US007131740B2

(12) United States Patent
Nishioka

(10) Patent No.: US 7,131,740 B2

(45) Date of Patent: Nov. 7, 2006

(54) OPTICAL SYSTEM AND OPTICAL APPARATUS PROVIDED WITH THE SAME

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/079,095

(22) Filed: Mar. 15, 2005

(65) Prior Publication Data

US 2005/0259335 A1 Nov. 24, 2005

(30) Foreign Application Priority Data

Mar. 17, 2004 (JP) ............................. 2004-076776
Aug. 10, 2004 (JP) ............................. 2004-233876
Aug. 10, 2004 (JP) ............................. 2004-233877

(51) Int. Cl.
*G02B 5/08* (2006.01)

(52) U.S. Cl. ...................................................... 359/862

(58) Field of Classification Search ................ 359/838, 359/862, 863
See application file for complete search history.

(56) References Cited

U.S. PATENT DOCUMENTS 7,031,069 B1 * 4/2006 Gruner et al. .............. 359/639
2002/0101646 A1 * 8/2002 Ide et al. .................... 359/295

FOREIGN PATENT DOCUMENTS

| | | |
|---|---|---|
| JP | 2000-298237 | 10/2000 |
| JP | 2002-189173 | 7/2002 |
| JP | 2002-233006 | 8/2002 |
| JP | 2002-233007 | 8/2002 |
| JP | 2003-029150 | 1/2003 |
| JP | 2003-077921 | 3/2003 |
| JP | 2003-098435 | 4/2003 |
| JP | 2003-102219 | 4/2003 |
| JP | 2003-233008 | 8/2003 |
| JP | 2003-302578 | 10/2003 |
| JP | 2004-109694 | 4/2004 |

* cited by examiner

*Primary Examiner*—Scott J. Sugarman
*Assistant Examiner*—Darryl J. Collins
(74) *Attorney, Agent, or Firm*—Pillsbury Winthrop Shaw Pittman LLP

(57) ABSTRACT

An optical system has a plurality of optical surfaces including a rotational-symmetrical optical surface and a reflection-type varaible optical-property element. The reflection-type variable optical-property element is interposed on the optical path between two optical surfaces, and a deflection angle θ of the optical axis caused by the reflection-type variable optical-property element satisfies the following condition:

$$10° < \theta < 67°.$$

24 Claims, 47 Drawing Sheets

POSITIVE DIRECTION OF X-AXIS OF CO-ORDINATES IS SURFACE DIRECTION OF THIS SHEET

POSITIVE DIRECTION OF X-AXIS OF CO-ORDINATES IS BACK DIRECTION OF THIS SHEET

FIG.54
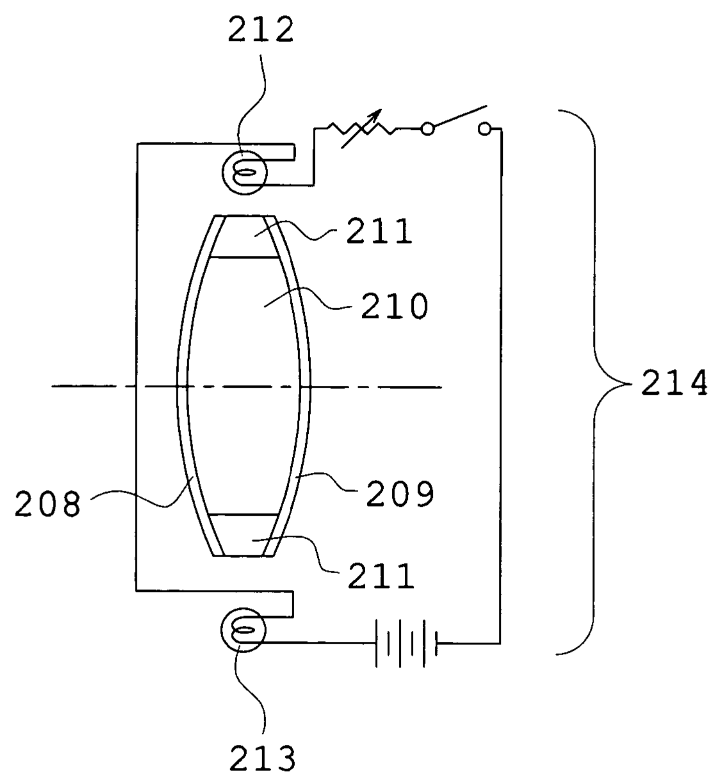
FIG.55A
FIG.55B
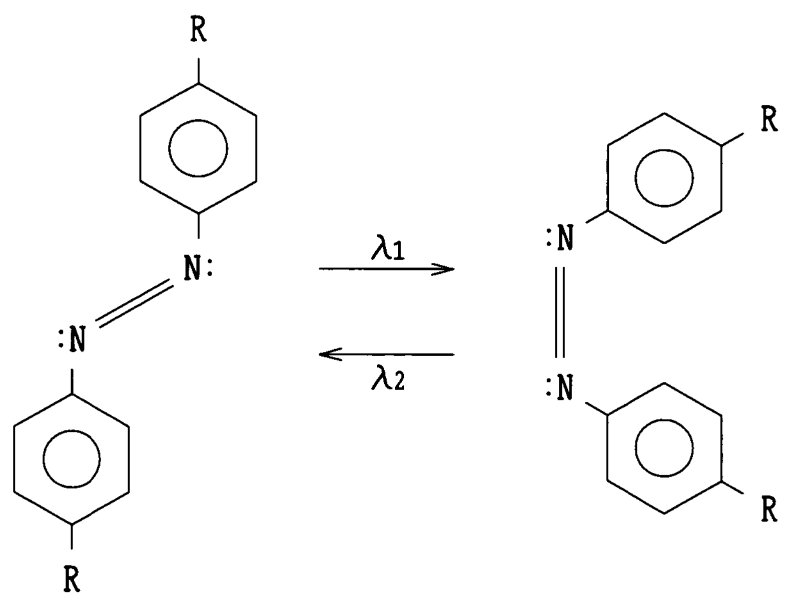

OPTICAL SYSTEM AND OPTICAL APPARATUS PROVIDED WITH THE SAME

This application claims benefits of Japanese Application Nos. 2004-76776 filed in Japan on Mar. 17, 2004; 2004-233876 filed in Japan on Aug. 10, 2004; and 2004-233877 filed in Japan on Aug. 10, 2004, the contents of which are incorporated by this reference.

BACKGROUND OF THE INVENTION

1. Field of the Invention

This invention relates to a variable optical-property element such as a variable mirror, a variable focal-length lens, a variable focal-length diffraction optical element, or a variable deflection-angle prism, and to an optical apparatus such as a digital camera, a TV camera, an endoscope, spectacles, a video projector, a telescope, a camera finder, an imaging apparatus of a mobile phone (a digital camera or TV camera of a mobile phone), an optical information processor, or an optical interconnection apparatus, provided with an optical system including the variable optical-property element.

2. Description of Related Art

Conventional lenses have been manufactured by polishing glass, and focal lengths cannot be changed by the lenses themselves. Thus, for example, to carry out focusing of a camera or the magnification change of an optical system, lens units must be moved along the optical axis, and a mechanical structure becomes complicated.

Because a motor or the like is used to move a part of the lens units, this conventional practice has disadvantages that power consumption is large, noise is produced, response time is long, and much time is required for moving lenses.

For shake prevention as well, mechanical movement of the lenses by a motor or a solenoid causes defects such as large power consumption and a complicated mechanical structure, resulting in a higher cost.

In order to obviate these defects, lenses using variable mirrors are proposed, for example, in Japanese Patent Kokai Nos. 2000-298237, 2002-189173, 2002-233006, 2002-233007, 2003-29150, 2003-98435, 2003-233008, 2003-302578, 2003-77921, 2003-102219, and 2004-109694.

SUMMARY OF THE INVENTION

The optical system according to the present invention has a plurality of rotational-symmetrical optical surfaces and one or a plurality of reflection-type variable optical-property elements. The reflection-type variable optical-property element is interposed on the optical path between two rotational-symmetrical optical surfaces, and a deflection angle θ of the optical axis caused by the reflection-type variable optical-property element satisfies one of the following conditions:

$$10° < \theta < 67°$$

$$10° < \theta / npr < 67°$$

where npr is the refractive index of an optical element having an optical surface opposite to the reflection-type variable optical-property element.

The optical system according to the present invention has a plurality of transmission-type rotational-symmetrical optical surfaces and a reflection-type variable optical-property element. The reflection-type variable optical-property element is interposed on the optical path between two transmission-type rotational-symmetrical optical surfaces and satisfies the following condition:

$$0.7 < |L/fw| < 50$$

where $L = L_1 + L_2 + \ldots L_n \ldots + L_B$, and in the optical path between the two transmission-type rotational-symmetrical optical surfaces that are located before and behind the variable optical-property element and do not construct the same transmissive surface, $L_1$ is a distance between a first reflecting surface from the object side and a transmission-type optical surface disposed on the object side of and being nearest to the first reflecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is the focal length of the optical system and stands for the focal length which is shortest (whose absolute value is small) when the focal length of the optical system is changed.

The optical system according to the present invention has a variable optical-property element, an optical element unit with negative power, and an optical element unit with positive power. The optical element unit with negative power and the optical element unit with positive power are moved and thereby the magnification change of the optical system is carried out.

The optical system according to the present invention has a variable optical-property element, together with an optical element unit with negative power and an optical element unit with positive power which are arranged in this order behind the variable optical-property element. The optical element unit with negative power and the optical element unit with positive power are moved and thereby the magnification change of the optical system is carried out.

The optical system according to the present invention has a first optical element unit with negative power, a variable optical-property element, a second optical element unit with positive power, a third optical element unit with negative power which is movable, and a fourth optical element unit with positive power which is movable. The third and fourth optical element units are moved and thereby the magnification change of the optical system is carried out.

The optical system according to the present invention has an optical element unit including a variable optical-property element, and at least two optical element units. At least three optical element units are moved and thereby the magnification change of the optical system is carried out.

The optical system according to the present invention has an optical element unit including a variable optical-property element, and at least two optical element units. The optical element unit including the variable optical-property element and the at least two optical element units are moved and thereby the magnification change of the optical system is carried out.

The optical system according to the present invention has an optical element unit including a variable optical-property element, and at least three optical element units. At least three of optical element units excluding the variable optical-property element are moved and thereby the magnification change of the optical system is carried out.

Also, the optical element unit refers to a unit including at least one optical element.

The optical apparatus according to the present invention includes the optical system of the present invention mentioned above.

These and other features and advantages of the present invention will become apparent from the following detailed description of the preferred embodiments when taken in conjunction with the accompanying drawings.

BRIEF DESCRIPTION OF THE DRAWINGS

FIG. 42 is a view showing schematically an example of a variable focal-length mirror which functions as the variable focal-length lens applicable to the optical system of the optical apparatus of the present invention;

FIG. 54 is a view showing schematically a further example of the variable optical-property element applicable to the optical system of the optical apparatus of the present invention, which is the variable focal-length lens using a photonical effect;

FIGS. 55A and 55B are explanatory views showing the structures of trans-type and cis-type azobenzene, respectively, used in the variable focal-length lens of FIG. 54;

DETAILED DESCRIPTION OF THE PREFERRED EMBODIMENTS

Figure 1:
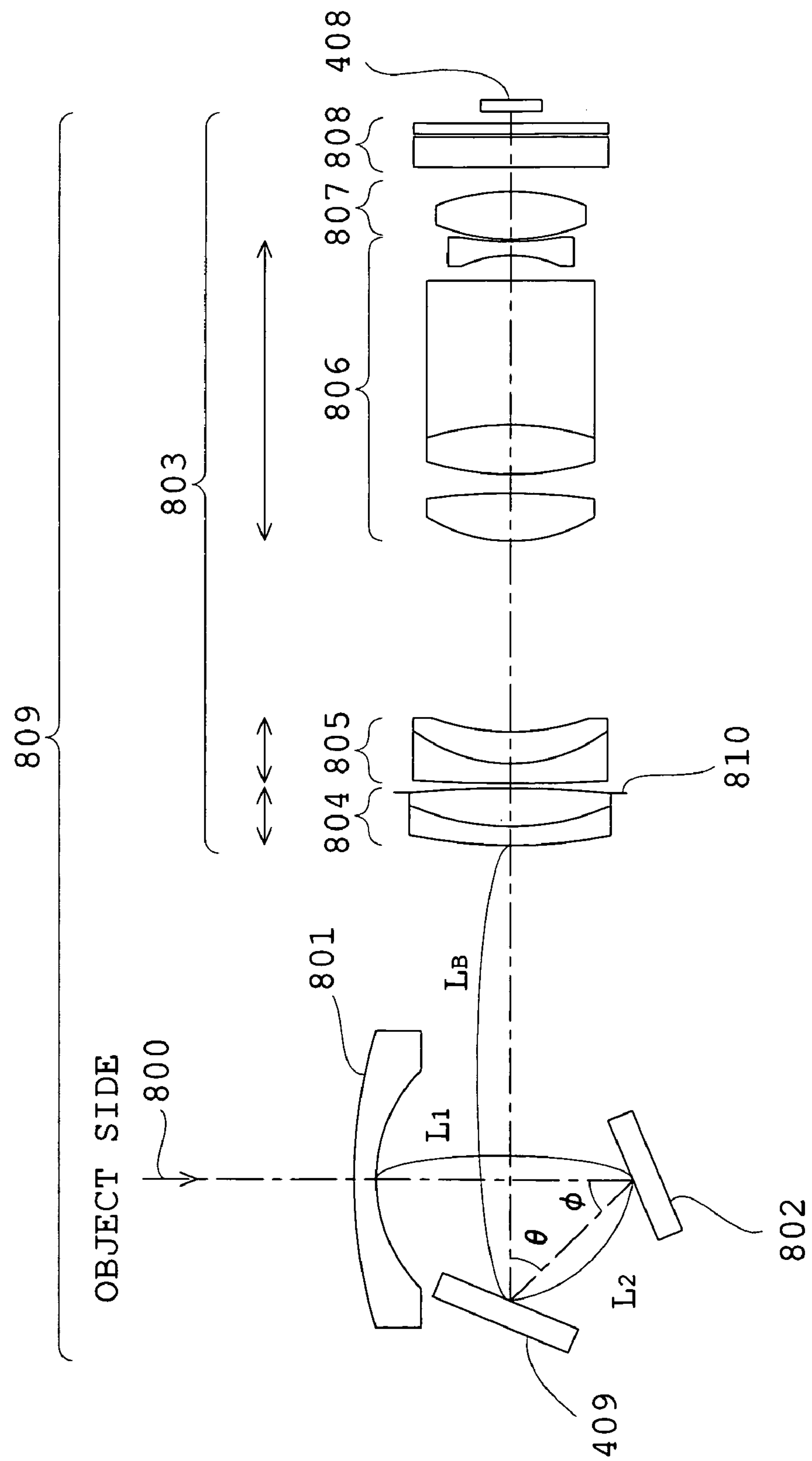
FIG. 1 is a view showing schematically the arrangement of a zoom imaging optical system using a variable mirror of one embodiment in the present invention.

FIG. 1 shows the arrangement of a zoom imaging optical system using a variable mirror 409 of one embodiment in the present invention. This zoom imaging optical system 809 comprises, in order from the object side, a concave lens 801, a mirror 802, the variable mirror 409 as the reflection-type variable optical-property element, a lens system 803, and an image sensor 408. The concave lens 801, the mirror 802, and the lens system 803 are designed to have rotational-symmetrical optical surfaces.

In the zoom imaging optical system 809, light traveling along an optical axis 800 (that is, an axial principal ray) is deflected by an angle $\phi$ at the mirror 802 through the concave lens 801 and is incident on the variable mirror 409. The optical axis 800 is deflected by an angle $\theta$ at the variable mirror 409 and enters the lens system 803 which is a rear lens unit.

The lens system 803 includes a lens unit 804, a lens unit 805, a lens unit 806, a lens unit 807, and a filter unit 808 so that the lens units 804 and 806 can be moved independently along the optical axis (that is, in left and right directions of the figure), and thereby the magnification change (zooming) of the optical system is brought about. The optical axis is bent by two reflecting surfaces of the variable mirror 409 and the mirror 802 to intersect.

Also, the mirror 802 may be constructed as the variable mirror.

Reference numeral 800 represents an aperture stop.

The zoom imaging optical system is constructed so that focusing can be performed by only the deformation of the variable mirror 409.

This embodiment is constructed as mentioned above, and thus there is no need to move lenses in focusing. Consequently, it is possible to realize the optical system and the optical apparatus which are extremely small in power consumption, do not practically produce operation noise, are simple in mechanical structure, are compact in design, and are low in cost.

It is desirable that the reflecting surface of the variable mirror 409 is configured as a free-formed surface. In doing so, correction for aberration is facilitated, which is advantageous.

In the imaging optical system 809 of FIG. 1, when the surface of the variable mirror 409 is deformed from a flat surface into a curved surface, decentration aberration is produced by the reflection of the mirror surface. In particular, in focusing of a near point that the amount of deformation of the variable mirror 409 is large, the decentration aberration is considerably produced. Hence, in order to obtain good optical performance in the range from the far point to the near point, shift or tilt decentration is applied to a lens or an imaging surface (the surface of the image sensor 408), which is fixed. Whereby, the production of the decentration aberration in focusing is balanced.

In the imaging optical system 809 of FIG. 1, to correct the decentration aberration, at least one rotational-symmetrical lens, a lens unit, or the imaging surface is placed to have the shift or tilt decentration with respect to the Z axis.

By doing so, a residual amount of decentration aberration increases as the power of a deformable mirror becomes strong, but in such a case also, it becomes possible to obtain good optical performance. Also, decentration in the optical system applied to the optical apparatus of the present invention refers to a shift or a tilt.

The variable mirror 409 is controlled so that it is deformed into a rotational-symmetrical shape and the balance of aberration in focusing is improved, together with the shift or tilt decentration applied to the lens unit or the imaging surface.

Instead of applying the shift or tilt decentration to the lens unit or the imaging surface, the optical system may be designed to change the profile of the reflecting surface of the variable mirror 409 or decentration so that the variable mirror 409 corrects the decentration aberration by itself.

According to the imaging optical system 809 of FIG. 1, the variable mirror 409 is constructed so that as an object distance in focusing becomes short, positive power is increased. Whereby, favorable focusing can be performed in a wide range from the far point to the near point. Also, in this specification, power signs are defined as plus in the case of a converging function and minus in the case of a diverging function. That is, in the deformable mirror, as the amount of deformation of the concave surface is increased, the positive power becomes strong.

The variable mirror 409 may be designed so that it can be provided with only the positive power. By doing so, mechanical and electrical structures are simplified, and a low-cost deformable mirror can be provided.

The variable mirror 409 may be constructed so that it can be provided with both the positive power and the negative power in accordance with deformation. Whereby, the production of decentration aberration of the deformable mirror is suppressed and good optical performance can be attained. Specifically, in the deformable mirror, as the power is increased, the amount of deformation becomes large, and thereby decentration aberration is produced to degrade optical performance. However, the deformable mirror has both the positive power and the negative power and thereby the amount of deformation is held so that the production of decentration aberration is suppressed and good optical performance can be obtained.

It is favorable that the variable mirror 409 is constructed so that the periphery of a thin film constituting the mirror surface is fixed to a zonal member when the mirror surface is deformed. It is further favorable that the variable mirror 409 is such that the middle of the mirror surface is displaced.

The optical system applicable to the present invention and the optical apparatus using this optical system are constructed to have at least one cemented lens. Specifically, in the lens system 809 of the embodiment of FIG. 1, each of the lens units 804 and 805 is constructed as a cemented lens and the lens unit 806 has a cemented lens. By doing so, chromatic aberration produced in each of the lens units can be favorably corrected. Moreover, this arrangement can contribute to the compact design of the optical system.

The variable mirror 409 may be designed to have not only a focusing function, but also the functions of camera shake compensation, manufacturing error compensation, and the magnification change at the same time.

It is desirable that when the bending angle of the axial principal ray caused by the variable mirror is denoted by θ, the optical system applicable to the present invention and the optical apparatus using this optical system satisfy, in a certain state, the following condition;

$$10° < \theta < 67° \quad (1)$$

If the lower limit of Condition (1) is exceeded, bent light beams will interfere with each other and an optical design becomes difficult. Beyond the upper limit of Condition (1), decentration aberration is increased and imaging performance is impaired.

Also, the axial principal ray refers to a ray that emanates from the center of the object, passes through the center of the stop, and reaches the center of the image. The axial principal ray is usually called the optical axis.

It is desirable that the optical system applicable to the present invention and the optical apparatus using the optical system satisfy, in a certain state, the following condition:

$$15° < \theta < 56° \quad (1')$$

Whereby, better results are obtained with respect to the optical design and imaging performance.

It is desirable that the optical system applicable to the present invention and of the application with a higher degree of accuracy and the optical apparatus using this optical system satisfy, in a certain state, the following condition:

$$20° < \theta < 47° \quad (1'')$$

Whereby, much better results are obtained with respect to the optical design and imaging performance.

Figure 2:
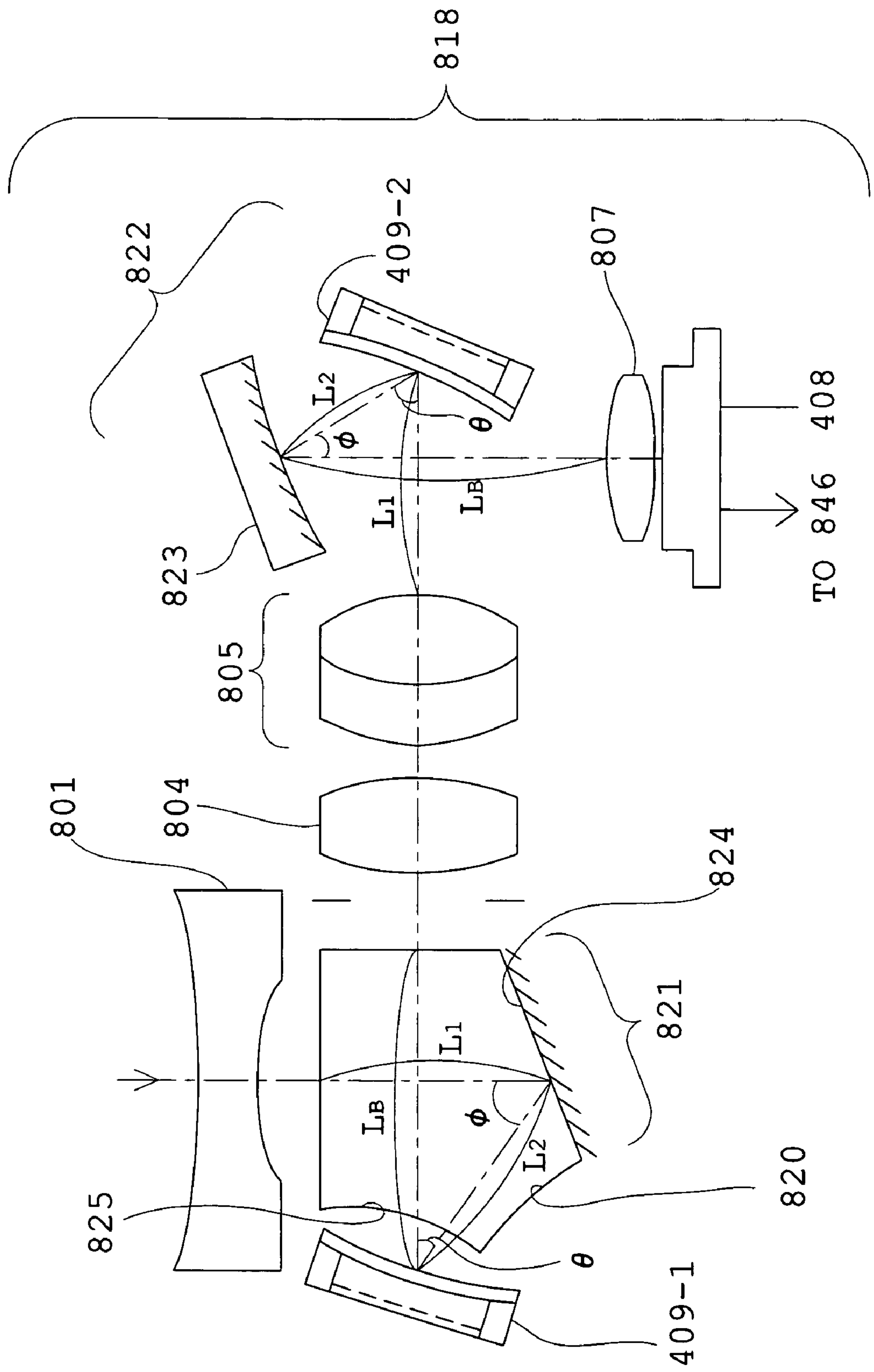
FIG. 2 is a view showing schematically the arrangement of the imaging optical system using the variable mirror of another embodiment in the present invention.
Figure 3:
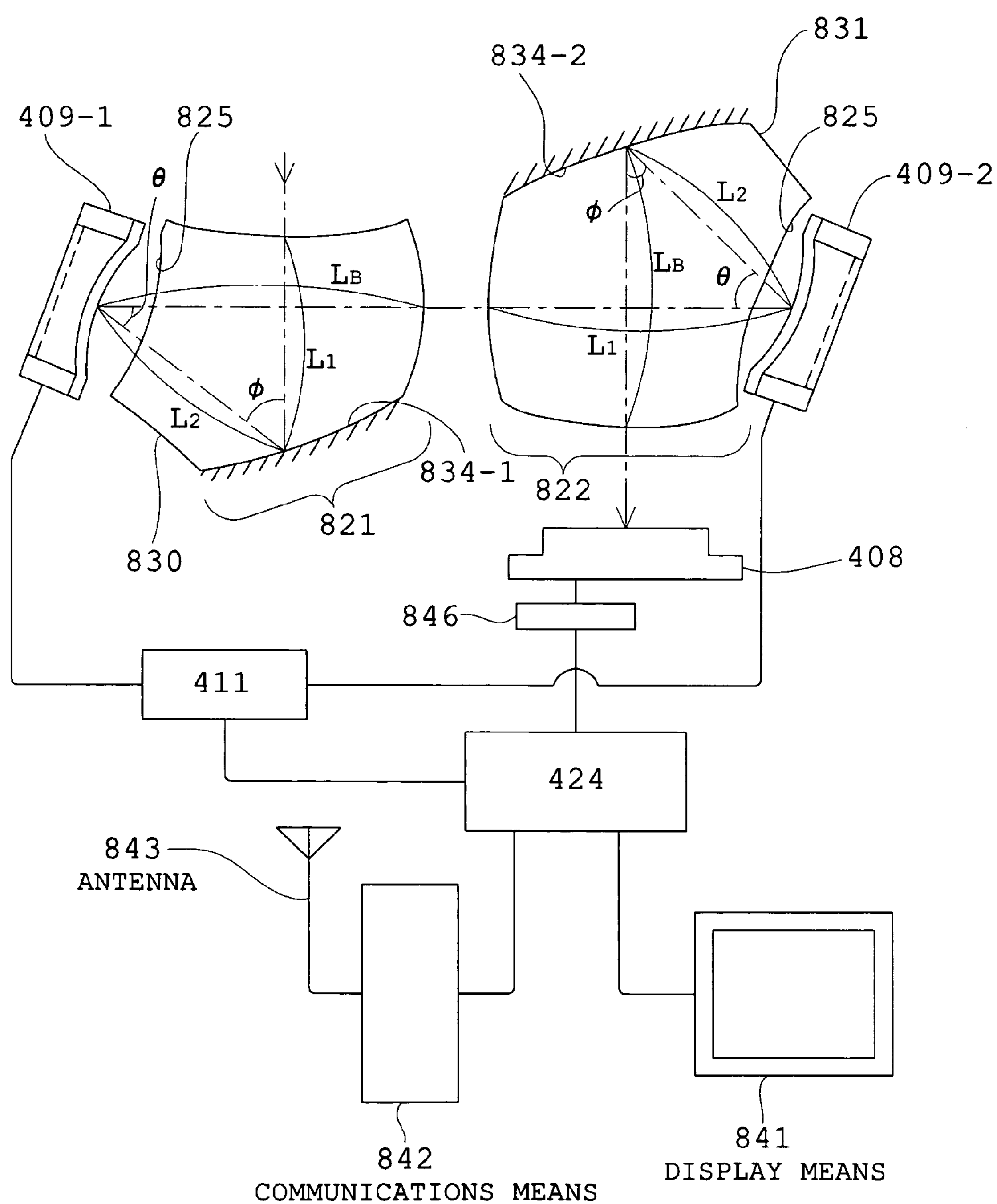
FIG. 3 is a view showing schematically the arrangement of the imaging optical system using the variable mirror of still another embodiment in the present invention.

As shown in FIGS. 2 and 3, when prism surfaces or optical element surfaces are placed opposite to variable mirrors 409-1 and 409-2, the optical system and the optical apparatus, instead of satisfying Conditions (1), (1'), and (1"), may satisfy the following conditions.

$$10° < \theta / npr < 67° \quad (2)$$

$$15° < \theta / npr < 56° \quad (2')$$

$$20° < \theta / npr < 47° \quad (2'')$$

where npr is the refractive index of a prism (a prism 820 in FIG. 2 or a prism 830 or 831 in FIG. 3) opposite to the variable mirror, or of another optical element.

FIG. 2 shows the arrangement of the zoom imaging optical system using the variable mirror of another embodiment in the present invention. FIG. 3 shows the arrangement of the zoom imaging optical system using the variable mirror of still another embodiment in the present invention.

The imaging optical system 818 of FIG. 2 comprises the concave lens 801, the curved-surface prism 820, the variable mirror 409-1, the lens unit 804, the lens unit 805 including a cemented lens, a variable mirror 409-2, a curved mirror 823, the lens unit 807, and the image sensor 408.

The imaging optical system of FIG. 3 comprises a curved-surface prism 830, the variable mirror 409-1, a curved-surface prism 831, the variable mirror 409-2, and the image sensor 408. Also, in FIG. 3, reference numeral 846 represents an electronic circuit, 411 represents a driving circuit provided with variable resisters that change voltages applied to electrodes provided in the variable mirrors 409-1 and 409-2, and 424 represent a shake sensor.

In the optical system of FIG. 2, the curved-surface prism 820 and the curved mirror 823 are constructed so that all optical surfaces are rotational symmetrical. The curved-surface prism 820 has a reflecting surface 824. The optical surfaces of the curved-surface prism 820, however, may include rotational-symmetrical surfaces or free-formed surfaces.

In the optical system of FIG. 3, the curved-surface prisms 830 and 831 are such that their optical surfaces include rotational-asymmetrical surfaces or free-formed surfaces. In addition, the curved-surface prisms 830 and 831 have reflecting surfaces 834-1 and 8342, respectively. Also, it is assumed that the rotational-symmetrical surfaces include plane surfaces.

In the case where the optical axis bending section is constructed with two reflecting surfaces, it is desirable that values of the bending angle θ of the axial principal ray caused by the variable mirror and the deflection angle φ of the optical axis by another reflecting surface satisfy a condition described below on the mechanical design. When bent optical axis intersects as in the optical system of each of the embodiments of FIGS. 1, 2, and 3, it is desirable to satisfy the following condition:

$$45° \leqq \theta/npr+\phi \leqq 130° \quad (3)$$

In this case, it is further desirable to satisfy the following condition:

$$60° \leqq \theta/npr+\phi \leqq 115° \quad (3'')$$

In the absence of the prism or optical element opposite to the variable mirror 409, npr=1.

When the bent optical axis does not intersect unlike FIG. 3, it is desirable, for the same reason, to satisfy the following condition:

$$90° \leqq \theta/npr+\phi \leqq 220° \quad (4)$$

In this case, it is further desirable to satisfy the following condition:

$$75° \leqq \theta/npr+\phi \leqq 205° \quad (4'')$$

Figure 4:
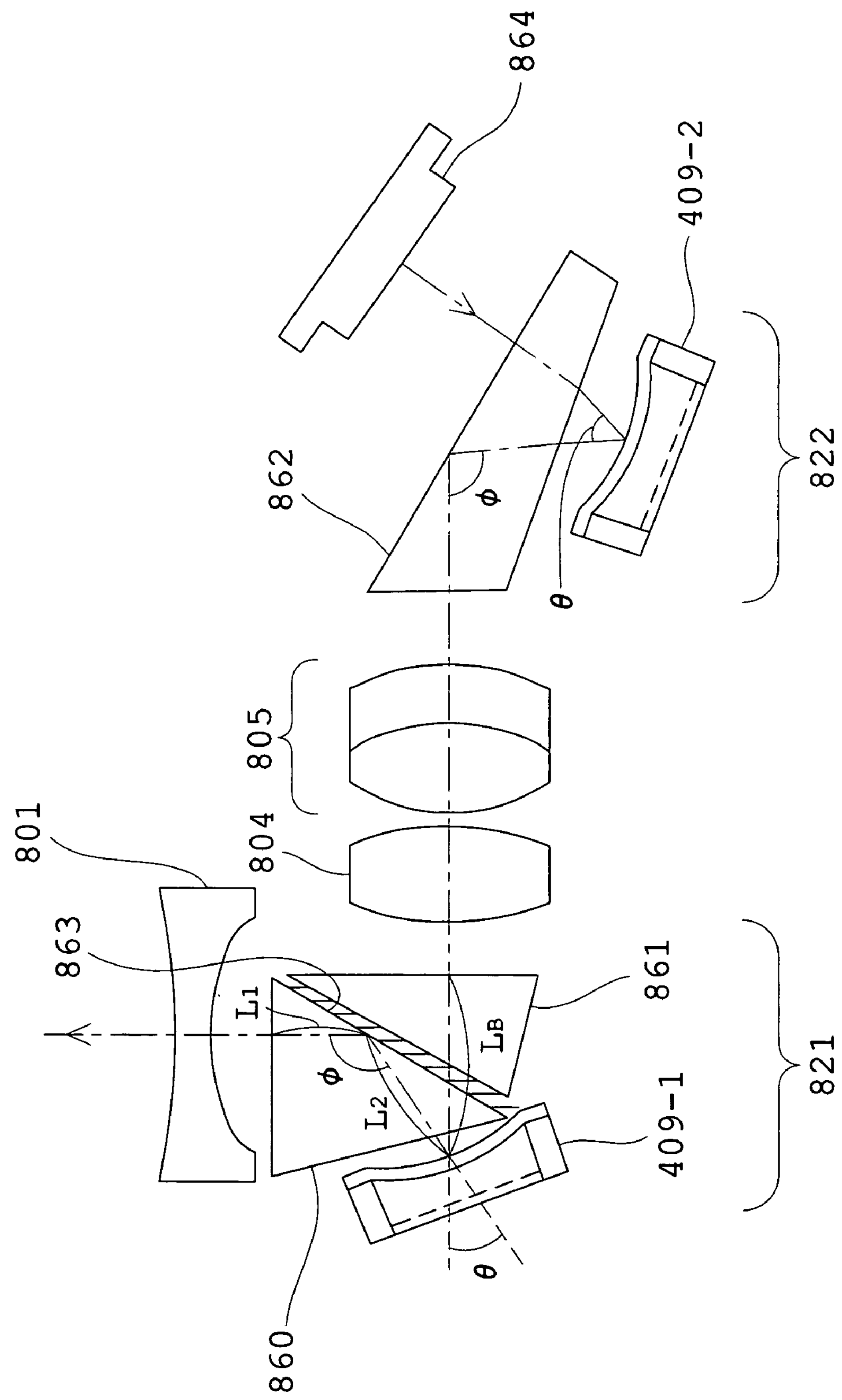
FIG. 4 is a view showing schematically the arrangement of a display optical system using the variable mirror of a further embodiment in the present invention.

FIG. 4 shows a display optical system using the variable mirror of a further embodiment in the present invention. The display optical system comprises a display element 864, a prism 862, the variable mirror 409-2, the lens unit 805 including a cemented lens, the lens unit 804, prisms 861 and 860, the variable mirror 409-1, and the concave lens 801. The prism 860 and the prism 861 are cemented to each other with an adhesive of low refractive index.

In the optical system applicable to the present invention and the optical apparatus using the optical system, it is favorable for the mechanical design that, in order to obviate the mutual interfere of light beams, the deflection angle φ of the optical axis caused by the reflecting angle other than the variable mirror satisfies a condition described below. When the optical axis does not intersect, it is desirable to satisfy the following condition:

$$25° \leqq \phi \leqq 75° \quad (5)$$

It is further desirable, instead of satisfying Condition (5), to satisfy the following condition:

$$30° \leqq \phi \leqq 60° \quad (5')$$

When the optical axis intersects, it is desirable to satisfy the following condition:

$$105° \leqq \phi \leqq 155° \quad (6)$$

It is further desirable, instead of satisfying Condition (6), to satisfy the following condition:

$$120° \leqq \phi \leqq 150° \quad (6')$$

When the optical axis bending section is constructed with two reflecting surfaces as in the optical system of FIG. 1, the optical system that is particularly advantageous for mechanical design is attained by choosing the angles θ and φ so as to satisfy the following conditions:

$$39° \leqq \theta \leqq 46° \quad (7)$$

$$39° \leqq \phi \leqq 46° \quad (8)$$

A considerable effect is brought about even when the optical system, instead of satisfying Conditions (7) and (8), satisfies the following conditions:

$$30° \leqq \theta \leqq 60° \quad (7')$$

$$30° \leqq \phi \leqq 60° \quad (8')$$

It is desirable that when the magnification of a lens unit located on the image side of the variable mirror, that is, of a lens unit ranging from an optical surface situated immediately behind the variable mirror to the last surface, is denoted by β1, the optical system applicable to the present invention and the optical apparatus using the optical system satisfy a condition described below in a certain state. However, in the case of a variable magnification optical system such as that shown in FIG. 1, it is only necessary that the value of the magnification β1 whose absolute value is minimum satisfies the following condition:

$$0.05<|\beta 1<1.1 \quad (9)$$

Below the lower limit of Condition (9), the magnification of the lens unit located behind the variable mirror becomes extremely low. Hence, the focus sensitivity of the variable mirror is impaired and the amount of deformation of the variable mirror necessary for focusing is increased. Beyond the upper limit of Condition (9), the magnification of the lens unit becomes extremely high. Thus, decentration aberration produced in the variable mirror is increased and it becomes difficult to obtain satisfactory optical performance.

In the optical system applicable to the present invention and the optical apparatus using the optical system, it is desirable to satisfy, in a certain state, the following condition $$0.1<|\beta 1<0.8 \quad (9')$$

Whereby, optical performance is ensured and the amount of deformation of the variable mirror is kept within a suitable limit. As such, a more favorable result is obtained.

In the optical system with a higher degree of accuracy, it is desirable to satisfy, in a certain state, the following condition:

$$0.17<|\beta 1|<0.5 \quad (9'')$$

Whereby, optical performance is further ensured and the amount of deformation of the variable mirror is kept within a more suitable limit. As such, a further favorable result is obtained.

It is more desirable to satisfy the following condition:

$$0.2<|\beta 1|<0.35 \quad (9''')$$

Now, a length from a first reflecting surface (for example, the mirror 802 in the embodiment of FIG. 1) to the most object-side transmission-type optical surface (the image-side surface of the concave lens 801 in FIG. 1) is denoted by $L_1$. A length from the first reflecting surface to a second reflecting surface (the reflecting surface of the variable mirror 409 in FIG. 1) is denoted by $L_2$. A length from the rearmost reflecting surface (the variable mirror 409 in FIG. 1) to the transmission-type optical surface of a rear lens unit closest to the reflecting surface (the object-side surface of the lens unit 804 in FIG. 1) is denoted by $L_B$.

Also, in the case of the variable magnification optical system such as that shown in FIG. 1, the lens unit 804 is moved and thus it is assumed that the position of the lens unit 804 where the lens unit 804 is moved closest to the variable mirror 409 is determined as the length $L_B$. The sum of these lengths is represented by L as described below.

$$L=L_1+L_2+L_3+ \ldots +L_B \quad (10)$$

Even when the number of reflecting surfaces interposed between one lens unit (the lens unit 801 in FIG. 1) and another lens unit (the lens unit 804 in FIG. 1) is more than 2, the length L is defined by Equation (10).

Also, even when a single reflecting surface is provided, Equation (10) and Equations (11), (11'), and (11") can be applied in the present invention.

In this case, it is desirable to satisfy the following condition:

$$2<|L/fw|<25 \tag{11}$$

Here, fw is the focal length of the optical system and stands for the focal length at the wide-angle position (that is, where the absolute value of the focal length is smallest), for example, in the case of the variable magnification optical system of FIG. 1. Also, when the focal length fw is calculated, the surface profile of the reflection-type variable optical-property element is thought of as a plane surface.

If the value of |L/fw| is below the lower limit of Condition (11), it becomes difficult to place the reflecting surface because of the eclipse of the light beam. If, on the other hand, the value of |L/fw| is beyond the upper limit of Condition (11), problems will arise that the dimension of the entire lens is increased and correction for aberration becomes difficult.

It is further desirable, instead of satisfying Condition (11), to satisfy the following condition:

$$4<|L/fw|<15 \tag{11'}$$

In the optical system whose F-number is large, it is desirable in practical use to satisfy the following condition:

$$0.7<|L/fw|<50 \tag{11''}$$

In the optical system 818 such as that shown in the embodiment of FIG. 2, each of the lengths $L_1$, $L_2$, and $L_B$ indicates a corresponding portion of the figure. The optical system 818 has the optical axis bending sections indicated by numerals 821 and 822, the lengths $L_1$, $L_2$, and $L_B$ are defined individually.

In the present invention, it is assumed that when the lengths $L_1, L_2, \ldots, L_B$ are measured, a surface 825 of the curved surface prism 820 opposite to the variable mirror 409 is not regarded as the transmission-type optical surface as it is usually called in the present invention, no matter whether the surface 825 is a curved surface or the plane surface. That is, in the present invention, the surface that is the transmission-type optical surface located before or behind the variable mirror and constitutes the same transmissive surface is eliminated from the reference of the length.

In the embodiment of FIG. 2, the surface 825 is configured as a rotational-symmetrical surface.

In the optical system including two free-formed surface prisms 830 and 831 as in the embodiment of FIG. 3, the lengths $L_1$, $L_2$, and $L_B$ are defined as shown in FIG. 3. That is, except for the surface 825, the curved surfaces of the free-formed surface prisms 830 and 831 are thought of as the lens surfaces and the lengths $L_1$, $L_2$, and $L_B$ are measured.

The embodiment of FIG. 3 is an example of a digital camera optical system for mobile phones. The embodiment of FIG. 4 is an example of the display optical system having two optical axis bending sections. A surface 863 applying the adhesive of low refractive index has two functions of transmission and total reflection.

Figure 5:
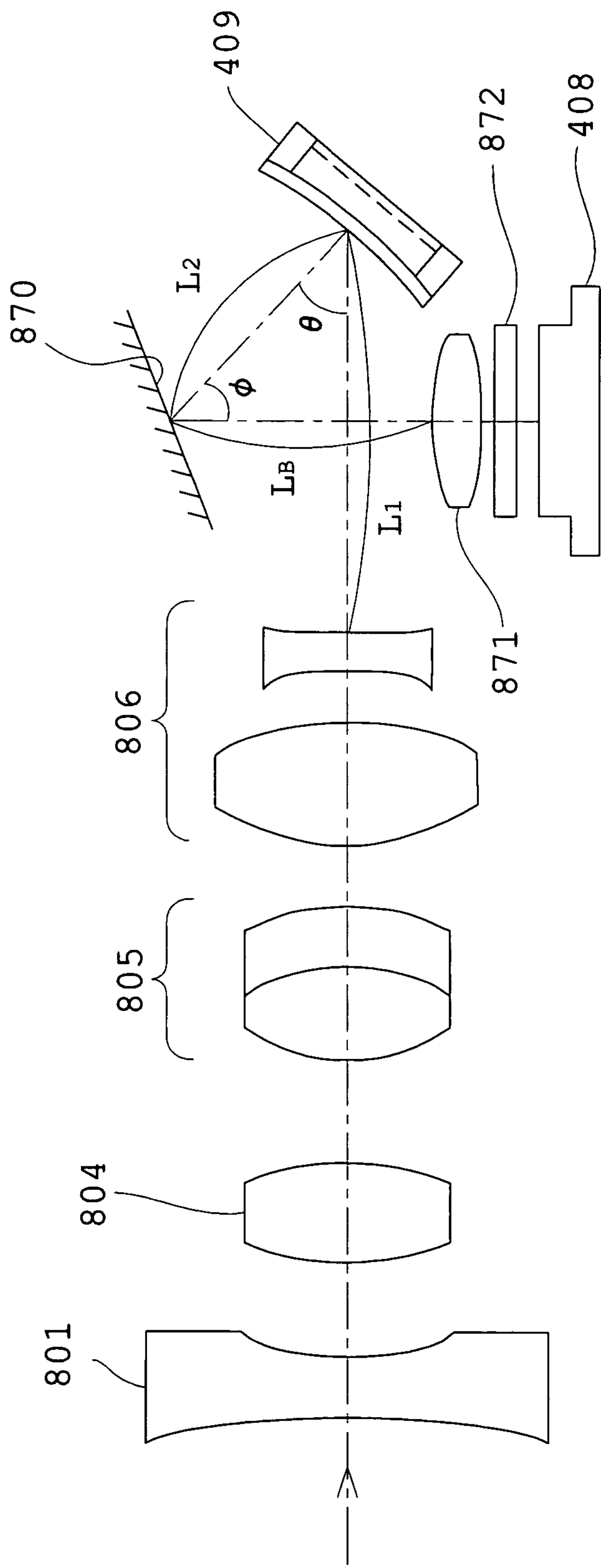
FIG. 5 is a view showing schematically the arrangement of the zoom imaging optical system having an optical axis bending section behind lenses, of a still further embodiment in the present invention.

FIG. 5 show the arrangement of the zoom imaging optical system having the optical axis bending section behind lenses, of a still further embodiment of the present invention.

The imaging optical system of the embodiment in FIG. 5 comprises the concave lens 801, the lens unit 804, the lens unit 805 provided with a cemented lens, the lens unit 806, the variable mirror 409, a mirror 870, a lens 871, a filter unit 872 including a low-pass filter and an infrared cutoff filter, and the image senor. In the optical system of FIG. 5, the concave surface 801, the lens units 804, 805, and 806, the mirror 870, the lens 871, and the filter unit are such that all optical surfaces are constructed as rotational-symmetrical surfaces. Also, when a lens frame for the concave lens 801 and the lens units 804-806 is designed to have a collapsible mount type (a slide type), the overall length can be reduced where the imaging optical system is not utilized, which is convenient for carrying. Any example of FIGS. 1–3 and 5 has the feature that the relative positions of the reflection-type variable optical-property element and the imaging surface are fixed. This is good practice because the fabrication of the optical system is facilitated. In the example of each of FIGS. 1–3, the relative positions of the imaging surface and the most object-side optical element are fixed. This is favorable because the optical apparatus becomes sturdy. Even when the position of any optical element is fixed with respect to the image sensor, the same effect is brought about.

In the optical system applicable to the present invention and the optical apparatus using the optical system, when a lens unit with negative power is placed on the object side of the variable mirror, it is desirable to satisfy, in a certain state, the following condition:

$$-10.0<f1/f<-0.15 \tag{12}$$

where f1 is the focal length of the lens unit with negative power and f is the focal length of the optical system.

When the optical system is constructed as mentioned above, a compact design, a cost reduction, and favorable optical performance of the deformable mirror can be attained. Specifically, below the lower limit of Condition (12), the negative power of the negative lens unit becomes so weak that the height of the off-axis ray of the deformable mirror at the wide-angle position cannot be reduced. This causes oversizing of the deformable mirror and an increase in cost. Beyond the upper limit of Condition (12), the negative power of the negative lens unit becomes so strong that it becomes difficult to correct coma and chromatic aberration of magnification, produced in the lens unit.

In the optical system applicable to the present invention and the optical apparatus using the optical system, it is desirable to satisfy, in a certain state, the following condition:

$$-4.5<f1/f<-0.4 \tag{12'}$$

When the optical system is constructed in this way, good optical performance is ensured and further compactness of the deformable mirror can be realized.

When the maximum amount of deformation of the deformable mirror is denoted by md and the focal length of the optical system is denoted by f, the optical system applicable to the present invention and the optical apparatus using the optical system are characterized by satisfying, in a preset state, the following condition:

$$0<|md/f|<0.3 \tag{13}$$

In the present invention, however, the focal length f of the optical system is defined as the focal length of the optical system where the reflecting surface of the deformable mirror has a plane shape.

Whereby, the amount of deformation of the deformable mirror can be kept within a proper limit. Specifically, beyond the upper limit of condition (13), the amount of deformation of the deformable mirror becomes so large that the amount of production of decentration aberration is increased, and it becomes difficult to fulfill desired optical performance. Moreover, the difficulty of fabrication is increased.

In the optical system applicable to the present invention and the optical apparatus using the optical system, it is desirable to satisfy, in a preset state, the following condition:

$$0<|md/f|<0.1 \quad (13')$$

When the optical system is constructed as mentioned above, the amount of production of decentration aberration can be further suppressed.

In the optical system applicable to the present invention and the optical apparatus using the optical system, it is desirable to satisfy, in a preset state, the following condition:

$$0<|md/f|<0.03 \quad (13'')$$

When the optical system is constructed as mentioned above, the amount of production of decentration aberration can be more favorably suppressed.

When the maximum amount of deformation of the deformable mirror is denoted by md and an optically effective area of the reflecting surface of the deformable mirror is denoted by Sm, the optical system applicable to the present invention and the optical apparatus using the optical system are characterized by satisfying, in a preset state, the following condition:

$$0<md^2/Sm<5.0\times10^{-4} \quad (14)$$

Whereby, the amount of deformation of the deformable mirror can be kept within a proper limit.

In the optical system applicable to the present invention and the optical apparatus using the optical system, it is desirable to satisfy, in a preset state, the following condition:

$$0<md^2/Sm<1.0\times10^{-4} \quad (14')$$

Whereby, the amount of deformation of the deformable mirror can be more favorably kept within a proper limit.

In the optical system applicable to the present invention and the optical apparatus using the optical system, when the variable mirror is of a voltage driving system (utilizing electrostatic drive and a piezoelectric effect, for instance), it is desirable to satisfy, in a preset state, the following condition:

$$0\leqq|Vm|<500 \quad (15)$$

where Vm (volt) is a voltage applied to the variable mirror when the focal length of the variable mirror is changed.

Whereby, it is possible to diminish the dangerous property of an electric discharge into air and to increase the amount of deformation of the deformable mirror.

In the optical system applicable to the present invention and the optical apparatus using the optical system, it is desirable to satisfy, in a preset state, the following condition:

$$0<|Vm|<300 \quad (15')$$

Whereby, power consumption can be lowered and thus the optical system and the optical apparatus that are more favorable can be provided.

In the optical system applicable to the present invention and the optical apparatus using the optical system, when an amount proportional to the power of the deformable mirror is represented by $\phi$DM and the focal length of the optical system is represented by f, it is desirable to satisfy, in a preset state, the following condition:

$$0\leqq|\phi DM\times f|<1.00 \quad (16)$$

Here, the amount $\phi$DM proportional to the power of the variable mirror is the average of an amount $\phi$DMy proportional to the power in a plane of the direction of decentration (the Y direction) of the deformable mirror and an amount $\phi$DMx proportional to the power in a plane of a direction (the X direction) perpendicular to the above direction, and is defined as $\phi DM=(\phi DMx+\phi DMy)/2$. In the present invention, by using C4 and C6 of power components to be described later, the amounts are defined as $\phi DMx=C4$ and $\phi DMy=C6$.

Whereby, the focusing function of the deformable mirror can be satisfactorily obtained and decentration aberration produced in the deformable mirror can be suppressed within a proper limit.

In the optical system applicable to the present invention and the optical apparatus using the optical system, it is desirable to satisfy, in a preset state, the following condition:

$$0\leqq|\phi DM\times f|<0.50 \quad (16')$$

Whereby, decentration aberration produced in the deformable mirror can be further suppressed.

In the optical system applicable to the present invention and the optical apparatus using the optical system, it is desirable to satisfy, in a preset state, the following condition:

$$0\leqq|\phi DM\times f|<0.10 \quad (16'')$$

Whereby, decentration aberration produced in the deformable mirror can be more favorably suppressed.

In the optical system applicable to the present invention and the optical apparatus using the optical system, it is desirable that when focusing is performed on a far point by the variable mirror, the variable mirror can be deformed into a state of lower power than in a state of focusing.

When the optical system is constructed in this way, it becomes possible to perform an autofous operation of a contrast system. Specifically, the variable mirror has lower power than in focusing of the far point, and thereby the degree of the blurring of an image at the far point where a focusing position is detected can be adjusted.

In the optical system applicable to the present invention and the optical apparatus using the optical system, it is desirable that when focusing is performed on a near point by the variable mirror, the variable mirror can be deformed into a state of higher power than in a state of focusing.

When the optical system is constructed in this way, it becomes possible to perform an autofous operation of a contrast system. Specifically, the variable mirror has higher power than in focusing of the near point, and thereby the degree of the blurring of an image at the near point where a focusing position is detected can be adjusted.

In the optical system applicable to the present invention and the optical apparatus using the optical system, it is desirable that when focusing is performed on an infinite object point at an object distance by the variable mirror, the variable mirror is deformed into not a plane shape, but a concave shape that has larger power than zero.

In the optical system applicable to the present invention and the optical apparatus using the optical system, it is desirable that the lens unit with negative power placed on the object side of the variable mirror is constructed with a single concave lens. Whereby, only one lens is provided on the object side of the variable mirror, and thus the optical system of compact and slim design can be attained.

It is further desirable that the lens unit with negative power is constructed with a biconcave aspherical lens or an aspherical lens in which the absolute value of the radius of curvature of the image-side surface is smaller than that of the radius of curvature of the object-side surface. By doing so, distortion and coma can be favorably corrected.

In the optical system applicable to the present invention and the optical apparatus using the optical system, when the overall length of the optical system is denoted by Cj and the focal length of the optical system is denoted by f, it is desirable to satisfy, in a certain state, the following condition:

$$1.0<Cj/f<60.0 \quad (17)$$

Beyond the upper limit of Condition (17), the overall length of the optical system becomes so vast that the compact design is difficult. Below the lower limit of Condition (17), the compact design can be attained, but the arrangement of lens units is limited and sufficient optical performance cannot be obtained.

Also, the overall length Cj refers to a distance, measured by extending the bent optical axis, from the most object-side optical element to the imaging surface. The optical system of the present invention can also be used in a display apparatus for projecting and displaying an image appearing on the display such as an LCD, but in the display apparatus, the length Cj refers to a distance from a display element to the surface of the most image-side optical element.

In the optical system applicable to the present invention and the optical apparatus using the optical system, it is desirable to satisfy, in a certain state, the following condition:

$$3.0<Cj/f<40.0 \quad (17')$$

Whereby, the optical system, although compact, is capable of exhibiting higher optical performance.

In the optical system applicable to the present invention and the optical apparatus using the optical system, it is desirable to satisfy, in a certain state, the following condition:

$$5.0<Cj/f<23.0 \quad (17'')$$

Whereby, the optical system, although compact, is capable of exhibiting more favorable optical performance.

In the optical system applicable to the present invention and the optical apparatus using the optical system, when a shift is applied to at least one lens in order to correct decentration aberration produced in the variable mirror, it is desirable to satisfy, in a certain state, the following condition:

$$0.0 \leqq |\delta/f| < 1.00 \quad (18)$$

where δ is the amount of shift of the lens and f is the focal length of the optical system.

Whereby, the amount of decentration applied to the lens can be kept within a proper limit, and the balance of optical performance between weak power and strong power of the variable mirror can be held. Here, the amount of shift δ is defined as a distance between the center axis of the lens to which the shift is applied and the Z axis of the optical system.

In the optical system applicable to the present invention and the optical apparatus using the optical system, it is desirable to satisfy, in a certain state, the following condition:

$$0.0 \leqq |\delta/f| < 0.50 \quad (18')$$

Whereby, performance in focusing of the far point and the near point can be further improved.

In the optical system applicable to the present invention and the optical apparatus using the optical system, it is desirable to satisfy, in a certain state, the following condition:

$$0.0 \leqq |\delta/f| < 0.25 \quad (18'')$$

Whereby, performance in focusing of the far point and the near point can be more favorably improved.

In the optical system applicable to the present invention and the optical apparatus using the optical system, when a tilt is applied at least one lens or the imaging surface in order to correct decentration aberration produced in the deformable mirror, it is desirable to satisfy, in a certain state, the following condition:

$$0.0° \leqq |\epsilon| < 20° \quad (19)$$

where ε is the amount of tilt of the lens.

Whereby, the amount of decentration applied to the lens can be kept within a proper limit, and the balance of optical performance between weak power and strong power of the deformable mirror can be held. Here, the amount of tilt ε is defined as an inclination angle made by the center axis of the lens to which the shift is applied or of the imaging surface with the Z axis of the optical system.

In the optical system applicable to the present invention and the optical apparatus using the optical system, it is desirable to satisfy, in a certain state, the following condition:

$$0.0° \leqq |\epsilon| < 10° \quad (19')$$

Whereby, performance in focusing of the far point and the near point can be further improved.

In the optical system applicable to the present invention and the optical apparatus using the optical system, it is desirable to satisfy, in a certain state, the following condition:

$$0.0° \leqq |\epsilon| < 5.5° \quad (19'')$$

Whereby, performance in focusing of the far point and the near point can be more favorably improved.

In the optical system applicable to the present invention and the optical apparatus using the optical system, it is desirable that, among the absolute values of amounts of tilt applied to individual lenses or the imaging surface, the absolute value of the amount of tilt to the imaging surface is maximum.

In the optical system applicable to the present invention and the optical apparatus using the optical system, it is desirable that the direction of the tilt applied to the imaging surface is parallel with the variable mirror.

In the optical system applicable to the present invention and the optical apparatus using the optical system, it is desirable that, in the optical system in which the shift and the tilt are applied to at least one lens or the imaging surface in order to correct decentration aberration produced by the deformation of the deformable mirror, the shift is made in one plane and the rotation axis of the tilt is perpendicular to the plane.

In the optical system applicable to the present invention and the optical apparatus using the optical system, it is desirable to have at least one concave lens behind the variable lens. By doing so, axial chromatic aberration and chromatic aberration of magnification can be favorably corrected. It is further desirable to have at least two or three concave lenses behind the variable mirror.

In the optical system applicable to the present invention and the optical apparatus using the optical system, it is desirable that when the bending angle of the axial principal ray caused by the variable mirror or the reflecting surface is represented by $\theta$, it is desirable to satisfy a condition described below in a certain state. Here, the state means any state within a limit in which the focal length and the focus are changed, not any one of 12 states shown in the embodiments to be mentioned later.

$$10° < \theta < 120° \quad (20)$$

Below the lower limit of Condition (20), bent light beams interfere with each other and an optical design becomes difficult. Beyond the upper limit of Condition (20), decentration aberration is increased and imaging performance is impaired.

In the optical system applicable to the present invention and the optical apparatus using the optical system, it is desirable to satisfy, in a certain state, the following condition:

$$20° < \theta < 110° \quad (20')$$

Whereby, better results are obtained with respect to the optical design and imaging performance.

In the optical system applicable to the present invention and of the application with a higher degree of accuracy and the optical apparatus using this optical system, it is desirable to satisfy, in a certain state of the optical system, the following condition:

$$30° < \theta < 105° \quad (20'')$$

Whereby, much better results are obtained with respect to the optical design and imaging performance.

When the optical axis bending section is constructed with a plurality of reflecting surfaces as in the optical system of FIG. 1 and the deflection angle of the optical axis caused by another reflecting surface is denoted by $\phi$, the optical system that is particularly advantageous for mechanical design is attained by choosing the angles $\theta$ and $\phi$ so as to satisfy the following conditions:

$$39° \leqq \theta \leqq 46° \quad (21)$$

$$\text{or } 39° \leqq \phi \leqq 46° \quad (22)$$

A considerable effect is brought about even when the optical system, instead of satisfying Conditions (21) and (22), satisfies the following conditions:

$$30° \leqq \theta \leqq 60° \quad (21')$$

$$\text{or } 30° \leqq \phi \leqq 60° \quad (22')$$

It is desirable that when the magnification of a lens unit located on the image side of the variable mirror, that is, of a lens unit ranging from an optical surface situated immediately behind the variable optical-property element to the last surface, is denoted by $\beta 1$, the optical system applicable to the present invention and the optical apparatus using the optical system satisfy a condition described below in a certain state. However, in the case of the variable magnification optical system such as that shown in FIG. 1, it is only necessary that the value of the magnification $\beta 1$ whose absolute value is minimum satisfies the following condition:

$$0.05 < |\beta 1 < 1.3 \quad (23)$$

Below the lower limit of Condition (23), the magnification of the lens unit located behind the variable mirror becomes extremely low. Hence, the focus sensitivity of the variable mirror is impaired and the amount of deformation of the variable mirror necessary for focusing is increased. Beyond the upper limit of Condition (23), the magnification of the lens unit becomes extremely high. Thus, decentration aberration produced in the variable mirror is increased and it becomes difficult to obtain satisfactory optical performance.

In the optical system applicable to the present invention and the optical apparatus using the optical system, it is desirable to satisfy, in a certain state of the optical system, the following condition $$0.1 < |\beta 1| < 0.9 \quad (23')$$

Whereby, optical performance is ensured and the amount of deformation of the variable optical-property element or the amount of change of the focal length is kept within a suitable limit. As such, a better result is obtained.

In the optical system with a higher degree of accuracy, it is desirable to satisfy, in a certain state, the following condition:

$$0.17 < |\beta 1| < 0.7 \quad (23'')$$

Whereby, optical performance is further ensured and the amount of deformation of the variable optical-property element or the amount of change of the focal length is kept within a more suitable limit. As such, a much better result is obtained.

It is more desirable to satisfy the following condition:

$$0.2 < |\beta 1| < 0.35 \quad (23''')$$

Also, Conditions (23'), (23''), and (23''') are established even where the variable focal-length lens and other variable optical-property elements are used.

When a lens frame for the concave lens 801 and the lens units 804–806 is designed to have a collapsible mount type (a slide type), the overall length can be reduced where the imaging optical system is not utilized, which is convenient for carrying.

In FIG. 1, when the relative positions of a frame, a fixed section, a non-moving section, or a non-deforming section of the reflection-type variable optical-property element (the variable mirror 409) and the imaging surface are fixed, the fabrication of the optical system is facilitated, which is favorable.

In FIG. 1, the relative positions of the imaging surface and the most object-side optical element are fixed. This is favorable because the optical apparatus becomes sturdy. Even when the position of any optical element is fixed with respect to the image sensor, the same effect is brought about.

When the focal length of an optical element unit with negative power (corresponding to the lens unit 805 in FIG. 1) moved for the magnification change is designated by $f_3$ and the focal length of the optical system is designated by f, it is desirable to satisfy, in a certain state, the following condition:

$$|f_3/f| > 1.0 \quad (24)$$

Below the lower limit of Condition (24) relative to the value of $|f_3/f|$, the concave function of the lens unit with negative power becomes too strong, and thus the imaging performance of the optical system is liable to be impaired due to manufacturing errors.

It is more desirable to satisfy the following condition:

$$|f_3/f| > 3 \quad (25)$$

When an optical element unit with negative power (corresponding to the concave lens 801 in FIG. 1) is provided on the object side of the variable mirror, it is desirable to satisfy, in a certain state, one of the following conditions:

$$R1<0 \quad (26)$$

$$|R1/f|>1.0 \quad (27)$$

where R1 is the radius of curvature of the object-side surface of the optical element unit and f is the focal length of the optical system.

Below the lower limit of Condition (26) relative to the value of R1, negative distortion or coma is produced, which is disadvantageous.

It is more desirable to satisfy, in a certain state, Condition (26) and the following condition:

$$|R1/f|>3.0 \quad (28)$$

However, even when Condition (26) is not satisfied, sufficient optical performance may be obtained, depending on the application, if either Condition (27) or (28) is satisfied. In this case, therefore, Condition (26) need not necessarily be satisfied.

The lens system 803, unlike the above case, may be designed so that the lens units 804, 805, and 806 can be moved independently along the optical axis (that is, in left and right directions of the figure), and thereby the magnification change (zooming) of the optical system is brought about.

As mentioned above, the lens units 804, 805, and 806 are arranged so that they are moved, and thereby the concave lens 801, the mirror 802, and the variable mirror 409 constitute one block. Thus, since the rear lens units 804, 805, and 806 are arranged as moving lens units, there are merits that the mechanical structure is simplified, the mechanical design of the lens frame becomes easy, the assembly and adjustment are simple, etc.

In addition, since three lens units are optically moved and thereby the magnification change is carried out, there are merits that the number of degrees of optical freedom is increased, the variable magnification ratio (the zoom ratio) can be increased, aberration can be favorably corrected, etc.

As the three lens units, the concave lens 801, the mirror 802, and the variable mirror 409, constituting one optical unit, and at least two lens units are moved to thereby change the magnification. In this case also, similar merits are obtained. In short, when at least three optical element units are moved to make the magnification change, the number of degrees of freedom of the optical system is increased, and the optical system that has a high variable magnification ratio and good imaging performance is obtained.

Also, in the present invention, the optical element unit refers to a unit including at least one optical element. As such, even a single lens is called the optical element unit.

When the lens unit 804 is constructed as a positive lens unit and the lens unit 805 as a negative lens unit, there are merits that the ray height of the lens system 803 is reduced and the entire lens barrel is made small and fine. The lens unit 806 is the positive lens unit and contributes to the magnification change. The most image-side lens of the lens unit 806 is configured as a concave lens, and the principal point of the lens unit 806 is shifted forward to thereby avoid a collision between lenses. The lens unit 807 is configured as the lens unit with positive power and has the effect of demagnifying and forming an image produced by the optical system located ahead of this lens unit and reducing aberration. Also, the lens unit is an example of the optical element unit. The concave lens 801 is the lens unit with negative power and has the effect of widening the angle of view. The whole of the zoom imaging optical system 809 constitutes a retrofocus type of lens system at the wide-angle position.

Here, the coordinate system and the surface profile in the present invention are defined.

The axial principal ray refers to a ray that emanates from the center of the object, passes through the center of the stop, and reaches the center of the image. The axial principal ray is usually called the optical axis.

Subsequently, a description is given of the profile of the reflecting surface of the deformable mirror in the optical system applicable to the present invention, that is, a free-formed surface (FFS) defined by Equation (a) shown below. The Z axis of this equation corresponds to the axis of the free-formed surface.

$$Z = cr^2 / \left[1 + \sqrt{\{1-(1+k)c^2r^2\}}\right] + \sum_{j=2}^{N} C_j X^m Y^n \quad \text{(a)}$$

Here, the first term of Equation (2) is a spherical surface term, and the second term is a free-formed surface term. In the spherical surface term, c is the curvature of the vertex, k is a conic constant, $r=\sqrt{(X^2+Y^2)}$, N is a natural number of 2 or larger, m is an integral number of 0 or larger, and n is an integral number of 0 or larger.

The free-formed surface term is as follows:

$$\begin{aligned}\sum_{j=2}^{N} C_j X^m Y^n = {} & C_2X + C_3Y + C_4X^2 + C_5XY + C_6Y^2 + \\ & C_7X^3 + C_8X^2Y + C_9XY^2 + C_{10}Y^3 + C_{11}X^4 + C_{12}X^3Y + \\ & C_{13}X^2Y^2 + C_{14}XY^3 + C_{15}Y^4 + C_{16}X^5 + C_{17}X^4Y + C_{18}X^3Y^2 + \\ & C_{19}X^2Y^3 + C_{20}XY^4 + C_{21}Y^5 + C_{22}X^6 + C_{23}X^5Y + C_{24}X^4Y^2 + \\ & C_{25}X^3Y^3 + C_{26}X^2Y^4 + C_{27}XY^5 + C_{28}Y^6 + C_{29}X^7 + C_{30}X^6Y + \\ & C_{31}X^5Y^2 + C_{32}X^4Y^3 + C_{33}X^3Y^4 + C_{34}X^2Y^5 + C_{35}XY^6 + C_{36}Y^7\end{aligned}$$

where $C_j$ (is an integral number of 2 or larger) is a coefficient.

In general, the above-mentioned free-formed surface does not have symmetric surfaces for both the X-Z plane and the Y-Z plane. However, by bringing all odd-number order terms of X to 0, a free-formed surface having only one symmetrical surface parallel to the Y-Z plane is obtained. By bringing all odd-number order terms of Y to 0, a free-formed surface having only one symmetrical surface parallel to the X-Z plane is obtained.

The free-formed surface of rotational-asymmetrical curved shape, mentioned above, can also be defined by the Zernike polynomial as another defining equation. The configuration of this surface is defined by Equation (b) described below. The Z axis of Equation (b) corresponds to the axis of the Zernike polynomial. The rotational-asymmetrical surface is defined by polar coordinates of a height from the Z axis relative to the X-Y plane. Symbol R is a distance from the Z axis in the X-Y plane, and A is an azimuth around the Z axis and is expressed by an rotating angle measured from the Z axis.

$$X = R \times \cos(A) \quad (b)$$

$$Y = R \times \sin(A)$$

$$Z = D_2 + D_3 R\cos(A) + D_4 R\sin(A) + D_5 R^2\cos(2A) + D_6(R^2 - 1) + D_7 R^2\sin(2A) + D_8 R^3\cos(3A) + D_9(3R^3 - 2R)\cos(A) + D_{10}(3R^3 - 2R)\sin(A) + D_{11} R^3\sin(3A) + D_{12} R^4\cos(4A) + D_{13}(4R^4 - 3R^2)\cos(2A) + D_{14}(6R^4 - 6R^2 + 1) + D_{15}(4R^4 - 3R^2)\sin(2A) + D_{16} R^4\sin(4A) + D_{17} R^5\cos(5A) + D_{18}(5R^5 - 4R^3)\cos(3A) + D_{19}(10R^5 - 12R^3 + 3R)\cos(A) + D_{21}(5R^5 - 4R^3)\sin(3A) + D_{22} R^5\sin(5A) + D_{23} R^6\cos(6A) + D_{24}(6R^6 - 5R^4)\cos(4A) + D_{25}(15R^6 - 20R^4 + 6R^2)\cos(2A) + D_{26}(20R^6 - 30R^4 + 12R^2 - 1) + D_{27}(15R^6 - 20R^4 + 6R^2)\sin(2A) + D_{28}(6R^6 - 5R^4)\sin(4A) + D_{29} R^6\sin(6A)$$

where $D_m$ (m is an integral number of 2 or larger) is a coefficient. Also, in order to make a design as an optical system symmetrical with respect to the X axis, the coefficients $D_4$, $D_5$, $D_6$, $D_{10}$, $D_{11}$, $D_{12}$, $D_{13}$, $D_{14}$, $D_{20}$, $D_{21}$, $D_{22}$, . . . are used.

The above defining equation is shown to give an example of the configuration of the rotational-asymmetrical curved surface, and it is needless to say that the same effect is secured with respect to any other defining equation. If mathematically identical values are given, the configuration of the curved surface may be expressed by another definition.

In the present invention, all odd-number order terms of X in Equation (a) are brought to zero and thereby the free-formed surface that has a symmetrical surface parallel to the Y-Z plane is obtained.

Also, when Z is taken as the coordinate in the direction of the optical axis, Y is taken as the coordinate normal to the optical axis, k represents a conic constant, and a, b, c, and d represent aspherical coefficients, the configuration of an aspherical surface is expressed by the following equation:

$$Z=(Y^2/r)/[1+\{1-(1+k)\cdot(Y/r)^2\}^{1/2}]+aY^4+bY^6+cY^8+dY^{10} \quad (c)$$

The explanation of the numerical data can also be used for the numerical data of the embodiments of the present invention to be described later.

In the numerical data of the embodiments to be described below, ASP denotes the aspherical surface, FFS denotes the free-formed surface, and DM denotes the deformable mirror. The terms relating to the aspherical surface and the free-formed surface which are not described in the data are zero. The refractive index and the Abbe's number are relative to the d line (wavelength 587.56 nm). The length and the angle are expressed by mm and deg, respectively. In each embodiment, two or three plane-parallel plates are located on the side of the imaging surface. These are assumed as the cover glass of the image sensor, a low-pass filter placed ahead of the cover glass, and an IR cutoff filter placed ahead of the low-pass filter. Also, when the IR cutoff filter is made in such a way that it is coated with the low-pass filter, two plane-parallel plates are available.

In the embodiments, the Z axis of the coordinate system on the object plane is defined as a straight line that passes through the center of the object and is perpendicular to the object plane. The Y axis is taken in a direction perpendicular to the Z axis, and an axis constituting the right-handed coordinate system with the Y axis and the Z axis is taken as the X axis. The optical axis is defines as the path of the ray that passes through the center of the object plane and the center of the stop or the exit pupil. Thus, the optical axis is changed in accordance with the deformation of the deformable mirror, but its change is slight in most cases. In the embodiments, therefore, the Z axis practically coincides with the optical axis.

Figure 9A:
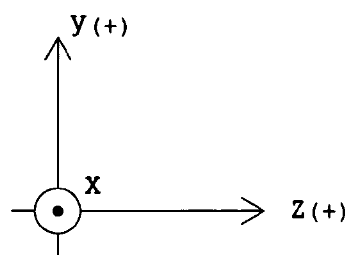
FIGS. 9A and 9B are views showing coordinate axes and positive directions of individual axes in the optical element of the zoom imaging optical system according to the present invention.
Figure 9B:
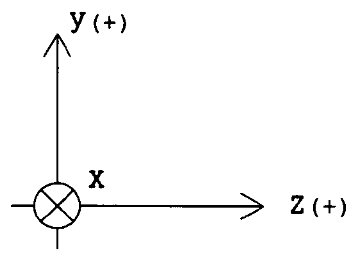

In FIGS. 9A and 9B, the coordinate systems and the positive direction of individual axes are shown.

A decentered surface is given by the shift of the vertex position of this surface (the directions of X, Y, and Z axes are denoted by X, Y, and Z, respectively) from the origin of the coordinate system and by the tilt (α, β, and γ (deg)) of the center axis of the surface (the Z axis of Equation (a) in the free-formed surface), with the X, Y, and Z axes as centers. When a surface to be decentered is called a k surface, the origin of the coordinate system where decentration takes place is defined as a point shifted from the vertex position of a k−1 surface along the Z axis for surface-to-surface spacing.

The decentration takes place in order of X shift, Y shift, Z shift, α tilt, β tilt, and γ tilt. In this case, the plus sign of each of α and β indicates a counterclockwise direction where each of the X axis and the Y axis is viewed from a minus side, and the plus sign of γ indicates a clockwise direction where the Z axis is viewed from a minus direction.

Also, there are two kinds of decentration, decenter-and-return (DAR) and decenter-only (DEO). In the DAR, when the k surface has been decentered, each of the coordinate systems of a k+1 surface and surfaces lying behind it coincides with that of the k surface before decentration. The vertex position of the k+1 surface is defined as a point shifted from that of the k surface before decentration along the Z axis for surface-to-surface spacing. In the DEO, on the other hand, when the k surface has been decentered, each of the coordinate systems of the k+1 surface and surfaces lying behind it coincides with that of the k surface after decentration. The vertex position of the k+1 surface is defined as a point shifted from that of the k surface after decentration along the Z axis for surface-to-surface spacing.

The positive direction of the Z axis of the coordinate system of a reflecting surface refers to a direction in which the axis travels from the obverse of the reflecting surface toward the reverse. Thus, when the reflecting surface is changed into the free-formed surface shape expressed by the X-Y polynomial and the power components $C_4$ and $C_6$ are positive, the reflecting surface becomes a convex mirror, that is, a mirror with negative power. Conversely, when the power components $C_4$ and $C_6$ are negative, a concave mirror, that is, a mirror with positive power, is obtained.

The coordinate system of the optical system after array of light is reflected by the reflecting surface is defined as a coordinate system where the coordinate system before reflection is rotated by 180° around the X axis. Whereby, the ray always travels along the positive direction of the Z axis of the optical system.

The deformable mirror is capable of changing the power to perform focusing from the far point to the near point. However, in order to perform auto-focusing of a contrast method, it is designed to bring about a state of weaker power than in focusing at the far point and a state of stronger power than in focusing at the near point. In the embodiments, the state of weaker power than in focusing at the far point is defined as far-point allowance, and a state of stronger power than in focusing at the near point is defined as near-point allowance. That is, the deformable mirror has four states, the far-point allowance, the far point, the near point, and the near-point allowance.

The deformable mirror in each embodiment is designed to consider the shift of the image plane in the Z direction caused by a fabrication error in actual fabrication and by a temperature change and to have the allowance of the amount of deformation before and after a focus limit.

As mentioned above, since the focusing function is imparted to the deformable mirror, and thereby focusing can be carried out without mechanical drive, the structure of the lens frame is simplified and the compact and low-cost design can be attained. In addition, there is the merit that the driving noise of a motor in focusing is eliminated.

Embodiment 1

Figure 6:
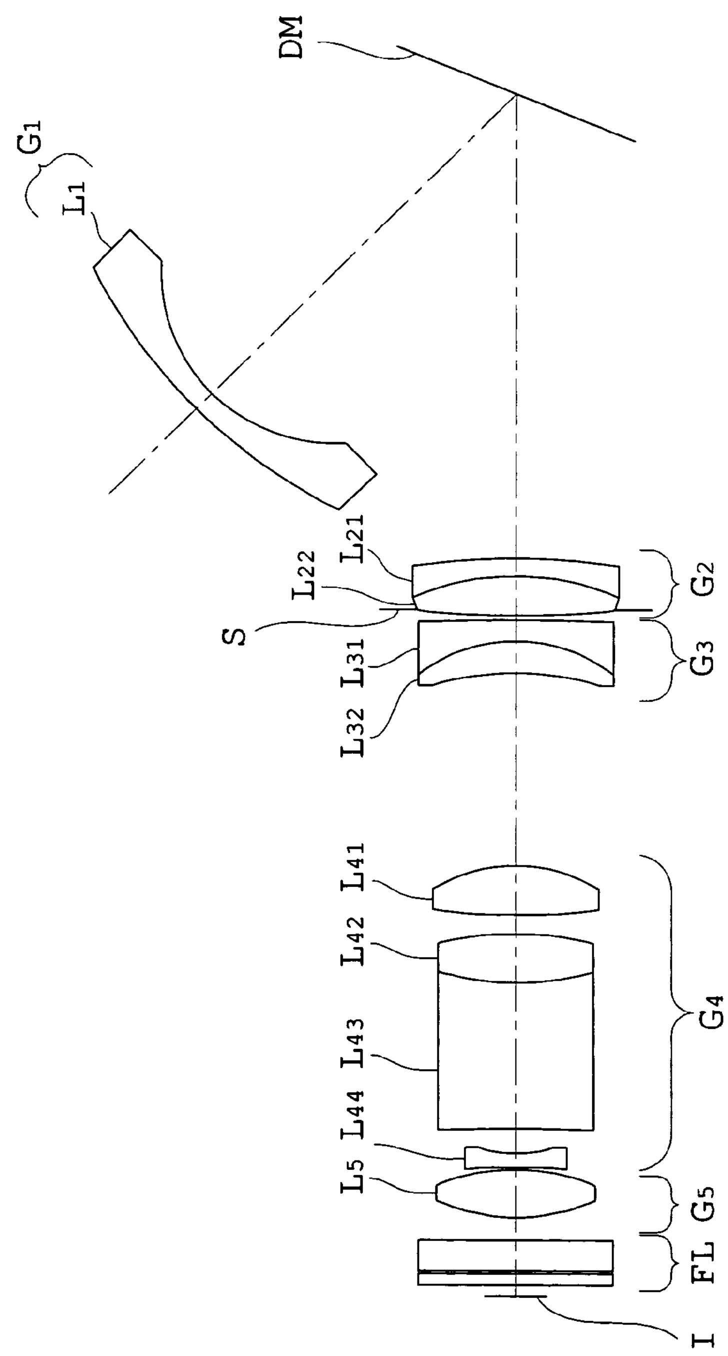
FIG. 6 is a Y-Z sectional view showing schematically the arrangement, at a wide-angle position, of Embodiment 1 of the optical system applicable to the optical apparatus of the present invention.
Figure 7:
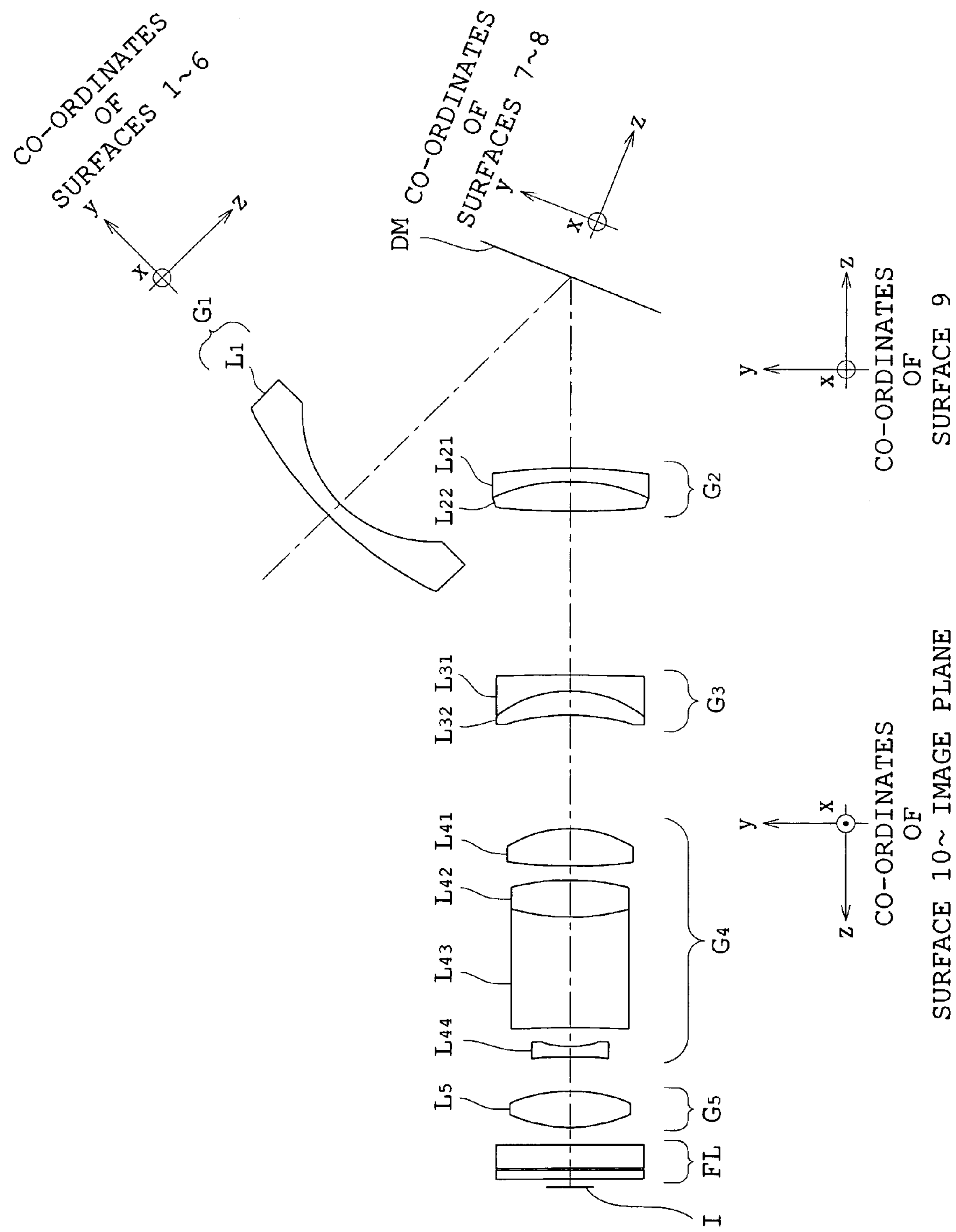
FIG. 7 is a Y-Z sectional view showing schematically the arrangement, at a standard position, of Embodiment 1 of the optical system applicable to the optical apparatus of the present invention.
Figure 8:
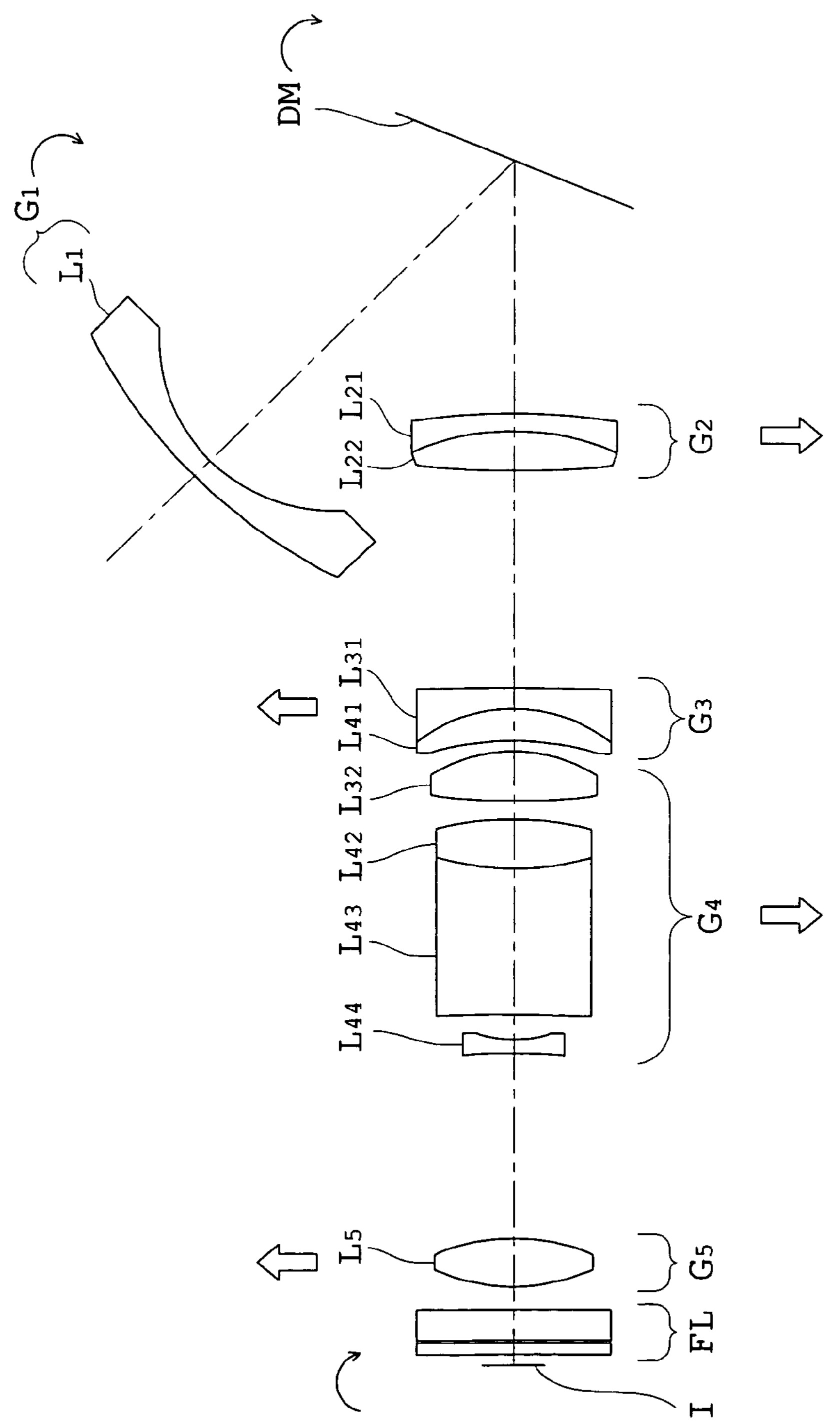
FIG. 8 is a Y-Z sectional view showing schematically the arrangement, at a telephoto position, of Embodiment 1 of the optical system applicable to the optical apparatus of the present invention.

FIGS. 6–8 show Embodiment 1 of the optical system applicable to the optical apparatus of the present invention.

For convenience, in FIGS. 6–8, bending of the optical path by an ordinary plane mirror is eliminated, but the optical system of Embodiment 1, like the optical system of FIG. 1, is such that the optical path is bent 45° by the ordinary plane mirror and 45° by the variable mirror.

In lens data also to be described later, the ordinary plane mirror is eliminated, but actually, the plane mirror is located 8.25 mm in front of the variable mirror.

The deformable mirror of Embodiment 1 is capable of changing the power to perform focusing from the far point to the near point. However, in order to perform auto-focusing of a contrast method, it is designed to bring about a state of weaker power than in focusing at the far point and a state of stronger power than in focusing at the near point. In Embodiment 1, the state of weaker power than in focusing at the far point is defined as far-point allowance, and a state of stronger power than in focusing at the near point is defined as near-point allowance.

That is, the deformable mirror in Embodiment I has four states, the far-point allowance, the far point, the near point, and the near-point allowance. Additionally, in each of these states, there are three states, the wide-angle, standard, and telephoto positions in the magnification change. Thus, the deformable mirror has 12 deformation states in total. In the four states of the far-point allowance, the far point, the near point, and the near-point allowance, the object distance and the position of the imaging surface are different.

The deformable mirror in Embodiment 1 is designed to consider the shift of the image plane in the Z direction caused by a fabrication error in actual fabrication and by a temperature change and to have the allowance of the amount of deformation before and after a focus limit.

For convenience, the deformable mirror in each of FIGS. 6–8 is such that only the mirror surface is shown.

The optical system of Embodiment 1 comprise, in order from the object side, a fixed lens unit G1 with negative power, a deformable mirror DM, a moving lens unit G2 with positive power, a stop S, a fixed lens unit G3 with negative power, a moving lens unit G4 with positive power, and a fixed lens unit G5 with positive power. In FIGS. 6–8, reference symbol FL designates a filter unit and I designates an image plane. Each of filters and the cover glass of the image sensor is also a kind of optical element.

The fixed lens unit G1 is constructed with a meniscus concave lens L1. The moving lens unit G2 is constructed with a cemented doublet of a negative meniscus lens L21 with a convex surface facing the object side and a biconvex lens L22. The fixed lens unit G3 is constructed with a cemented doublet of a meniscus concave lens L31 and a positive meniscus lens L32 lens with a convex surface facing the object side. The moving lens unit G4 includes a biconvex lens L41, a cemented doublet of a biconvex lens L42 and a biconcave lens L43, and a biconcave lens L44. The fixed lens unit G5 is constructed with a biconvex lens L5.

The optical system of Embodiment 1 is such as to perform a variable magnification function by moving the moving lens unit G2 and the moving lens unit G4. In addition, a thin film forming the reflecting surface of the deformable mirror DM is deformed and thereby focusing can be carried out in the range from the infinity to a near point of 300 mm.

When the thin film of the deformable mirror DM is deformed from a flat surface into a curved surface, decentration aberration is produced by the reflection of the mirror surface. In particular, in focusing of an extremely near point that the amount of deformation of the variable mirror DM is large, the decentration aberration is considerably produced. Hence, in order to obtain good optical performance between the far point and the near point in the optical system of Embodiment 1, shift and tilt decentrations are applied to a lens unit or the imaging surface to balance the production of the decentration aberration in focusing. In FIG. 8, the directions of the decentrations are indicated by arrows.

According to the optical system of Embodiment 1, focusing can be performed without mechanical drive, and thus the structure of the lens frame is simplified and the compact and low-cost design can be attained. Moreover, there is the merit that the driving noise of a motor in focusing is eliminated.

Subsequently, numerical data of optical members constituting the optical system of Embodiment 1 are shown below.

Numerical Data 1

Focal length: 4.4 mm (wide-angle)~13.2 mm (telephoto), 7.6 mm (standard)

Open F-number: 2.8 (wide-angle)~3.3 (standard)~5.1 (telephoto)

Size of imaging surface: 4.0 mm×3.0 mm (X direction×Y direction)

Spacings with the moving lenses change in order of (wide-angle)–(standard)–(telephoto).

Data of the ordinary plane mirror are eliminated, but the plane mirror is located 8.25 mm in front of the variable mirror. The bending angle of the optical axis by the ordinary plane mirror is 45°.

| Surface number | Radius of curvature | Surface spacing | Decentration | Refractive index | Abbe's number |
|---|---|---|---|---|---|
| Object surface | ∞ | D0 | | | |
| 1 (virtual plane) | ∞ | 0.00 | Decentration (1) | | |
| 2 | 25.67 | 1.00 | Decentration (2) | 1.7800 | 49.4 |
| 3 | ASP [1] | 0.00 | | | |
| 4 (virtual plane) | ∞ | 21.4 | | | |
| 5 | ∞ | 0.00 | | | |
| 6 | ∞ | 0.00 | | | |
| 7 | ∞ | 0.00 | Decentration (3) | | |
| 8 (DM) | FFS [1] | 0.00 | Decentration (4) | | |
| 9 | ∞ | 0.00 | Decentration (3) | | |
| 10 | ∞ | 12.10 | | | |
| 11 | ∞ | 0.00 | Decentration (5) | | |
| 12 | ∞ | 0.00 | Decentration (5) | | |
| 13 | ∞ | D13 | | | |
| 14 | ASP [2] | 0.85 | Decentration (6) | 1.6575 | 33.3 |
| 15 | 11.71 | 1.92 | Decentration (6) | 1.6499 | 55.3 |

-continued

| | | | | | |
|---|---|---|---|---|---|
| 16 (stop surface) | ASP [3] | D16 | Decentration (6) | | |
| 17 | 107.24 | 1.00 | Decentration (7) | 1.7929 | 41.2 |
| 18 | 7.42 | 1.56 | Decentration (7) | 1.8491 | 24.0 |
| 19 | 14.93 | 0.43 | Decentration (7) | | |
| 20 | ∞ | D20 | Decentration (5) | | |
| 21 | ASP [4] | 2.36 | Decentration (8) | 1.4900 | 70.0 |
| 22 | ASP [5] | 0.89 | Decentration (8) | | |
| 23 | 14.22 | 2.34 | Decentration (8) | 1.5213 | 65.7 |
| 24 | −12.93 | 6.96 | Decentration (8) | 1.6812 | 30.1 |
| 25 | 13.00 | 1.22 | Decentration (8) | | |
| 26 | −6.56 | 0.68 | Decentration (8) | 1.8299 | 27.9 |
| 27 | ASP [6] | D27 | Decentration (8) | | |
| 28 | ∞ | 0.00 | Decentration (5) | | |
| 29 | 9.33 | 2.30 | Decentration (9) | 1.4908 | 69.2 |
| 30 | ASP [7] | 1.11 | Decentration (9) | | |
| 31 | ∞ | 1.44 | | 1.5477 | 62.8 |
| 32 | ∞ | 0.10 | | | |
| 33 | ∞ | 0.60 | | 1.5163 | 64.1 |
| 34 | ∞ | D34 | | | |
| 35 | ∞ | 0.00 | | | |
| Image plane (CCD) | ∞ | 0.00 | Decentration (10) | | |

Aspherical coefficients

Aspherical surface [1]

Radius of curvature 7.97
$k = 0$
$a = -3.7265 \times 10^{-5}$ $b = -3.7143 \times 10^{-6}$ $c = 9.6404 \times 10^{-8}$
$d = -1.7897 \times 10^{-9}$ Aspherical surface [2]

Radius of curvature 30.43
$k = 0$
$a = 1.5944 \times 10^{-7}$ $b = -1.4815 \times 10^{-7}$ $c = -2.3155 \times 10^{-9}$
$d = 1.2125 \times 10^{-11}$ $f = 6.5516 \times 10^{-13}$ $g = -1.2053 \times 10^{-14}$
$h = 3.1653 \times 10^{-16}$ Aspherical surface [3]

Radius of curvature −43.58
$k = 0$
$a = -2.2905 \times 10^{-6}$ $b = 4.2783 \times 10^{-7}$ $c = -5.0313 \times 10^{-8}$
$d = 1.5611 \times 10^{-9}$ Aspherical surface [4]

Radius of curvature 7.13
$k = 0$
$a = -2.7501 \times 10^{-4}$ $b = 1.4112 \times 10^{-5}$ $c = -1.3354 \times 10^{-6}$
$d = 4.7311 \times 10^{-8}$ Aspherical surface [5]

Radius of curvature −27.43
$k = 0$
$a = -6.0572 \times 10^{-6}$ $b = 2.0804 \times 10^{-5}$ $c = -1.7300 \times 10^{-6}$
$d = 6.5271 \times 10^{-8}$ Aspherical surface [6]

Radius of curvature 20.39
$k = 0$
$a = 4.5682 \times 10^{-4}$ $b = 4.0088 \times 10^{-4}$ $c = -1.0421 \times 10^{-4}$
$d = 1.0827 \times 10^{-5}$ $e = -6.0757 \times 10^{-20}$ $f = -4.7038 \times 10^{-22}$
$g = -3.6419 \times 10^{-24}$ $h = -2.8197 \times 10^{-26}$ Aspherical surface [7]

Radius of curvature −8.48
$k = 0$
$a = 5.4589 \times 10^{-4}$ $b = -6.3342 \times 10^{-5}$ $c = 6.8699 \times 10^{-6}$
$d = -2.7683 \times 10^{-7}$ $e = 8.4003 \times 10^{-10}$ $f = 1.2201 \times 10^{-10}$
$g = 4.3140 \times 10^{-13}$ $h = -3.7503 \times 10^{-19}$

FFS[1]

State 1: Wide-angle, far-point allowance (∞)
State 2: Standard, far-point allowance (∞)
State 3: Telephoto, far-point allowance (∞)
In the above three states, all of the coefficients C4–C21 are zero.
Y = 0 Z = 0

-continued

State 4: Wide-angle, far-point allowance (∞)

$C4 = -2.4991 \times 10^{-4}$ $C6 = -2.4856 \times 10^{-4}$ $C8 = 0$
$C10 = 2.1950 \times 10^{-6}$ $C11 = 3.7858 \times 10^{-7}$ $C13 = 1.8474 \times 10^{-6}$
$C15 = 7.7107 \times 10^{-7}$ $C17 = 7.4499 \times 10^{-8}$ $C19 = -5.0041 \times 10^{-8}$
$C21 = -7.2560 \times 10^{-8}$
Y = 0 Z = 0.00701

State 5: Standard, far-point allowance (∞)

$C4 = -7.7223 \times 10^{-5}$ $C6 = -6.4819 \times 10^{-5}$ $C8 = 0$
$C10 = -5.5783 \times 10^{-8}$ $C11 = -1.3297 \times 10^{-6}$ $C13 = -3.0304 \times 10^{-6}$
$C15 = -1.3026 \times 10^{-6}$ $C17 = -1.1664 \times 10^{-8}$ $C19 = -9.8164 \times 10^{-8}$
$C21 = 1.8441 \times 10^{-9}$
Y = 0 Z = 0.00335

State 6: Telephoto, far-point allowance (∞)

$C4 = -3.3000 \times 10^{-5}$ $C6 = -2.7793 \times 10^{-5}$ $C8 = 0$
$C10 = 2.0771 \times 10^{-7}$ $C11 = -9.6247 \times 10^{-7}$ $C13 = -1.6125 \times 10^{-6}$
$C15 = -7.5417 \times 10^{-7}$ $C17 = -1.5207 \times 10^{-9}$ $C19 = -3.2815 \times 10^{-8}$
$C21 = -1.7174 \times 10^{-8}$
Y = 0 Z = 0.00168

State 7: Wide-angle, near point (300 mm)

$C4 = -4.0436 \times 10^{-4}$ $C6 = -3.8705 \times 10^{-4}$ $C8 = 0$
$C10 = -1.9545 \times 10^{-6}$ $C11 = 5.0250 \times 10^{-7}$ $C13 = 3.3615 \times 10^{-6}$
$C15 = 3.6734 \times 10^{-7}$ $C17 = 4.0646 \times 10^{-8}$ $C19 = -2.3559 \times 10^{-8}$
$C21 = 6.4612 \times 10^{-8}$
Y = 0 Z = 0.01157

State 8: Standard, near point (300 mm)

$C4 = -2.3916 \times 10^{-4}$ $C6 = -1.9966 \times 10^{-4}$ $C8 = 0$
$C10 = -1.0627 \times 10^{-6}$ $C11 = -6.0727 \times 10^{-7}$ $C13 = -2.6157 \times 10^{-6}$
$C15 = -1.4758 \times 10^{-6}$ $C17 = -6.7566 \times 10^{-8}$ $C19 = -1.3145 \times 10^{-7}$
$C21 = 3.5131 \times 10^{-8}$
Y = 0 Z = 0.00759

State 9: Telephoto, near point (300 mm)

$C4 = -1.9462 \times 10^{-4}$ $C6 = -1.6127 \times 10^{-4}$ $C8 = 0$
$C10 = -2.1866 \times 10^{-6}$ $C11 = -2.0560 \times 10^{-7}$ $C13 = -1.4147 \times 10^{-6}$
$C15 = -8.7102 \times 10^{-7}$ $C17 = -1.3124 \times 10^{-7}$ $C19 = -1.1803 \times 10^{-7}$
$C21 = 7.2285 \times 10^{-8}$
Y = 0 Z = 0.00588

State 10: Wide-angle, near-point allowance (300 mm)

$C4 = -6.9241 \times 10^{-4}$ $C6 = -5.8388 \times 10^{-4}$ $C8 = -5.9904 \times 10^{-6}$
$C10 = -5.8969 \times 10^{-6}$ $C11 = 1.8998 \times 10^{-6}$ $C13 = 2.9095 \times 10^{-6}$
$C15 = -1.2509 \times 10^{-6}$ $C17 = 6.1178 \times 10^{-6}$ $C19 = 4.5179 \times 10^{-7}$
$C21 = 1.9494 \times 10^{-7}$
Y = 0 Z = 0.01901

State 11: Standard, near-point allowance (300 mm)

$C4 = -3.4651 \times 10^{-4}$ $C6 = -2.8937 \times 10^{-4}$ $C8 = -3.5487 \times 10^{-6}$
$C10 = -3.5184 \times 10^{-6}$ $C11 = 1.4147 \times 10^{-6}$ $C13 = -1.0992 \times 10^{-7}$
$C15 = -3.7014 \times 10^{-8}$ $C17 = 9.6527 \times 10^{-8}$ $C19 = -3.1169 \times 10^{-8}$
$C21 = 1.1631 \times 10^{-7}$
Y = 0 Z = 0.00899

State 12: Telephoto, near-point allowance (300 mm)

$C4 = -2.4485 \times 10^{-4}$ $C6 = -2.0300 \times 10^{-4}$ $C8 = -2.2660 \times 10^{-6}$
$C10 = -3.2087 \times 10^{-6}$ $C11 = 2.4419 \times 10^{-7}$ $C13 = -1.1076 \times 10^{-6}$
$C15 = -7.0219 \times 10^{-7}$ $C17 = 1.4929 \times 10^{-8}$ $C19 = -6.1649 \times 10^{-9}$
$C21 = 1.0607 \times 10^{-7}$
Y = 0 Z = 0.00698

Amount of decentration
Decentration [1] (DEO)

State 1: Wide-angle, far-point allowance (∞)
State 2: Standard, far-point allowance (∞)

X = 0.00 Y = 0.00 Z = 0.00
α = 0.07 β = 0.00 γ = 0.00
(The states 1 and 2 are the same.)

State 3: Telephoto, far-point allowance (∞)

X = 0.00 Y = 0.00 Z = 0.00
α = 0.11 β = 0.00 γ = 0.00

-continued

| State 4: Wide-angle, far point (∞) | | |
|---|---|---|
| X = 0.00 | Y = 0.00 | Z = 0.00 |
| α = 0.08402 | β = 0.00 | γ = 0.00 |
| **State 5: Standard, far point (∞)** | | |
| X = 0.00 | Y = 0.00 | Z = 0.00 |
| α = 0.00 | β = 0.00 | γ = 0.00 |
| **State 6: Telephoto, far point (∞)** | | |
| X = 0.00 | Y = 0.00 | Z = 0.00 |
| α = 0.09 | β = 0.00 | γ = 0.00 |
| **State 7: Wide-angle, near point (300 mm)** | | |
| X = 0.00 | Y = 0.00 | Z = 0.00 |
| α = 0.01 | β = 0.00 | γ = 0.00 |
| **State 8: Standard, near point (300 mm)** | | |
| X = 0.00 | Y = 0.00 | Z = 0.00 |
| α = 0.04 | β = 0.00 | γ = 0.00 |
| **State 9: Telephoto, near point (300 mm)** | | |
| X = 0.00 | Y = 0.00 | Z = 0.00 |
| α = 0.03 | β = 0.00 | γ = 0.00 |
| **State 10: Wide-angle, near-point allowance (300 mm)** | | |
| X = 0.00 | Y = 0.00 | Z = 0.00 |
| α = 0.05 | β = 0.00 | γ = 0.00 |
| **State 11: Standard, near-point allowance (300 mm)** | | |
| X = 0.00 | Y = 0.00 | Z = 0.00 |
| α = 0.06 | β = 0.00 | γ = 0.00 |
| **State 12: Telephoto, near-point allowance (300 mm)** | | |
| X = 0.00 | Y = 0.00 | Z = 0.00 |
| α = 0.10 | β = 0.00 | γ = 0.00 |
| **Decentration [2] (DEO)** | | |
| X = 0.00 | Y = 0.00 | Z = 0.00 |
| α = −0.112485 | β = 0.00 | γ = 0.00 |

-continued

| Decentration [3] (DEO) | | |
|---|---|---|
| X = 0.00 | Y = 0.00 | Z = 0.00 |
| α = 22.50 | β = 0.00 | γ = 0.00 |
| **Decentration [4] (DAR)<br>State 1: Wide-angle, far-point allowance (∞)<br>State 2: Standard, far-point allowance (∞)** | | |
| X = 0.00 | Y (described in FFS [1]) | Z (described in FFS [1]) |
| α = −0.030508 | β = 0.00 | γ = 0.00 |
| **Decentration [5] (DAR)** | | |
| X = 0.00 | Y = 0.00 | Z = 0.00 |
| α = 0.00 | β = 0.00 | γ = 0.00 |
| **Decentration [6] (DAR)** | | |
| X = 0.00 | Y = −0.005637 | Z = 0.00 |
| α = 0.00 | β = 0.00 | γ = 0.00 |
| **Decentration [7] (DAR)** | | |
| X = 0.00 | Y = 0.027831 | Z = 0.00 |
| α = 0.00 | β = 0.00 | γ = 0.00 |
| **Decentration [8] (DAR)** | | |
| X = 0.00 | Y = −0.000581 | Z = 0.00 |
| α = 0.00 | β = 0.00 | γ = 0.00 |
| **Decentration [9] (DAR)** | | |
| X = 0.00 | Y = 0.002028 | Z = 0.00 |
| α = 0.00 | β = 0.00 | γ = 0.00 |
| **Decentration [10] (DAR)** | | |
| X = 0.00 | Y = 0.00 | Z = 0.00 |
| α = 0.575351 | β = 0.00 | γ = 0.00 |

However, the coordinate system of the fourth surface is the same as that of the first surface. The coordinate systems after the fifth surface are defined in order from the fourth surface.

| Object distance | Far-point allowance | Far point | Near point | Near-point allowance |
|---|---|---|---|---|
| D0 | ∞ | ∞ | 300.00 | 300.00 |

| Image distance | State 1 | 2 | 3 | 4 | 5 | 6 | 7 | 8 | 9 | 10 | 11 | 12 |
|---|---|---|---|---|---|---|---|---|---|---|---|---|
| D34 | 0.60 | 0.62 | 0.68 | 0.50 | 0.50 | 0.50 | 0.50 | 0.50 | 0.50 | 0.40 | 0.38 | 0.32 |

Zoom spacing

| | Wide-angle | Standard | Telephoto |
|---|---|---|---|
| D13 | 10.19 | 0.00 | 0.00 |
| D16 | 0.20 | 10.39 | 10.39 |
| D20 | 8.79 | 6.77 | 0.10 |
| D27 | 0.11 | 2.13 | 8.80 |

Also, the conditions described below apply to the optical system of Embodiment 1 shown in FIGS. 6–8. It is merely necessary that these conditions are satisfied in at least one state.

Conditions (1), (1'), (1"), (2), (2'), (2"), (9), (9'), (9"), (9'"), (12), (12'), (10), (11), (11'), (11"), (3), (3'), (4), (4'), (5), (5'), (6), (6'), (7), (8), (7'), (8'), (13), (13'), (13"), (14), (14'), (15), (15'), (16), (16'), (16"), (17), (17'), (17"), (18), (18'), (18"), (19), (19'), (19").

In Embodiment 1, the values of the focal lengths f, as described in the numerical data, are 4.4 mm (wide-angle) ~13.2 mm (telephoto), and 7.6 mm (standard). The value (mm) of the maximum amount of deformation md of the variable mirror is equal to that of the amount of decentration Z of the eighth surface.

The value of the optically effective area Sm of the reflecting surface of the deformable mirror in Condition (14) or (14') is 8.5 $mm^2$ (practically corresponding to that of a circle with a radius of 5.2 mm).

The value of the voltage Vm applied to the deformable mirror in Condition (15) or (15') is 0–200 V, depending upon the state.

The value of the amount $\phi DM$ of the deformable mirror in Condition (16), (16'), or (16") is $\phi DM=(1/2)\cdot(C4+C6)$. Also, $\phi DMx=C4$ and $\phi DMy=C6$.

The value of the focal length f1 of the lens unit with negative power placed on the object side of the variable mirror in Condition (12) or (12') is −15.1768.

The value of the bending angle θ of the axial principal ray in the variable mirror is 45°.

The magnifications β1 of the lens unit ranging from the optical surface situated immediately behind the variable mirror to the last surface in Condition (9), (9'), or (9") are −0.29 at the wide-angle position, −0.51 at the standard position, and −0.87 at the telephoto position.

The overall length Cj (the length measured by extending the bent optical path) of the optical system in Condition (17), (17'), or (17") is 79.045 mm.

As mentioned above, it is only necessary that individual conditions of the present invention are satisfied in at least one state.

Next, values of parameters of the conditions in Embodiment 1 are shown below.

$$L_1 = 12.15$$

$$L_2 = 8.25$$

$$L_B = 11.0$$

$$L = 32.4$$

$$fw = 4.401$$

$$L/fw = 7.36$$

$$\theta = 45°$$

$$\phi = 45°$$

$$npr = 1$$

$$\theta/npr + \phi = 90°$$

$$fl/f = -3.45\text{(wide-angle)}$$

$$= -2.0\text{(standard)}$$

$$= -1.15\text{(telephoto)}$$

$$md = 19\ \text{microns(wide-angle, near-point allowance)}$$

$$= 9\ \text{microns(standard, near-point allowance)}$$

$$= 7\ \text{microns(telephoto, near-point allowance)}$$

$$md/f = 0.0043\text{(wide-angle, near-point allowance)}$$

$$md^2/Sm = 0.00000425\text{(wide-angle, near-point allowance)}$$

$$Cj/f = 17.96\text{(wide-angle)}$$

As shown in Embodiment 1, the values of the amounts of shift δ and tilt ε of the optical element, with the exception of the image sensor, are small, and thus even though the optical element is manufactured, with these amounts as zero, no problem may be caused in practical use.

In Embodiment 1, reference has been made to the optical system using the deformable mirror. However, even where the optical system, instead of using the deformable mirror, uses a plane mirror or curved mirror whose shape remains unchanged, the above conditions and limits may be applied unless otherwise noted. This is because the merit of the compact design in a bending optical system using the mirror is maintained as it is.

In the optical system of Embodiment 1, an arrangement in which the lens unit includes the reflecting surface has been described. However, even when a refraction-type variable optical-property element, for example, a variable focal-length lens, is used instead of the reflection-type variable optical-property element, it is possible to obtain the effects of the compact and low-cost design, power saving, and noiseless operation. The above conditions, which include many paraxial theories, are established even in the case of lenses practically constructed as variable focal-length lenses. In addition, a variable focal-length mirror that has no deformable surface may be used in Embodiment 1. Also the variable focal-length mirror is a kind of variable mirror. The variable focal-length mirror will be described later with reference to one example shown in FIG. 44.

The optical system can be applied to a film camera, a digital camera, a TV camera, a camera for personal digital assistants, an imaging apparatus for mobile phones, a monitoring camera, a robot's eye, and an electronic endoscope.

In the above description, the imaging optical system is assumed as the optical system, but the imaging optical system can be used, for example, as a projection optical system, such as a projector, by replacing an object plane with an image plane, and an optical apparatus using this projection optical system can be manufactured.

Embodiment 2

Figure 10:
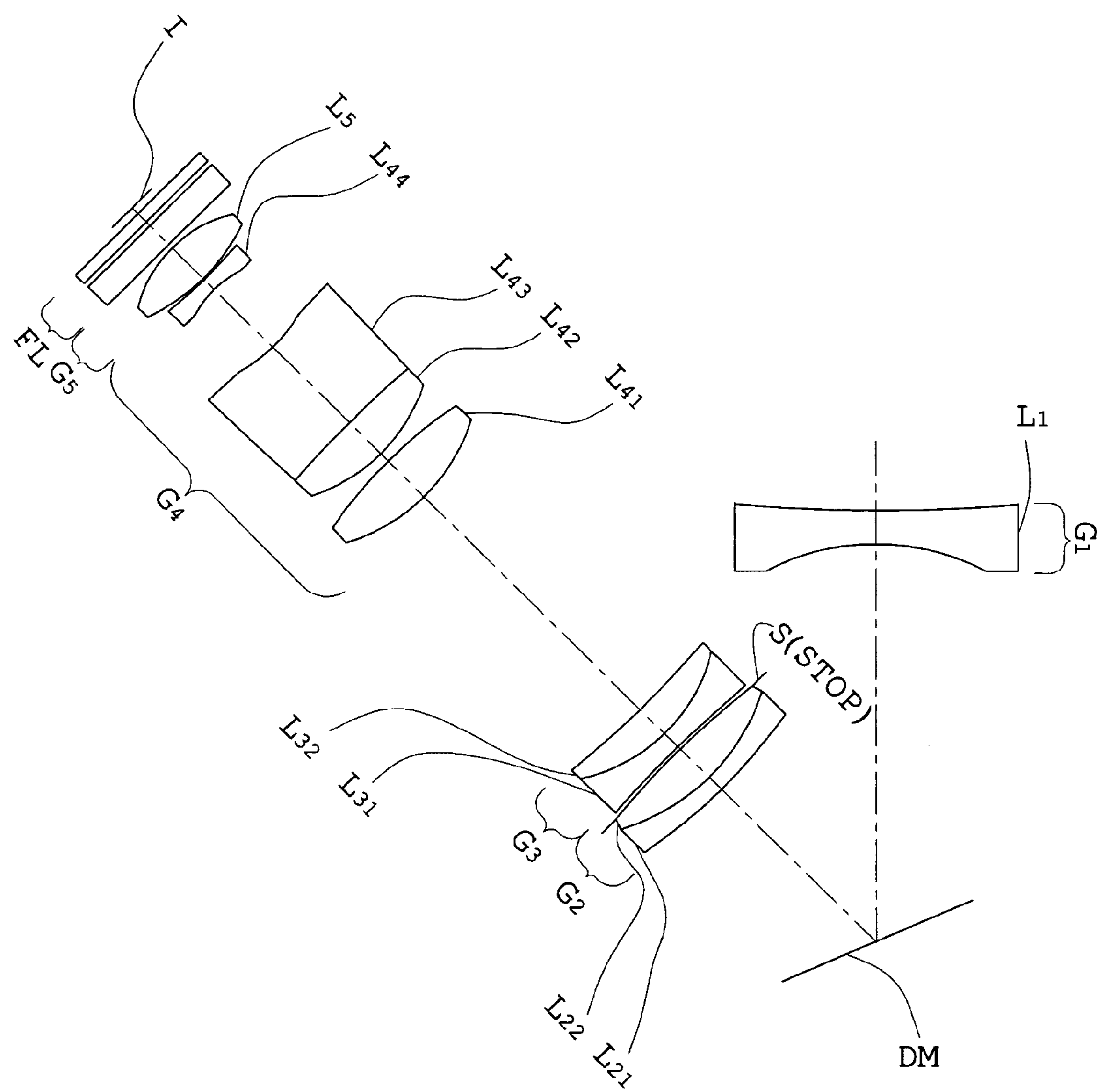
FIG. 10 is a Y-Z sectional view showing schematically the arrangement, at the wide-angle position, of Embodiment 2 of the optical system applicable to the optical apparatus of the present invention.
Figure 11:
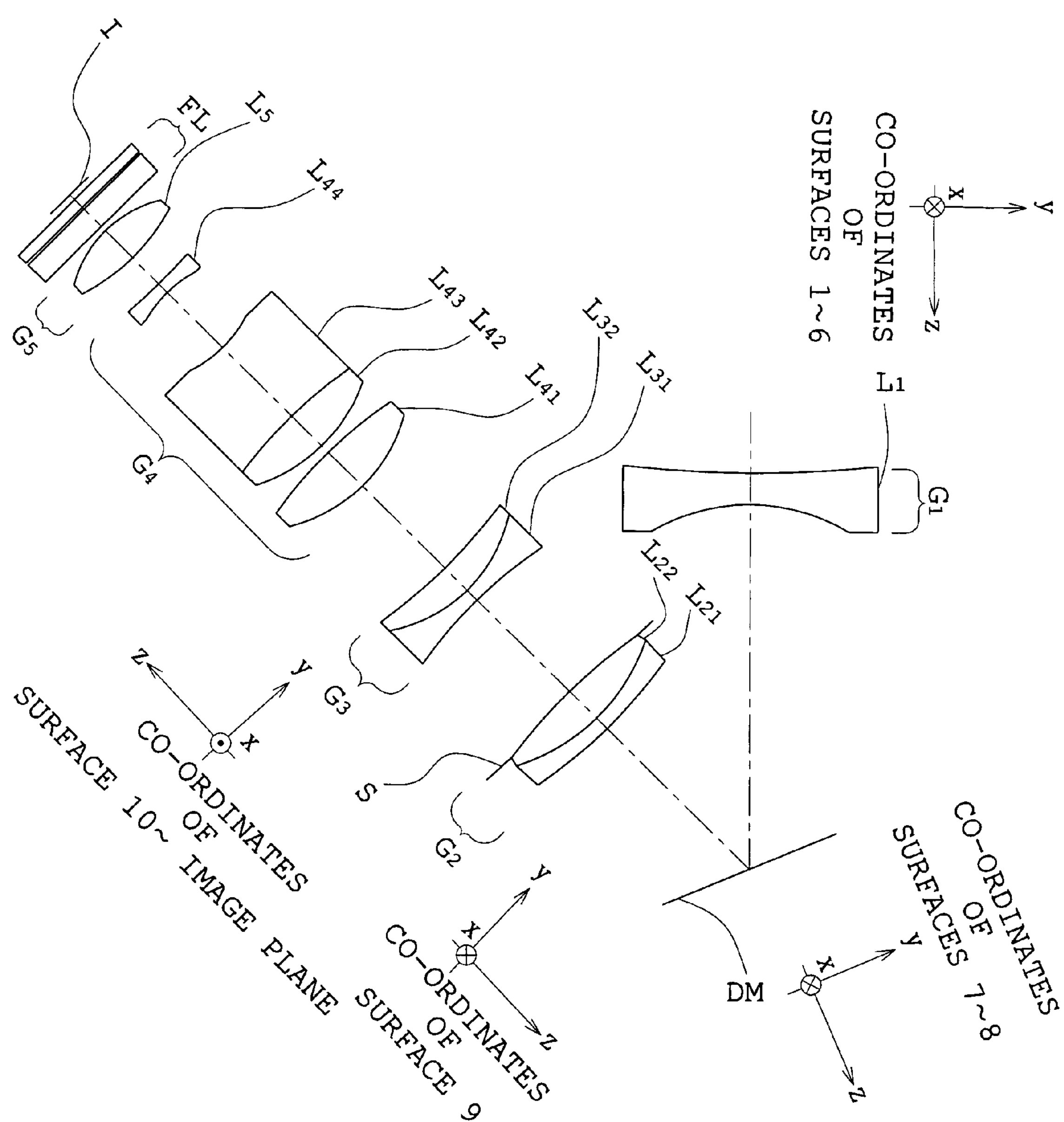
FIG. 11 is a Y-Z sectional view showing schematically the arrangement, at the standard position, of Embodiment 2 of the optical system applicable to the optical apparatus of the present invention.
Figure 12:
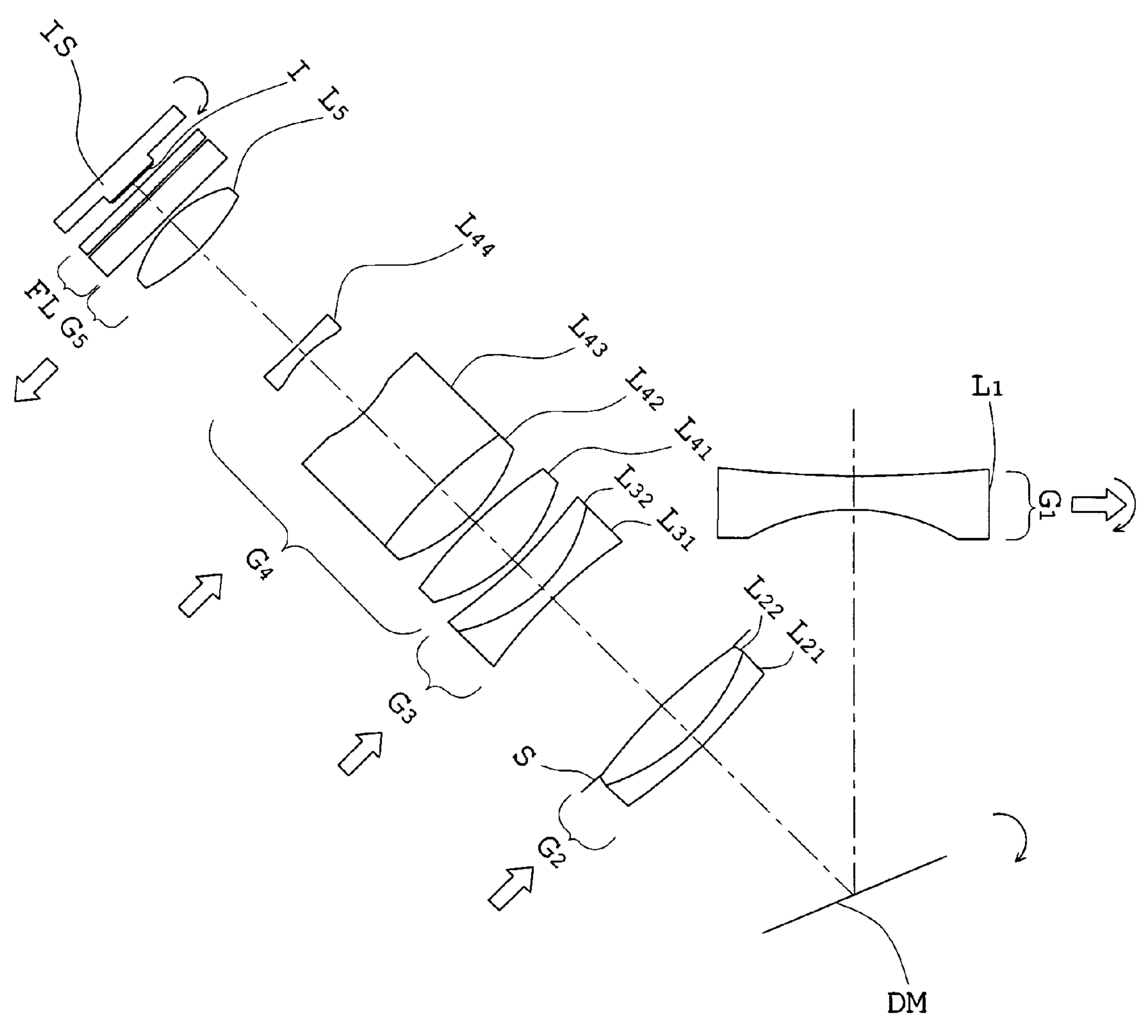
FIG. 12 is a Y-Z sectional view showing schematically the arrangement, at the telephoto position, of Embodiment 2 of the optical system applicable to the optical apparatus of the present invention.

FIGS. 10–12 show Embodiment 2 of the optical system applicable to the optical apparatus of the present invention.

For convenience, in FIGS. 10–12, bending of the optical path by the ordinary plane mirror is eliminated, but the optical system of Embodiment 2, like the optical system of FIG. 1, is such that the optical path is bent 45° by the ordinary plane mirror and 45° by the variable mirror.

In lens data also to be described later, the ordinary plane mirror is eliminated, but actually, the plane mirror is located 8.7 mm in front of the variable mirror.

The deformable mirror of Embodiment 2 is capable of changing the power to perform focusing from the far point to the near point. However, in order to perform autofocusing of a contrast method, it is designed to bring about a state of weaker power than in focusing at the far point and a state of stronger power than in focusing at the near point. In Embodiment 2, the state of weaker power than in focusing at the far point is defined as far-point allowance, and a state of stronger power than in focusing at the near point is defined as near-point allowance.

That is, the deformable mirror in Embodiment 2 has four states, the far-point allowance, the far point, the near point, and the near-point allowance. Additionally, in each of these states, there are three states, the wide-angle, standard, and telephoto positions in the magnification change. Thus, the deformable mirror has 12 deformation states in total. In the four states of the far-point allowance, the far point, the near point, and the near-point allowance, the object distance and the position of the imaging surface are different. In the states of the far-point allowance and the near-point allowance, the position of the imaging surface is different from the far point and the near point, but the imaging surface is not physically moved. In order to change the power of the deformable mirror, the numerical value of the position of the imaging surface is changed for convenience.

The deformable mirror in Embodiment 2 is designed to consider the shift of the image plane in the Z direction caused by a fabrication error in actual fabrication and by a temperature change and to have the allowance of the amount of deformation before and after a focus limit.

For convenience, the deformable mirror in each of FIGS. 10–12 is such that only the mirror surface is shown.

The optical system of Embodiment 2 comprise, in order from the object side, the fixed lens unit G1 with negative power, the deformable mirror DM, the fixed lens unit G2 with positive power, the stop S, the moving lens unit G3 with negative power, the moving lens unit G4 with positive power, and the fixed lens unit G5 with positive power. In FIGS. 10–12, reference symbol FL designates a filter unit and I designates an image plane. Filters and the cover glass of the image sensor are also a kind of optical element. The fixed lens unit G1 is constructed with the biconcave lens L1. The fixed lens unit G2 is constructed with the cemented doublet of the negative meniscus lens L21 with a convex surface facing the object side and the biconvex lens L22. The moving lens unit G3 is constructed with the cemented doublet of the biconcave lens L31 and the positive meniscus lens L32 lens with a convex surface facing the object side. The moving lens unit G4 includes the biconvex lens L41, the cemented doublet of the biconvex lens L42 and the biconcave lens L43, and the biconvex lens L44. The fixed lens unit G5 is constructed with the biconvex lens L5.

The optical system of Embodiment 2 is such as to perform the variable magnification function by moving the moving lens unit G3 and the moving lens unit G4. In addition, the thin film forming the reflecting surface of the deformable mirror DM is deformed and thereby focusing can be carried out in the range from the infinity to a near point of 300 mm.

When the thin film of the deformable mirror DM is deformed from a flat surface into a curved surface, decentration aberration is produced by the reflection of the mirror surface. In particular, in focusing of an extremely near point that the amount of deformation of the variable mirror DM is large, the decentration aberration is considerably produced. Hence, in order to obtain good optical performance between the far point and the near point in the optical system of Embodiment 2, shift and tilt decentrations are applied to a lens unit or the imaging surface to balance the production of the decentration aberration in focusing. In FIG. 12, the directions of the decentrations are indicated by arrows. An image sensor IS is shown in FIG. 12 only.

According to the optical system of Embodiment 2, focusing can be performed without mechanical drive, and thus the structure of the lens frame is simplified and the compact and low-cost design can be attained. Moreover, there is the merit that the driving noise of a motor in focusing is eliminated.

Subsequently, numerical data of optical members constituting the optical system of Embodiment 2 are shown below.

Numerical Data 2

Focal length: 4.4 mm (wide-angle)~13.2 mm (telephoto), 7.6 mm (standard)

Open F-number: 2.8 (wide-angle)~3.4 (standard)~5.1 (telephoto)

Size of imaging surface: 4.0 mm×3.0 mm (X direction×Y direction)

Spacings with the moving lenses change in order of (wide-angle)–(standard)–(telephoto).

Object distance: Spacing to object surface

Image plane distance: Spacing to the 34th surface

Zoom spacing: 16th surface, 20th surface, and 27th surface

Object point infinity: Wide-angle position

Data of the ordinary plane mirror (corresponding to the reflecting surface of the mirror 802 in FIG. 1) are eliminated, but the plane mirror is located 8.7 mm in front of the variable mirror. The bending angle of the optical axis by the ordinary plane mirror is 45°.

Also, in the description of aspherical coefficients, for example, a=−1.5557e-005 in Aspherical surface [1] can also be expressed by $-1.5557\times10^{-5}$, but in the numerical data, any of the aspherical coefficients is expressed by the former form.

| Surface number | Radius of curvature | Surface spacing | Decentration | Refractive index | Abbe's number |
|---|---|---|---|---|---|
| Object surface | ∞ | ∞ | | | |
| 1 | ∞ | 0.0000 | Decentration (1) | | |
| 2 | −91.6997 | 1.9000 | Decentration (2) | 1.7305 | 51.7 |
| 3 | Aspherical surface [1] | 0.0000 | | | |
| 4 | ∞ | 23.5000 | | | |
| 5 | ∞ | 0.0000 | | | |
| 6 | ∞ | 0.0000 | | | |
| 7 | ∞ | 0.0000 | Decentration (3) | | |
| 8 | FFS [1] | 0.0000 | Decentration (4) | DM | |
| 9 | ∞ | 0.0000 | Decentration (3) | | |
| 10 | ∞ | 11.8000 | | | |
| 11 | ∞ | 0.0000 | Decentration (5) | | |
| 12 | ∞ | 0.0000 | Decentration (5) | | |
| 13 | ∞ | 0.0000 | | | |
| 14 | 33.4692 | 0.8500 | Decentration (6) | 1.7467 | 32.1 |
| 15 | 10.2499 | 2.2848 | Decentration (6) | 1.6673 | 54.4 |
| Stop surface | −27.1780 | D16 | Decentration (6) | | |
| 17 | −28.1223 | 1.0000 | Decentration (7) | 1.7871 | 43.4 |
| 18 | 9.2449 | 1.7506 | Decentration (7) | 1.8500 | 24.0 |
| 19 | 38.3301 | 0.2215 | Decentration (7) | | |
| 20 | ∞ | D20 | Decentration (5) | | |
| 21 | Aspherical surface [1] | 2.7500 | Decentration (8) | 1.4900 | 70.0 |
| 22 | −25.8249 | 0.6266 | Decentration (8) | | |
| 23 | 10.2009 | 2.4000 | Decentration (8) | 1.4901 | 69.8 |
| 24 | −35.2953 | 5.8646 | Decentration (8) | 1.7568 | 26.7 |
| 25 | 9.6030 | 4.5689 | Decentration (8) | | |
| 26 | −6.3930 | 0.6782 | Decentration (8) | 1.8246 | 28.2 |
| 27 | Aspherical surface [3] | D27 | Decentration (8) | | |
| 28 | ∞ | 0.0000 | Decentration (5) | | |
| 29 | 12.4963 | 2.3000 | Decentration (9) | 1.5046 | 58.3 |
| 30 | −7.0843 | 0.3000 | Decentration (9) | | |
| 31 | ∞ | 1.4400 | | 1.5477 | 62.8 |
| 32 | ∞ | 0.1000 | | | |
| 33 | ∞ | 0.6000 | | 1.5163 | 64.1 |
| 34 | ∞ | 0.5000 | | | |
| 35 | ∞ | 0.0000 | | | |
| Image plane | ∞ | 0.0000 | Decentration (10) | | |

[State 1]
Aspherical coefficients

Aspherical surface [1]

Radius of curvature 11.0043
k = 0.0000e+000
a = −1.5557e−005 b = −3.3468e−006 c = 8.5221e−008
d = −1.0800e−009

-continued

Aspherical surface [2]

Radius of curvature 9.0597
k = 0.0000e+000
a = −1.6160e−004 b = −8.7320e−007 c = −3.3584e−009
d = −2.9637e−010

Aspherical surface [3]

Radius of curvature 42.9471
k = 0.0000e+000
a = 8.8856e−004 b = 8.4232e−004 c = −1.9163e−004
d = 1.7309e−005 e = −1.1637e−019 f = −9.1919e−022
g = −7.2415e−024 h = −5.6990e−026

FFS [1]

Radius of curvature ∞

All of the coefficients C4–C21 are zero.

Decentration [1] (DEO)

| X = 0.0000 | Y = 0.0000 | Z = 0.0000 |
|---|---|---|
| α = 0.0133 | β = 0.0000 | γ = 0.0000 |

Decentration [2] (DEO)

| X = 0.0000 | Y = 0.0096 | Z = 0.0000 |
|---|---|---|
| α = −0.0610 | β = 0.0000 | γ = 0.0000 |

Decentration [3] (DEO)

| X = 0.0000 | Y = 0.0000 | Z = 0.0000 |
|---|---|---|
| α = 22.5000 | β = 0.0000 | γ = 0.0000 |

Decentration [4] (DAR)

| X = 0.0000 | Y = 0.0000 | Z = 0.0000 |
|---|---|---|
| α = −0.0164 | β = 0.0000 | γ = 0.0000 |

Decentration [5] (DAR)

| X = 0.0000 | Y = 0.0000 | Z = 0.0000 |
|---|---|---|
| α = 0.0000 | β = 0.0000 | γ = 0.0000 |

Decentration [6] (DAR)

| X = 0.0000 | Y = 0.0000 | Z = 0.0000 |
|---|---|---|
| α = 0.0000 | β = 0.0000 | γ = 0.0000 |

Decentration [7] (DAR)

| X = 0.0000 | Y = 0.0183 | Z = 0.0000 |
|---|---|---|
| α = 0.0000 | β = 0.0000 | γ = 0.0000 |

Decentration [8] (DAR)

| X = 0.0000 | Y = 0.0078 | Z = 0.0000 |
|---|---|---|
| α = 0.0000 | β = 0.0000 | γ = 0.0000 |

Decentration [9] (DAR)

| X = 0.0000 | Y = −0.0474 | Z = 0.0000 |
|---|---|---|
| α = 0.0000 | β = 0.0000 | γ = 0.0000 |

Decentration [10] (DAR)

| X = 0.0000 | Y = 0.0000 | Z = 0.0000 |
|---|---|---|
| α = 0.5642 | β = 0.0000 | γ = 0.0000 |

[State 2]
Aspherical coefficients

Aspherical surface [1]

Radius of curvature 11.0043
k = 0.0000e+000
a = −1.5557e−005 b = −3.3468e−006 c = 8.5221e−008
d = −1.0800e−009

Aspherical surface [2]

Radius of curvature 9.0597
k = 0.0000e+000
a = −1.6160e−004 b = −8.7320e−007 c = −3.3584e−009
d = −2.9637e−010

Aspherical surface [3]

Radius of curvature 42.9471
k = 0.0000e+000
a = 8.8856e−004 b = 8.4232e−004 c = −1.9163e−004

-continued d = 1.7309e−005 e = −1.1637e−019 f = −9.1919e−022
g = −7.2415e−024 h = −5.6990e−026

FFS [1]

Radius of curvature ∞

All of the coefficients C-4–C12 are zero.

Decentration [1] (DEO)

| X = 0.0000 | Y = 0.0000 | Z = 0.0000 |
|---|---|---|
| α = 0.0073 | β = 0.0000 | γ = 0.0000 |

Decentration [2] (DEO)

| X = 0.0000 | Y = 0.0096 | Z = 0.0000 |
|---|---|---|
| α = −0.0610 | β = 0.0000 | γ = 0.0000 |

Decentration [3] (DEO)

| X = 0.0000 | Y = 0.0000 | Z = 0.0000 |
|---|---|---|
| α = 22.5000 | β = 0.0000 | γ = 0.0000 |

Decentration [4] (DAR)

| X = 0.0000 | Y = 0.0000 | Z = 0.0000 |
|---|---|---|
| α = −0.0164 | β = 0.0000 | γ = 0.0000 |

Decentration [5] (DAR)

| X = 0.0000 | Y = 0.0000 | Z = 0.0000 |
|---|---|---|
| α = 0.0000 | β = 0.0000 | γ = 0.0000 |

Decentration [6] (DAR)

| X = 0.0000 | Y = 0.0070 | Z = 0.0000 |
|---|---|---|
| α = 0.0000 | β = 0.0000 | γ = 0.0000 |

Decentration [7] (DAR)

| X = 0.0000 | Y = 0.0183 | Z = 0.0000 |
|---|---|---|
| α = 0.0000 | β = 0.0000 | γ = 0.0000 |

Decentration [8] (DAR)

| X = 0.0000 | Y = 0.0078 | Z = 0.0000 |
|---|---|---|
| α = 0.0000 | β = 0.0000 | γ = 0.0000 |

Decentration [9] (DAR)

| X = 0.0000 | Y = −0.0474 | Z = 0.0000 |
|---|---|---|
| α = 0.0000 | β = 0.0000 | γ = 0.0000 |

Decentration [10] (DAR)

| X = 0.0000 | Y = 0.0000 | Z = 0.0000 |
|---|---|---|
| α = 0.5642 | β = 0.0000 | γ = 0.0000 |

[State 3]
Aspherical coefficients

Aspherical surface [1]

Radius of curvature 11.0043
k = 0.0000e+000
a = −1.5557e−005 b = −3.3468e−006 c = 8.5221e−008
d = −1.0800e−009

Aspherical surface [2]

Radius of curvature 9.0597
k = 0.0000e+000
a = −1.6160e−004 b = −8.7320e−007 c = −3.3584e−009
d = −2.9637e−010

Aspherical surface [3]

Radius of curvature 42.9471
k = 0.0000e+000
a = 8.8856e−004 b = 8.4232e−004 c = −1.9163e−004
d = 1.7309e−005 e = −1.1637e−019 f = −9.1919e−022
g = −7.2415e−024 h = −5.6990e−026

FFS [1]

Radius of curvature ∞

All of the coefficients C4–C21 are zero.

Decentration [1] (DEO)

| X = 0.0000 | Y = 0.0000 | Z = 0.0000 |
|---|---|---|
| α = −0.0194 | β = 0.0000 | γ = 0.0000 |

-continued

| Decentration [2] (DEO) | | |
|---|---|---|
| X = 0.0000 | Y = 0.0096 | Z = 0.0000 |
| α = −0.0610 | β = 0.0000 | γ = 0.0000 |
| Decentration [3] (DEO) | | |
| X = 0.0000 | Y = 0.0000 | Z = 0.0000 |
| α = 22.5000 | β = 0.0000 | γ = 0.0000 |
| Decentration [4] (DAR) | | |
| X = 0.0000 | Y = 0.0000 | Z = 0.0000 |
| α = −0.0164 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.0070 | Z = 0.0000 |
| α = 0.0000 | β = 0.0000 | γ = 0.0000 |
| Decentration [7] (DAR) | | |
| X = 0.0000 | Y = 0.0183 | Z = 0.0000 |
| α = 0.0000 | β = 0.0000 | γ = 0.0000 |
| Decentration [8] (DAR) | | |
| X = 0.0000 | Y = 0.0078 | Z = 0.0000 |
| α = 0.0000 | β = 0.0000 | γ = 0.0000 |
| Decentration [9] (DAR) | | |
| X = 0.0000 | Y = −0.0474 | Z = 0.0000 |
| α = 0.0000 | β = 0.0000 | γ = 0.0000 |
| Decentration [10] (DAR) | | |
| X = 0.0000 | Y = 0.0000 | Z = 0.0000 |
| α = 0.5642 | β = 0.0000 | γ = 0.0000 |

[State 4]
Aspherical coefficients

| Aspherical surface [1] | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |
| Aspherical surface [2] | | |
| Radius of curvature | 9.0597 | |
| k = 0.0000e+000 | | |
| a = −1.6160e−004 | b = −8.7320e−007 | c = −3.3584e−009 |
| d = −2.9637e−010 | | |
| Aspherical surface [3] | | |
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |
| FFS [1] | | |
| Radius of curvature | ∞ | |
| C4 = −1.6471e−004 | C6 = −1.4364e−004 | C8 = 1.4307e−006 |
| C10 = 5.6799e−006 | C11 = −4.2537e−007 | C13 = −1.9416e−006 |
| C15 = −9.0327e−007 | C17 = 4.8420e−008 | C19 = −1.1288e−007 |
| C21 = −1.4803e−007 | | |

| Decentration [1] (DEO) | | |
|---|---|---|
| X = 0.0000 | Y = 0.0000 | Z = 0.0000 |
| α = −0.0404 | β = 0.0000 | γ = 0.0000 |
| Decentration [2] (DEO) | | |
| X = 0.0000 | Y = 0.0096 | Z = 0.0000 |
| α = −0.0610 | β = 0.0000 | γ = 0.0000 |
| Decentration [3] (DEO) | | |
| X = 0.0000 | Y = 0.0000 | Z = 0.0000 |
| α = 22.5000 | β = 0.0000 | γ = 0.0000 |

-continued

| Decentration [4] (DAR) | | |
|---|---|---|
| X = 0.0000 | Y = 0.0000 | Z = 0.0052 |
| α = −0.0164 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.0070 | Z = 0.0000 |
| α = 0.0000 | β = 0.0000 | γ = 0.0000 |
| Decentration [7] (DAR) | | |
| X = 0.0000 | Y = 0.0183 | Z = 0.0000 |
| α = 0.0000 | β = 0.0000 | γ = 0.0000 |
| Decentration [8] (DAR) | | |
| X = 0.0000 | Y = 0.0078 | Z = 0.0000 |
| α = 0.0000 | β = 0.0000 | γ = 0.0000 |
| Decentration [9] (DAR) | | |
| X = 0.0000 | Y = −0.0474 | Z = 0.0000 |
| α = 0.0000 | β = 0.0000 | γ = 0.0000 |
| Decentration [10] (DAR) | | |
| X = 0.0000 | Y = 0.0000 | Z = 0.0000 |
| α = 0.5642 | β = 0.0000 | γ = 0.0000 |

[State 5]
Aspherical coefficients

| Aspherical surface [1] | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |
| Aspherical surface [2] | | |
| Radius of curvature | 9.0597 | |
| k = 0.0000e+000 | | |
| a = −1.6160e−004 | b = −8.7320e−007 | c = −3.3584e−009 |
| d = −2.9637e−010 | | |
| Aspherical surface [3] | | |
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |
| FFS [1] | | |
| Radius of curvature | ∞ | |
| C4 = −7.0369e−005 | C6 = −5.8510e−005 | C8 = 2.7900e−008 |
| C10 = −2.5943e−007 | C11 = −1.1696e−006 | C13 = −2.9963e−006 |
| C15 = −1.1245e−006 | C17 = −2.6771e−008 | C19 = −8.9343e−008 |
| C21 = 8.5763e−009 | | |

| Decentration [1] (DEO) | | |
|---|---|---|
| X = 0.0000 | Y = 0.0000 | Z = 0.0000 |
| α = −0.0724 | β = 0.0000 | γ = 0.0000 |
| Decentration [2] (DEO) | | |
| X = 0.0000 | Y = 0.0000 | Z = 0.0000 |
| α = −0.0610 | β = 0.0000 | γ = 0.0000 |
| Decentration [3] (DEO) | | |
| X = 0.0000 | Y = 0.0000 | Z = 0.0000 |
| α = 22.5000 | β = 0.0000 | γ = 0.0000 |
| Decentration [4] (DAR) | | |
| X = 0.0000 | Y = 0.0000 | Z = 0.0030 |
| α = −0.0164 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |

-continued

| Decentration [6] (DAR) | | |
|---|---|---|
| X = 0.0000 | Y = 0.0070 | Z = 0.0000 |
| α = 0.0000 | β = 0.0000 | γ = 0.0000 |
| Decentration [7] (DAR) | | |
| X = 0.0000 | Y = 0.0183 | Z = 0.0000 |
| α = 0.0000 | β = 0.0000 | γ = 0.0000 |
| Decentration [8] (DAR) | | |
| X = 0.0000 | Y = 0.0078 | Z = 0.0000 |
| α = 0.0000 | β = 0.0000 | γ = 0.0000 |
| Decentration [9] (DAR) | | |
| X = 0.0000 | Y = −0.0474 | Z = 0.0000 |
| α = 0.0000 | β = 0.0000 | γ = 0.0000 |
| Decentration [10] (DAR) | | |
| X = 0.0000 | Y = 0.0000 | Z = 0.0000 |
| α = 0.5642 | β = 0.0000 | γ = 0.0000 |

[State 6]
Aspherical coefficients

| Aspherical surface [1] | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |
| Aspherical surface [2] | | |
| Radius of curvature | 9.0597 | |
| k = 0.0000e+000 | | |
| a = −1.6160e−004 | b = −8.7320e−007 | c = −3.3584e−009 |
| d = −2.9637e−010 | | |
| Aspherical surface [3] | | |
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |
| FFS [1] | | |
| Radius of curvature | ∞ | |
| C4 = −3.1791e−005 | C6 = −2.7057e−005 | C8 = −2.5859e−007 |
| C10 = −2.6043e−007 | C11 = −4.0756e−007 | C13 = −6.8479e−007 |
| C15 = −3.0771e−007 | C17 = −2.5460e−008 | C19 = −4.1332e−008 |
| C21 = −1.5297e−008 | | |

| Decentration [1] (DEO) | | |
|---|---|---|
| X = 0.0000 | Y = 0.0000 | Z = 0.0000 |
| α = −0.0051 | β = 0.0000 | γ = 0.0000 |
| Decentration [2] (DEO) | | |
| X = 0.0000 | Y = 0.0096 | Z = 0.0000 |
| α = −0.0610 | β = 0.0000 | γ = 0.0000 |
| Decentration [3] (DEO) | | |
| X = 0.0000 | Y = 0.0000 | Z = 0.0000 |
| α = 22.5000 | β = 0.0000 | γ = 0.0000 |
| Decentration [4] (DAR) | | |
| X = 0.0000 | Y = 0.0000 | Z = 0.0012 |
| α = −0.0164 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.0070 | Z = 0.0000 |
| α = 0.0000 | β = 0.0000 | γ = 0.0000 |
| Decentration [7] (DAR) | | |
| X = 0.0000 | Y = 0.0183 | Z = 0.0000 |
| α = 0.0000 | β = 0.0000 | γ = 0.0000 |

-continued

| Decentration [8] (DAR) | | |
|---|---|---|
| X = 0.0000 | Y = 0.0078 | Z = 0.0000 |
| α = 0.0000 | β = 0.0000 | γ = 0.0000 |
| Decentration [9] (DAR) | | |
| X = 0.0000 | Y = −0.0474 | Z = 0.0000 |
| α = 0.0000 | β = 0.0000 | γ = 0.0000 |
| Decentration [10] (DAR) | | |
| X = 0.0000 | Y = 0.0000 | Z = 0.0000 |
| α = 0.5642 | β = 0.0000 | γ = 0.0000 |

[State 7]
Aspherical coefficients

| Aspherical surface [1] | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |
| Aspherical surface [2] | | |
| Radius of curvature | 9.0597 | |
| k = 0.0000e+000 | | |
| a = −1.6160e−004 | b = −8.7320e−007 | c = −3.3584e−009 |
| d = −2.9637e−010 | | |
| Aspherical surface [3] | | |
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |
| FFS [1] | | |
| Radius of curvature | ∞ | |
| C4 = −2.8589e−004 | C6 = −2.5889e−004 | C8 = 3.2593e−006 |
| C10 = 2.7690e−006 | C11 = −1.8982e−007 | C13 = 1.3287e−007 |
| C15 = −6.4529e−007 | C17 = −1.0919e−007 | C19 = −1.1178e−007 |
| C21 = −9.1537e−008 | | |

| Decentration [1] (DEO) | | |
|---|---|---|
| X = 0.0000 | Y = 0.0000 | Z = 0.0000 |
| α = −0.0659 | β = 0.0000 | γ = 0.0000 |
| Decentration [2] (DEO) | | |
| X = 0.0000 | Y = 0.0096 | Z = 0.0000 |
| α = −0.0610 | β = 0.0000 | γ = 0.0000 |
| Decentration [3] (DEO) | | |
| X = 0.0000 | Y = 0.0000 | Z = 0.0000 |
| α = 22.5000 | β = 0.0000 | γ = 0.0000 |
| Decentration [4] (DAR) | | |
| X = 0.0000 | Y = 0.0000 | Z = 0.0086 |
| α = −0.0164 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.0070 | Z = 0.0000 |
| α = 0.0000 | β = 0.0000 | γ = 0.0000 |
| Decentration [7] (DAR) | | |
| X = 0.0000 | Y = 0.0183 | Z = 0.0000 |
| α = 0.0000 | β = 0.0000 | γ = 0.0000 |
| Decentration [8] (DAR) | | |
| X = 0.0000 | Y = 0.0078 | Z = 0.0000 |
| α = 0.0000 | β = 0.0000 | γ = 0.0000 |
| Decentration [9] (DAR) | | |
| X = 0.0000 | Y = −0.0474 | Z = 0.0000 |
| α = 0.0000 | β = 0.0000 | γ = 0.0000 |

-continued

| Decentration [10] (DAR) | | |
|---|---|---|
| X = 0.0000 | Y = 0.0000 | Z = 0.0000 |
| α = 0.5642 | β = 0.0000 | γ = 0.0000 |

[State 8]
Aspherical coefficients

| Aspherical surface [1] | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |
| | Aspherical surface [2] | |
| Radius of curvature | 9.0597 | |
| k = 0.0000e+000 | | |
| a = −1.6160e−004 | b = −8.7320e−007 | c = −3.3584e−009 |
| d = −2.9637e−010 | | |
| | Aspherical surface [3] | |
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |
| | FFS [1] | |
| Radius of curvature | ∞ | |
| C4 = −1.9599e−004 | C6 = −1.6222e−004 | C8 = −3.8018e−007 |
| C10 = −7.6439e−007 | C11 = −5.7571e−007 | C13 = −2.8235e−006 |
| C15 = −1.2550e−006 | C17 = −3.8507e−008 | C19 = −1.1226e−007 |
| C21 = 2.5269e−008 | | |

| Decentration [1] (DEO) | | |
|---|---|---|
| X = 0.0000 | Y = 0.0000 | Z = 0.0000 |
| α = −0.0323 | β = 0.0000 | γ = 0.0000 |
| | Decentration [2] (DEO) | |
| X = 0.0000 | Y = 0.0096 | Z = 0.0000 |
| α = −0.0610 | β = 0.0000 | γ = 0.0000 |
| | Decentration [3] (DEO) | |
| X = 0.0000 | Y = 0.0000 | Z = 0.0000 |
| α = 22.5000 | β = 0.0000 | γ = 0.0000 |
| | Decentration [4] (DAR) | |
| X = 0.0000 | Y = 0.0000 | Z = 0.0063 |
| α = −0.0164 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.0070 | Z = 0.0000 |
| α = 0.0000 | β = 0.0000 | γ = 0.0000 |
| | Decentration [7] (DAR) | |
| X = 0.0000 | Y = 0.0183 | Z = 0.0000 |
| α = 0.0000 | β = 0.0000 | γ = 0.0000 |
| | Decentration [8] (DAR) | |
| X = 0.0000 | Y = 0.0078 | Z = 0.0000 |
| α = 0.0000 | β = 0.0000 | γ = 0.0000 |
| | Decentration [9] (DAR) | |
| X = 0.0000 | Y = −0.0474 | Z = 0.0000 |
| α = 0.0000 | β = 0.0000 | γ = 0.0000 |
| | Decentration [10] (DAR) | |
| X = 0.0000 | Y = 0.0000 | Z = 0.0000 |
| α = 0.5642 | β = 0.0000 | γ = 0.0000 |

-continued

[State 9]
Aspherical coefficients

| Aspherical surface [1] | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |
| | Aspherical surface [2] | |
| Radius of curvature | 9.0597 | |
| k = 0.0000e+000 | | |
| a = −1.6160e−004 | b = −8.7320e−007 | c = −3.3584e−009 |
| d = −2.9637e−010 | | |
| | Aspherical surface [3] | |
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |
| | FFS [1] | |
| Radius of curvature | ∞ | |
| C4 = −1.5429e−004 | C6 = −1.2713e−004 | C8 = −8.9433e−007 |
| C10 = −2.1087e−006 | C11 = −2.0173e−007 | C13 = −1.2541e−006 |
| C15 = −7.6926e−007 | C17 = −5.6479e−008 | C19 = −1.3282e−007 |
| C21 = 5.0322e−008 | | |

| Decentration [1] (DEO) | | |
|---|---|---|
| X = 0.0000 | Y = 0.0000 | Z = 0.0000 |
| α = −0.0358 | β = 0.0000 | γ = 0.0000 |
| | Decentration [2] (DEO) | |
| X = 0.0000 | Y = 0.0096 | Z = 0.0000 |
| α = −0.0610 | β = 0.0000 | γ = 0.0000 |
| | Decentration [3] (DEO) | |
| X = 0.0000 | Y = 0.0000 | Z = 0.0000 |
| α = 22.5000 | β = 0.0000 | γ = 0.0000 |
| | Decentration [4] (DAR) | |
| X = 0.0000 | Y = 0.0000 | Z = 0.0047 |
| α = −0.0164 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.0070 | Z = 0.0000 |
| α = 0.0000 | β = 0.0000 | γ = 0.0000 |
| | Decentration [7] (DAR) | |
| X = 0.0000 | Y = 0.0183 | Z = 0.0000 |
| α = 0.0000 | β = 0.0000 | γ = 0.0000 |
| | Decentration [8] (DAR) | |
| X = 0.0000 | Y = 0.0078 | Z = 0.0000 |
| α = 0.0000 | β = 0.0000 | γ = 0.0000 |
| | Decentration [9] (DAR) | |
| X = 0.0000 | Y = −0.0474 | Z = 0.0000 |
| α = 0.0000 | β = 0.0000 | γ = 0.0000 |
| | Decentration [10] (DAR) | |
| X = 0.0000 | Y = 0.0000 | Z = 0.0000 |
| α = 0.5642 | β = 0.0000 | γ = 0.0000 |

-continued

[State 10]
Aspherical coefficients

Aspherical surface [1]

| | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |

Aspherical surface [2]

| | | |
|---|---|---|
| Radius of curvature | 9.0597 | |
| k = 0.0000e+000 | | |
| a = −1.6160e−004 | b = −8.7320e−007 | c = −3.3584e−009 |
| d = −2.9637e−010 | | |

Aspherical surface [3]

| | | |
|---|---|---|
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |

FFS [1]

| | | |
|---|---|---|
| Radius of curvature | ∞ | |
| C4 = −5.0277e−004 | C6 = −4.2283e−004 | C8 = 3.3085e−006 |
| C10 = 3.9196e−007 | C11 = 1.3147e−006 | C13 = 5.4721e−006 |
| C15 = −8.9090e−007 | C17 = −1.6290e−007 | C19 = 1.0356e−007 |
| C21 = −1.2958e−008 | | |

Decentration [1] (DEO)

| | | |
|---|---|---|
| X = 0.0000 | Y = 0.0000 | Z = 0.0000 |
| α = −0.0681 | β = 0.0000 | γ = 0.0000 |

Decentration [2] (DEO)

| | | |
|---|---|---|
| X = 0.0000 | Y = 0.0096 | Z = 0.0000 |
| α = −0.0610 | β = 0.0000 | γ = 0.0000 |

Decentration [3] (DEO)

| | | |
|---|---|---|
| X = 0.0000 | Y = 0.0000 | Z = 0.0000 |
| α = 22.5000 | β = 0.0000 | γ = 0.0000 |

Decentration [4] (DAR)

| | | |
|---|---|---|
| X = 0.0000 | Y = 0.0000 | Z = 0.0138 |
| α = −0.0164 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = 0.0070 | Z = 0.0000 |
| α = 0.0000 | β = 0.0000 | γ = 0.0000 |

Decentration [7] (DAR)

| | | |
|---|---|---|
| X = 0.0000 | Y = 0.0183 | Z = 0.0000 |
| α = 0.0000 | β = 0.0000 | γ = 0.0000 |

Decentration [8] (DAR)

| | | |
|---|---|---|
| X = 0.0000 | Y = 0.0078 | Z = 0.0000 |
| α = 0.0000 | β = 0.0000 | γ = 0.0000 |

Decentration [9] (DAR)

| | | |
|---|---|---|
| X = 0.0000 | Y = −0.0474 | Z = 0.0000 |
| α = 0.0000 | β = 0.0000 | γ = 0.0000 |

Decentration [10] (DAR)

| | | |
|---|---|---|
| X = 0.0000 | Y = 0.0000 | Z = 0.0000 |
| α = 0.5642 | β = 0.0000 | γ = 0.0000 |

[State 11]
Aspherical coefficients

Aspherical surface [1]

| | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |

Aspherical surface [2]

| | | |
|---|---|---|
| Radius of curvature | 9.0597 | |
| k = 0.0000e+000 | | |
| a = −1.6160e−004 | b = −8.7320e−007 | c = −3.3584e−009 |
| d = −2.9637e−010 | | |

Aspherical surface [3]

| | | |
|---|---|---|
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |

FFS [1]

| | | |
|---|---|---|
| Radius of curvature | ∞ | |
| C4 = −2.7469e−004 | C6 = −2.2830e−004 | C8 = −4.5559e−007 |
| C10 = −2.4931e−006 | C11 = −3.1360e−007 | C13 = −2.3477e−006 |
| C15 = −1.4103e−006 | C17 = −5.3766e−008 | C19 = −7.9850e−008 |
| C21 = 8.2415e−008 | | |

Decentration [1] (DEO)

| | | |
|---|---|---|
| X = 0.0000 | Y = 0.0000 | Z = 0.0000 |
| α = −0.0383 | β = 0.0000 | γ = 0.0000 |

Decentration [2] (DEO)

| | | |
|---|---|---|
| X = 0.0000 | Y = 0.0096 | Z = 0.0000 |
| α = −0.0610 | β = 0.0000 | γ = 0.0000 |

Decentration [3] (DEO)

| | | |
|---|---|---|
| X = 0.0000 | Y = 0.0000 | Z = 0.0000 |
| α = 22.5000 | β = 0.0000 | γ = 0.0000 |

Decentration [4] (DAR)

| | | |
|---|---|---|
| X = 0.0000 | Y = 0.0000 | Z = 0.0084 |
| α = −0.0164 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = 0.0070 | Z = 0.0000 |
| α = 0.0000 | β = 0.0000 | γ = 0.0000 |

Decentration [7] (DAR)

| | | |
|---|---|---|
| X = 0.0000 | Y = 0.0183 | Z = 0.0000 |
| α = 0.0000 | β = 0.0000 | γ = 0.0000 |

Decentration [8] (DAR)

| | | |
|---|---|---|
| X = 0.0000 | Y = 0.0078 | Z = 0.0000 |
| α = 0.0000 | β = 0.0000 | γ = 0.0000 |

Decentration [9] (DAR)

| | | |
|---|---|---|
| X = 0.0000 | Y = −0.0474 | Z = 0.0000 |
| α = 0.0000 | β = 0.0000 | γ = 0.0000 |

Decentration [10] (DAR)

| | | |
|---|---|---|
| X = 0.0000 | Y = 0.0000 | Z = 0.0000 |
| α = 0.5642 | β = 0.0000 | γ = 0.0000 |

[State 12]
Aspherical coefficients

Aspherical surface [1]

| | | |
|---|---|---|
| Radius of curvature | 11.0043 | |
| k = 0.0000e+000 | | |
| a = −1.5557e−005 | b = −3.3468e−006 | c = 8.5221e−008 |
| d = −1.0800e−009 | | |

Aspherical surface [2]

| | | |
|---|---|---|
| Radius of curvature | 9.0597 | |
| k = 0.0000e+000 | | |
| a = −1.6160e−004 | b = −8.7320e−007 | c = −3.3584e−009 |
| d = −2.9637e−010 | | |

-continued

| Aspherical surface [3] | | |
|---|---|---|
| Radius of curvature | 42.9471 | |
| k = 0.0000e+000 | | |
| a = 8.8856e−004 | b = 8.4232e−004 | c = −1.9163e−004 |
| d = 1.7309e−005 | e = −1.1637e−019 | f = −9.1919e−022 |
| g = −7.2415e−024 | h = −5.6990e−026 | |
| **FFS [1]** | | |
| Radius of curvature | ∞ | |
| C4 = −1.9401e−004 | C6 = −1.5928e−004 | C8 = −1.1467e−006 |
| C10 = −2.6166e−006 | C11 = −1.4811e−007 | C13 = −1.4595e−006 |
| C15 = −9.5532e−007 | C17 = −5.2442e−008 | C19 = −1.5690e−007 |
| C21 = 6.8978e−008 | | |
| **Decentration [1] (DEO)** | | |
| X = 0.0000 | Y = 0.0000 | Z = 0.0000 |
| α = −0.0334 | β = 0.0000 | γ = 0.0000 |
| **Decentration [2] (DEO)** | | |
| X = 0.0000 | Y = 0.0096 | Z = 0.0000 |
| α = −0.0610 | β = 0.0000 | γ = 0.0000 |
| **Decentration [3] (DEO)** | | |
| X = 0.0000 | Y = 0.0000 | Z = 0.0000 |
| α = 22.5000 | β = 0.0000 | γ = 0.0000 |
| **Decentration [4] (DAR)** | | |
| X = 0.0000 | Y = 0.0000 | Z = 0.0058 |
| α = −0.0164 | β = 0.0000 | γ = 0.0000 |

-continued

| Decentration [5] (DAR) | | |
|---|---|---|
| X = 0.0000 | Y = 0.0000 | Z = 0.0000 |
| α = 0.0000 | β = 0.0000 | γ = 0.0000 |
| **Decentration [6] (DAR)** | | |
| X = 0.0000 | Y = 0.0070 | Z = 0.0000 |
| α = 0.0000 | β = 0.0000 | γ = 0.0000 |
| **Decentration [7] (DAR)** | | |
| X = 0.0000 | Y = 0.0183 | Z = 0.0000 |
| α = 0.0000 | β = 0.0000 | γ = 0.0000 |
| **Decentration [8] (DAR)** | | |
| X = 0.0000 | Y = 0.0078 | Z = 0.0000 |
| α = 0.0000 | β = 0.0000 | γ = 0.0000 |
| **Decentration [9] (DAR)** | | |
| X = 0.0000 | Y = −0.0474 | Z = 0.0000 |
| α = 0.0000 | β = 0.0000 | γ = 0.0000 |
| **Decentration [10] (DAR)** | | |
| X = 0.0000 | Y = 0.0000 | Z = 0.0000 |
| α = 0.5642 | β = 0.0000 | γ = 0.0000 |

However, the coordinate system of the fourth surface is the same as that of the first surface. The coordinate systems after the fifth surface are defined in order from the fourth surface.

| | Far-point allowance | | Far point | | Near point | | Near-point allowance | |
|---|---|---|---|---|---|---|---|---|
| **Object distance D0** | | | | | | | | |
| Wide-angle | State 1 | ∞ | State 4 | ∞ | State 7 | 300 | State 10 | 300 |
| Standard | State 2 | ∞ | State 5 | ∞ | State 8 | 300 | State 11 | 300 |
| Telephoto | State 3 | ∞ | State 6 | ∞ | State 9 | 300 | State 12 | 300 |
| **Image plane distance D34** | | | | | | | | |
| Wide-angle | State 1 | 0.605 | State 4 | 0.500 | State 7 | 0.500 | State 10 | 0.395 |
| Standard | State 2 | 0.620 | State 5 | 0.500 | State 8 | 0.500 | State 11 | 0.380 |
| Telephoto | State 3 | 0.675 | State 6 | 0.500 | State 9 | 0.500 | State 12 | 0.320 |

Zoom spacing

| | Wide-angle | Standard | Telephoto |
|---|---|---|---|
| D16 | 0.2000 | 7.6527 | 8.8500 |
| D20 | 16.3097 | 6.7999 | 0.1000 |
| D27 | 0.1000 | 2.1570 | 7.6596 |

Embodiment 3

Figure 13:
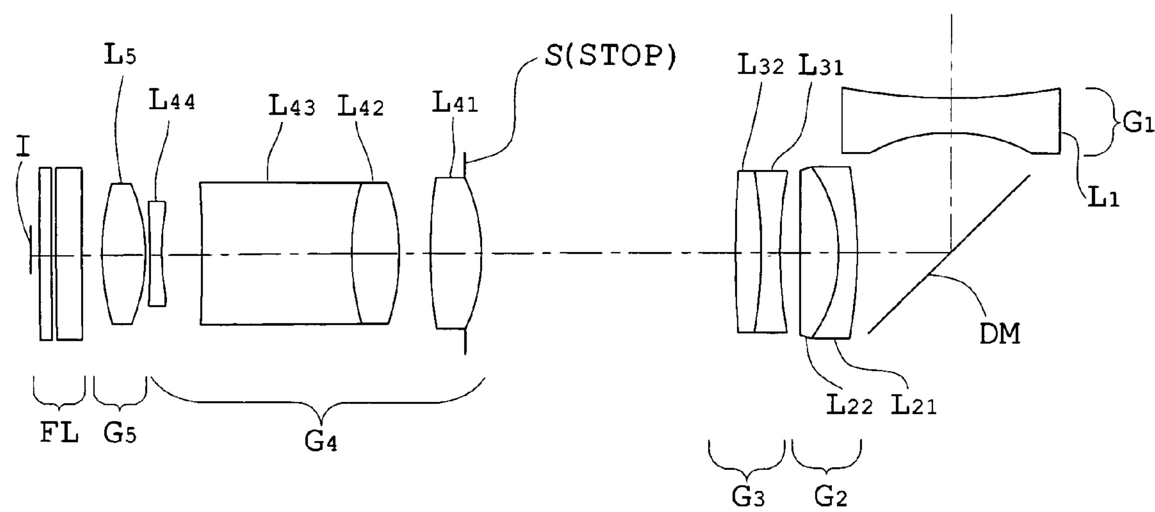
FIG. 13 is a Y-Z sectional view showing schematically the arrangement, at the wide-angle position, of Embodiment 3 of the optical system applicable to the optical apparatus of the present invention.
Figure 14:
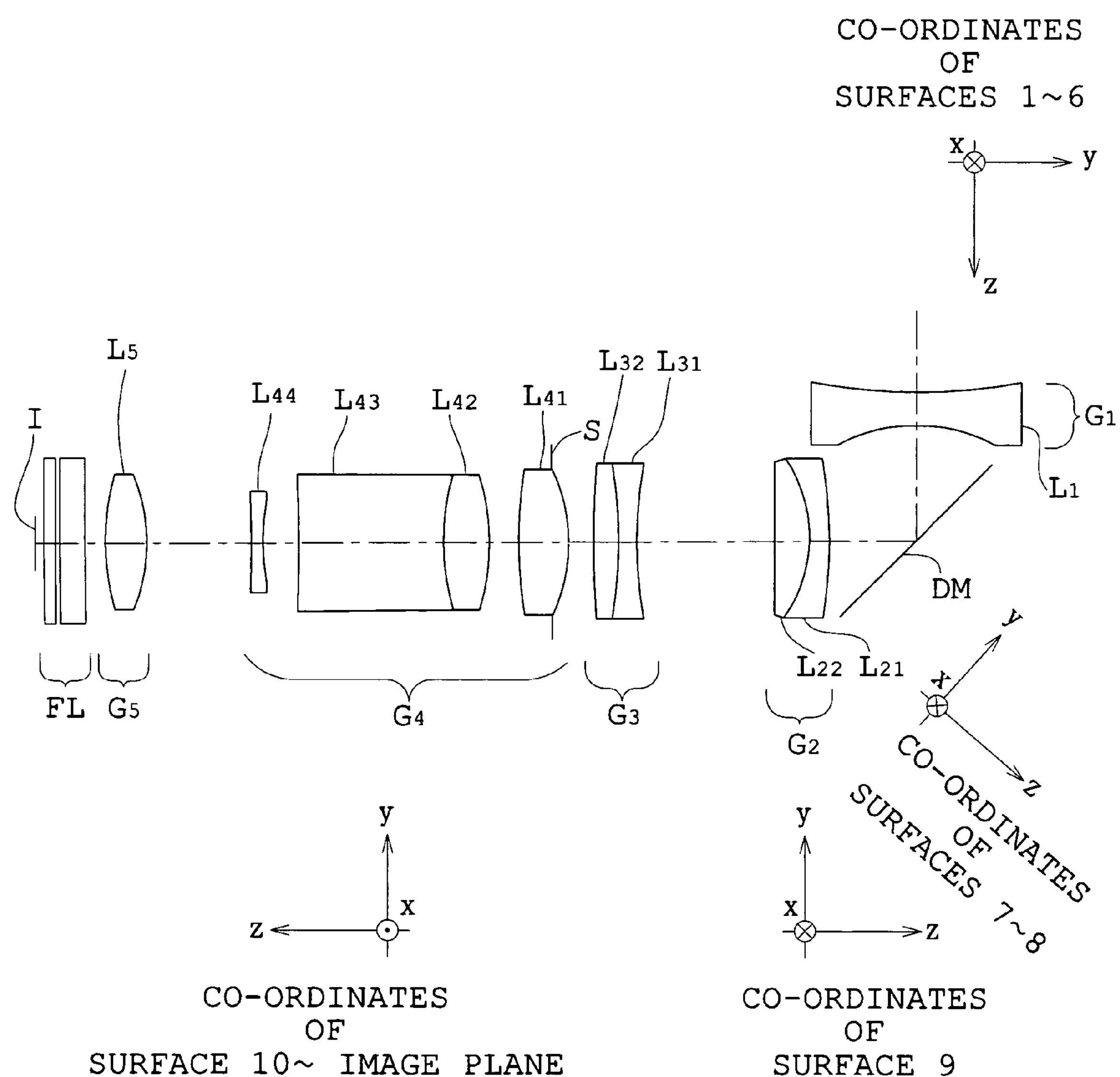
FIG. 14 is a Y-Z sectional view showing schematically the arrangement, at the standard position, of Embodiment 3 of the optical system applicable to the optical apparatus of the present invention.
Figure 15:
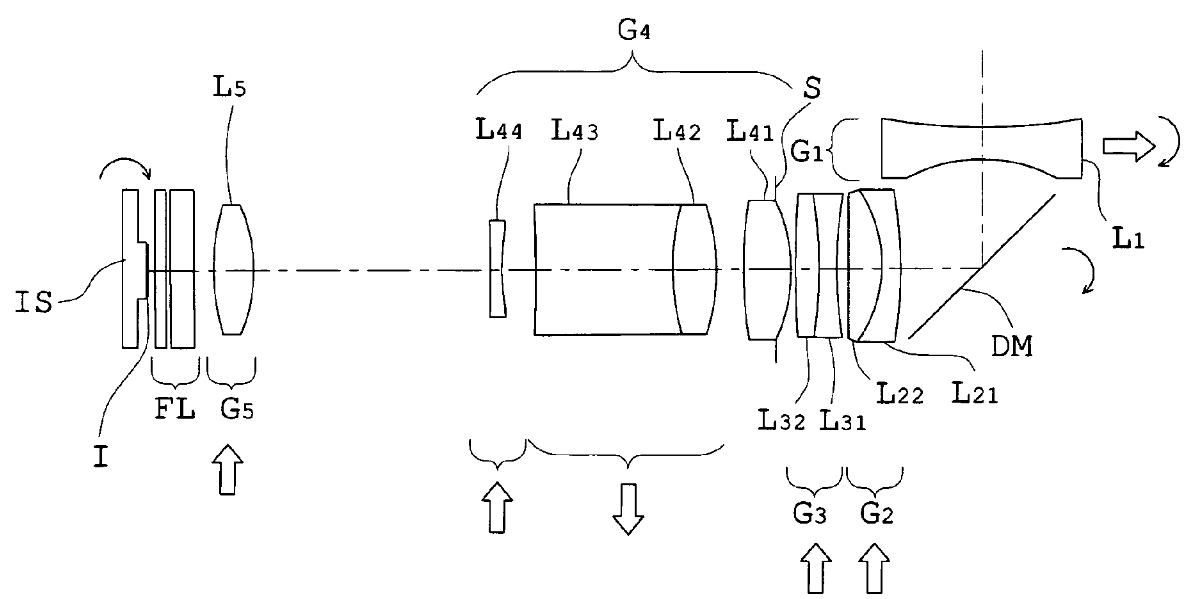
FIG. 15 is a Y-Z sectional view showing schematically the arrangement, at the telephoto position, of Embodiment 3 of the optical system applicable to the optical apparatus of the present invention.

FIGS. 13–15 show Embodiment 3 of the optical system applicable to the optical apparatus of the present invention.

In the optical system of Embodiment 3, as shown in FIGS. 13–15, the optical path is bent 90° by the variable mirror.

The deformable mirror of Embodiment 3 is capable of changing the power to perform focusing from the far point to the near point. However, in order to perform auto-focusing of a contrast method, it is designed to bring about a state of weaker power than in focusing at the far point and a state of stronger power than in focusing at the near point. In Embodiment 3, the state of weaker power than in focusing at the far point is defined as far-point allowance, and a state of stronger power than in focusing at the near point is defined as near-point allowance. That is, the deformable mirror in Embodiment 3 has four states, the far-point allowance, the far point, the near point, and the near-point allowance. Additionally, in each of these states, there are three states, the wide-angle, standard, and telephoto positions in the magnification change. Thus, the deformable mirror has 12 deformation states in total.

In the four states of the far-point allowance, the far point, the near point, and the near-point allowance, the object distance and the position of the imaging surface are different. In the states of the far-point allowance and the near-point allowance, the position of the imaging surface is different from the far point and the near point, but the imaging surface is not physically moved. In order to change the power of the deformable mirror, the numerical value of the position of the imaging surface is changed for convenience.

The deformable mirror in Embodiment 3 is designed to consider the shift of the image plane in the Z direction caused by a fabrication error in actual fabrication and by a temperature change and to have the allowance of the amount of deformation before and after a focus limit.

For convenience, the deformable mirror in each of FIGS. 13–15 is such that only the mirror surface is shown.

The optical system of Embodiment 3 comprise, in order from the object side, the fixed lens unit G1 with negative power, the deformable mirror DM, the fixed lens unit G2 with positive power, the moving lens unit G3 with negative power, the stop S, the moving lens unit G4 with positive power, and the fixed lens unit G5 with positive power. In FIGS. 13–15, reference symbol FL designates a filter unit and I designates an image plane. Filters and the cover glass of the image sensor are also a kind of optical element.

The fixed lens unit G1 is constructed with the biconcave lens L1. The fixed lens unit G2 is constructed with the cemented doublet of the negative meniscus lens L21 with a convex surface facing the object side and the biconvex lens L22. The moving lens unit G3 is constructed with the cemented doublet of the biconcave lens L31 and the biconvex lens L32 lens. The moving lens unit G4 includes the biconvex lens L41, the cemented doublet of the biconvex lens L42 and the biconcave lens L43, and the biconcave lens L44. The fixed lens unit G5 is constructed with the biconvex lens L5.

The optical system of Embodiment 3 is such as to perform the variable magnification function by moving the moving lens unit G3 and the moving lens unit G4. In addition, the thin film forming the reflecting surface of the deformable mirror DM is deformed and thereby focusing can be carried out in the range from the infinity to a near point of 300 mm.

When the thin film of the deformable mirror DM is deformed from a flat surface into a curved surface, decentration aberration is produced by the reflection of the mirror surface. In particular, in focusing of an extremely near point that the amount of deformation of the variable mirror DM is large, the decentration aberration is considerably produced. Hence, in order to obtain good optical performance between the far point and the near point in the optical system of Embodiment 2, shift and tilt decentrations are applied to a lens unit or the imaging surface to balance the production of the decentration aberration in focusing. In FIG. 15, the directions of the decentrations are indicated by arrows. The image sensor IS is shown in FIG. 15 only.

According to the optical system of Embodiment 3, like Embodiment 2, focusing can be performed without mechanical drive, and thus the structure of the lens frame is simplified and the compact and low-cost design can be attained. Moreover, there is the merit that the driving noise of a motor in focusing is eliminated.

Embodiment 3 is constructed so that the optical axis is bent 90° by the variable mirror DM. This arrangement is compacter than that of Embodiment 2.

Subsequently, numerical data of optical members constituting the optical system of Embodiment 3 are shown below.

Numerical Data 3

Object point: ∞~300 mm

Focal length: 4.4 mm (wide-angle)~13.2 mm (telephoto), 7.6 mm (standard)

Open F-number: 2.5 (wide-angle)~3.6 (standard)~5.1 (telephoto)

Size of imaging surface: 4.0 mm×3.0 mm (X direction×Y direction)

Spacings with the moving lenses change in order of (wide-angle)–(standard)–(telephoto).

Object distance: Spacing to object surface

Image plane distance: Spacing to the 34th surface

Zoom spacing: 16th surface, 20th surface, and 27th surface

Object point infinity: Wide-angle position, State 4

| Surface number | Radius of curvature | Surface spacing | Decentration | Refractive index | Abbe's number |
|---|---|---|---|---|---|
| Object surface | ∞ | ∞ | | | |
| 1 | ∞ | 0.0000 | Decentration (1) | | |
| 2 | Aspherical surface [1] | 1.9000 | Decentration (2) | 1.6852 | 53.6 |
| 3 | Aspherical surface [2] | 0.0000 | | | |
| 4 | ∞ | 8.3000 | | | |
| 5 | ∞ | 0.0000 | | | |
| 6 | ∞ | 0.0000 | | | |
| 7 | ∞ | 0.0000 | Decentration (3) | | |
| 8 | FFS[1] | 0.0000 | Decentration (4) | DM | |
| 9 | ∞ | 0.0000 | Decentration (3) | | |
| 10 | ∞ | 4.8000 | | | |
| 11 | ∞ | 0.0000 | Decentration (5) | | |
| 12 | ∞ | 0.0000 | Decentration (5) | | |
| 13 | ∞ | 0.0000 | | | |
| 14 | 29.1579 | 1.1000 | Decentration (6) | 1.7416 | 46.8 |
| 15 | 7.5985 | 2.0000 | Decentration (6) | 1.7258 | 42.8 |
| 16 | 673.0429 | D16 | Decentration (6) | | |
| 17 | −25.6668 | 1.0000 | Decentration (7) | 1.7292 | 33.6 |
| 18 | 24.2481 | 1.3733 | Decentration (7) | 1.8497 | 24.0 |
| 19 | −71.0490 | 0.1000 | Decentration (7) | | |
| 20 | ∞ | D20 | Decentration (5) | | |
| Stop surface | Aspherical surface [3] | 2.7500 | Decentration (8) | 1.4900 | 70.0 |
| 22 | −24.3326 | 1.7476 | Decentration (8) | | |
| 23 | 14.3318 | 2.4000 | Decentration (8) | 1.5093 | 67.2 |
| 24 | −16.8685 | 8.2111 | Decentration (8) | 1.8114 | 25.0 |
| 25 | 112.9770 | 2.0756 | Decentration (8) | | |
| 26 | −10.2677 | 0.6782 | Decentration (9) | 1.8127 | 26.2 |
| 27 | Aspherical surface [4] | D27 | Decentration (9) | | |
| 28 | ∞ | 0.0000 | Decentration (5) | | |
| 29 | 10.0305 | 2.3000 | Decentration (10) | 1.5022 | 59.9 |
| 30 | −14.6267 | 1.1218 | Decentration (10) | | |
| 31 | ∞ | 1.4400 | | 1.5477 | 62.8 |
| 32 | ∞ | 0.1000 | | | |
| 33 | ∞ | 0.6000 | | 1.5163 | 64.1 |
| 34 | ∞ | 0.5000 | | | |
| 35 | ∞ | 0.0000 | | | |
| Image plane | ∞ | 0.0000 | Decentration (11) | | |

-continued

| [State 1] Aspherical coefficients | | |
|---|---|---|
| | Aspherical surface [1] | |
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curvature | ∞ | |

All of the coefficients C4–C21 are zero.

| Decentration [1] (DEO) | | |
|---|---|---|
| X = 0.0000 | Y = 0.0000 | Z = 0.0000 |
| α = −0.5173 | β = 0.0000 | γ = 0.0000 |
| Decentration [2] (DEO) | | |
| X = 0.0000 | Y = 0.1346 | Z = 0.0000 |
| α = −0.3322 | β = 0.0000 | γ = 0.0000 |
| Decentration [3] (DEO) | | |
| X = 0.0000 | Y = 0.0000 | Z = 0.0000 |
| α = 45.0000 | β = 0.0000 | γ = 0.0000 |
| Decentration [4] (DAR) | | |
| X = 0.0000 | Y = 0.0000 | Z = 0.0000 |
| α = −0.0141 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.1328 | Z = 0.0000 |
| α = 0.0000 | β = 0.0000 | γ = 0.0000 |
| Decentration [7] (DAR) | | |
| X = 0.0000 | Y = 0.0778 | Z = 0.0000 |
| α = 0.0000 | β = 0.0000 | γ = 0.0000 |
| Decentration [8] (DAR) | | |
| X = 0.0000 | Y = −0.0152 | Z = 0.0000 |
| α = 0.0000 | β = 0.0000 | γ = 0.0000 |
| Decentration [9] (DAR) | | |
| X = 0.0000 | Y = 0.0172 | Z = 0.0000 |
| α = 0.0000 | β = 0.0000 | γ = 0.0000 |
| Decentration [10] (DAR) | | |
| X = 0.0000 | Y = 0.0223 | Z = 0.0000 |
| α = 0.0000 | β = 0.0000 | γ = 0.0000 |
| Decentration [11] (DAR) | | |
| X = 0.0000 | Y = 0.0000 | Z = 0.0000 |
| α = 1.2000 | β = 0.0000 | γ = 0.0000 |

-continued

| [State 2] Aspherical coefficients | | |
|---|---|---|
| | Aspherical surface [1] | |
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curvature | ∞ | |

All of the coefficients C4–C21 are zero.

| Decentration [1] (DEO) | | |
|---|---|---|
| X = 0.0000 | Y = 0.0000 | Z = 0.0000 |
| α = −0.4639 | β = 0.0000 | γ = 0.0000 |
| Decentration [2] (DEO) | | |
| X = 0.0000 | Y = 0.1346 | Z = 0.0000 |
| α = −0.3322 | β = 0.0000 | γ = 0.0000 |
| Decentration [3] (DEO) | | |
| X = 0.0000 | Y = 0.0000 | Z = 0.0000 |
| α = 45.0000 | β = 0.0000 | γ = 0.0000 |
| Decentration [4] (DAR) | | |
| X = 0.0000 | Y = 0.0000 | Z = 0.0000 |
| α = −0.0141 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.1328 | Z = 0.0000 |
| α = 0.0000 | β = 0.0000 | γ = 0.0000 |
| Decentration [7] (DAR) | | |
| X = 0.0000 | Y = 0.0778 | Z = 0.0000 |
| α = 0.0000 | β = 0.0000 | γ = 0.0000 |
| Decentration [8] (DAR) | | |
| X = 0.0000 | Y = −0.0152 | Z = 0.0000 |
| α = 0.0000 | β = 0.0000 | γ = 0.0000 |
| Decentration [9] (DAR) | | |
| X = 0.0000 | Y = 0.0172 | Z = 0.0000 |
| α = 0.0000 | β = 0.0000 | γ = 0.0000 |
| Decentration [10] (DAR) | | |
| X = 0.0000 | Y = 0.0223 | Z = 0.0000 |
| α = 0.0000 | β = 0.0000 | γ = 0.0000 |
| Decentration [11] (DAR) | | |
| X = 0.0000 | Y = 0.0000 | Z = 0.0000 |
| α = 1.2000 | β = 0.0000 | γ = 0.0000 |

-continued

[State 3]
Aspherical coefficients

Aspherical surface [1]

| | | |
|---|---|---|
| Radius of curvature | −20.2305 | |
| k = 0.0000e+000 | | |
| a = 2.7885e−004 | b = −2.3020e−007 | c = −2.1076e−007 |
| d = 5.6711e−009 | | |

Aspherical surface [2]

| | | |
|---|---|---|
| Radius of curvature | 8.9249 | |
| k = 0.0000e+000 | | |

Aspherical surface [3]

| | | |
|---|---|---|
| Radius of curvature | 9.0805 | |
| k = 0.0000e+000 | | |
| a = −1.8047e−004 | b = 7.2683e−007 | c = −1.0551e−007 |
| d = 2.1720e−009 | | |

Aspherical surface [4]

| | | |
|---|---|---|
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |

FFS [1]

| | |
|---|---|
| Radius of curvature | ∞ |

All of the coefficients C4–C21 are zero.

Decentration [1] (DEO)

| | | |
|---|---|---|
| X = 0.0000 | Y = 0.0000 | Z = 0.0000 |
| α = −0.5772 | β = 0.0000 | γ = 0.0000 |

Decentration [2] (DEO)

| | | |
|---|---|---|
| X = 0.0000 | Y = 0.1346 | Z = 0.0000 |
| α = −0.3322 | β = 0.0000 | γ = 0.0000 |

Decentration [3] (DEO)

| | | |
|---|---|---|
| X = 0.0000 | Y = 0.0000 | Z = 0.0000 |
| α = 45.0000 | β = 0.0000 | γ = 0.0000 |

Decentration [4] (DAR)

| | | |
|---|---|---|
| X = 0.0000 | Y = 0.0000 | Z = 0.0000 |
| α = −0.0141 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = 0.1328 | Z = 0.0000 |
| α = 0.0000 | β = 0.0000 | γ = 0.0000 |

Decentration [7] (DAR)

| | | |
|---|---|---|
| X = 0.0000 | Y = 0.0778 | Z = 0.0000 |
| α = 0.0000 | β = 0.0000 | γ = 0.0000 |

Decentration [8] (DAR)

| | | |
|---|---|---|
| X = 0.0000 | Y = −0.0152 | Z = 0.0000 |
| α = 0.0000 | β = 0.0000 | γ = 0.0000 |

Decentration [9] (DAR)

| | | |
|---|---|---|
| X = 0.0000 | Y = 0.0172 | Z = 0.0000 |
| α = 0.0000 | β = 0.0000 | γ = 0.0000 |

Decentration [10] (DAR)

| | | |
|---|---|---|
| X = 0.0000 | Y = 0.0223 | Z = 0.0000 |
| α = 0.0000 | β = 0.0000 | γ = 0.0000 |

Decentration [11] (DAR)

| | | |
|---|---|---|
| X = 0.0000 | Y = 0.0000 | Z = 0.0000 |
| α = 1.2000 | β = 0.0000 | γ = 0.0000 |

-continued

[State 4]
Aspherical coefficients

Aspherical surface [1]

| | | |
|---|---|---|
| Radius of curvature | −20.2305 | |
| k = 0.0000e+000 | | |
| a = 2.7885e−004 | b = −2.3020e−007 | c = −2.1076e−007 |
| d = 5.6711e−009 | | |

Aspherical surface [2]

| | | |
|---|---|---|
| Radius of curvature | 8.9249 | |
| k = 0.0000e+000 | | |

Aspherical surface [3]

| | | |
|---|---|---|
| Radius of curvature | 9.0805 | |
| k = 0.0000e+000 | | |
| a = −1.8047e−004 | b = 7.2683e−007 | c = −1.0551e−007 |
| d = 2.1720e−009 | | |

Aspherical surface [4]

| | | |
|---|---|---|
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |

FFS [1]

| | | |
|---|---|---|
| Radius of curvature | ∞ | |
| C4 = −4.6914e−004 | C6 = −2.3722e−004 | C8 = −1.4566e−005 |
| C10 = −9.0035e−006 | C11 = 5.2980e−006 | C13 = 1.6198e−006 |
| C15 = 1.6959e−006 | C17 = 4.2647e−007 | C19 = 8.7832e−007 |
| C21 = 2.5847e−007 | | |

Decentration [1] (DEO)

| | | |
|---|---|---|
| X = 0.0000 | Y = 0.0000 | Z = 0.0000 |
| α = 0.1392 | β = 0.0000 | γ = 0.0000 |

Decentration [2] (DEO)

| | | |
|---|---|---|
| X = 0.0000 | Y = 0.1346 | Z = 0.0000 |
| α = −0.3322 | β = 0.0000 | γ = 0.0000 |

Decentration [3] (DEO)

| | | |
|---|---|---|
| X = 0.0000 | Y = 0.0000 | Z = 0.0000 |
| α = 45.0000 | β = 0.0000 | γ = 0.0000 |

Decentration [4] (DAR)

| | | |
|---|---|---|
| X = 0.0000 | Y = 0.0000 | Z = 0.0064 |
| α = −0.0141 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = 0.1328 | Z = 0.0000 |
| α = 0.0000 | β = 0.0000 | γ = 0.0000 |

Decentration [7] (DAR)

| | | |
|---|---|---|
| X = 0.0000 | Y = 0.0778 | Z = 0.0000 |
| α = 0.0000 | β = 0.0000 | γ = 0.0000 |

Decentration [8] (DAR)

| | | |
|---|---|---|
| X = 0.0000 | Y = −0.0152 | Z = 0.0000 |
| α = 0.0000 | β = 0.0000 | γ = 0.0000 |

Decentration [9] (DAR)

| | | |
|---|---|---|
| X = 0.0000 | Y = 0.0172 | Z = 0.0000 |
| α = 0.0000 | β = 0.0000 | γ = 0.0000 |

Decentration [10] (DAR)

| | | |
|---|---|---|
| X = 0.0000 | Y = 0.0223 | Z = 0.0000 |
| α = 0.0000 | β = 0.0000 | γ = 0.0000 |

Decentration [11] (DAR)

| | | |
|---|---|---|
| X = 0.0000 | Y = 0.0000 | Z = 0.0000 |
| α = 1.2000 | β = 0.0000 | γ = 0.0000 |

-continued

| [State 5] Aspherical coefficients | | |
|---|---|---|
| | Aspherical surface [1] | |
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curvature | ∞ | |
| C4 = −1.8503e−004 | C6 = −9.4231e−005 | C8 = −5.0792e−006 |
| C10 = −2.1749e−006 | C11 = −2.7333e−006 | C13 = −3.5716e−006 |
| C15 = −4.7702e−007 | C17 = 1.0027e−007 | C19 = −2.3668e−007 |
| C21 = 3.6066e−008 | | |

| | Decentration [1] (DEO) | |
|---|---|---|
| X = 0.0000 | Y = 0.0000 | Z = 0.0000 |
| α = −0.7496 | β = 0.0000 | γ = 0.0000 |
| | Decentration [2] (DEO) | |
| X = 0.0000 | Y = 0.1346 | Z = 0.0000 |
| α = −0.3322 | β = 0.0000 | γ = 0.0000 |
| | Decentration [3] (DEO) | |
| X = 0.0000 | Y = 0.0000 | Z Z = 0.0000 |
| α = 45.0000 | β = 0.0000 | γ = 0.0000 |
| | Decentration [4] (DAR) | |
| X = 0.0000 | Y = 0.0000 | Z = 0.0039 |
| α = −0.0141 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.1328 | Z = 0.0000 |
| α = 0.0000 | β = 0.0000 | γ = 0.0000 |
| | Decentration [7] (DAR) | |
| X = 0.0000 | Y = 0.0778 | Z = 0.0000 |
| α = 0.0000 | β = 0.0000 | γ = 0.0000 |
| | Decentration [8] (DAR) | |
| X = 0.0000 | Y = −0.0152 | Z = 0.0000 |
| α = 0.0000 | β = 0.0000 | γ = 0.0000 |
| | Decentration [9] (DAR) | |
| X = 0.0000 | y = 0.0172 | Z = 0.0000 |
| α = 0.0000 | β = 0.0000 | γ = 0.0000 |
| | Decentration [10] (DAR) | |
| X = 0.0000 | Y = 0.0223 | Z = 0.0000 |
| α = 0.0000 | β = 0.0000 | γ = 0.0000 |
| | Decentration [11] (DAR) | |
| X = 0.0000 | Y = 0.0000 | Z = 0.0000 |
| α = 1.2000 | β = 0.0000 | γ = 0.0000 |

-continued

| [State 6] Aspherical coefficients | | |
|---|---|---|
| | Aspherical surface [1] | |
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curvature | ∞ | |
| C4 = −9.1127e−005 | C6 = −4.6396e−005 | C8 = 2.1757e−006 |
| C10 = −4.8994e−007 | C11 = −1.1325e−006 | C13 = −2.4257e−006 |
| C15 = −3.2392e−007 | C17 = −9.1792e−007 | C19 = −5.7032e−007 |
| C21 = −1.3342e−008 | | |

| | Decentration [1] (DEO) | |
|---|---|---|
| X = 0.0000 | Y = 0.0000 | Z = 0.0000 |
| α = −0.6020 | β = 0.0000 | γ = 0.0000 |
| | Decentration [2] (DEO) | |
| X = 0.0000 | Y = 0.1346 | Z = 0.0000 |
| α = −0.3322 | β = 0.0000 | γ = 0.0000 |
| | Decentration [3] (DEO) | |
| X = 0.0000 | Y = 0.0000 | Z = 0.0000 |
| α = 45.0000 | β = 0.0000 | γ = 0.0000 |
| | Decentration [4] (DAR) | |
| X = 0.0000 | Y = 0.0000 | Z = 0.0020 |
| α = −0.0141 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.1328 | Z = 0.0000 |
| α = 0.0000 | β = 0.0000 | γ = 0.0000 |
| | Decentration [7] (DAR) | |
| X X = 0.0000 | Y = 0.0778 | Z = 0.0000 |
| α = 0.0000 | β = 0.0000 | γ = 0.0000 |
| | Decentration [8] (DAR) | |
| X = 0.0000 | Y = −0.0152 | Z = 0.0000 |
| α = 0.0000 | β = 0.0000 | γ = 0.0000 |
| | Decentration [9] (DAR) | |
| X = 0.0000 | Y = 0.0172 | Z = 0.0000 |
| α = 0.0000 | β = 0.0000 | γ = 0.0000 |
| | Decentration [10] (DAR) | |
| X = 0.0000 | Y = 0.0223 | Z = 0.0000 |
| α = 0.0000 | β = 0.0000 | γ = 0.0000 |
| | Decentration [11] (DAR) | |
| X = 0.0000 | Y = 0.0000 | Z = 0.0000 |
| α = 1.2000 | β = 0.0000 | γ = 0.0000 |

-continued

| [State 7] Aspherical coefficients | | |
|---|---|---|
| | Aspherical surface [1] | |
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curuvature | ∞ | |
| C4 = −8.2525e−004 | C6 = −4.2649e−004 | C8 = −1.6977e−005 |
| C10 = −4.2815e−006 | C11 = 5.4217e−006 | C13 = 3.8069e−006 |
| C15 = 2.0437e−006 | C17 = −1.5019e−008 | C19 = −2.0430e−008 |
| C21 = 1.2176e−007 | | |

| | Decentration [1] (DEO) | |
|---|---|---|
| X = 0.0000 | Y = 0.0000 | Z = 0.0000 |
| α = −0.3635 | β = 0.0000 | γ = 0.0000 |
| | Decentration [2] (DEO) | |
| X = 0.0000 | Y = 0.1346 | Z = 0.0000 |
| α = −0.3322 | β = 0.0000 | γ = 0.0000 |
| | Decentration [3] (DEO) | |
| X = 0.0000 | Y = 0.0000 | Z = 0.0000 |
| α = 45.0000 | β = 0.0000 | γ = 0.0000 |
| | Decentration [4] (DAR) | |
| X = 0.0000 | Y = 0.0000 | Z = 0.0127 |
| α = −0.0141 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.1328 | Z = 0.0000 |
| α = 0.0000 | β = 0.0000 | γ = 0.0000 |
| | Decentration [7] (DAR) | |
| X = 0.0000 | Y = 0.0778 | Z = 0.0000 |
| α = 0.0000 | β = 0.0000 | γ = 0.0000 |
| | Decentration [8] (DAR) | |
| X = 0.0000 | Y = −0.0152 | Z = 0.0000 |
| α = 0.0000 | β = 0.0000 | γ = 0.0000 |
| | Decentration [9] (DAR) | |
| X = 0.0000 | Y = 0.0172 | Z = 0.0000 |
| α = 0.0000 | β = 0.0000 | γ = 0.0000 |
| | Decentration [10] (DAR) | |
| X = 0.0000 | Y = 0.0223 | Z = 0.0000 |
| α = 0.0000 | β = 0.0000 | γ = 0.0000 |

-continued

| | Decentration [11] (DAR) | |
|---|---|---|
| X = 0.0000 | Y = 0.0000 | Z = 0.0000 |
| X = 0.0000 | Y = 0.0000 | Z = 0.0000 |
| α = 1.2000 | β = 0.0000 | γ = 0.0000 |

| [State 8] Aspherical coefficients | | |
|---|---|---|
| | Aspherical surface [1] | |
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curvature | ∞ | |
| C4 = −5.4105e−004 | C6 = −2.8050e−004 | C8 = −1.9101e−005 |
| C10 = −1.0944e−005 | C11 = −1.2928e−006 | C13 = −3.6120e−006 |
| C15 = 9.5023e−008 | C17 = 9.5714e−007 | C19 = 1.7951e−007 |
| C21 = 2.8393e−007 | | |

| | Decentration [1] (DEO) | |
|---|---|---|
| X = 0.0000 | Y = 0.0000 | Z = 0.0000 |
| α = −0.5185 | β = 0.0000 | γ = 0.0000 |
| | Decentration [2] (DEO) | |
| X = 0.0000 | Y = 0.1346 | Z = 0.0000 |
| α = −0.3322 | β = 0.0000 | γ = 0.0000 |
| | Decentration [3] (DEO) | |
| X = 0.0000 | Y = 0.0000 | Z = 0.0000 |
| α = 45.0000 | β = 0.0000 | γ = 0.0000 |
| | Decentration [4] (DAR) | |
| X = 0.0000 | Y = 0.0000 | Z = 0.0097 |
| α = −0.0141 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.1328 | Z = 0.0000 |
| α = 0.0000 | β = 0.0000 | γ = 0.0000 |
| | Decentration [7] (DAR) | |
| X = 0.0000 | Y = 0.0778 | Z = 0.0000 |
| α = 0.0000 | β = 0.0000 | γ = 0.0000 |
| | Decentration [8] (DAR) | |
| X = 0.0000 | Y = −0.0152 | Z = 0.0000 |
| α = 0.0000 | β = 0.0000 | γ = 0.0000 |
| | Decentration [9] (DAR) | |
| X = 0.0000 | Y = 0.0172 | Z = 0.0000 |
| α = 0.0000 | β = 0.0000 | γ = 0.0000 |

-continued

| | Decentration [10] (DAR) | |
|---|---|---|
| X = 0.0000 | Y = 0.0223 | Z = 0.0000 |
| α = 0.0000 | β = 0.0000 | γ = 0.0000 |
| | Decentration [11] (DAR) | |
| X = 0.0000 | Y = 0.0000 | Z = 0.0000 |
| α = 1.2000 | β = 0.0000 | γ = 0.0000 |

[State 9]
Aspherical coefficients

| | Aspherical surface [1] | |
|---|---|---|
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curvature | ∞ | |
| C4 = −4.4271e−004 | C6 = −2.2428e−004 | C8 = −1.3335e−005 |
| C10 = −1.3499e−005 | C11 = −2.2540e−006 | C13 = −2.5429e−006 |
| C15 = −3.4277e−007 | C17 = −7.7252e−007 | C19 = 3.8982e−008 |
| C21 = 3.5661e−007 | | |

| | Decentration [1] (DEO) | |
|---|---|---|
| X = 0.0000 | Y = 0.0000 | Z = 0.0000 |
| α = −0.6964 | β = 0.0000 | γ = 0.0000 |
| | Decentration [2] (DEO) | |
| X = 0.0000 | Y = 0.1346 | Z = 0.0000 |
| α = −0.3322 | β = 0.0000 | γ = 0.0000 |
| | Decentration [3] (DEO) | |
| X = 0.0000 | Y = 0.0000 | Z = 0.0000 |
| α = 45.0000 | β = 0.0000 | γ = 0.0000 |
| | Decentration [4] (DAR) | |
| X = 0.0000 | Y = 0.0000 | Z = 0.0083 |
| α = −0.0141 | β = 0.0000 | γ = 0.0000 |
| | Decentration [5] DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.1328 | Z = 0.0000 |
| α = 0.0000 | β = 0.0000 | γ = 0.0000 |
| | Decentration [7] (DAR) | |
| X = 0.0000 | Y = 0.0778 | Z = 0.0000 |
| α = 0.0000 | β = 0.0000 | γ = 0.0000 |
| | Decentration [8] (DAR) | |
| X = 0.0000 | Y = −0.0152 | Z = 0.0000 |
| α = 0.0000 | β = 0.0000 | γ = 0.0000 |
| | Decentration [9] (DAR) | |
| X = 0.0000 | Y = 0.0172 | Z = 0.0000 |
| α = 0.0000 | β = 0.0000 | γ = 0.0000 |

-continued

| | Decentration [10] (DAR) | |
|---|---|---|
| X = 0.0000 | Y = 0.0223 | Z = 0.0000 |
| α = 0.0000 | β = 0.0000 | γ = 0.0000 |
| | Decentration [11] (DAR) | |
| X = 0.0000 | Y = 0.0000 | Z = 0.0000 |
| α = 1.2000 | β = 0.0000 | γ = 0.0000 |

[State 10]
Aspherical coefficients

| | Aspherical surface [1] | |
|---|---|---|
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| | Aspherical surface [2] | |
| Radius of curvature | 8.9249 | |
| k = 0.0000e+000 | | |
| | Aspherical surface [3] | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| | Aspherical surface [4] | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| | FFS [1] | |
| Radius of curvature | ∞ | |
| C4 = −1.3938e−003 | C6 = −7.0703e−004 | C8 = −1.5155e−005 |
| C10 = −4.5162e−006 | C11 = 5.6357e−006 | C13 = 5.9336e−006 |
| C15 = 1.8032e−006 | C17 = −6.9534e−008 | C19 = −6.4725e−007 |
| C21 = 1.0115e−007 | | |

| | Decentration [1] (DEO) | |
|---|---|---|
| X = 0.0000 | Y = 0.0000 | Z = 0.0000 |
| α = −0.5002 | β = 0.0000 | γ = 0.0000 |
| | Decentration [2] (DEO) | |
| X = 0.0000 | Y = 0.1346 | Z = 0.0000 |
| α = −0.3322 | β = 0.0000 | γ = 0.0000 |
| | Decentration [3] (DEO) | |
| X = 0.0000 | Y = 0.0000 | Z = 0.0000 |
| α = 45.0000 | β = 0.0000 | γ = 0.0000 |
| | Decentration [4] (DAR) | |
| X = 0.0000 | Y = 0.0000 | Z = 0.0226 |
| α = −0.0141 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = 0.1328 | Z = 0.0000 |
| α = 0.0000 | β = 0.0000 | γ = 0.0000 |
| | Decentration [7] (DAR) | |
| X = 0.0000 | Y = 0.0778 | Z = 0.0000 |
| α = 0.0000 | β = 0.0000 | γ = 0.0000 |
| | Decentration [8] (DAR) | |
| X = 0.0000 | Y = −0.0152 | Z = 0.0000 |
| α = 0.0000 | β = 0.0000 | γ = 0.0000 |
| | Decentration [9] (DAR) | |
| X = 0.0000 | Y = 0.0172 | Z = 0.0000 |
| α = 0.0000 | β = 0.0000 | γ = 0.0000 |

-continued

| Decentration [10] (DAR) | | |
|---|---|---|
| X = 0.0000 | Y = 0.0223 | Z = 0.0000 |
| α = 0.0000 | β = 0.0000 | γ = 0.0000 |
| Decentration [11] (DAR) | | |
| X = 0.0000 | Y = 0.0000 | Z = 0.0000 |
| α = 1.2000 | β = 0.0000 | γ = 0.0000 |

[State 11]
Aspherical coefficients

| Aspherical surface [1] | | |
|---|---|---|
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| Aspherical surface [2] | | |
| Radius of curvature | 8.9249 | |
| k = 0.0000e+000 | | |
| Aspherical surface [3] | | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| Aspherical surface [4] | | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| FFS [1] | | |
| Radius of curvature | ∞ | |
| C4 = −7.4303e−004 | C6 = −3.7984e−004 | C8 = −1.5168e−005 |
| C10 = −1.5325e−005 | C11 = −3.6115e−006 | C13 = −5.9302e−006 |
| C15 = −5.4478e−007 | C17 = −3.3466e−007 | C19 = −4.5506e−007 |
| C21 = 4.0854e−007 | | |

| Decentration [1] (DEO) | | |
|---|---|---|
| X = 0.0000 | Y = 0.0000 | Z = 0.0000 |
| α = −0.5448 | β = 0.0000 | γ = 0.0000 |
| Decentration [2] (DEO) | | |
| X = 0.0000 | Y = 0.1346 | Z = 0.0000 |
| α = −0.3322 | β = 0.0000 | γ = 0.0000 |
| Decentration [3] (DEO) | | |
| X = 0.0000 | Y = 0.0000 | Z = 0.0000 |
| α = 45.0000 | β = 0.0000 | γ = 0.0000 |
| Decentration [4] (DAR) | | |
| X = 0.0000 | Y = 0.0000 | Z = 0.0140 |
| α = −0.0141 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.1328 | Z = 0.0000 |
| α = 0.0000 | β = 0.0000 | γ = 0.0000 |
| Decentration [7] (DAR) | | |
| X = 0.0000 | Y = 0.0778 | Z = 0.0000 |
| α = 0.0000 | β = 0.0000 | γ = 0.0000 |
| Decentration [8] (DAR) | | |
| X = 0.0000 | Y = −0.0152 | Z = 0.0000 |
| α = 0.0000 | β = 0.0000 | γ = 0.0000 |
| Decentration [9] (DAR) | | |
| X = 0.0000 | Y = 0.0172 | Z = 0.0000 |
| α = 0.0000 | β = 0.0000 | γ = 0.0000 |

-continued

| Decentration [10] (DAR) | | |
|---|---|---|
| X = 0.0000 | Y = 0.0223 | Z = 0.0000 |
| α = 0.0000 | β = 0.0000 | γ = 0.0000 |
| Decentration [11] (DAR) | | |
| X = 0.0000 | Y = 0.0000 | Z = 0.0000 |
| α = 1.2000 | β = 0.0000 | γ = 0.0000 |

[State 12]
Aspherical coefficients

| Aspherical surface [1] | | |
|---|---|---|
| Radius of curvature | −20.2305 | |
| k = 0.0000e+000 | | |
| a = 2.7885e−004 | b = −2.3020e−007 | c = −2.1076e−007 |
| d = 5.6711e−009 | | |
| Aspherical surface [2] | | |
| Radius of curvature | 8.9249 | |
| k = 0.0000e+000 | | |
| Aspherical surface [3] | | |
| Radius of curvature | 9.0805 | |
| k = 0.0000e+000 | | |
| a = −1.8047e−004 | b = 7.2683e−007 | c = −1.0551e−007 |
| d = 2.1720e−009 | | |
| Aspherical surface [4] | | |
| Radius of curvature | 95.4717 | |
| k = 0.0000e+000 | | |
| a = 5.4659e−004 | b = 2.1373e−004 | c = −4.9057e−005 |
| d = 4.1896e−006 | e = −1.1823e−019 | f = −9.2632e−022 |
| g = −7.2687e−024 | h = −5.7094e−026 | |
| FFS [1] | | |
| Radius of curvature | ∞ | |
| C4 = −5.6255e−004 | C6 = −2.8611e−004 | C8 = −2.2258e−005 |
| C10 = −1.6912e−005 | C11 = −1.2545e−006 | C13 = −3.3466e−006 |
| C15 = −4.2582e−008 | C17 = −3.3832e−008 | C19 = 1.1622e−007 |
| C21 = 4.5367e−007 | | |

| Decentration [1] (DEO) | | |
|---|---|---|
| X = 0.0000 | Y = 0.0000 | Z = 0.0000 |
| α = −0.6840 | β = 0.0000 | γ = 0.0000 |
| Decentration [2] (DEO) | | |
| X = 0.0000 | Y = 0.1346 | Z = 0.0000 |
| α = −0.3322 | β = 0.0000 | γ = 0.0000 |
| Decentration [3] (DEO) | | |
| X = 0.0000 | Y = 0.0000 | Z = 0.0000 |
| α = 45.0000 | β = 0.0000 | γ = 0.0000 |
| Decentration [4] (DAR) | | |
| X = 0.0000 | Y = 0.0000 | Z = 0.0101 |
| α = −0.0141 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = 0.1328 | Z = 0.0000 |
| α = 0.0000 | β = 0.0000 | γ = 0.0000 |
| Decentration [7] (DAR) | | |
| X = 0.0000 | Y = 0.0778 | Z = 0.0000 |
| α = 0.0000 | β = 0.0000 | γ = 0.0000 |
| Decentration [8] (DAR) | | |
| X = 0.0000 | Y = −0.0152 | Z = 0.0000 |
| α = 0.0000 | β = 0.0000 | γ = 0.0000 |
| Decentration [9] (DAR) | | |
| X = 0.0000 | Y = 0.0172 | Z = 0.0000 |
| α = 0.0000 | β = 0.0000 | γ = 0.0000 |

-continued

| | Decentration [10] (DAR) | |
|---|---|---|
| X = 0.0000 | Y = 0.0223 | Z = 0.0000 |
| α = 0.0000 | β = 0.0000 | γ = 0.0000 |
| | **Decentration [11] (DAR)** | |
| X = 0.0000 | Y = 0.0000 | Z = 0.0000 |
| α = 1.2000 | β = 0.0000 | γ = 0.0000 |

However, the coordinate system of the fourth surface is the same as that of the first surface. The coordinate systems after the fifth surface are defined in order from the fourth surface.

| | Far-point allowance | | Far point | | Near point | | Near-point allowance | |
|---|---|---|---|---|---|---|---|---|
| | | | **Object distance D0** | | | | | |
| Wide-angle | State 1 | ∞ | State 4 | ∞ | State 7 | 300 | State 10 | 300 |
| Standard | State 2 | ∞ | State 5 | ∞ | State 8 | 300 | State 11 | 300 |
| Telephoto | State 3 | ∞ | State 6 | ∞ | State 9 | 300 | State 12 | 300 |
| | | | **Image plane distance D34** | | | | | |
| Wide-angle | State 1 | 0.605 | State 4 | 0.500 | State 7 | 0.500 | State 10 | 0.395 |
| Standard | State 2 | 0.620 | State 5 | 0.500 | State 8 | 0.500 | State 11 | 0.380 |
| Telephoto | State 3 | 0.675 | State 6 | 0.500 | State 9 | 0.500 | State 12 | 0.320 |

Zoom spacing

| | Wide-angle | Standard | Telephoto |
|---|---|---|---|
| D16 | 1.0683 | 7.7691 | 0.7000 |
| D20 | 13.6290 | 1.3000 | 0.2000 |
| D27 | 0.2000 | 5.8281 | 13.9972 |

The conditions described below apply to the optical system of each of Embodiments 2 and 3. It is merely necessary that these conditions are satisfied in at least one state.

Conditions (12), (12'), (13), (13'), (13"), (14), (14'), (15), (15'), (16), (16'), (16"), (17), (17'), (17"), (18), (18'), (18"), (19), (19'), (19"), (20), (20'), (20"), (21), (21'), (22), (22'), (23), (23'), (23"), (23'''), (24), (25), (27), (28). (Note: The numerals and order are changed.)

In Embodiment 3, the values of the focal lengths f, as described in the numerical data, are 4.4 mm (wide-angle) ~13.2 mm (telephoto), and 7.6 mm (standard). The value (mm) of the maximum amount of deformation md of the variable mirror is equal to that of the amount of decentration Z of the eighth surface.

The value of the optically effective area Sm of the reflecting surface of the deformable mirror in Condition (14) or (14') is 70 $mm^2$ (practically corresponding to that of a circle with a radius of 4.7 mm).

The value of the voltage Vm applied to the deformable mirror in Condition (15) or (15') is 0–200 V, depending upon the state.

The value of the amount φDM of the deformable mirror in Condition (16), (16'), or (16") is φDM=(½)·(C4+C6). Also, φDMx=C4 and φDMy=C6.

The value of the focal length f1 of the lens unit with negative power placed on the object side of the variable mirror in Condition (12) or (12') is −13.34.

The value of the bending angle θ of the axial principal ray in the variable mirror is 45°.

The magnifications β1 of the lens unit ranging from the optical surface situated immediately behind the variable mirror to the last surface in Condition (23), (23'), or (23") are −0.33 at the wide-angle position, −0.57 at the standard position, and −0.99 at the tele-photo position.

The overall length Cj (the length measured by extending the bent optical path) of the optical system in Condition (17), (17'), or (17") is 80.25 mm.

As mentioned above, it is only necessary that individual conditions of the present invention are satisfied in at least one state.

Next, values of parameters of the conditions in Embodiment 2 are shown below.

$$fw = 4.40$$

$$\theta = 45°$$

$$\phi = 45°$$

$$f1/f = -3.03\text{(wide-angle)}$$
$$= -1.76\text{(standard)}$$
$$= -1.01\text{(telephoto)}$$

$$md = 13.8 \text{ microns(wide-angle, near-point allowance)}$$
$$= 8.4 \text{ microns(standard, near-point allowance)}$$
$$= 5.8 \text{ microns(telephoto, near-point allowance)}$$

$$md/f = 0.0031\text{(wide-angle, near-point allowance)}$$

$$md^2/Sm = 0.00000272\text{(wide-angle, near-point allowance)}$$

$$f1 = -13.34$$

$$Vm = 0 \sim 160 \text{ V}$$

$$Sm = 70 \text{ mm}^2$$

$$\beta 1 = -0.330\text{(wide-angle)}, -0.568\text{(standard)},$$
$$-0.990\text{(telephoto)}$$

$$Cj = 80.25$$

$$Cj/f = 18.239\text{(wide-angle)}$$

-continued $$f_3 = -22.703$$

$$|f_3/f| = 5.16\text{(wide-angle)}$$

$$RI = -91.6997$$

$$|RI/f| = 6.95\text{(telephoto)}$$

Next, values of parameters of the conditions in Embodiment 3 are shown below.

$$Sm = 57\ \text{mm}^2(5.2\times3.5\times3.14)$$

$$Vm = 0\sim200\ \text{V}$$

$$fl = -8.8$$

$$\beta 1 = -0.5\text{(wide-angle)}, -0.1\text{(standard)}, -1.5\text{(telephoto)}$$

$$Cj = 57.6$$

$$f_3 = -90.951$$

$$fl/f = -2\text{(wide-angle)}, -1.16\text{(standard)}, -0.667\text{(telephoto)}$$

$$md/f = 0.0051\text{(wide-angle, near-point allowance)}$$

$$md^2/Sm = 0.00000896\text{(wide-angle, near-point allowance)}$$

$$Cj/f = 13.1\text{(wide-angle)}$$

$$f_3 = -90.951$$

$$|f_3/f| = 20.7\text{(wide-angle)}$$

$$RI = -20.230$$

$$|RI/f| = 1.53\text{(telephoto)}$$

As shown in Embodiment 3, the values of the amounts of shift δ and tilt ε of the optical element, with the exception of the image sensor, are small, and thus even though the optical element is manufactured, with these amounts as zero, no problem may be caused in practical use.

In Embodiments 2 and 3, reference has been made to the optical system using the deformable mirror. However, even where the optical system, instead of using the deformable mirror, uses a plane mirror or curved mirror whose shape remains unchanged or a prism having a plane or curved surface, the above conditions and limits may be applied unless otherwise noted. This is because the merit of the compact design in a bending optical system using the reflecting surface is maintained as it is.

In the optical system of each of Embodiments 2 and 3, an arrangement in which the lens unit includes the reflecting surface has been described. However, even when a refraction-type variable optical-property element, for example, a variable focal-length lens, is used instead of the reflection-type variable optical-property element, it is possible to obtain the effects of the compact and low-cost design, power saving, and noiseless operation. The above conditions, which include many paraxial theories, are established even in the case of lenses practically constructed as variable focal-length lenses. In addition, a variable focal-length mirror that has no deformable surface may be used in the above embodiments. Also the variable focal-length mirror is a kind of variable mirror. The variable focal-length mirror will be described later with reference to one example shown in FIG. 44.

The optical system can be applied to a film camera, a digital camera, a TV camera, a camera for personal digital assistants, an imaging apparatus for mobile phones, a monitoring camera, a robot's eye, and an electronic endoscope.

In the above description, the imaging optical system is assumed as the optical system, but the imaging optical system can be used, for example, as a projection optical system, such as a projector, by replacing an object plane with an image plane, and an optical apparatus using this projection optical system can be manufactured.

Embodiment 4

Figure 16:
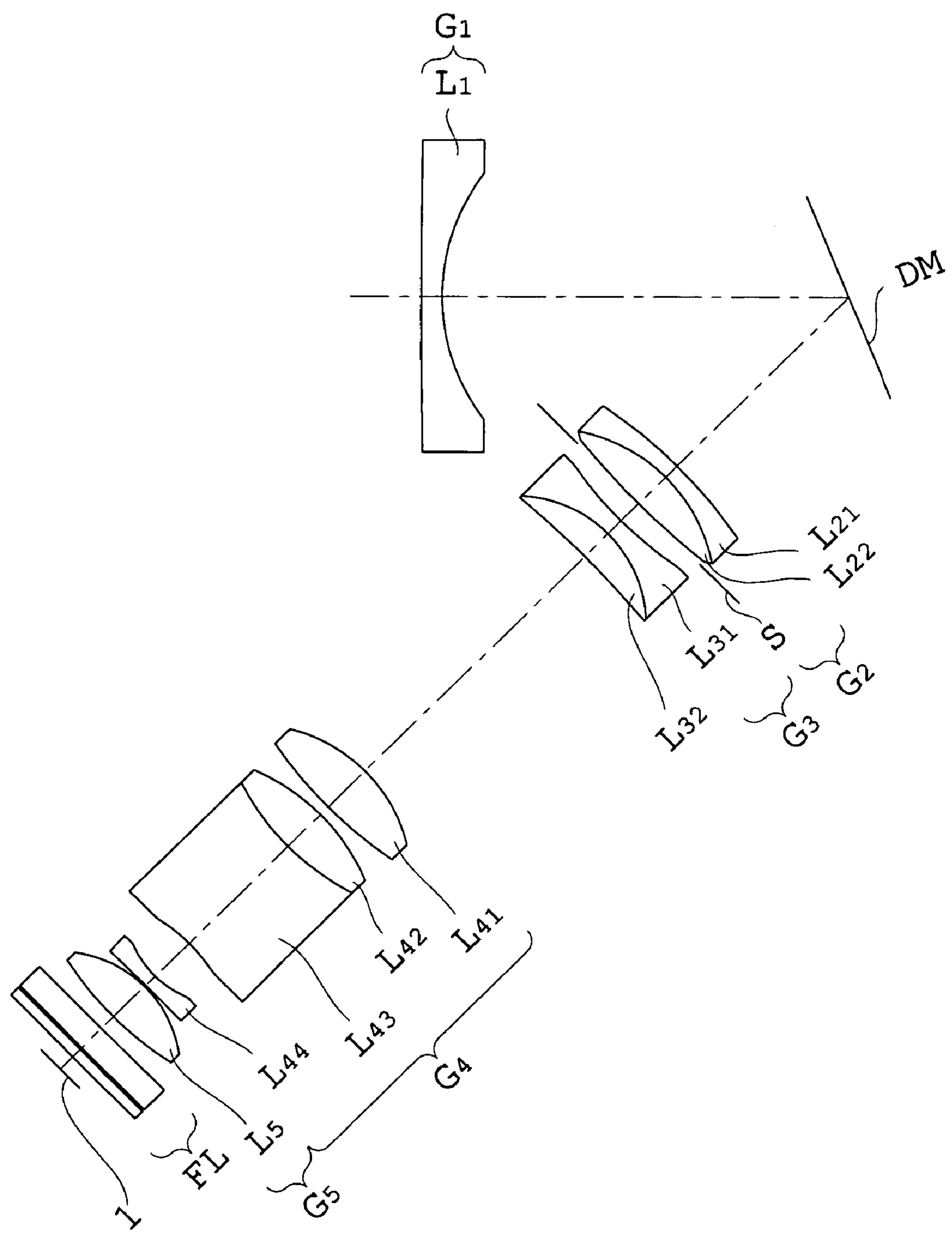
FIG. 16 is a Y-Z sectional view showing schematically the arrangement, at the wide-angle position, of Embodiment 4 of the optical system applicable to the optical apparatus of the present invention.
Figure 17:
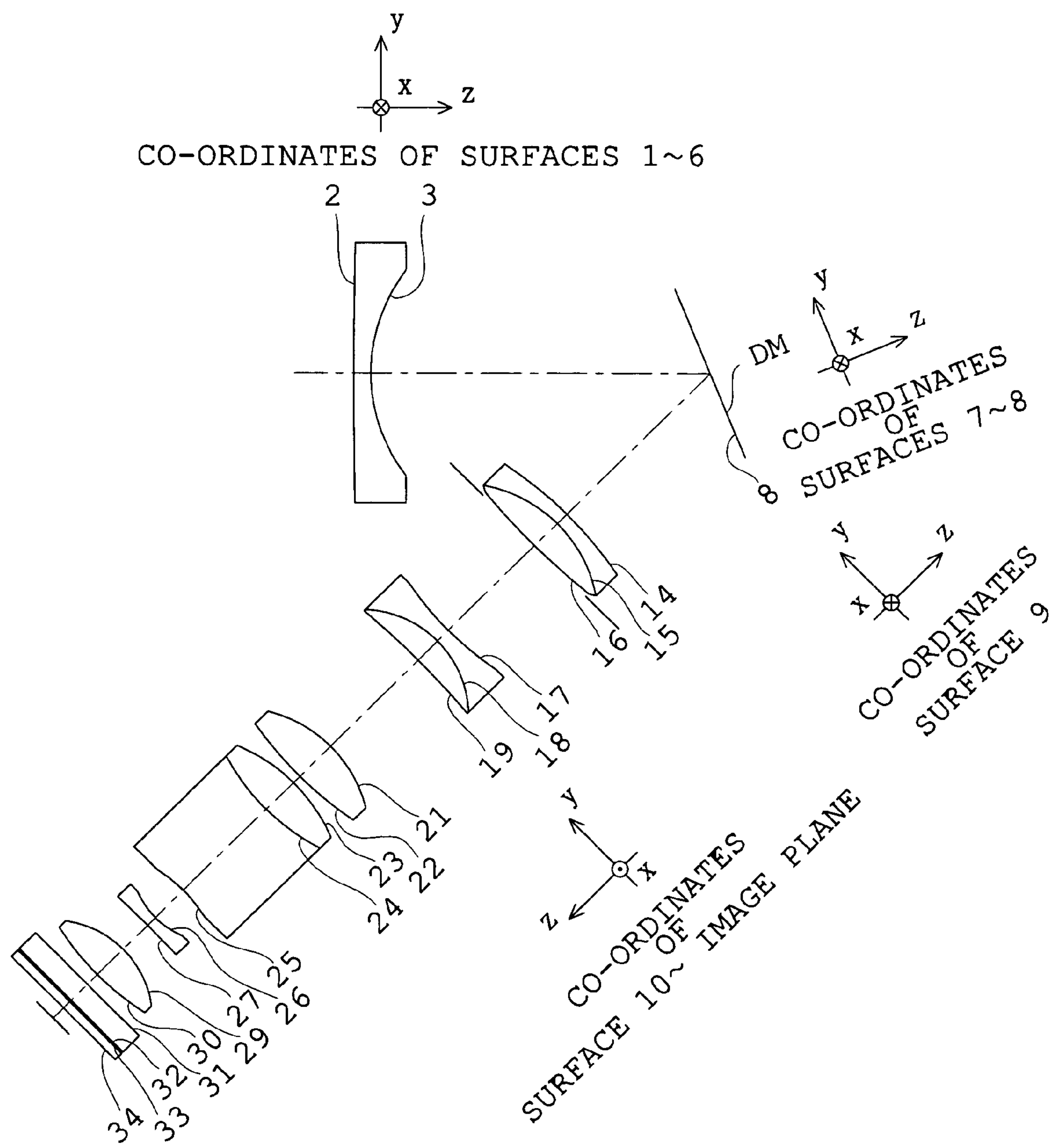
FIG. 17 is a Y-Z sectional view showing schematically the arrangement, at the standard position, of Embodiment 4 of the optical system applicable to the optical apparatus of the present invention.
Figure 18:
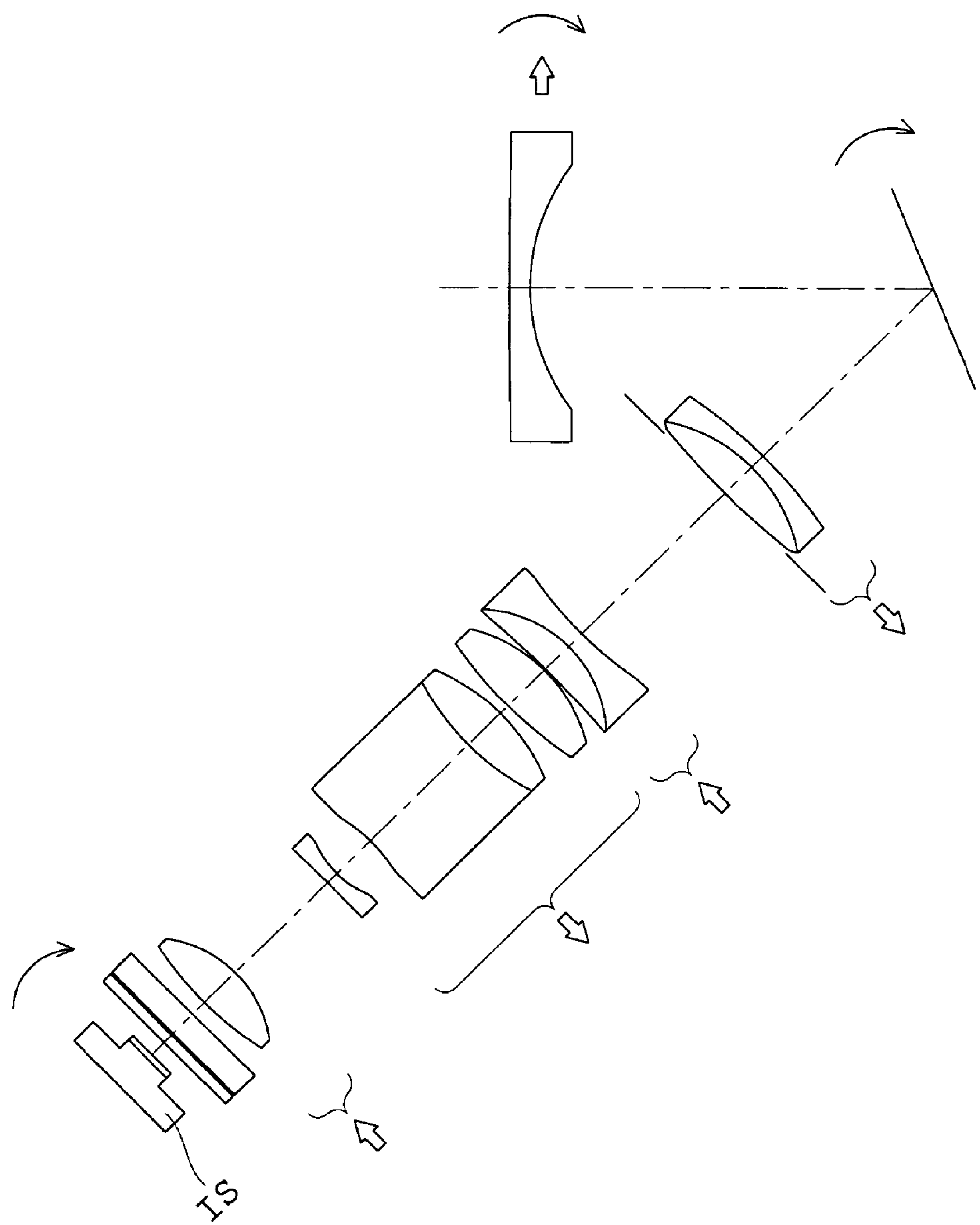
FIG. 18 is a Y-Z sectional view showing schematically the arrangement, at the telephoto position, of Embodiment 4 of the optical system applicable to the optical apparatus of the present invention.

FIGS. 16–18 show Embodiment 4 of the optical system applicable to the optical apparatus of the present invention.

For convenience, in FIGS. 16–18, bending of the optical path by the ordinary plane mirror is eliminated, but this optical system, like the optical system of FIG. 1, is such that the optical path is bent 45° by the ordinary plane mirror and 45° by the variable mirror.

In lens data also to be described later, the ordinary plane mirror is eliminated, but actually, the plane mirror is located 9 mm in front of the variable mirror.

The deformable mirror is capable of changing the power to perform focusing from the far point to the near point. However, in order to perform auto-focusing of a contrast method, it is designed to bring about a state of weaker power than in focusing at the far point and a state of stronger power than in focusing at the near point. In this embodiment, the state of weaker power than in focusing at the far point is defined as far-point allowance, and a state of stronger power than in focusing at the near point is defined as near-point allowance.

That is, the deform able mirror in the embodiment has four states, the far-point allowance, the far point, the near point, and the near-point allowance. Additionally, in each of these states, there are three states, the wide-angle, standard, and telephoto positions in the magnification change. Thus, the deformable mirror has 12 deformation states in total.

In the four states of the far-point allowance, the far point, the near point, and the near-point allowance, the object distance and the position of the imaging surface are different. In the states of the far-point allowance and the near-point allowance, the position of the imaging surface is different from the far point and the near point, but the imaging surface is not physically moved. In order to change the power of the deformable mirror, the numerical value of the position of the imaging surface is changed for convenience.

The deformable mirror in Embodiment 4 is designed to consider the shift of the image plane in the Z direction caused by a fabrication error in actual fabrication and by a temperature change and to have the allowance of the amount of deformation before and after a focus limit.

For convenience, the deformable mirror in each of FIGS. 16–18 is such that only the mirror surface is shown.

The optical system of Embodiment 4 comprise, in order from the object side, the fixed lens unit G1 with negative power, the deformable mirror DM, the moving lens unit G2 with positive power, the stop S, the moving lens unit G3 with negative power, the moving lens unit G4 with positive power, and the fixed lens unit G5 with positive power. In FIGS. 16–18, reference symbol FL designates a filter unit and I designates an image plane. Each of filters and the cover glass of the image sensor is also a kind of optical element.

The fixed lens unit G1 is constructed with the plano-concave lens L1. The moving lens unit G2 is constructed with the cemented doublet of the negative meniscus lens L21 with a convex surface facing the object side and the biconvex lens L22. The moving lens unit G3 is constructed with the cemented doublet of the biconcave lens L31 and the positive meniscus lens L32 lens with a convex surface facing the object side. The moving lens unit G4 includes the biconvex lens L41, the cemented doublet of the biconvex lens L42 and the biconcave lens L43, and the biconcave lens L44. The fixed lens unit G5 is constructed with the biconvex lens L5.

The optical system of Embodiment 4 is such as to perform the variable magnification function by moving the moving lens unit G2, the moving lens unit G3, and the moving lens unit G4. In addition, the thin film forming the reflecting surface of the deformable mirror DM is deformed and thereby focusing can be carried out in the range from the infinity to a near point of 300 mm.

When the thin film of the deformable mirror DM is deformed from a flat surface into a curved surface, decentration aberration is produced by the reflection of the mirror surface. In particular, in focusing of an extremely near point that the amount of deformation of the variable mirror DM is large, the decentration aberration is considerably produced. Hence, in order to obtain good optical performance between the far point and the near point in the optical system of the embodiment, shift and tilt decentrations are applied to a lens unit or the imaging surface to balance the production of the decentration aberration in focusing. In FIG. 18, the directions of the decentrations are indicated by arrows. Symbol IS in FIG. 18 represents the image sensor.

According to this optical system, focusing can be performed without mechanical drive, and thus the structure of the lens frame is simplified and the compact and low-cost design can be attained. Moreover, there is the merit that the driving noise of a motor in focusing is eliminated.

Subsequently, numerical data of optical members constituting the optical system of Embodiment 4 are shown below.

Numerical Data 4

Focal length: 4.4 mm (wide-angle)~13.2 mm (telephoto), 7.6 mm (standard)

Open F-number: 2.7 (wide-angle)~3.2 (standard)~5.2 (telephoto)

Size of imaging surface: 4.0 mm×3.0 mm (X direction×Y direction)

Spacings with the moving lenses change in order of (wide-angle)-(standard)-(tele-photo).

Object distance: Spacing to object surface

Image plane distance: Spacing to the 34th surface

Zoom spacing: 13th surface, 16th surface, 20th surface, and 27th surface

Object point infinity: Wide-angle position

Data of the ordinary plane mirror (corresponding to the reflecting surface of the mirror 802 in FIG. 1) are eliminated, but the plane mirror is located 9 mm in front of the variable mirror. The bending angle of the optical axis by the ordinary plane mirror is 45°. In the table listed below, the amount changed in every state is shown in the data of State 4.

Also, in the description of aspherical coefficients, for example, a=−1.0641e-004 in Aspherical surface [1] can also be expressed by $-1.0641\times10^{-4}$, but in the numerical data, any of the aspherical coefficients is expressed by the former form.

| Surface number | Radius of curvature | Surface spacing | Decentration | Refractive index | Abbe's number |
|---|---|---|---|---|---|
| Object surface | ∞ | ∞ | | | |
| 1 | ∞ | 0.0000 | Decentration (1) | | |
| 2 | ∞ | 1.0000 | Decentration (2) | 1.6589 | 49.0 |
| 3 | Aspherical surface [1] | 0.0000 | | | |
| 4 | ∞ | 22.3000 | | | |
| 5 | ∞ | 0.0000 | | | |
| 6 | ∞ | 0.0000 | | | |
| 7 | ∞ | 0.0000 | Decentration (3) | | |
| 8 | FFS[1] | 0.0000 | Decentration (4) | DM | |
| 9 | ∞ | 0.0000 | Decentration (3) | | |
| 10 | ∞ | 12.1000 | | | |
| 11 | ∞ | 0.0000 | Decentration (5) | | |
| 12 | ∞ | 0.0000 | Decentration (5) | | |
| 13 | ∞ | 0.4899 | | | |
| 14 | 25.4807 | 0.8500 | Decentration (6) | 1.7015 | 34.7 |
| 15 | 8.8359 | 2.0281 | Decentration (6) | 1.6533 | 55.1 |
| Stop surface | −33.3222 | 1.2490 | Decentration (6) | | |
| 17 | −25.0249 | 1.0000 | Decentration (7) | 1.7977 | 38.7 |
| 18 | 6.8177 | 1.6958 | Decentration (7) | 1.8066 | 25.1 |
| 19 | 39.9889 | 0.1288 | Decentration (7) | | |
| 20 | ∞ | 16.0595 | Decentration (5) | | |
| 21 | Aspherical surface [2] | 2.7500 | Decentration (8) | 1.4900 | 70.0 |
| 22 | −24.1491 | 0.5468 | Decentration (8) | | |
| 23 | 11.8250 | 2.4000 | Decentration (8) | 1.5229 | 65.5 |
| 24 | −13.8039 | 7.2901 | Decentration (8) | 1.7320 | 33.1 |
| 25 | 10.5189 | 2.4880 | Decentration (8) | | |
| 26 | −6.0535 | 0.6782 | Decentration (8) | 1.8471 | 24.5 |
| 27 | Aspherical surface [3] | 0.1000 | Decentration (8) | | |
| 28 | ∞ | 0.0000 | Decentration (5) | | |
| 29 | 6.4662 | 2.3000 | Decentration (9) | 1.4900 | 70.0 |
| 30 | −17.3775 | 0.8507 | Decentration (9) | | |
| 31 | ∞ | 1.4400 | | 1.5477 | 62.8 |
| 32 | ∞ | 0.1000 | | | |
| 33 | ∞ | 0.6000 | | 1.5163 | 64.1 |
| 34 | ∞ | 0.5000 | | | |
| 35 | ∞ | 0.0000 | | | |
| Image plane | ∞ | 0.0000 | Decentration (10) | | |

[State 1]

Aspherical surface [1]

| | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |

Aspherical surface [2]

| | | |
|---|---|---|
| Radius of curvature | 8.2793 | |
| k = 0.0000e+000 | | |
| a = −1.7023e−004 | b = −9.4716e−007 | c = −1.0243e−008 |
| d = −8.5213e−010 | | |

Aspherical surface [3]

| | | |
|---|---|---|
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |

FFS [1]

Radius of curvature ∞

All of the coefficients C4–C21 are zero.

Decentration [1] (DEO)

| | | |
|---|---|---|
| X = 0.0000 | Y = 0.0000 | Z = 0.0000 |
| α = −0.0602 | β = 0.0000 | γ = 0.0000 |

Decentration [2] (DEO)

| | | |
|---|---|---|
| X = 0.0000 | Y = 0.0287 | Z = 0.0000 |
| α = −0.1303 | β = 0.0000 | γ = 0.0000 |

Decentration [3] (DEO)

| | | |
|---|---|---|
| X = 0.0000 | Y = 0.0000 | Z = 0.0000 |
| α = 22.5000 | β = 0.0000 | γ = 0.0000 |

-continued

| Decentration [4] (DAR) | | |
|---|---|---|
| X = 0.0000 | Y = 0.0000 | Z = 0.0000 |
| α = −0.0363 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = −0.0002 | Z = 0.0000 |
| α = 0.0000 | β = 0.0000 | γ = 0.0000 |
| Decentration [7] (DAR) | | |
| X = 0.0000 | Y = 0.0135 | Z = 0.0000 |
| α = 0.0000 | β = 0.0000 | γ = 0.0000 |
| Decentration [8] (DAR) | | |
| X = 0.0000 | Y = −0.0404 | Z = 0.0000 |
| α = 0.0000 | β = 0.0000 | γ = 0.0000 |
| Decentration [9] (DAR) | | |
| X = 0.0000 | Y = 0.0215 | Z = 0.0000 |
| α = 0.0000 | β = 0.0000 | γ = 0.0000 |
| Decentration [10] (DAR) | | |
| X = 0.0000 | Y = 0.0000 | Z = 0.0000 |
| α = 0.1305 | β = 0.0000 | γ = 0.0000 |

[State 2]

| Aspherical surface [1] | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |
| Aspherical surface [2] | | |
| Radius of curvature | 8.2793 | |
| k = 0.0000e+000 | | |
| a = −1.7023e−004 | b = −9.4716e−007 | c = −1.0243e−008 |
| d = −8.5213e−010 | | |
| Aspherical surface [3] | | |
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |
| FFS [1] | | |
| Radius of curvature | ∞ | |

All of the coefficients C4–C21 are zero.

| Decentration [1] (DEO) | | |
|---|---|---|
| X = 0.0000 | Y = 0.0000 | Z = 0.0000 |
| α = −0.0543 | β = 0.0000 | γ = 0.0000 |
| Decentration [2] (DEO) | | |
| X = 0.0000 | Y = 0.0287 | Z = 0.0000 |
| α = −0.1303 | β = 0.0000 | γ = 0.0000 |
| Decentration [3] (DEO) | | |
| X = 0.0000 | Y = 0.0000 | Z = 0.0000 |
| α = 22.5000 | β = 0.0000 | γ = 0.0000 |
| Decentration [4] (DAR) | | |
| X = 0.0000 | Y = 0.0000 | Z = 0.0000 |
| α = −0.0363 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = −0.0002 | Z = 0.0000 |
| α = 0.0000 | β = 0.0000 | γ = 0.0000 |

-continued

| Decentration [7] (DAR) | | |
|---|---|---|
| X = 0.0000 | Y = 0.0135 | Z = 0.0000 |
| α = 0.0000 | β = 0.0000 | γ = 0.0000 |
| Decentration [8] (DAR) | | |
| X = 0.0000 | Y = −0.0404 | Z = 0.0000 |
| α = 0.0000 | β = 0.0000 | γ = 0.0000 |
| Decentration [9] (DAR) | | |
| X = 0.0000 | Y = 0.0215 | Z = 0.0000 |
| α = 0.0000 | β = 0.0000 | γ = 0.0000 |
| Decentration [10] (DAR) | | |
| X = 0.0000 | Y = 0.0000 | Z = 0.0000 |
| α = 0.1305 | β = 0.0000 | γ = 0.0000 |

[State 3]

| Aspherical surface [1] | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |
| Aspherical surface [2] | | |
| Radius of curvature | 8.2793 | |
| k = 0.0000e+000 | | |
| a = −1.7023e−004 | b = −9.4716e−007 | c = −1.0243e−008 |
| d = −8.5213e−010 | | |
| Aspherical surface [3] | | |
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |
| FFS [1] | | |
| Radius of curvature | ∞ | |

All of the coefficients C4–C21 are zero.

| Decentration [1] (DEO) | | |
|---|---|---|
| X = 0.0000 | Y = 0.0000 | Z = 0.0000 |
| α = −0.0490 | β = 0.0000 | γ = 0.0000 |
| Decentration [2] (DEO) | | |
| X = 0.0000 | Y = 0.0287 | Z = 0.0000 |
| α = −0.1303 | β = 0.0000 | γ = 0.0000 |
| Decentration [3] (DEO) | | |
| X = 0.0000 | Y = 0.0000 | Z = 0.0000 |
| α = 22.5000 | β = 0.0000 | γ = 0.0000 |
| Decentration [4] (DAR) | | |
| X = 0.0000 | Y = 0.0000 | Z = 0.0000 |
| α = −0.0363 | β = 0.0000 | γ = 0.0000 |
| Decentration [5] (DAR) | | |
| X = 0.0000 | Y = 0.0000 | Z = 0.0000 |
| α = 0.0000 | β = 0.0000 | γ = 0.0000 |
| Decentration [6] (DAR) | | |
| X = 0.0000 | Y = −0.0002 | Z = 0.0000 |
| α = 0.0000 | β = 0.0000 | γ = 0.0000 |
| Decentration [7] (DAR) | | |
| X = 0.0000 | Y = 0.0135 | Z = 0.0000 |
| α = 0.0000 | β = 0.0000 | γ = 0.0000 |
| Decentration [8] (DAR) | | |
| X = 0.0000 | Y = −0.0404 | Z = 0.0000 |
| α = 0.0000 | β = 0.0000 | γ = 0.0000 |
| Decentration [9] (DAR) | | |
| X = 0.0000 | Y = 0.0215 | Z = 0.0000 |
| α = 0.0000 | β = 0.0000 | γ = 0.0000 |

-continued

Decentration [10] (DAR)

| | | |
|---|---|---|
| X = 0.0000 | Y = 0.0000 | Z = 0.0000 |
| α = 0.1305 | β = 0.0000 | γ = 0.0000 |

[State 4]

Aspherical surface [1]

| | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |

Aspherical surface [2]

| | | |
|---|---|---|
| Radius of curvature | 8.2793 | |
| k = 0.0000e+000 | | |
| a = −1.7023e−004 | b = −9.4716e−007 | c = −1.0243e−008 |
| d = −8.5213e−010 | | |

Aspherical surface [3]

| | | |
|---|---|---|
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |

FFS 1]

| | | |
|---|---|---|
| Radius of curvature | ∞ | |
| C4 = −2.5678e−004 | C6 = −2.1871e−004 | C8 = −1.9398e−006 |
| C10 = −1.8658e−006 | C11 = 5.7489e−007 | C13 = 3.4502e−006 |
| C15 = −2.4641e−007 | C17 = 3.3480e−008 | C19 = 1.9553e−007 |
| C21 = 6.1678e−008 | | |

Decentration [1] (DEO)

| | | |
|---|---|---|
| X = 0.0000 | Y = 0.0000 | Z = 0.0000 |
| α = −0.0456 | β = 0.0000 | γ = 0.0000 |

Decentration [2] (DEO)

| | | |
|---|---|---|
| X = 0.0000 | Y = 0.0287 | Z = 0.0000 |
| α = −0.1303 | β = 0.0000 | γ = 0.0000 |

Decentration [3] (DEO)

| | | |
|---|---|---|
| X = 0.0000 | Y = 0.0000 | Z = 0.0000 |
| α = 22.5000 | β = 0.0000 | γ = 0.0000 |

Decentration [4] (DAR)

| | | |
|---|---|---|
| X = 0.0000 | Y = 0.0000 | Z = 0.0070 |
| α = −0.0363 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = −0.0002 | Z = 0.0000 |
| α = 0.0000 | β = 0.0000 | γ = 0.0000 |

Decentration [7] (DAR)

| | | |
|---|---|---|
| X = 0.0000 | Y = 0.0135 | Z = 0.0000 |
| α = 0.0000 | β = 0.0000 | γ = 0.0000 |

Decentration [8] (DAR)

| | | |
|---|---|---|
| X = 0.0000 | Y = −0.0404 | Z = 0.0000 |
| α = 0.0000 | β = 0.0000 | γ = 0.0000 |

Decentration [9] (DAR)

| | | |
|---|---|---|
| X = 0.0000 | Y = 0.0215 | Z = 0.0000 |
| α = 0.0000 | β = 0.0000 | γ = 0.0000 |

Decentration [10] (DAR)

| | | |
|---|---|---|
| X = 0.0000 | Y = 0.0000 | Z = 0.0000 |
| α = 0.1305 | β = 0.0000 | γ = 0.0000 |

-continued

[State 5]

Aspherical surface [1]

| | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |

Aspherical surface [2]

| | | |
|---|---|---|
| Radius of curvature | 8.2793 | |
| k = 0.0000e+000 | | |
| a = −1.7023e−004 | b = −9.4716e−007 | c = −1.0243e−008 |
| d = −8.5213e−010 | | |

Aspherical surface [3]

| | | |
|---|---|---|
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |

FFS [1]

| | | |
|---|---|---|
| Radius of curvature | ∞ | |
| C4 = −9.5412e−005 | C6 = −8.1036e−005 | C8 = 1.0513e−006 |
| C10 = −9.3690e−007 | C11 = −9.5520e−008 | C13 = 3.6913e−009 |
| C15 = −1.3361e−007 | C17 = 3.8928e−008 | C19 = 1.1246e−007 |
| C21 = 3.0972e−008 | | |

Decentration [1] (DEO)

| | | |
|---|---|---|
| X = 0.0000 | Y = 0.0000 | Z = 0.0000 |
| α = −0.0269 | β = 0.0000 | γ = 0.0000 |

Decentration [2] (DEO)

| | | |
|---|---|---|
| X = 0.0000 | Y = 0.0287 | Z = 0.0000 |
| α = −0.1303 | β = 0.0000 | γ = 0.0000 |

Decentration [3] (DEO)

| | | |
|---|---|---|
| X = 0.0000 | Y = 0.0000 | Z = 0.0000 |
| α = 22.5000 | β = 0.0000 | γ = 0.0000 |

Decentration [4] (DAR)

| | | |
|---|---|---|
| X = 0.0000 | Y = 0.0000 | Z = 0.0028 |
| α = −0.0363 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = −0.0002 | Z = 0.0000 |
| α = 0.0000 | β = 0.0000 | γ = 0.0000 |

Decentration [7] (DAR)

| | | |
|---|---|---|
| X = 0.0000 | Y = 0.0135 | Z = 0.0000 |
| α = 0.0000 | β = 0.0000 | γ = 0.0000 |

Decentration [8] (DAR)

| | | |
|---|---|---|
| X = 0.0000 | Y = −0.0404 | Z = 0.0000 |
| α = 0.0000 | β = 0.0000 | γ = 0.0000 |

Decentration [9] (DAR)

| | | |
|---|---|---|
| X = 0.0000 | Y = 0.0215 | Z = 0.0000 |
| α = 0.0000 | β = 0.0000 | γ = 0.0000 |

Decentration [10] (DAR)

| | | |
|---|---|---|
| X = 0.0000 | Y = 0.0000 | Z = 0.0000 |
| α = 0.1305 | β = 0.0000 | γ = 0.0000 |

[State 6]

Aspherical surface [1]

| | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |

-continued

| | Aspherical surface [2] | |
|---|---|---|
| Radius of curvature | 8.2793 | |
| k = 0.0000e+000 | | |
| a = −1.7023e−004 | b = −9.4716e−007 | c = −1.0243e−008 |
| d = −8.5213e−010 | | |
| | Aspherical surface [3] | |
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |
| | FFS [1] | |
| Radius of curvature | ∞ | |
| C4 = −4.7027e−005 | C6 = −4.0175e−005 | C8 = −4.9570e−007 |
| C10 = −4.7836e−007 | C11 = 1.1241e−007 | C13 = 3.7133e−007 |
| C15 = 8.9065e−008 | C17 = 1.9088e−008 | C19 = 4.1909e−008 |
| C21 = 1.9635e−008 | | |

| | Decentration [1] (DEO) | |
|---|---|---|
| X = 0.0000 | Y = 0.0000 | Z = 0.0000 |
| α = −0.0552 | β = 0.0000 | γ = 0.0000 |
| | Decentration [2] (DEO) | |
| X = 0.0000 | Y = 0.0287 | Z = 0.0000 |
| α = −0.1303 | β = 0.0000 | γ = 0.0000 |
| | Decentration [3] (DEO) | |
| X = 0.0000 | Y = 0.0000 | Z = 0.0000 |
| α = 22.5000 | β = 0.0000 | γ = 0.0000 |
| | Decentration [4] (DAR) | |
| X = 0.0000 | Y = 0.0000 | Z = 0.0013 |
| α = −0.0363 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = −0.0002 | Z = 0.0000 |
| α = 0.0000 | β = 0.0000 | γ = 0.0000 |
| | Decentration [7] (DAR) | |
| X = 0.0000 | Y = 0.0135 | Z = 0.0000 |
| α = 0.0000 | β = 0.0000 | γ = 0.0000 |
| | Decentration [8] (DAR) | |
| X = 0.0000 | Y = −0.0404 | Z = 0.0000 |
| α = 0.0000 | β = 0.0000 | γ = 0.0000 |
| | Decentration [9] (DAR) | |
| X = 0.0000 | Y = 0.0215 | Z = 0.0000 |
| α = 0.0000 | β = 0.0000 | γ = 0.0000 |
| | Decentration [10] (DAR) | |
| X = 0.0000 | Y = 0.0000 | Z = 0.0000 |
| α = 0.1305 | β = 0.0000 | γ = 0.0000 |

[State 7]

| | Aspherical surface [1] | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |
| | Aspherical surface [2] | |
| Radius of curvature | 8.2793 | |
| k = 0.0000e+000 | | |
| a = −1.7023e−004 | b = −9.4716e−007 | c = −1.0243e−008 |
| d = −8.5213e−010 | | |

-continued

| | Aspherical surface [3] | |
|---|---|---|
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |
| | FFS [1] | |
| Radius of curvature | ∞ | |
| C4 = −4.1026e−004 | C6 = −3.4715e−004 | C8 = −2.5854e−006 |
| C10 = −2.2649e−006 | C11 = 1.2726e−006 | C13 = 4.3888e−006 |
| C15 = −3.7666e−007 | C17 = 2.9201e−008 | C19 = 2.6454e−007 |
| C21 = 7.4872e−008 | | |

| | Decentration [1] (DEO) | |
|---|---|---|
| X = 0.0000 | Y = 0.0000 | Z = 0.0000 |
| α = −0.0599 | β = 0.0000 | γ = 0.0000 |
| | Decentration [2] (DEO) | |
| X = 0.0000 | Y = 0.0287 | Z = 0.0000 |
| α = −0.1303 | β = 0.0000 | γ = 0.0000 |
| | Decentration [3] (DEO) | |
| X = 0.0000 | Y = 0.0000 | Z = 0.0000 |
| α = 22.5000 | β = 0.0000 | γ = 0.0000 |
| | Decentration [4] (DAR) | |
| X = 0.0000 | Y = 0.0000 | Z = 0.0110 |
| α = −0.0363 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = −0.0002 | Z = 0.0000 |
| α = 0.0000 | β = 0.0000 | γ = 0.0000 |
| | Decentration [7] (DAR) | |
| X = 0.0000 | Y = 0.0135 | Z = 0.0000 |
| α = 0.0000 | β = 0.0000 | γ = 0.0000 |
| | Decentration [8] (DAR) | |
| X = 0.0000 | Y = −0.0404 | Z = 0.0000 |
| α = 0.0000 | β = 0.0000 | γ = 0.0000 |
| | Decentration [9] (DAR) | |
| X = 0.0000 | Y = 0.0215 | Z = 0.0000 |
| α = 0.0000 | β = 0.0000 | γ = 0.0000 |
| | Decentration [10] (DAR) | |
| X = 0.0000 | Y = 0.0000 | Z = 0.0000 |
| α = 0.1305 | β = 0.0000 | γ = 0.0000 |

[State 8]

| | Aspherical surface [1] | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |
| | Aspherical surface [2] | |
| Radius of curvature | 8.2793 | |
| k = 0.0000e+000 | | |
| a = −1.7023e−004 | b = −9.4716e−007 | c = −1.0243e−008 |
| d = −8.5213e−010 | | |
| | Aspherical surface [3] | |
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |

-continued

FFS [1]

| | | |
|---|---|---|
| Radius of curvature | ∞ | |
| C4 = −2.4692e−004 | C6 = −2.0605e−004 | C8 = −2.5695e−006 |
| C10 = −2.8078e−006 | C11 = 4.6822e−007 | C13 = 1.1357e−007 |
| C15 = −4.4573e−007 | C17 = 5.7484e−008 | C19 = 1.6067e−007 |
| C21 = 9.2821e−008 | | |

Decentration [1] (DEO)

| | | |
|---|---|---|
| X = 0.0000 | Y = 0.0000 | Z = 0.0000 |
| α = −0.0773 | β = 0.0000 | γ = 0.0000 |

Decentration [2] (DEO)

| | | |
|---|---|---|
| X = 0.0000 | Y = 0.0287 | Z = 0.0000 |
| α = −0.1303 | β = 0.0000 | γ = 0.0000 |

Decentration [3] (DEO)

| | | |
|---|---|---|
| X = 0.0000 | Y = 0.0000 | Z = 0.0000 |
| α = 22.5000 | β = 0.0000 | γ = 0.0000 |

Decentration [4] (DAR)

| | | |
|---|---|---|
| X = 0.0000 | Y = 0.0000 | Z = 0.0068 |
| α = −0.0363 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = −0.0002 | Z = 0.0000 |
| α = 0.0000 | β = 0.0000 | γ = 0.0000 |

Decentration [7] (DAR)

| | | |
|---|---|---|
| X = 0.0000 | Y = 0.0135 | Z = 0.0000 |
| α = 0.0000 | β = 0.0000 | γ = 0.0000 |

Decentration [8] (DAR)

| | | |
|---|---|---|
| X = 0.0000 | Y = −0.0404 | Z = 0.0000 |
| α = 0.0000 | β = 0.0000 | γ = 0.0000 |

Decentration [9] (DAR)

| | | |
|---|---|---|
| X = 0.0000 | Y = 0.0215 | Z = 0.0000 |
| α = 0.0000 | β = 0.0000 | γ = 0.0000 |

Decentration [10] (DAR)

| | | |
|---|---|---|
| X = 0.0000 | Y = 0.0000 | Z = 0.0000 |
| α = 0.1305 | β = 0.0000 | γ = 0.0000 |

[State 9]

Aspherical surface [1]

| | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |

Aspherical surface [2]

| | | |
|---|---|---|
| Radius of curvature | 8.2793 | |
| k = 0.0000e+000 | | |
| a = −1.7023e−004 | b = −9.4716e−007 | c = −1.0243e−008 |
| d = −8.5213e−010 | | |

Aspherical surface [3]

| | | |
|---|---|---|
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |

FFS [1]

| | | |
|---|---|---|
| Radius of curvature | ∞ | |
| C4 = −1.9874e−004 | C6 = −1.6635e−004 | C8 = −2.3552e−006 |
| C10 = −2.7779e−006 | C11 = 6.3614e−007 | C13 = 5.4796e−007 |
| C15 = 2.4565e−009 | C17 = 4.9993e−008 | C19 = 8.3921e−008 |
| C21 = 9.1830e−008 | | |

-continued

Decentration [1] (DEO)

| | | |
|---|---|---|
| X = 0.0000 | Y = 0.0000 | Z = 0.0000 |
| α = −0.0862 | β = 0.0000 | γ = 0.0000 |

Decentration [2] (DEO)

| | | |
|---|---|---|
| X = 0.0000 | Y = 0.0287 | Z = 0.0000 |
| α = −0.1303 | β = 0.0000 | γ = 0.0000 |

Decentration [3] (DEO)

| | | |
|---|---|---|
| X = 0.0000 | Y = 0.0000 | Z = 0.0000 |
| α = 22.5000 | β = 0.0000 | γ = 0.0000 |

Decentration [4] (DAR)

| | | |
|---|---|---|
| X = 0.0000 | Y = 0.0000 | Z = 0.0052 |
| α = −0.0363 | β = 0.0000 | γ = 0.0000 |

Decentration [5] (DAR)

| | | |
|---|---|---|
| X = 0.0000 | Y = 0.0000 | Z = 0.0000 |
| α = 0.0000 | β = 0.0000 | γ = 0.0000 |

Decentration [6] (DAR)

| | | |
|---|---|---|
| X = 0.0000 | Y = −0.0002 | Z = 0.0000 |
| α = 0.0000 | β = 0.0000 | γ = 0.0000 |

Decentration [7] (DAR)

| | | |
|---|---|---|
| X = 0.0000 | Y = 0.0135 | Z = 0.0000 |
| α = 0.0000 | β = 0.0000 | γ = 0.0000 |

Decentration [8] (DAR)

| | | |
|---|---|---|
| X = 0.0000 | Y = −0.0404 | Z = 0.0000 |
| α = 0.0000 | β = 0.0000 | γ = 0.0000 |

Decentration [9] (DAR)

| | | |
|---|---|---|
| X = 0.0000 | Y = 0.0215 | Z = 0.0000 |
| α = 0.0000 | β = 0.0000 | γ = 0.0000 |

Decentration [10] (DAR)

| | | |
|---|---|---|
| X = 0.0000 | Y = 0.0000 | Z = 0.0000 |
| α = 0.1305 | β = 0.0000 | γ = 0.0000 |

[State 10]

Aspherical surface [1]

| | | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |

Aspherical surface [2]

| | | |
|---|---|---|
| Radius of curvature | 8.2793 | |
| k = 0.0000e+000 | | |
| a = −1.7023e−004 | b = −9.4716e−007 | c = −1.0243e−008 |
| d = −8.5213e−010 | | |

Aspherical surface [3]

| | | |
|---|---|---|
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |

FFS [1]

| | | |
|---|---|---|
| Radius of curvature | ∞ | |
| C4 = −6.6104e−004 | C6 = −5.5774e−004 | C8 = −5.0196e−006 |
| C10 = −4.4272e−006 | C11 = 1.8910e−006 | C13 = 5.8910e−006 |
| C15 = −1.0867e−006 | C17 = 8.6615e−008 | C19 = 5.7741e−007 |
| C21 = 1.4635e−007 | | |

Decentration [1] (DEO)

| | | |
|---|---|---|
| X = 0.0000 | Y = 0.0000 | Z = 0.0000 |
| α = −0.0807 | β = 0.0000 | γ = 0.0000 |

Decentration [2] (DEO)

| | | |
|---|---|---|
| X = 0.0000 | Y = 0.0287 | Z = 0.0000 |
| α = −0.1303 | β = 0.0000 | γ = 0.0000 |

-continued

| | Decentration [3] (DEO) | |
|---|---|---|
| X = 0.0000 | Y = 0.0000 | Z = 0.0000 |
| α = 22.5000 | β = 0.0000 | γ = 0.0000 |
| | Decentration [4] (DAR) | |
| X = 0.0000 | Y = 0.0000 | Z = 0.0181 |
| α = −0.0363 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = −0.0002 | Z = 0.0000 |
| α = 0.0000 | β = 0.0000 | γ = 0.0000 |
| | Decentration [7] (DAR) | |
| X = 0.0000 | Y = 0.0135 | Z = 0.0000 |
| α = 0.0000 | β = 0.0000 | γ = 0.0000 |
| | Decentration [8] (DAR) | |
| X = 0.0000 | Y = −0.0404 | Z = 0.0000 |
| α = 0.0000 | β = 0.0000 | γ = 0.0000 |
| | Decentration [9] (DAR) | |
| X = 0.0000 | Y = 0.0215 | Z = 0.0000 |
| α = 0.0000 | β = 0.0000 | γ = 0.0000 |
| | Decentration [10] (DAR) | |
| X = 0.0000 | Y = 0.0000 | Z = 0.0000 |
| α = 0.1305 | β = 0.0000 | γ = 0.0000 |

[State 11]

| | Aspherical surface [1] | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |
| | Aspherical surface [2] | |
| Radius of curvature | 8.2793 | |
| k = 0.0000e+000 | | |
| a = −1.7023e−004 | b = −9.4716e−007 | c = −1.0243e−008 |
| d = −8.5213e−010 | | |
| | Aspherical surface [3] | |
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |
| | FFS [1] | |
| Radius of curvature | ∞ | |
| C4 = −3.4397e−004 | C6 = −2.8613e−004 | C8 = −3.7082e−006 |
| C10 = −4.1393e−006 | C11 = 8.1732e−007 | C13 = 1.5055e−007 |
| C15 = −6.5743e−007 | C17 = 7.7129e−008 | C19 = 2.1546e−007 |
| C21 = 1.3684e−007 | | |

| | Decentration [1] (DEO) | |
|---|---|---|
| X = 0.0000 | Y = 0.0000 | Z = 0.0000 |
| α = −0.0835 | β = 0.0000 | γ = 0.0000 |
| | Decentration [2] (DEO) | |
| X = 0.0000 | Y = 0.0287 | Z = 0.0000 |
| α = −0.1303 | β = 0.0000 | γ = 0.0000 |
| | Decentration [3] (DEO) | |
| X = 0.0000 | Y = 0.0000 | Z = 0.0000 |
| α = 22.5000 | β = 0.0000 | γ = 0.0000 |
| | Decentration [4] (DAR) | |
| X = 0.0000 | Y = 0.0000 | Z = 0.0095 |
| α = −0.0363 | β = 0.0000 | γ = 0.0000 |

-continued

| | Decentration [5] (DAR) | |
|---|---|---|
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = −0.0002 | Z = 0.0000 |
| α = 0.0000 | β = 0.0000 | γ = 0.0000 |
| | Decentration [7] (DAR) | |
| X = 0.0000 | Y = 0.0135 | Z = 0.0000 |
| α = 0.0000 | β = 0.0000 | γ = 0.0000 |
| | Decentration [8] (DAR) | |
| X = 0.0000 | Y = −0.0404 | Z = 0.0000 |
| α = 0.0000 | β = 0.0000 | γ = 0.0000 |
| | Decentration [9] (DAR) | |
| X = 0.0000 | Y = 0.0215 | Z = 0.0000 |
| α = 0.0000 | β = 0.0000 | γ = 0.0000 |
| | Decentration [10] (DAR) | |
| X = 0.0000 | Y = 0.0000 | Z = 0.0000 |
| α = 0.1305 | β = 0.0000 | γ = 0.0000 |

[State 12]

| | Aspherical surface [1] | |
|---|---|---|
| Radius of curvature | 10.0000 | |
| k = 0.0000e+000 | | |
| a = −1.0641e−004 | b = 4.1079e−007 | c = −4.3269e−008 |
| d = 4.0273e−010 | | |
| | Aspherical surface [2] | |
| Radius of curvature | 8.2793 | |
| k = 0.0000e+000 | | |
| a = −1.7023e−004 | b = −9.4716e−007 | c = −1.0243e−008 |
| d = −8.5213e−010 | | |
| | Aspherical surface [3] | |
| Radius of curvature | 805.0880 | |
| k = 0.0000e+000 | | |
| a = 1.1980e−003 | b = 1.4699e−004 | c = −2.2725e−005 |
| d = 1.6892e−006 | e = −1.1754e−019 | f = −9.2349e−022 |
| g = −7.2572e−024 | h = −5.7046e−026 | |
| | FFS [1] | |
| Radius of curvature | ∞ | |
| C4 = −2.4699e−004 | C6 = −2.0590e−004 | C8 = −2.8803e−006 |
| C10 = −3.4975e−006 | C11 = 8.5301e−007 | C13 = 5.7313e−007 |
| C15 = −6.8244e−008 | C17 = 5.8524e−008 | C19 = 8.9189e−008 |
| C21 = 1.1562e−007 | | |

| | Decentration [1] (DEO) | |
|---|---|---|
| X = 0.0000 | Y = 0.0000 | Z = 0.0000 |
| α = −0.0873 | β = 0.0000 | γ = 0.0000 |
| | Decentration [2] (DEO) | |
| X = 0.0000 | Y = 0.0287 | Z = 0.0000 |
| α = −0.1303 | β = 0.0000 | γ = 0.0000 |
| | Decentration [3] (DEO) | |
| X = 0.0000 | Y = 0.0000 | Z = 0.0000 |
| α = 22.5000 | β = 0.0000 | γ = 0.0000 |
| | Decentration [4] (DAR) | |
| X = 0.0000 | Y = 0.0000 | Z = 0.0065 |
| α = −0.0363 | β = 0.0000 | γ = 0.0000 |
| | Decentration [5] (DAR) | |
| X = 0.0000 | Y = 0.0000 | Z = 0.0000 |
| α = 0.0000 | β = 0.0000 | γ = 0.0000 |
| | Decentration [6] (DAR) | |
| X = 0.0000 | Y = −0.0002 | Z = 0.0000 |
| α = 0.0000 | β = 0.0000 | γ = 0.0000 |

-continued

| | Decentration [7] (DAR) | |
|---|---|---|
| X = 0.0000 | Y = 0.0135 | Z = 0.0000 |
| α = 0.0000 | β = 0.0000 | γ = 0.0000 |
| | Decentration [8] (DAR) | |
| X = 0.0000 | Y = −0.0404 | Z = 0.0000 |
| α = 0.0000 | β = 0.0000 | γ = 0.0000 |
| | Decentration [9] (DAR) | |
| X = 0.0000 | Y = 0.0215 | Z = 0.0000 |
| α = 0.0000 | β = 0.0000 | γ = 0.0000 |
| | Decentration [10] (DAR) | |
| X = 0.0000 | Y = 0.0000 | Z = 0.0000 |
| α = 0.1305 | β = 0.0000 | γ = 0.0000 |

However, the coordinate system of the fourth surface is the same as that of the first surface. The coordinate systems after the fifth surface are defined in order from the fourth surface.

| | Far-point allowance | | Far point | | Near point | | Near-point allowance | |
|---|---|---|---|---|---|---|---|---|
| | | | Object distance D0 | | | | | |
| Wide-angle | State 1 | ∞ | State 4 | ∞ | State 7 | 300 | State 10 | 300 |
| Standard | State 2 | ∞ | State 5 | ∞ | State 8 | 300 | State 11 | 300 |
| Telephoto | State 3 | ∞ | State 6 | ∞ | State 9 | 300 | State 12 | 300 |
| | | | Object distance D34 | | | | | |
| Wide-angle | State 1 | 0.605 | State 4 | 0.500 | State 7 | 0.500 | State 10 | 0.395 |
| Standard | State 2 | 0.620 | State 5 | 0.500 | State 8 | 0.500 | State 11 | 0.380 |
| Telephoto | State 3 | 0.675 | State 6 | 0.500 | State 9 | 0.500 | State 12 | 0.320 |

Zoom spacing

| | Wide-angle | Standard | Telephoto |
|---|---|---|---|
| D13 | 0.4899 | 0.0000 | 0.0000 |
| D16 | 1.2490 | 7.7097 | 10.7217 |
| D20 | 16.0595 | 7.7838 | 0.1000 |
| D27 | 0.1000 | 2.4050 | 7.0768 |

DI indicates spacing between the Ith surface and the (I+1)th surface. I is an integer of any of 0–36.

The conditions described below apply to the optical system of Embodiment 4. It is merely necessary that these conditions are satisfied in at least one state.

Conditions (12), (12'), (13), (13'), (13"), (14), (14'), (15), (15'), (16), (16'), 16"), (17), (17'), (17"), (18), (18'), (18"), (19), (19'), (19"), (20), (20'), (20"), (21), (21'), (22), (22'), (23), (23'), (23"), (23'''), (24), (25), (27), (28). (Note: The numerals and order are changed.)

In Embodiment 4, the values of the focal lengths f, as described in the numerical data, are 4.4 mm (wide-angle) ~13.2 mm (telephoto), and 7.6 mm (standard).

The value (mm) of the maximum amount of deformation md of the variable mirror is equal to that of the amount of decentration Z of the eighth surface.

The value of the optically effective area Sm of the reflecting surface of the deformable mirror in Condition (14) or (14') is 72 $mm^2$ (practically corresponding to that of a circle with a radius of 4.8 mm).

The value of the voltage Vm applied to the deformable mirror in Condition (15) or (15') is 0–200 V, depending upon the state.

The value of the amount φDM of the deformable mirror in Condition (16), (16'), or (16") is φDM=(½)·(C4+C6). Also, φDMx=C4 and φDMy=C6.

The value of the focal length f1 of the lens unit with negative power placed on the object side of the variable mirror in Condition (12) or (12') is −15.184.

The value of the bending angle θ of the axial principal ray in the variable mirror is 45°.

The magnifications β1 of the lens unit ranging from the optical surface situated immediately behind the variable mirror to the last surface in Condition (23), (23'), or (23") are −0.29 at the wide-angle position, −0.51 at the standard position, and −0.87 at the tele-photo position.

The overall length Cj (the length measured by extending the bent optical path) of the optical system in Condition (17), (17'), or (17") is 80.05 mm.

As mentioned above, it is only necessary that individual conditions of the present invention are satisfied in at least one state of the optical system.

Next, values of parameters of the conditions in Embodiment 4 are shown below.

$$fw = 4.40$$

$$\theta = 45°$$

$$\phi = 45°$$

$$\begin{aligned} f1/f &= -3.43 \text{(wide-angle)} \\ &= -2.0 \text{(standard)} \\ &= -1.15 \text{(telephoto)} \end{aligned}$$

$$\begin{aligned} md &= 18.1 \text{ microns(wide-angle, near-point allowance)} \\ &= 9.5 \text{ microns(standard, near-point allowance)} \\ &= 6.5 \text{ microns(telephoto, near-point allowance)} \end{aligned}$$

$$md/f = 0.0041 \text{(wide-angle, near-point allowance)}$$

$$md^2/Sm = 0.00000454 \text{(wide-angle, near-point allowance)}$$

$$Cj/f = 18.19 \text{(wide-angle)}$$

$$f_3 = -19.361$$

$$|f_3/f| = 4.40 \text{(wide-angle)}$$

$$R1 = \infty$$

$$|R1/f| = \infty \text{(telephoto)}$$

As shown in Embodiment 4, the values of the amounts of shift δ and tilt ε of the optical element, with the exception of the image sensor, are small, and thus even though the optical element is manufactured, with these amounts as zero, no problem may be caused in practical use.

In Embodiment 4, reference has been made to the optical system using the deformable mirror. However, even where the optical system, instead of using the deformable mirror, uses a plane mirror or curved mirror whose shape remains unchanged or a prism having a plane or curved surface, the above conditions and limits may be applied unless otherwise noted. This is because the merit of the compact design in a bending optical system using the reflecting surface is maintained as it is.

In the optical system of Embodiment 4, an arrangement in which the lens unit includes the reflecting surface has been described. However, even when a refraction-type variable optical-property element, for example, a variable focal-length lens, is used instead of the reflection-type variable optical-property element, it is possible to obtain the effects of the compact and low-cost design, power saving, and noiseless operation. The above conditions, which include many paraxial theories, are established even in the case of lenses practically constructed as variable focal-length lenses. In addition, a variable focal-length mirror that has no deformable surface may be used in the above embodiments. Also the variable focal-length mirror is a kind of variable mirror. The variable focal-length mirror will be described later with reference to one example shown in FIG. 44.

The optical system can be applied to a film camera, a digital camera, a TV camera, a camera for personal digital assistants, an imaging apparatus for mobile phones, a monitoring camera, a robot's eye, and an electronic endoscope.

In the above description, the imaging optical system is assumed as the optical system, but the imaging optical system can be used, for example, as a projection optical system, such as a projector, by replacing an object plane with an image plane, and an optical apparatus using this projection optical system can be manufactured.

Subsequently, a description is given of structural examples of variable optical-property elements, such as the variable mirror and the varaible focal-length lens, applicable to the optical system used in the optical apparatus of the present invention.

Figure 19:
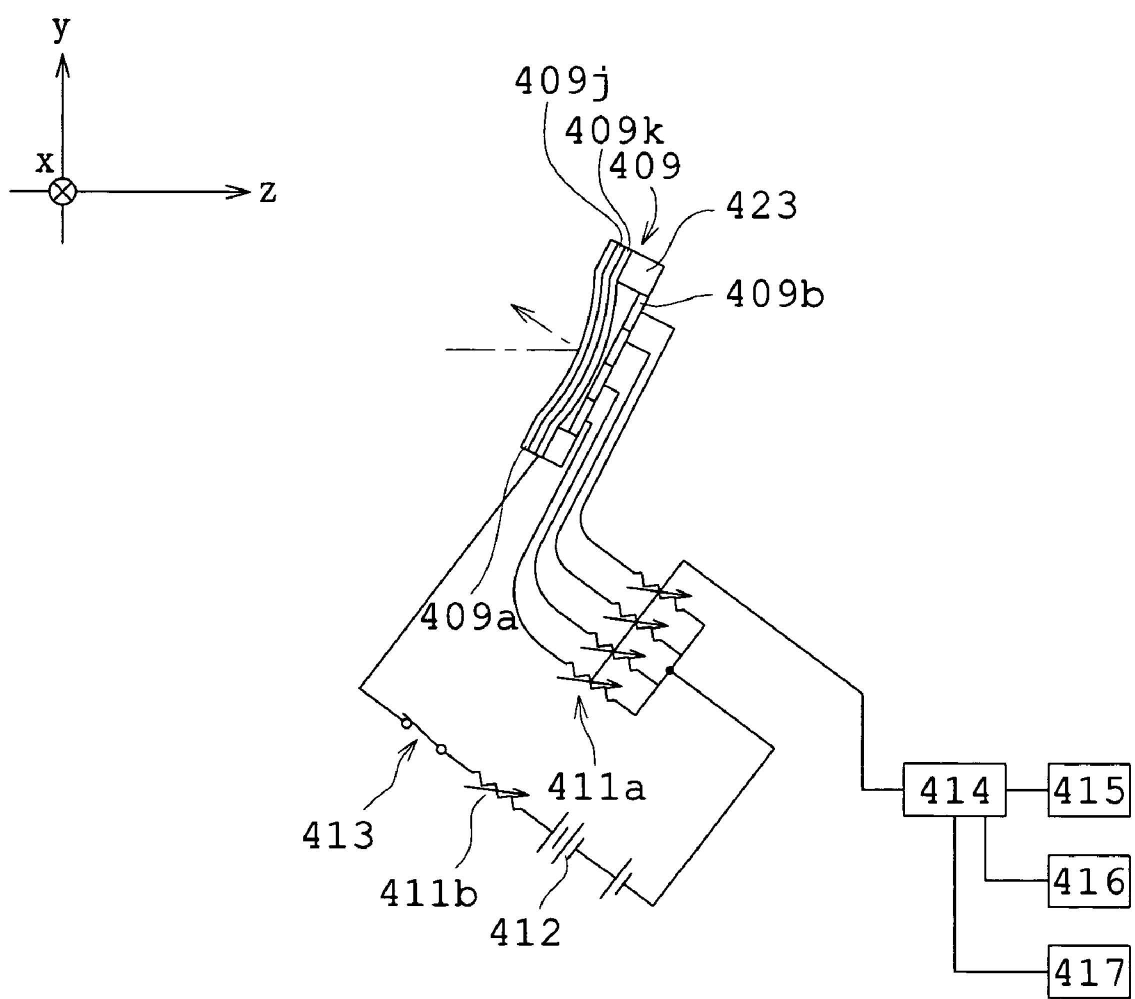
FIG. 19 is a view showing schematically an example of a deformable mirror as the variable optical-property element applicable to the optical system used in the optical apparatus of the present invention.

FIG. 19 shows the structural example of the deformable mirror as the varaible optical-property element applicable to the optical system used in the optical apparatus of the present invention.

In FIG. 19, a deformable mirror 409 includes a thin film (reflecting surface) 409*a* of an aluminum coating formed on a deforming substrate 409*j*; the plurality of electrodes 409*b* in which the periphery of the three-layer structure including an electrode 409*k* provided beneath the substrate 409*j* is supported by an annular support 423 so that the electrodes 409*b* are spaced away from the electrode 409*k* and are mounted to the support 423; a plurality of variable resistors 411*a* connecting to the electrodes 409*b* and functioning as driving circuits; a power source 412 connected between the electrode 409*k* and the electrodes 409*b* through a variable resistor 411*b* and a power switch 413; and an arithmetical unit 414 for controlling the resistance values of the plurality of variable resistors 411*a*. A temperature sensor 415, a humidity sensor 416, and a range sensor 417 are connected to the arithmetical unit 414, and as shown in the figure, these constitute a part of one optical unit. Also, the deforming substrate 409*j* may be the thin film or may have a plate shape.

The reflecting surface of the variable mirror need not necessarily be planar, depending on the control of the arithmetical unit 414, and may have any shape such as a spherical or rotational-symmetrical aspherical surface; a spherical, planar, or rotational-symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. In general, such a surface is referred as to an extended surface. By the reflecting surface constructed of the thin film 409*a*, a ray of light is reflected in the direction of the arrow of the figure.

The thin film 409*a*, like a membrane mirror set forth, for example, in "Handbook of Microlithography, Micromachining and Microfabrication", by P. Rai-Choudhury, Volume 2: Micromachining and Microfabrication, p. 495, FIG. 8.58, SPIE PRESS, or Optics Communication, Vol. 140, pp. 187–190, 1997, is such that when voltages are applied between the plurality of electrodes 409*b* and the electrode 409*k*, the thin film 409*a* is deformed by the electrostatic force and its surface profile is changed.

Figure 21:
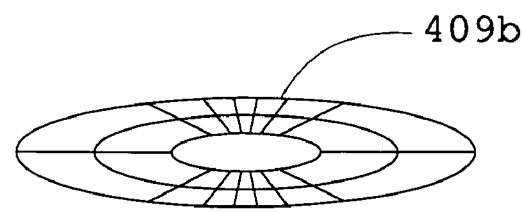
FIG. 21 is an explanatory view showing one aspect of electrodes used in the deformable mirror of each of FIGS. 19 and 20.
Figure 22:
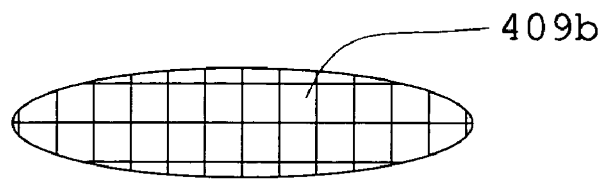
FIG. 22 is an explanatory view showing another aspect of electrodes used in the deformable mirror of each of FIGS. 19 and 20.

Also, it is only necessary that the profile of the electrodes 409*b*, for example, as shown in FIG. 21 or 22, is selected to have a concentric or rectangular division pattern in accordance with the deformation of the thin film 409*a*.

As mentioned above, the configuration of the thin film 409*a* functioning as the reflecting surface is controlled in such a way that the resistance values of the variable resistors 411*a* are changed by signals from the arithmetical unit 414 to optimize imaging performance. Signals corresponding to ambient temperature and humidity and a distance to the object are input into the arithmetical unit 414 from the temperature sensor 415, the humidity sensor 416, and the range sensor 417. In accordance with these input signals, the arithmetical unit 414 outputs signals for determining the resistance values of the variable resistors 411*a* so that voltages governing the configuration of the thin film 409*a* are applied to the electrodes 409*b* by the command of an image processor for the ambient temperature and humidity conditions and the distance to the object or the electronic zoom. Thus, since the thin film 409*a* is deformed with the voltages applied to the electrodes 409*b*, that is, the electrostatic forces, it assumes the shapes of various extended surfaces including an aspherical surface, according to circumstances. The range sensor 417 need not necessarily be used, and in this case, it is only necessary that the object distance is calculated and the variable mirror is deformed so that a high-frequency component of an image signal from the solid-state image sensor 408, not shown, is roughly maximized. When the variable mirror 409 is made by using lithography, high fabrication accuracy and good quality are easily obtained.

When the deforming substrate 409*j* is made of synthetic resin, such as polyimide or the trade name, Cytop (made by ASAHI GLASS CO., LTD), it can be considerably deformed even at a low voltage, which is advantageous.

In FIG. 19, the thin film 409*a* of the reflecting surface and the deforming electrode 409*k* sandwiching the deforming substrate 409*j* between them are independently provided and integrally constructed, and thus there is the advantage that some manufacturing methods can be chosen. The thin film 409*a* of the reflecting surface may be configured as a conductive thin film. By doing so, the thin film 409*a* can also be used as the deforming electrode 409*k*. This brings about the advantage that the structure is simplified because both are configured into one unit.

It is favorable that the reflecting surface of the variable mirror is configured as a free-formed surface. This is because correction for aberration can be facilitated, which is advantageous.

Also, although in FIG. 19 the arithmetical unit 414, the temperature sensor 415, the humidity sensor 416, and the range sensor 417 are provided so that the variable mirror 409 compensates for the changes of the temperature, the humidity, and the object distance, the present invention is not limited to this construction. That is, the temperature sensor 415, the humidity sensor 416, and the range sensor 417 may be eliminated.

Figure 20:
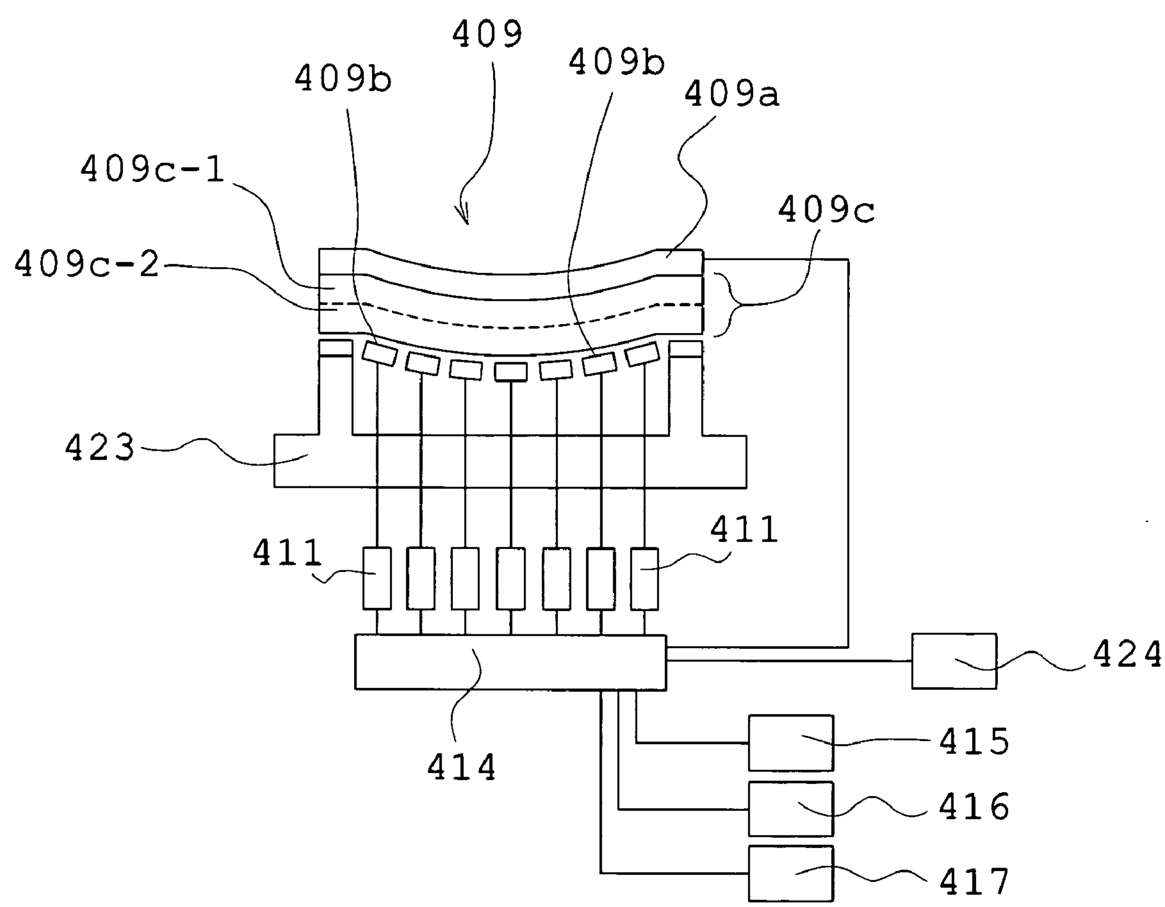
FIG. 20 is a view showing schematically another example of the deformable mirror.

FIG. 20 shows another example of the variable mirror 409.

In the variable mirror of this example, a piezoelectric element 409*c* is interposed between the thin film 409*a* of the reflecting surface and the electrodes 409*b*, and these are placed on the support 423. A voltage applied to the piezoelectric element 409*c* is changed in accordance with each of the electrodes 409*b*, and thereby the piezoelectric element 409*c* causes expansion and contraction which are partially different so that the shape of the thin film 409*a* can be changed. The configuration of the electrodes 409*b*, as illustrated in FIG. 21, may have a concentric division pattern, or as in FIG. 22, may be a rectangular division pattern. As other patterns, proper configurations can be chosen. In FIG. 20, reference numeral 424 represents a shake sensor connected to the arithmetical unit 414. The shake sensor 424, for example, detects the shake of a digital camera when the optical apparatus mentioned above is used in the digital camera, and changes the voltages applied to the electrodes 409*b* through the arithmetical unit 414 and driving circuits 411 housing variable resistors in order to deform the thin film 409*a* so as to compensate for the blurring of an image caused by the shake. At this time, signals from the temperature sensor 415, the humidity sensor 416, and the range sensor 417 are taken into account simultaneously, and focusing and compensation for temperature and humidity are performed. In this case, stress is applied to the thin film 409*a* by the deformation of the piezoelectric element 409*c*, and hence it is good practice that the thin film 409*a* is designed to have a moderate thickness and a proper strength.

The driving circuits 411 are not limited to the construction that a plurality of circuits are arranged in accordance with the number of the electrodes 409*b*, and may be constructed so that the plurality of electrodes 409*b* are controlled by a single driving circuit.

Figure 23:
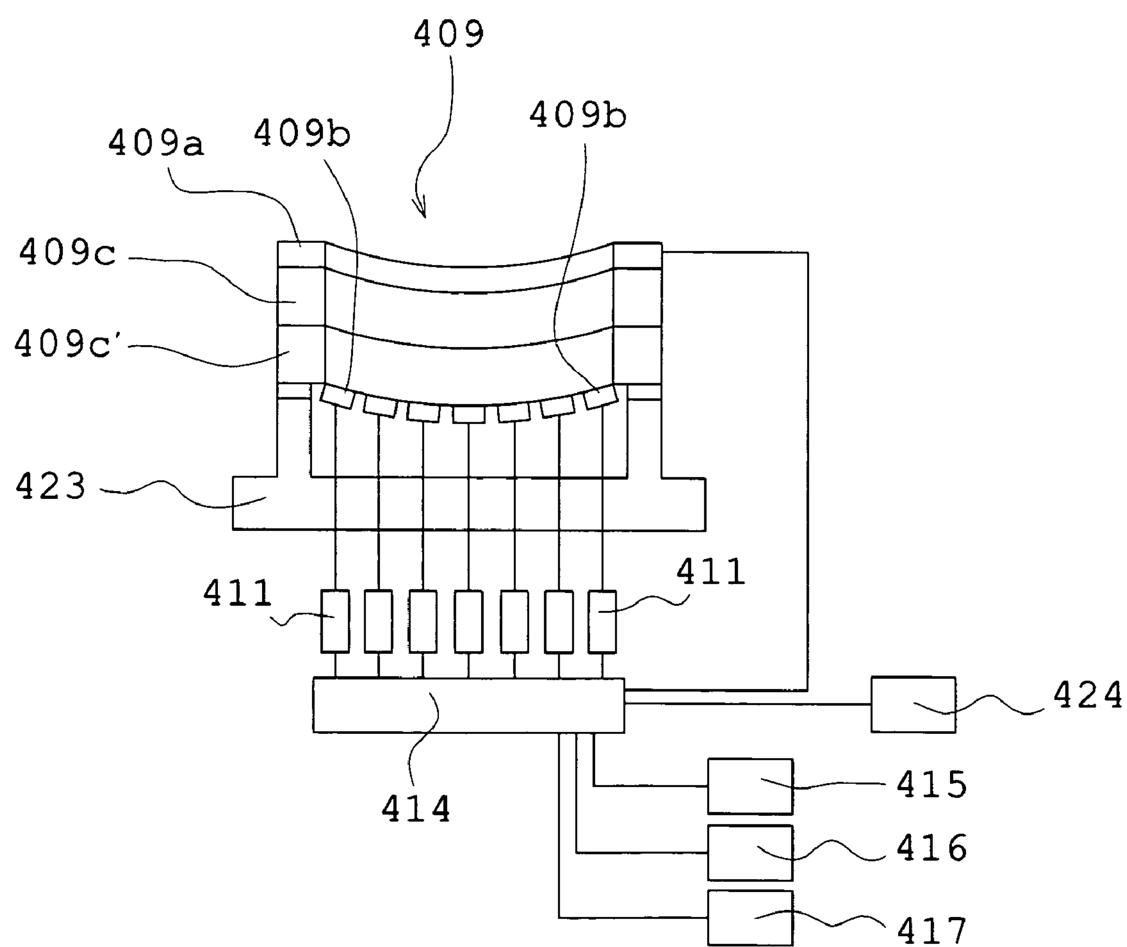
FIG. 23 is a view showing schematically another example of the deformable mirror.

FIG. 23 shows still another example of the variable mirror 409. The variable mirror of this example is constructed with two piezoelectric elements 409*c* and 409*c*' interposed between the thin film 409*a* and the electrodes 409*b* and made with substances having piezoelectric characteristics which are reversed in direction. Specifically, the piezoelectric elements 409*c* and 409*c*' are made with ferroelectric crystals and are arranged so that their crystal axes are reversed in direction with respect to each other. In this case, the piezoelectric elements 409*c* and 409*c*' expand or contract in a reverse direction when voltages are applied, and thus there is the advantage that a force for deforming the thin film 409*a* becomes stronger than in the single layer structure of FIG. 20, and as a result, the shape of the mirror surface can be considerably changed.

For substances used for the piezoelectric elements 409*c* and 409*c*', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When these piezoelectric elements are used, it is also possible to properly deform the thin film 409*a* in each of the above examples if their thicknesses are made uneven.

As materials of the piezoelectric elements 409*c* and 409*c*', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, is favorable because it brings about a considerable deformation of the surface of the variable mirror.

Figure 24:
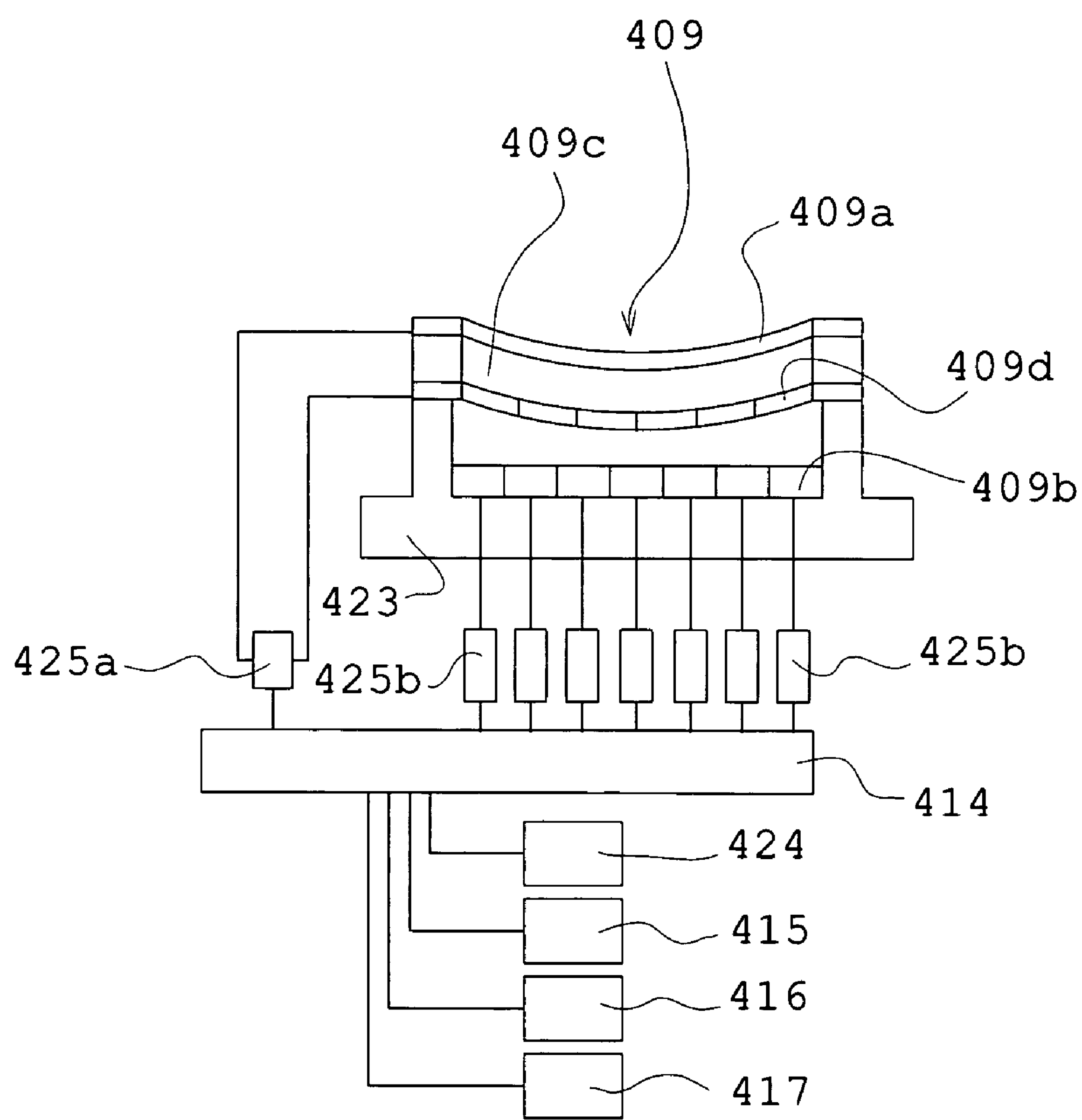
FIG. 24 is a view showing schematically another example of the deformable mirror.

When an electrostrictive substance, for example, acrylic elastomer or silicon rubber, is used for the piezoelectric element 409*c* shown in FIGS. 20 and 24, the piezoelectric element 409*c*, instead of the single layer structure, as indicated by a broken line in FIG. 20, may have the two-layer structure in which a substrate 409*c*-1 is cemented to an electrostrictive substance 409*c*-2.

FIG. 24 shows another example of the variable mirror 409.

The variable mirror of this example is designed so that the piezoelectric element 409*c* is sandwiched between the thin film 409*a* and an electrode 409*d*, and the voltage is applied to the piezoelectric element 409*c* between the thin film 409*a* and the electrode 409*d* through a driving circuit 425*a* controlled by the arithmetical unit 414. Furthermore, apart from this, voltages are also applied to the electrodes 409*b* provided on the support 423, through driving circuits 425*b* controlled by the arithmetical unit 414. Therefore, in this example, the thin film 409*a* can be doubly deformed by electrostatic forces due to the voltages applied between the thin film 409*a* and the electrode 409*d* and applied to the electrodes 409*b*. There are advantages that various deformation patterns can be provided and the response is quick, compared with any of the above examples.

By changing the signs of the voltages applied between the thin film 409*a* and the electrode 409*d*, the variable mirror can be deformed into either a convex or concave surface. In this case, a considerable deformation may be performed by a piezoelectric effect, while a slight shape change may be carried out by the electrostatic force. Alternatively, the piezoelectric effect may be chiefly used for the deformation of the convex surface, while the electrostatic force may be used for the deformation of the concave surface. Also, the electrode 409*d* may be constructed as a plurality of electrodes like the electrodes 409*b*. This state is shown in FIG. 24. In the present invention, all of the piezoelectric effect, the electrostrictive effect, and electrostriction are generally called the piezoelectric effect. Thus, it is assumed that the electrostrictive substance comes into the category of the piezoelectric substance.

Figure 25:
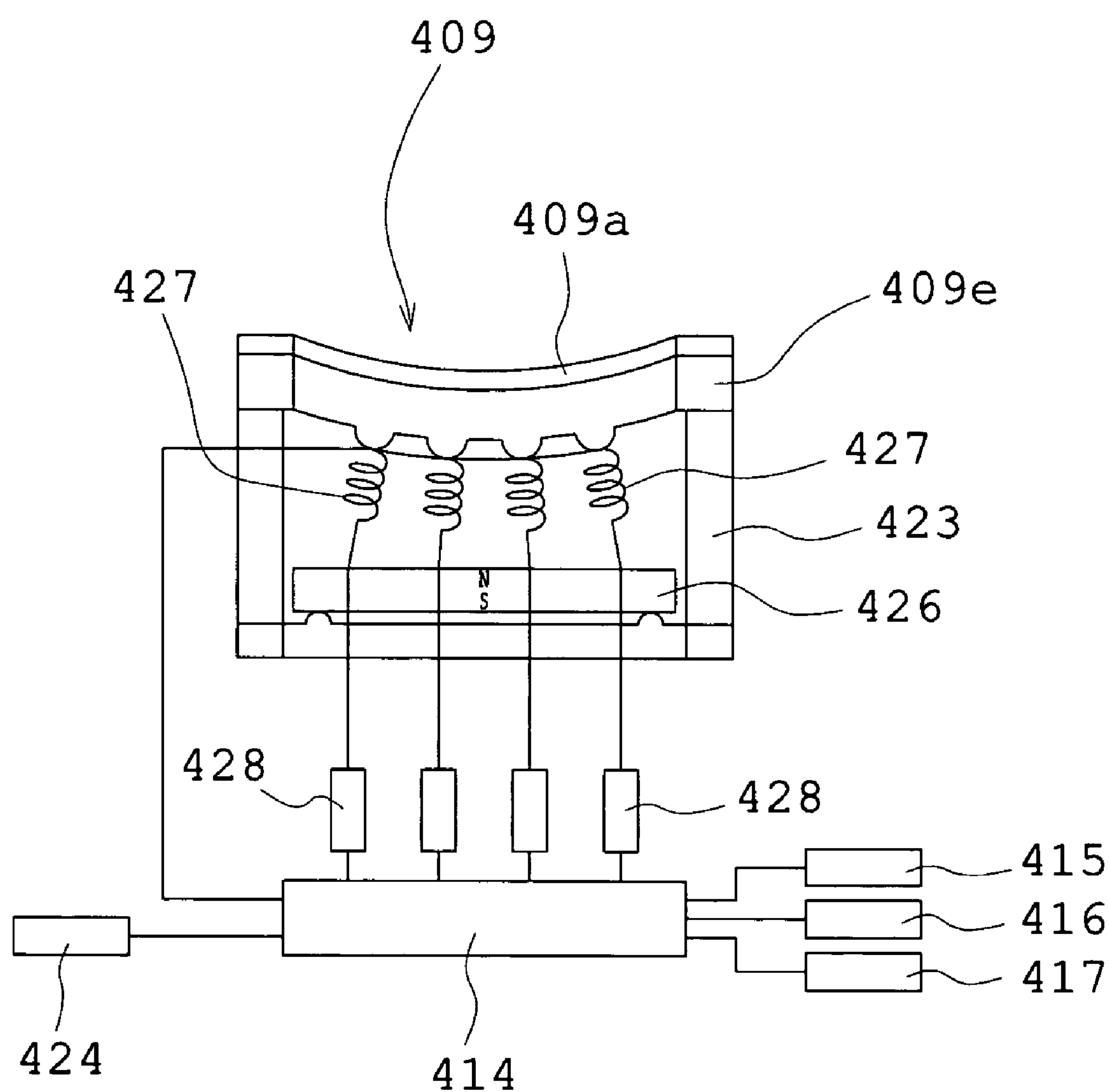
FIG. 25 is a view showing schematically another example of the deformable mirror.

FIG. 25 shows another example of the variable mirror 409.

The variable mirror of this example is designed so that the shape of the reflecting surface can be changed by utilizing an electromagnetic force. A permanent magnet 426 is fixed on the bottom surface inside the support 423, and the periphery of a substrate 409*e* made with silicon nitride or polyimide is mounted and fixed on the top surface thereof. The thin film 409*a* with the coating of metal, such as aluminum, is deposited on the surface of the substrate 409*e*, thereby constituting the variable mirror 409. Below the substrate 409*e*, a plurality of coils 427 are fixedly mounted and are connected to the arithmetical unit 414 through driving circuits 428. In accordance with output signals from the arithmetical unit 414 corresponding to changes of the optical system obtained at the arithmetical unit 414 by signals from the sensors 415, 416, 417, and 424 and others, proper electric currents are supplied from the driving circuits 428 to the coils 427. At this time, the coils 427 are repelled or attracted by the electromagnetic force with the permanent magnet 426 to deform the substrate 409*e* and the thin film 409*a* functioning as the reflecting surface.

In this case, a different amount of current can also be caused to flow through each of the coils 427. A single coil 427 may be used. The permanent magnet 426 may be mounted on the lower surface of the substrate 409*e* so that the coils 427 are arranged on the bottom side in the support 423. It is desirable that the coils 427 are made by a lithography process. A ferromagnetic iron core may be encased in each of the coils 427.

Figure 26:
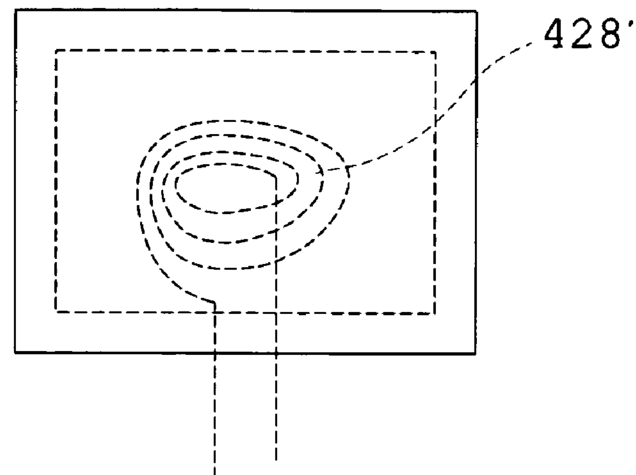
FIG. 26 is an explanatory view showing the winding density of a thin-film coil in the example of FIG. 25.

In this case, each of the coils 427, as illustrated in FIG. 26, can be designed so that a coil density varies with the place like a coil 428', and thereby a desired deformation can be brought to the substrate 409*e* and the thin film 409*a*. A single coil 427 may be used, or a ferromagnetic iron core may be encased in each of the coils 427.

Figure 27:
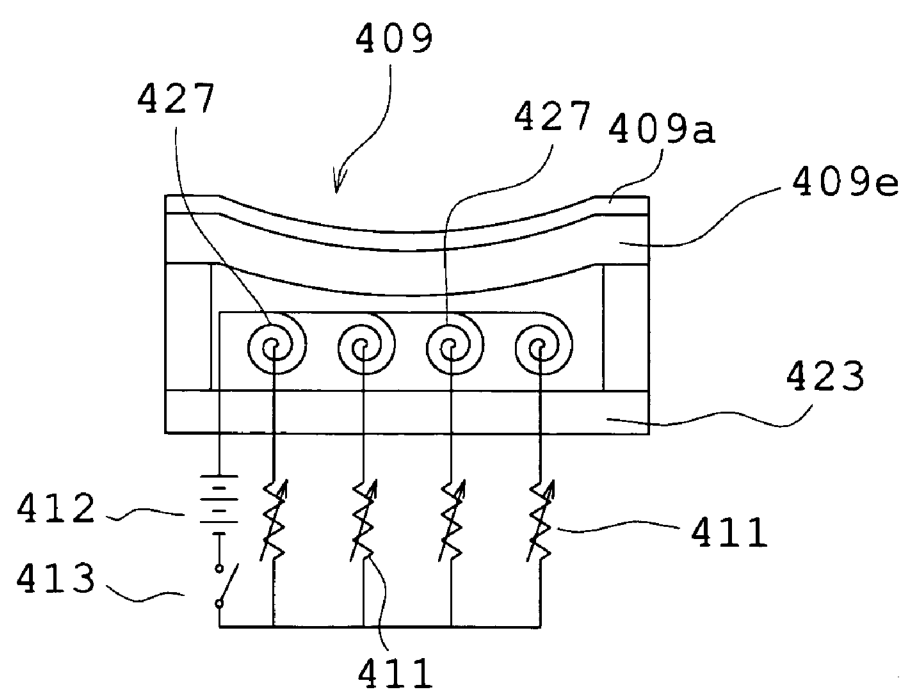
FIG. 27 is a view showing schematically another example of the deformable mirror.

FIG. 27 shows another example of the variable mirror 409.

In the variable mirror of this example, the substrate 409*e* is made with a ferromagnetic such as iron, and the thin film 409*a* of the reflecting film is made with aluminum. In this case, since even though the coils are not provided beneath the substrate 409*e*, the thin film 409*a* can be deformed by the magnetic force, the structure is simplified and the manufacturing cost can be reduced. If the power switch 413 is replaced with a changeover and power on-off switch, the directions of currents flowing through the coils 427 can be changed, and the configurations of the substrate 409*e* and the thin film 409*a* can be changed at will.

Figure 28:
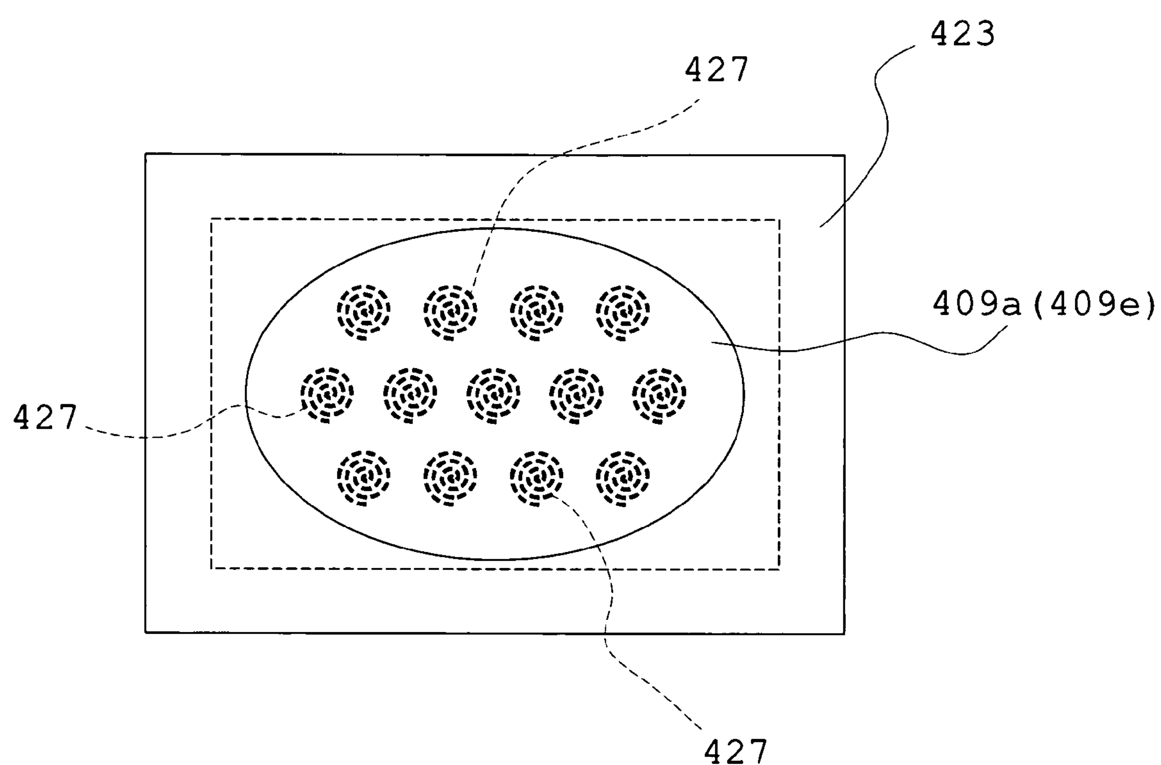
FIG. 28 is an explanatory view showing one example of an array of coils in the example of FIG. 27.
Figure 29:
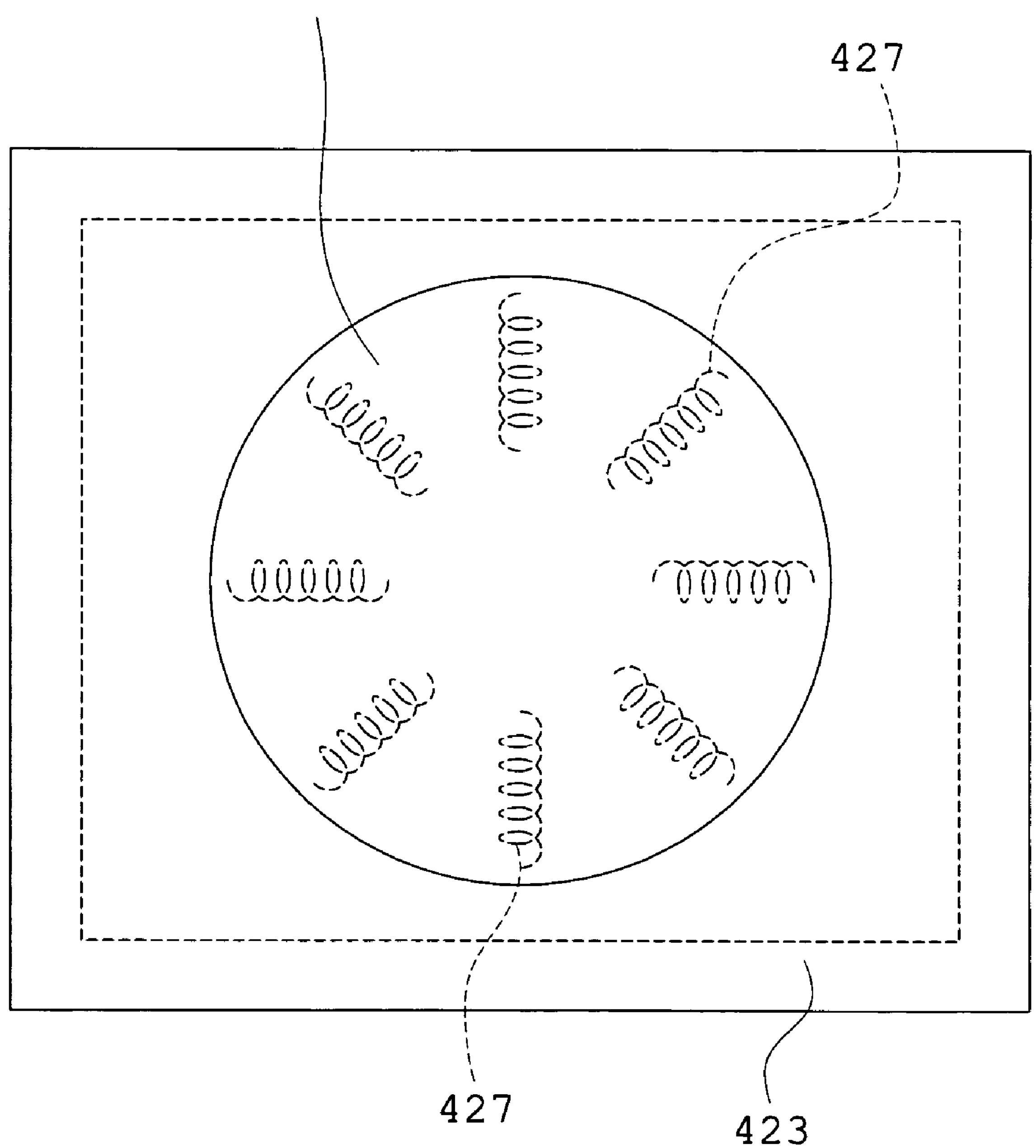
FIG. 29 is an explanatory view showing another example of the array of coils in the example of FIG. 27.
Figure 30:
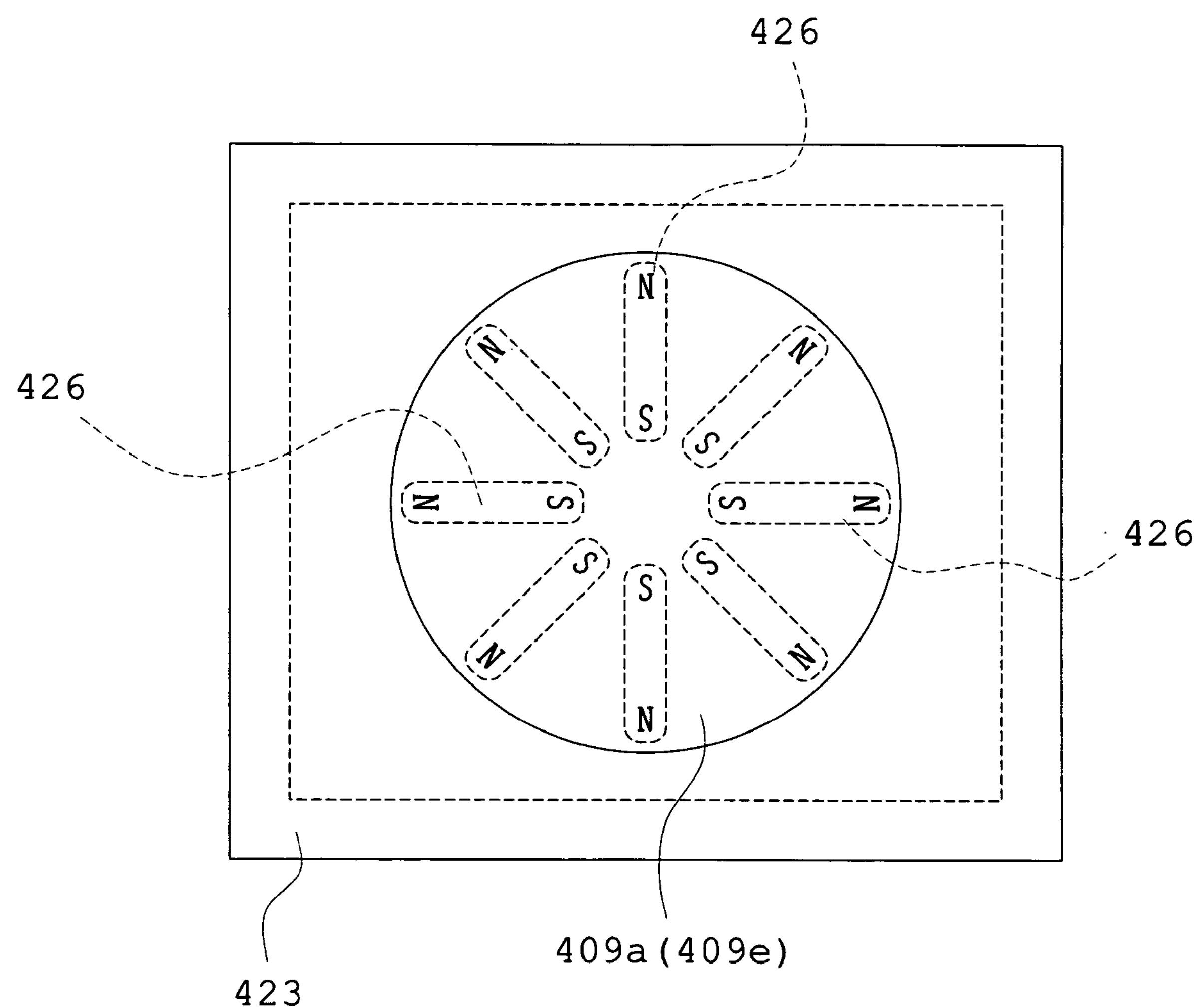
FIG. 30 is an explanatory view showing an array of permanent magnets suitable for the array of coils of FIG. 29 in the example of FIG. 25.

FIG. 28 shows an example of an array of the coils 427 of this example. FIG. 29 shows another example of the array of the coils 427. These arrays are also applicable to the example of FIG. 25. FIG. 30 shows an array of the permanent magnets 426 suitable for the case where the coils 427, as shown in FIG. 29, are radially arrayed. Specifically, when the bar-shaped permanent magnets 426, as shown in FIG. 30, are radially arrayed, a delicate deformation can be provided to the substrate 409*e* and the thin film 409*a* in contrast with the example of FIG. 25. As mentioned above, when the electromagnetic force is used to deform the substrate 409*e* and the thin film 409*a* (in the examples of FIGS. 25 and 27), there is the advantage that they can be driven at a lower voltage than in the case where the electrostatic force is used.

Some examples of the variable mirrors have been described, but as shown in the example of FIG. 24, at least two kinds of forces may be used in order to change the shape of the mirror constructed with the thin film 409*a*. Specifically, at least two among the electrostatic force, electromagnetic force, piezoelectric effect, magnetrostriction, pressure of a fluid, electric field, magnetic field, temperature change, and electromagnetic wave, may be used simultaneously to deform the thin film constituting the reflecting surface. That is, when at least two different driving techniques are used to make the variable optical-property element, a considerable deformation and a slight deformation can be achieved simultaneously and a mirror surface with a high degree of accuracy can be obtained.

Figure 31:
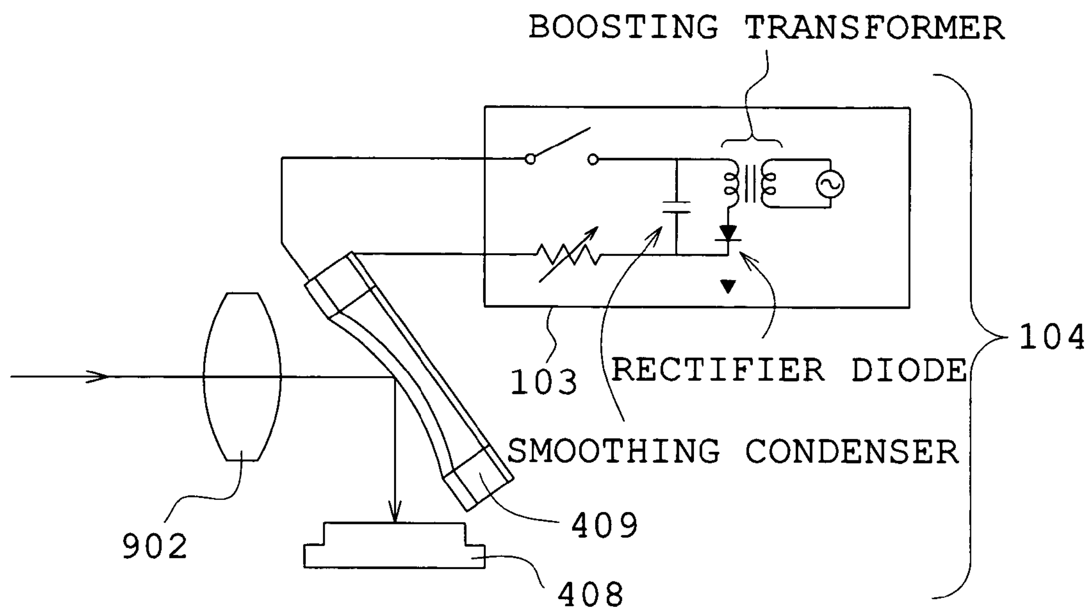
FIG. 31 is a view showing schematically the variable mirror applicable to the optical system of the optical apparatus of the present invention.

FIG. 31 shows an imaging system which uses the variable mirror 409 applicable to the optical apparatus of another embodiment of the present invention and which is used, for example, in a digital camera of a mobile phone, a capsule endoscope, an electronic endoscope, a digital camera for personal computers, or a digital camera for PDAs.

In this imaging system, the deformable mirror 409, a lens 902, the solid-state image sensor 408, and a control system 103 constitute one imaging unit 104. The imaging unit 104 of this embodiment is designed so that light from an object passing through the lens 902 is condensed by the variable mirror 409 and is imaged on the solid-state image sensor 408. The variable mirror 409 is a kind of variable optical-property element and is also referred to as the variable focal-length mirror.

According to the embodiment, even when the object distance is changed, the variable mirror 409 is deformed and thereby the object can be brought into a focus. The embodiment need not move the lens 902 by using a motor and excels in compact and lightweight design and low power consumption. The imaging unit 104 can be used in any of the embodiments as the imaging system of the present invention. When a plurality of variable mirrors 409 are used, a variable magnification imaging system or optical system can be constructed.

In FIG. 31, an example of a control system is cited which includes the boosting circuit of a transformer using coils in the control system 103. In particular, the use of a laminated piezoelectric transformer is favorable because a compact design can be achieved. The boosting circuit can be used in the variable mirror or the variable focal-length lens which uses electricity, and is particularly useful for the variable mirror or the variable focal-length lens which utilizes the electrostatic force or the piezoelectric effect. In order to use the variable mirror 409 for focusing, it is only necessary, for example, to form an object image on the solid-state image sensor 408 and to find a state where the high-frequency component of the object image is maximized while changing the focal length of the variable able mirror 409. In order to detect the high-frequency component, it is only necessary, for example, to connect a processor including a microcomputer to the solid-state image sensor 408 and to detect the high-frequency component therein.

Also, the lens 902 may be replaced by the variable focal-length lens to be described later. The above effect is likewise obtained. In this case, the variable mirror 409 may also be an ordinary mirror. A combination of the lens 902 and the variable focal-length lens may be used.

Figure 32:
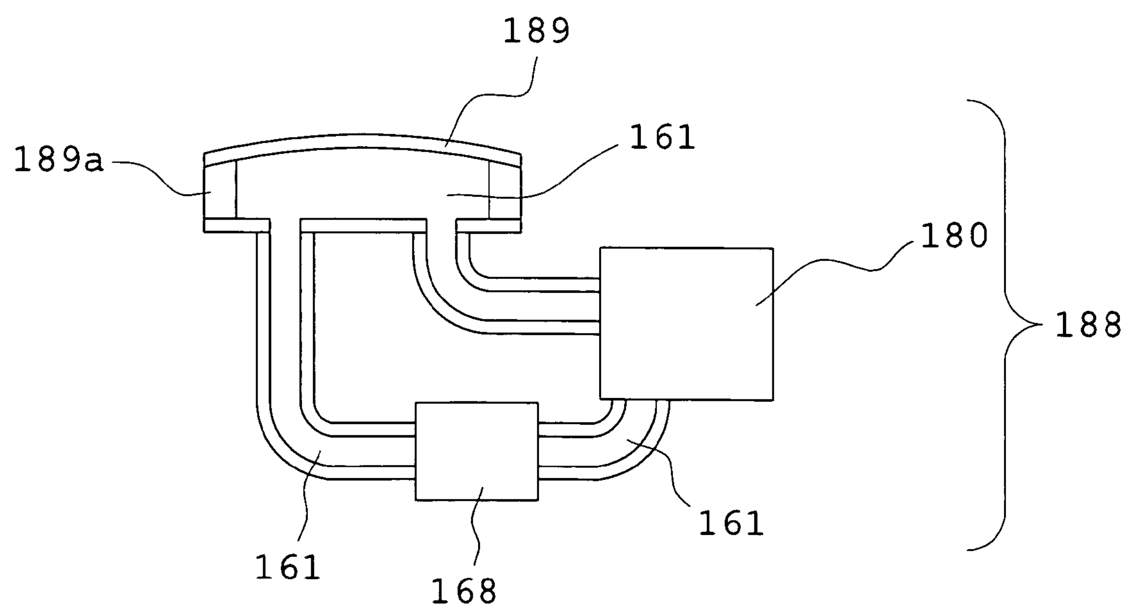
FIG. 32 is a view showing schematically the deformable mirror in which a fluid is taken in and out by a micropump to deform a lens surface in another example of the variable mirror.

FIG. 32 shows another example of the variable mirror. In this figure, a variable mirror 188 is constructed so that a fluid 161 is taken in and out by a micropump 180 to deform a mirror surface which is configured with a film extended on the upper surface of a support 189*a*. According to this embodiment, there is the advantage that the mirror surface can be considerably deformed. In this figure, reference numeral 168 denotes a control device controlling the amount of the fluid 161 in the support 189*a*, together with the micropump 180. The control device 168 and the micropump 180 are to control the deformation of a film 189, and thus correspond to the driving circuit.

The micropump 180 is a small-sized pump, for example, made by a micromachining technique and is constructed so that it is operated with an electric force. As examples of pumps made by the micromachining technique, there are those which use thermal deformations, piezoelectric substances, and electrostatic forces.

Figure 33:
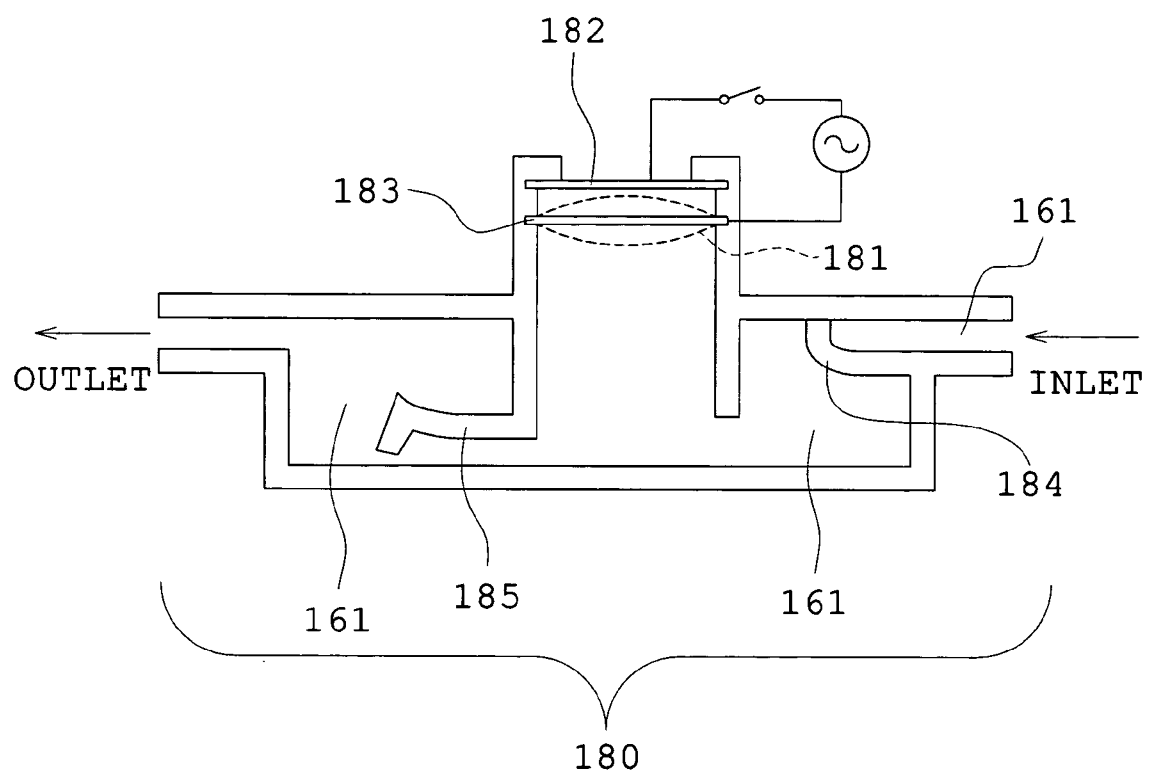
FIG. 33 is a view showing schematically one example of the micropump.

FIG. 33 shows an example of the micropump 180 of FIG. 32. In the micropump 180 of this example, a vibrating plate 181 is vibrated by the electrostatic force or the electric force of the piezoelectric effect. In FIG. 33, a case where the vibrating plate is vibrated by the electrostatic force is shown and reference numerals 182 and 183 represent electrodes. Dotted lines indicate the vibrating plate 181 where it is deformed. When the vibrating plate 181 is vibrated, two valves 184 and 185 are opened and closed to feed the fluid 161 from the right to the left.

In the variable mirror 188 shown in FIG. 32, the film 189 constituting the reflecting surface is deformed into a concave or convex shape in accordance with the amount of the fluid 161, thereby functioning as the variable mirror. An organic or inorganic substance, such as silicon oil, air, water, or jelly, can be used as the fluid.

In the variable mirror or the variable focal-length lens which uses the electrostatic force or the piezoelectric effect, a high voltage is sometimes required for drive. In this case, for example, as shown in FIG. 31, it is desirable that the boosting transformer or the piezoelectric transformer is used to constitute the control system.

The provision of the thin film 409*a* or the film 189 which constitutes the reflecting surface on a member which is not deformed like the upper portion of the annular member of the support 423 or 189*a* is convenient because it can be used as a reference surface when the profile of the reflecting surface of the variable mirror is measured by an interferometer.

Figure 34:
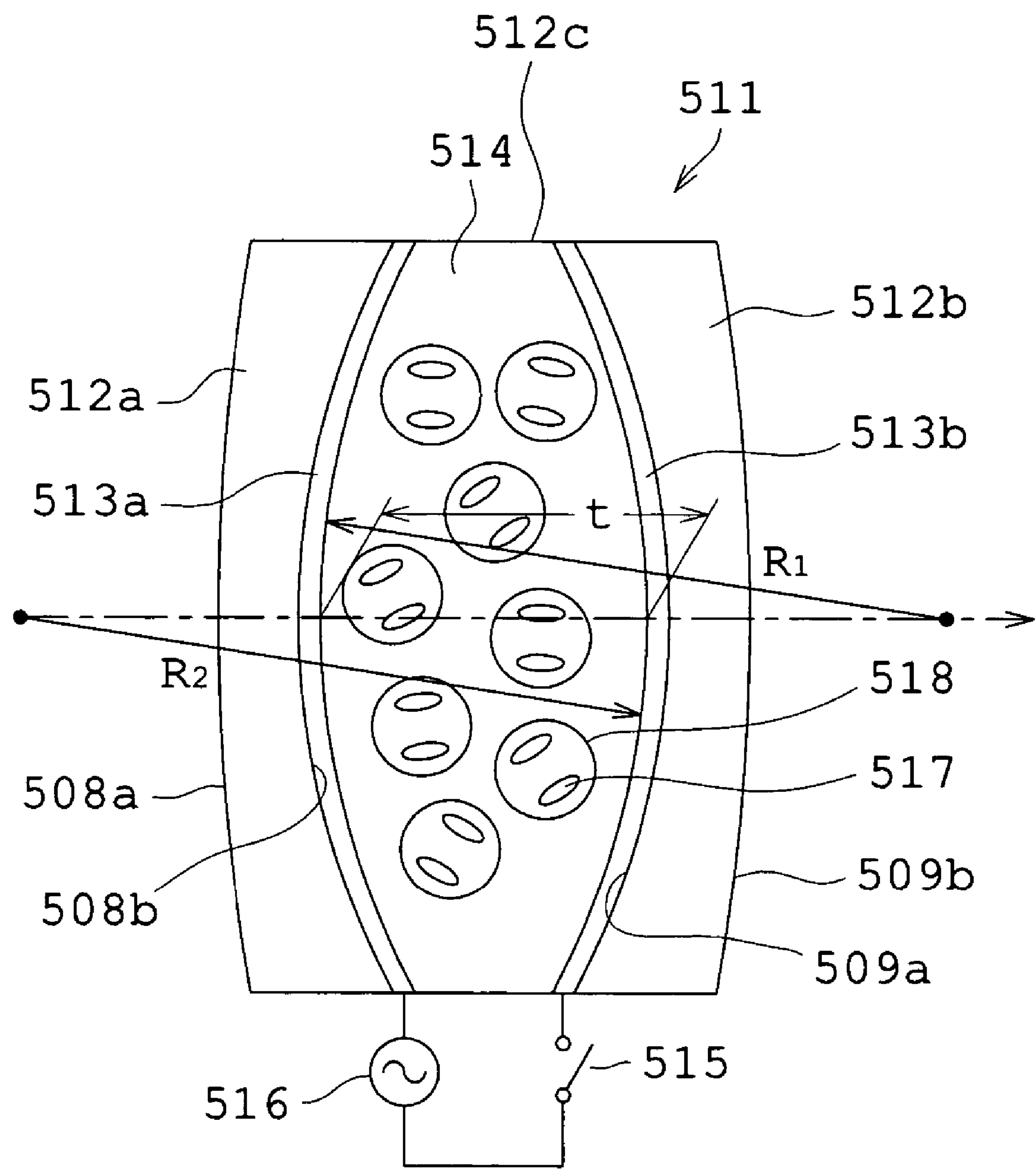
FIG. 34 is a view showing the principle structure of the variable focal-length lens applicable to the optical system of the optical apparatus of the present invention.

FIG. 34 shows the principle structure of the variable focal-length lens of another type. A variable focal-length lens 511 includes a first lens 512*a* having lens surfaces 508*a* and 508*b* as a first surface and a second surface, respectively; a second lens 512*b* having lens surfaces 509*a* and 509*b* as a third surface and a fourth surface, respectively; and a third lens 512*c* constructed with a macromolecular dispersed liquid crystal layer 514 sandwiched between the first and second lenses through transparent electrodes 513*a* and 513*b*. Incident light is converged through the first, third, and second lenses 512*a*, 512*c*, and 512*b*. The transparent electrodes 513*a* and 513*b* are connected to an alternating-current power supply 516 through a switch 515 so that an alternating-current voltage is selectively applied to the macromolecular dispersed liquid crystal layer 514. The macromolecular dispersed liquid crystal layer 514 is composed of a great number of minute macromolecular cells 518, each having any shape, such as a sphere or polyhedron, and including liquid crystal molecules 517. The volume of each cell is equal to the sum of volumes occupied by macromolecules and the liquid crystal molecules 517 which constitute the macromolecular cell 518.

Here, for the size of each of the macromolecular cells 518, for example, in the case of a sphere, when an average diameter is denoted by D and the wavelength of light used is denoted by λ, the average diameter D is chosen to satisfy the following condition:

$$2\ \text{nm} \leqq D \leqq \lambda/5 \quad (29)$$

Figure 35:
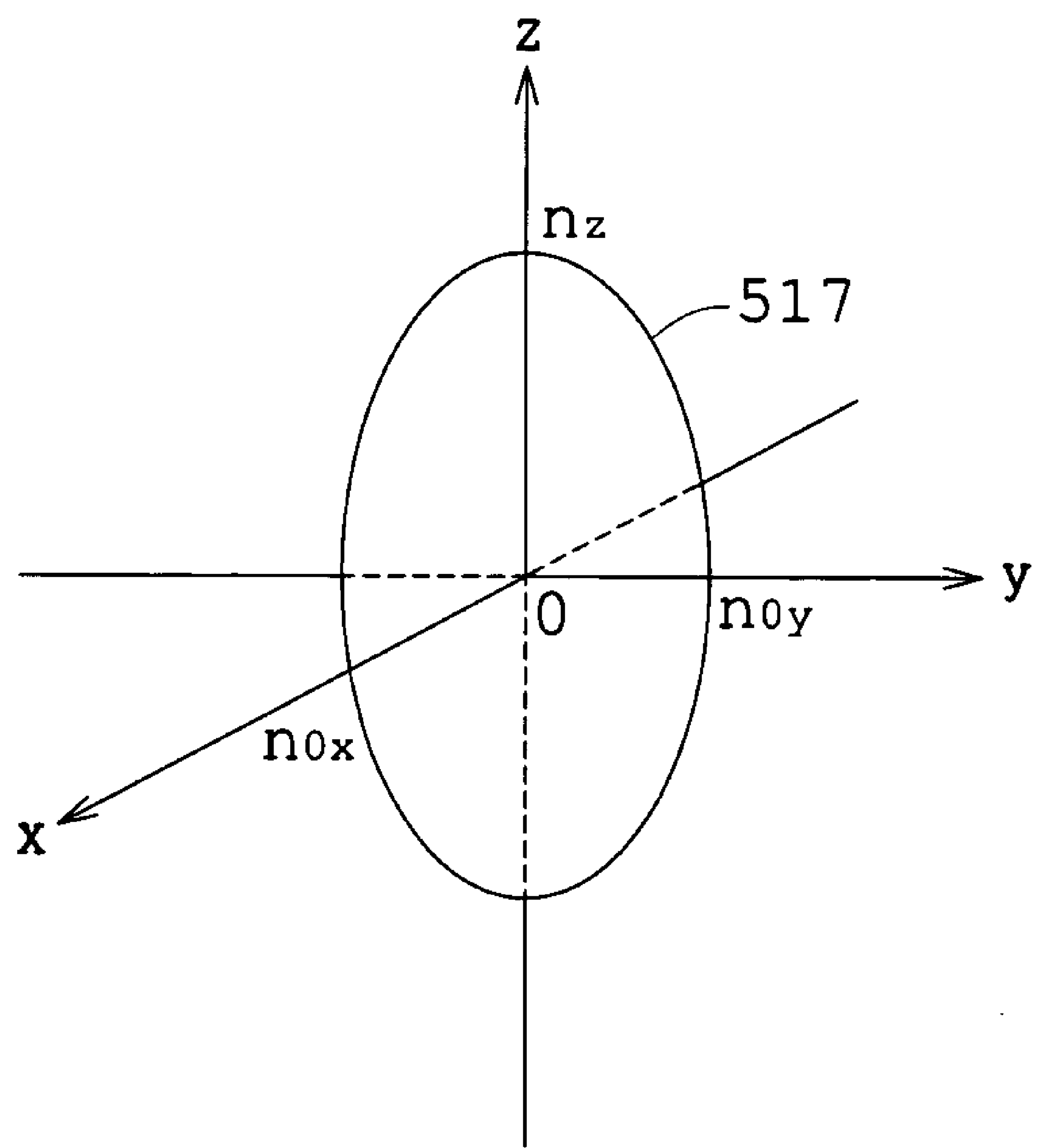
FIG. 35 is a view showing the index ellipsoid of a nematic liquid crystal molecule of uniaxial anisotropy.

That is, the size of each of the liquid crystal molecules 517 is at least about 2 nm and thus the lower limit of the average diameter D is set to 2 nm or larger. The upper limit of the diameter D depends on a thickness t of the macromolecular dispersed liquid crystal layer 514 in the direction of the optical axis of the variable focal-length lens 511. However, if the diameter is larger than the wavelength λ, a difference in refractive index between the macromolecule and the liquid crystal molecule 517 will cause light to be scattered at the interface of the macromolecular cell 518 and will render the liquid crystal layer 514 opaque. Hence, the upper limit of the diameter D, as described later, should preferably be λ/5 or less. A high degree of accuracy is not necessarily required, depending on an optical product using the variable focal-length lens. In this case, the diameter D below the value of the wavelength λ is satisfactory. Also, the transparency of the macromolecular dispersed liquid crystal layer 514 deteriorates with increasing thickness t. In the liquid crystal molecules 517, for example, uniaxial nematic liquid crystal molecules are used. The index ellipsoid of each of the liquid crystal molecules 517 is as shown in FIG. 35. That is, $$n_{ox} = n_{oy} = n_o \quad (30)$$

where $n_o$ is the refractive index of an ordinary ray, and $n_{ox}$ and $n_{oy}$ are refractive indices in directions perpendicular to each other in a plane including ordinary rays.

Figure 36:
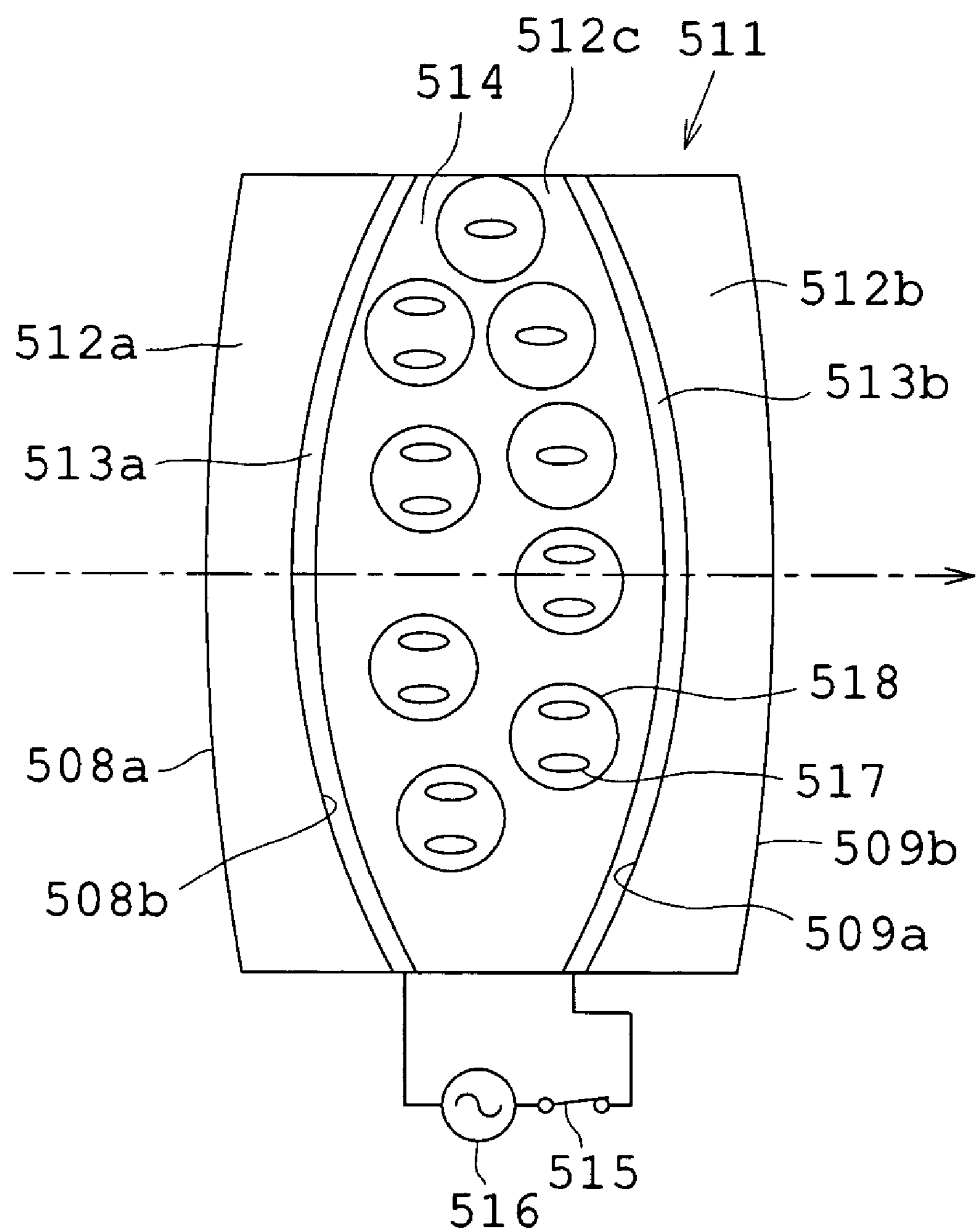
FIG. 36 is a view showing a state where an electric field is applied to a macromolecular dispersed liquid crystal layer in FIG. 34.

Here, in the case where the switch 515, as shown in FIG. 34 is turned off, that is, the electric field is not applied to the liquid crystal layer 514, the liquid crystal molecules 517 are oriented in various directions, and thus the refractive index of the liquid crystal layer 514 relative to incident light becomes high to provide a lens with strong refracting power. In contrast to this, when the switch 515, as shown in FIG. 36, is turned on and the alternating-current voltage is applied to the liquid crystal layer 514, the liquid crystal molecules 517 are oriented so that the major axis of the index ellipsoid of each liquid crystal molecule 517 is parallel with the optical axis of the variable focal-length lens 511, and hence the refractive index becomes lower to provide a lens with weaker refracting power.

Figure 37:
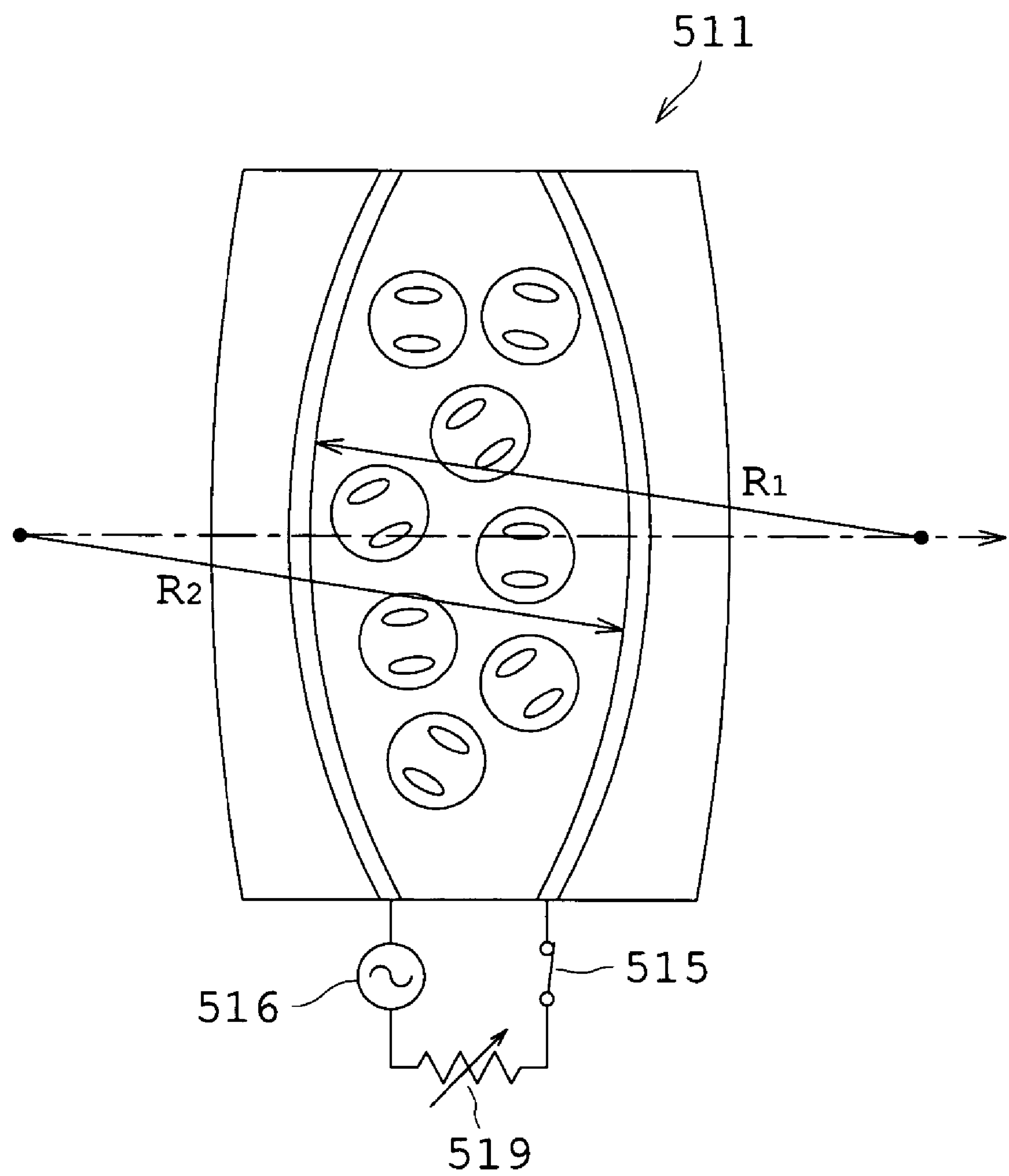
FIG. 37 is a view showing an example where a voltage applied to the macromolecular dispersed liquid crystal layer in FIG. 34 can be changed.

The voltage applied to the macromolecular dispersed liquid crystal layer 514, for example, as shown in FIG. 37, can be changed stepwise or continuously by the use of a variable resistor 519. By doing so, as the applied voltage becomes high, the liquid crystal molecules 517 are oriented so that the major axis of the index ellipsoid of each liquid crystal molecule 517 becomes progressively parallel with the optical axis of the variable focal-length lens 511, and thus the refractive index can be changed stepwise or continuously.

Here, in the case of FIG. 34, that is, in the case where the voltage is not applied to the macromolecular dispersed liquid crystal layer 514, when the refractive index in the direction of the major axis of the index ellipsoid, as shown in FIG. 35, is denoted by $n_z$, an average refractive index $n_{LC}'$ of the liquid crystal molecules 517 is roughly given by $$(n_{ox} + n_{oy} + n_z)/3 \equiv n_{LC}' \quad (31)$$

Also, when the refractive index $n_z$ is expressed as a refractive index $n_e$ of an extraordinary ray, an average refractive index $n_{LC}$ of the liquid crystal molecules 517 where Equation (30) is established is given by $$(2n_o + n_e)/3 \equiv n_{LC} \quad (32)$$

In this case, when the refractive index of each of the macromolecules constituting the macromolecular cells 518 is represented by $n_p$ and the ratio of volume between the liquid crystal layer 514 and the liquid crystal molecules 517 is represented by if, a refractive index $n_A$ of the liquid crystal layer 514 is given from the Maxwell-Garnet's law as $$n_A = ff \cdot n_{LC}' + (1 - ff) n_p \quad (33)$$

Thus, as shown in FIG. 37, when the radii of curvature of the inner surfaces of the lenses 512*a* and 512*b*, that is, the surfaces on the side of the liquid crystal layer 514, are represented by $R_1$ and $R_2$, a focal length $f_1$ of the third lens 512*c* constructed with the liquid crystal layer 514 is given by $$1/f_1 = (n_A - 1)(1/R_1 - 1/R_2) \quad (34)$$

Also, when the center of curvature is located on the image side, it is assumed that each of the radii of curvature $R_1$ and $R_2$ is positive. Refraction caused by the outer surface of each of the lenses 512*a* and 512*b* is omitted. That is, the focal length of the lens 512*c* constructed with only the liquid crystal layer 514 is given by Equation (34).

When the average refractive index of ordinary rays is expressed as $$(n_{ox}+n_{oy})/2=n_o' \quad (35)$$

a refractive index $n_B$ of the liquid crystal layer 514 in the case of FIG. 36, namely, in the case where the voltage is applied to the liquid crystal layer 514, is given by $$n_B=ff \cdot n_o'+(1-ff)n_p \quad (36)$$

and thus a focal length $f_2$ of the lens 512*c* constructed with only the liquid crystal layer 514 in this case is given by $$1/f_2=(n_B-1)(1/R_1-1/R_2) \quad (37)$$

Also, the focal length where a lower voltage than in FIG. 36 is applied to the liquid crystal layer 514 takes a value between the focal length $f_1$ given by Equation (34) and the focal length $f_2$ by Equation (37).

From Equations (34) and (37), a change rate of the focal length of the lens constructed with the liquid crystal layer 514 is given by $$|(f_2-f_1)/f_2|=|(n_B-n_A)/(n_A-1)| \quad (38)$$

Thus, in order to increase the change rate, it is merely necessary to increase the value of $|n_B-n_A$. Here, $$n_B-n_A=ff(n_o'-n_{LC}') \quad (39)$$

and hence if the value of $|n_o'-n_{LC}'|$ is increased, the change rate can be raised. Practically, since the refractive index $n_B$ of the liquid crystal layer 514 is about 1.3-2, the value of $|n_o'-n_{LC}'|$ is chosen so as to satisfy the following condition:

$$0.01 \leqq |n_o'-n_{LC}'| \leqq 10 \quad (40)$$

In this way, when ff=0.5, the focal length of the lens constructed with the liquid crystal layer 514 can be changed by at least 0.5%, and thus an effective variable focal-length lens can be obtained. Also, the value of $|n_o'-n_{LC}'|$ cannot exceed 10 because of restrictions on liquid crystal substances.

Subsequently, a description will be given of grounds for the upper limit of Condition (29). The variation of a transmittance τ where the size of each cell of a macromolecular dispersed liquid crystal is changed is described in "Transmission variation using scattering/transparent switching films" on pages 197-214 of "Solar Energy Materials and Solar Cells", Wilson and Eck, Vol. 31, Eleesvier Science Publishers B. v., 1993. In FIG. 6 on page 206 of this publication, it is shown that when the radius of each cell of the macromolecular dispersed liquid crystal is denoted by r, t=300 μm, ff=0.5, $n_p$=1.45, $n_{LC}$=1.585, and λ=500 nm, the theoretical value of the transmittance τ is about 90% if r=5 nm (D=λ/50 and D·t=·6 μm, where D and λ are expressed in nanometers), and is about 50% if r=25 nm (D=λ/10).

Here, it is assumed that t=150 μm and the transmittance τ varies as the exponential function of the thickness t. The transmittance λ in the case of t=150 μm is nearly 71% when r=25 nm (D=λ/10 and D·t=λ·15 μm). Similarly, in the case of t=75 μm, the transmittance τ is nearly 80% when r=25 nm (D=λ/10 and D·t=λ·7.5 μm).

From these results, the transmittance τ becomes at least 70–80% and the liquid crystal can be actually used as a lens, if the liquid crystal satisfies the following condition:

$$D \cdot t \leqq \lambda \cdot 15\ \mu m \quad (41)$$

Hence, for example, in the case of t=75 μm, if D≦λ/5, a satisfactory transmittance can be obtained.

The transmittance of the macromolecular dispersed liquid crystal layer 514 is raised as the value of the refractive index $n_p$ approaches the value of the refractive index $n_{LC}'$. On the other hand, if the values of the refractive indices $n_o'$ and $n_p$ are different from each other, the transmittance of the liquid crystal layer 514 will be degraded. In FIGS. 34 and 36, the transmittance of the liquid crystal layer 514 is improved on an average when the liquid crystal layer 514 satisfies the following equation:

$$n_p=(n_o'+n_{LC}')/2 \quad (42)$$

The variable focal-length lens 511 is used as a lens, and thus in both FIGS. 34 and 36, it is desirable that the transmittances are almost the same and high. For this, although there are limits to the substances of the macromolecules and the liquid crystal molecules 517 constituting the macromolecular cells 518, it is only necessary, in practical use, to satisfy the following condition:

$$n_o' \leqq n_p \leqq n_{LC}' \quad (43)$$

When Equation (42) is satisfied, Condition (41) is moderated and it is only necessary to satisfy the following condition:

$$D \cdot t \leqq \lambda \cdot 60\ \mu m \quad (44)$$

It is for this reason that, according to the Fresnel's law of reflection, the reflectance is proportional to the square of the difference of the refractive index, and thus the reflection of light at the interfaces between the macromolecules and the liquid crystal molecules 517 constituting the macromolecular cells 518, that is, a reduction in the transmittance of the liquid crystal layer 514, is roughly proportional to the square of the difference in refractive index between the macromolecules and the liquid crystal molecules 517.

In the above description, reference has been made to the case where $n_o'$≈1.45 and $n_{LC}'$≈1.585, but in a more general formulation, it is only necessary to satisfy the following condition:

$$D \cdot t \leqq \lambda \cdot 15\ \mu m \cdot (1.585-1.45)^2/(n_u-n_p)^2 \quad (45)$$

where $(n_u-n_p)^2$ is a value when one of $(n_{LC}'-n_p)^2$ and $(n_o'-n_p)^2$ is larger than the other.

In order to largely change the focal length of the variable focal-length lens 511, it is favorable that the ratio ff is as high as possible, but in the case of ff=1, the volume of the macromolecule becomes zero and the macromolecular cells 518 cease to be formable. Thus, it is necessary to satisfy the following condition:

$$0.1 \leqq ff \leqq 0.999 \quad (46)$$

On the other hand, the transmittance τ improves as the ratio ff becomes low, and hence Condition (45) may be moderated, preferably, as follows:

$$4\times10^{-6}[\mu m]^2 \leqq D \cdot t \leqq \lambda \cdot 45\ \mu m \cdot (1.585-1.45)^2/(n_u-n_p)^2 \quad (47)$$

Also, the lower limit of the thickness t, as is obvious from FIG. 34, corresponds to the diameter D, which is at least 2 nm as described above, and therefore the lower limit of D·t becomes $(2\times10^{-3}\ \mu m)^2$, namely $4\times10^{-6}[\mu m]^2$.

An approximation where the optical property of substance is represented by the refractive index is established when the diameter D is 5–10 nm or larger, as set forth in "Iwanami Science Library 8, Asteroids are coming", T. Mukai, Iwanami Shoten, p. 58, 1994. If the value of the diameter D exceeds 500 λ, the scattering of light will be changed geometrically, and the scattering of light at the interfaces between the macromolecules and the liquid crystal molecules 517 constituting the macromolecular cells 518 is increased in accordance with the Fresnel's equation of reflection. As such, in practical use, the diameter D must be chosen so as to satisfy the following condition:

$$7\ \text{nm} \leqq D \leqq 500\ \lambda \tag{48}$$

Figure 38:
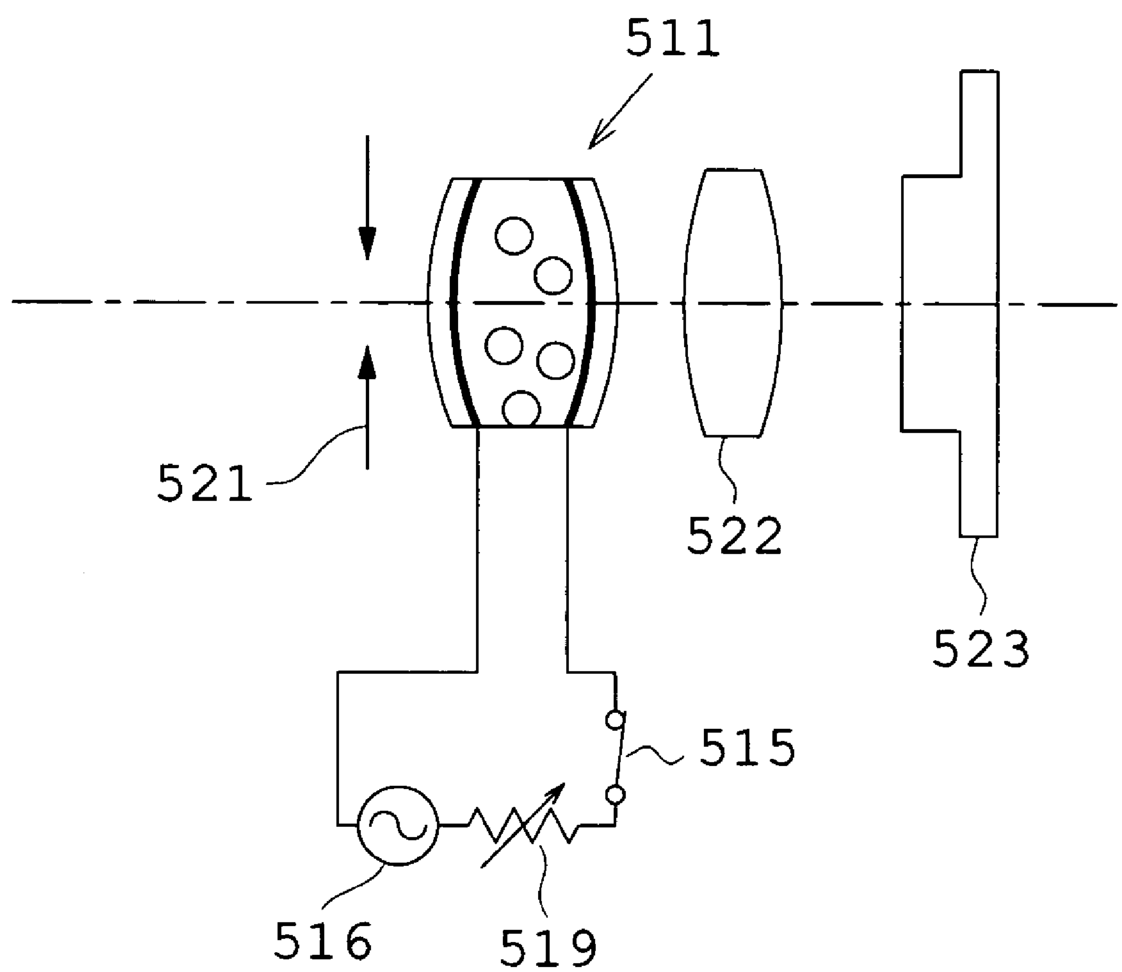
FIG. 38 is a view showing an example of an imaging optical system for digital cameras which uses the variable focal-length lens in the optical apparatus of the present invention.

FIG. 38 shows an imaging optical system using the variable focal-length lens 511 of FIG. 37 provided between an aperture stop 521 and the image sensor in the optical apparatus of the present invention, for instance, an example where the variable focal-length lens 511 is used in an imaging optical system for digital cameras. In this imaging optical system, an image of an object (not shown) is formed on a solid-state image sensor 523, such as a CCD, through the stop 521, the variable focal-length lens 511, and a lens 522. Also, in FIG. 38, the liquid crystal molecules are not shown.

According to such an imaging optical system, the alternating-current voltage applied to the macromolecular dispersed liquid crystal layer 514 of the variable focal-length lens 511 is controlled by the variable resistor 519 to change the focal length of the variable focal-length lens 511. Whereby, without moving the variable focal-length lens 511 and the lens 522 along the optical axis, it becomes possible to perform continuous focusing with respect to the object distance, for example, from the infinity to 600 mm.

Figure 39:
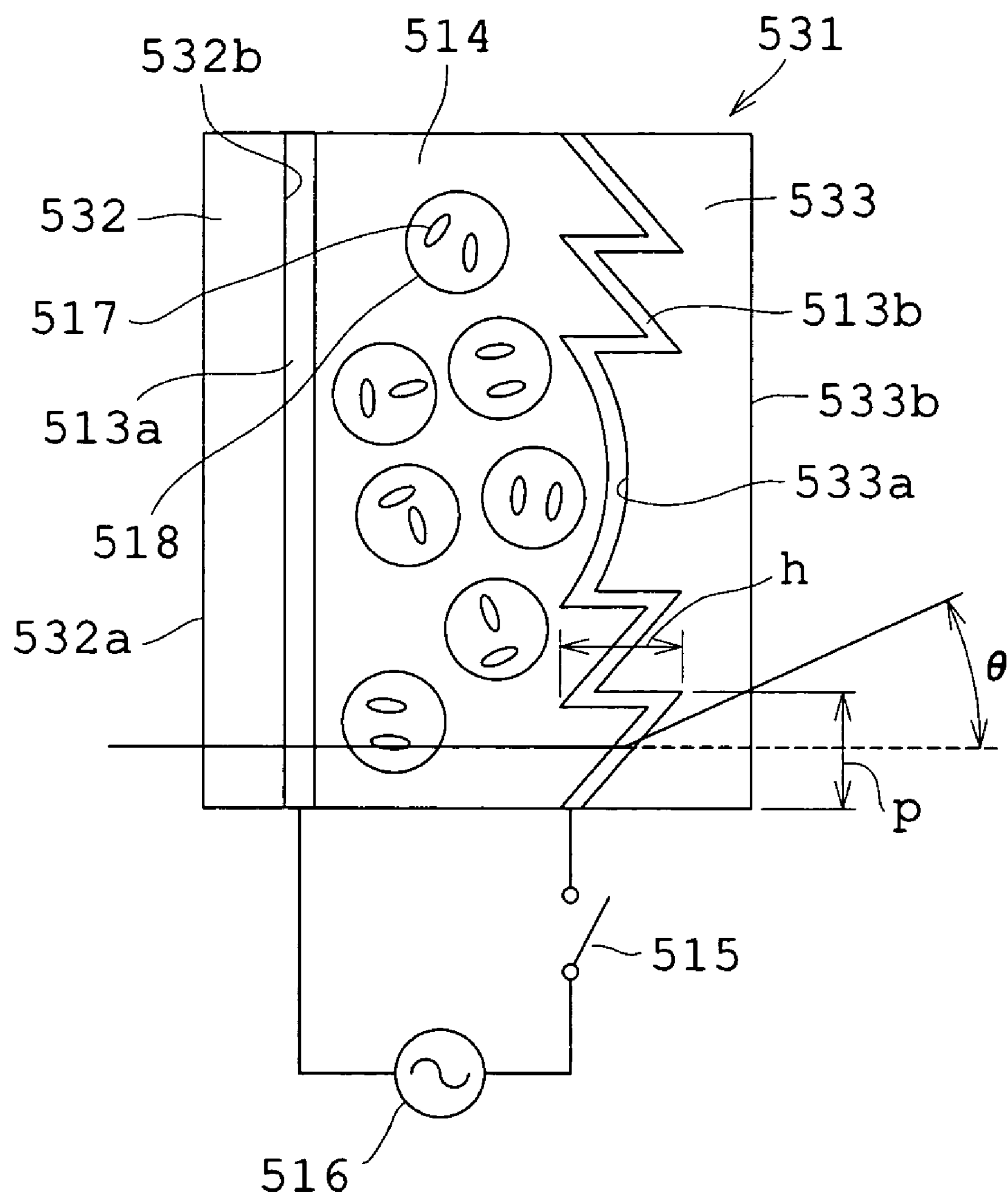
FIG. 39 is a view showing an example of a variable focal-length diffraction optical element applicable to the optical system of the optical apparatus of the present invention.

FIG. 39 shows one example of a variable focal-length diffraction optical element used so that the focal length of the imaging optical system can be changed, like the variable focal-length lens of FIG. 37, in the optical apparatus of the present invention.

A variable focal-length diffraction optical element 531 of this example includes a first transparent substrate 532 having a first surface 532*a* and a second surface 532*b* which are parallel with each other and a second transparent substrate 533 having a third surface 533*a* which is constructed with an annular diffraction grating of saw-like cross section having the depth of a groove corresponding to the wavelength of light and a fourth surface 533*b* which is flat. Incident light emerges through the first and second transparent substrates 532 and 533. Between the first and second transparent substrates 532 and 533, as in FIG. 34, the macromolecular dispersed liquid crystal layer 514 is sandwiched through the transparent electrodes 513*a* and 513*b* so that the transparent electrodes 513*a* and 513*b* are connected to the alternating-current power supply 516 through the switch 515 and the alternating-current voltage is applied to the macromolecular dispersed liquid crystal layer 514.

In such a structure, when the grating pitch of the third surface 533*a* is represented by p and an integer is represented by m, a ray of light incident on the variable focal-length diffraction optical element 531 is deflected by an angle θ satisfying the following equation:

$$p \sin \theta = m\lambda \tag{49}$$

and emerges therefrom. When the depth of the groove is denoted by h, the refractive index of the transparent substrate 533 is denoted by $n_{33}$, and an integer is denoted by k, a diffraction efficiency becomes 100% at the wavelength λ and the production of flare can be prevented by satisfying the following equations:

$$h(n_A - n_{33}) = m\lambda \tag{50}$$

$$h(n_B - n_{33}) = k\lambda \tag{51}$$

Here, the difference in both sides between Equations (50) and (51) is given by $$h(n_A - n_B) = (m-k)\lambda \tag{52}$$

Therefore, when it is assumed that λ=500 nm, $n_A$=1.55, and $n_B$=1.5, $$0.05h = (m-k)\cdot 500\ \text{nm}$$

and when m=1 and k=0, $$h = 10000\ \text{nm} = 10\ \mu\text{m}$$

In this case, it is favorable that the refractive index $n_{33}$ of the transparent substrate 533 is obtained as 1.5 from Equation (50). When the grating pitch p on the periphery of the variable focal-length diffraction optical element 531 is assumed to be 10 μm, θ≈2.87° and a lens with an F-number of 10 can be obtained.

The variable focal-length diffraction optical element 531, whose optical path length is changed by the on-off operation of the voltage applied to the liquid crystal layer 514, for example, can be used to make focus adjustment or to change the focal length of the entire lens system.

In this example, it is only necessary that Equations (50)–(52) are set in practical use to satisfy the following conditions:

$$0.7\ m\lambda \leqq h\ (n_A - n_{33}) \leqq 1.4\ m\lambda \tag{53}$$

$$0.7\ k\lambda \leqq h\ (n_A - n_{33}) \leqq 1.4\ k\lambda \tag{54}$$

$$0.7\ (m-k)\lambda \leqq h\ (n_A - n_B) \leqq 1.4\ (m-k)\lambda \tag{55}$$

Figure 40:
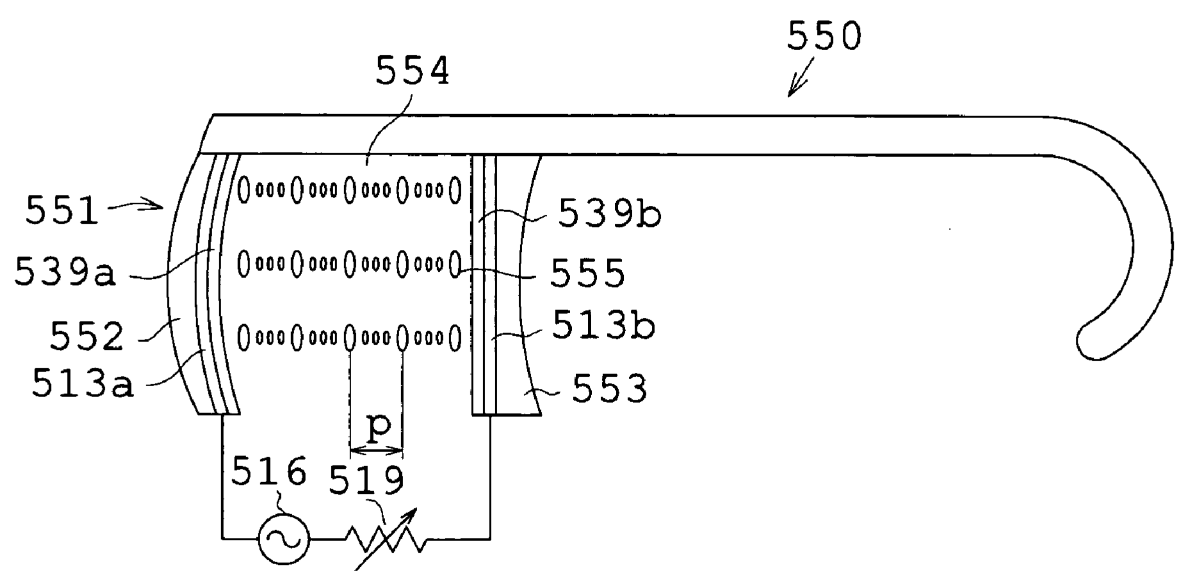
FIG. 40 is a view showing variable focal-length spectacles, each having a variable focal-length lens which uses a twisted nematic liquid crystal.
Figure 41:
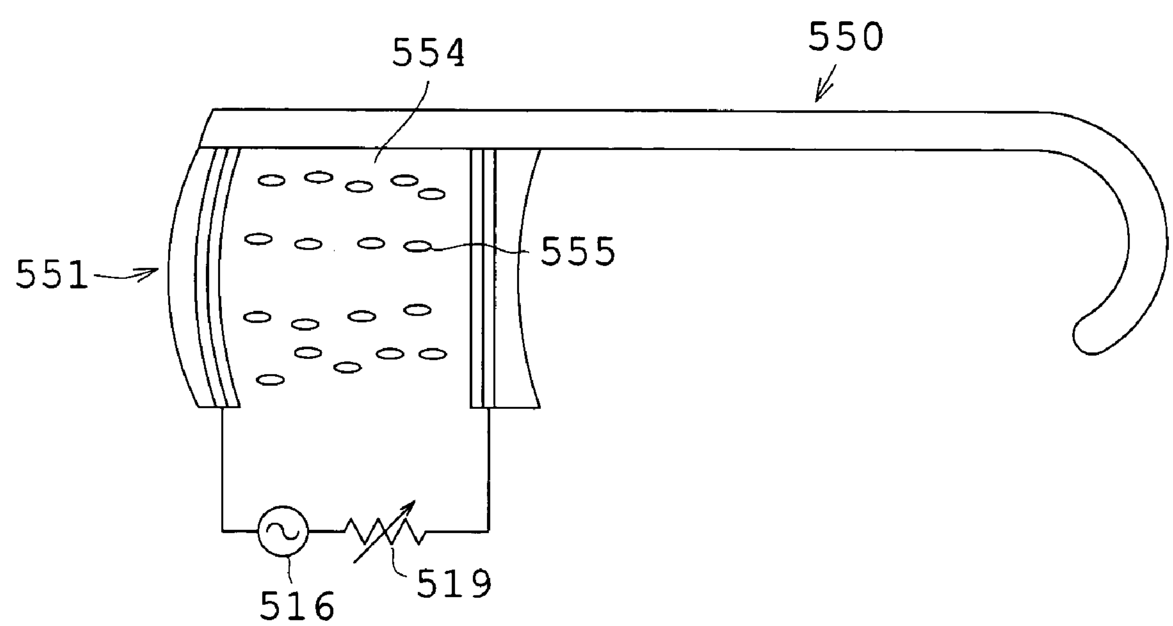
FIG. 41 is a view showing the orientation of liquid crystal molecules where a voltage applied to the twisted nematic liquid crystal layer of FIG. 40 is increased.

A variable focal-length lens using a twisted nematic liquid crystal also falls into the category of the present invention. FIGS. 40 and 41 show variable focal-length spectacles 550 in this case. A variable focal-length lens 551 has lenses 552 and 553, orientation films 539*a* and 539*b* provided through the transparent electrodes 513*a* and 513*b*, respectively, inside these lenses, and a twisted nematic liquid crystal layer 554 sandwiched between the orientation films. The transparent electrodes 513*a* and 513*b* are connected to the alternating-current power supply 516 through the variable resistor 519 so that the alternating-current voltage is applied to the twisted nematic liquid crystal layer 554.

In this structure, when the voltage applied to the twisted nematic liquid crystal layer 554 is increased, liquid crystal molecules 555, as illustrated in FIG. 41, exhibit a homeotropic orientation, so that the refractive index of the liquid crystal layer 554 is lower and the focal length is longer than in a twisted nematic state of FIG. 40 in which the applied voltage is low.

A spiral pitch P of the liquid crystal molecules 555 in the twisted nematic state of FIG. 40 must be made nearly equal to, or much smaller than, the wavelength λ of light, and thus is set to satisfy the following condition:

$$2\ \text{nm} \leqq P \leqq 2\lambda/3 \tag{56}$$

Also, the lower limit of this condition depends on the sizes of the liquid crystal molecules 555, while the upper limit is a value necessary for the behavior of the liquid crystal layer 554 as an isotropic medium in a state of FIG. 40 when incident light is natural light. If the upper limit of the condition is overstepped, the variable focal-length lens 551 is changed to a lens in which the focal length varies with the direction of deflection. Hence, a double image is formed and only a blurred image is obtained. However, when a very high degree of accuracy is not required, the upper limit of Condition (36) may be set to 3λ. In the application with less accuracy, the upper limit may be set to 5λ.

Figure 42A:
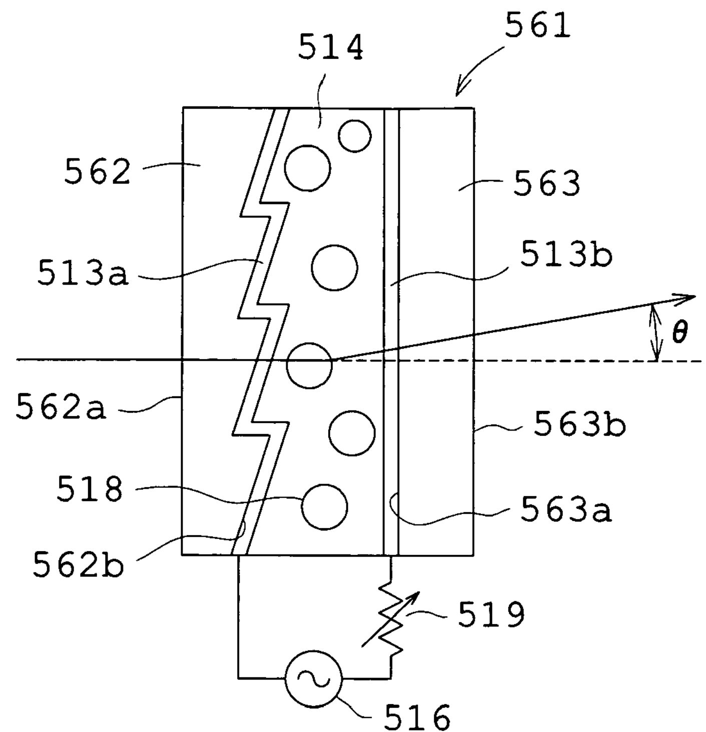
FIGS. 42A and 42B are views showing two different examples of variable deflection-angle prisms applicable to the optical system of the optical apparatus of the present invention.
Figure 42B:
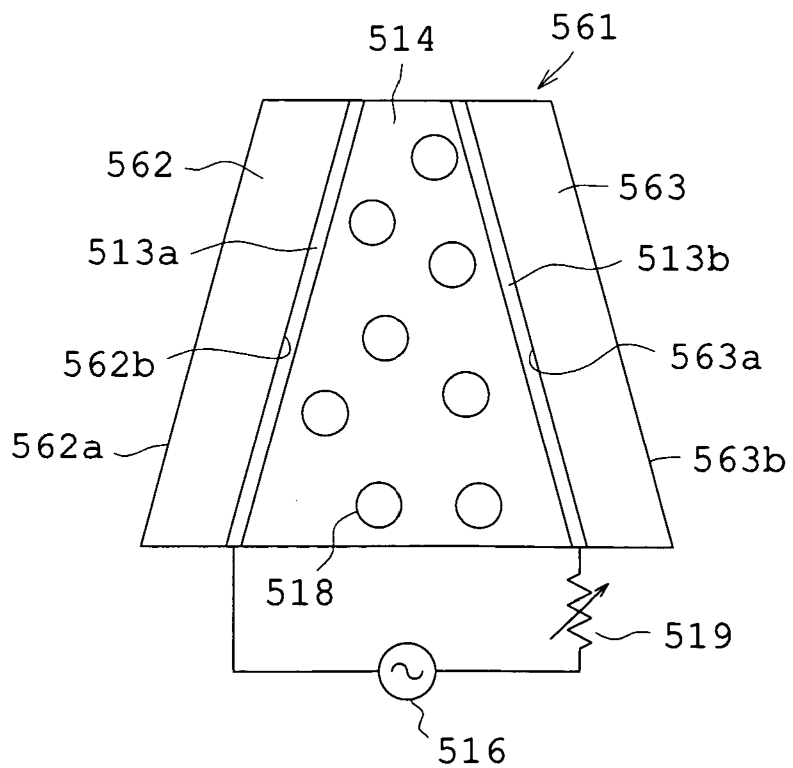

FIG. 42A shows an example of a variable deflection-angle prism applicable to the optical system used in the optical apparatus of the present invention. A variable deflection-angle prism 561 includes a first transparent substrate 562 on the entrance side, having a first surface 562*a* and a second surface 562*b*; and a second transparent substrate 563 like a plane-parallel plate on the exit side, having a third surface 563*a* and a fourth surface 563*b*. The inner surface (the second surface) 562*b* of the transparent substrate 562 on the entrance side is configured into a Fresnel form, and the macromolecular dispersed liquid crystal layer 514, as in FIG. 34, is sandwiched between this transparent substrate 562 and the transparent substrate 563 on the exit side through the transparent electrodes 513*a* and 513*b*. The transparent electrodes 513*a* and 513*b* are connected to the alternating-current power supply 516 through the variable resistor 519. Whereby, the alternating-current voltage is applied to the liquid crystal layer 514 so that a deflection angle θ of light transmitted through the variable deflection-angle prism 561 is controlled. Also, in FIG. 42A, the inner surface 562*b* of the transparent substrate 562 is configured into the Fresnel form, but as shown in FIG. 42B, the inner surfaces of the transparent substrates 562 and 563 may be configured like an ordinary prism whose surfaces are relatively inclined, or may be configured like the diffraction grating shown in FIG. 39. In the case of the latter, Equations (49)–(52) and Conditions (53)–(55) apply equally.

Figure 43:
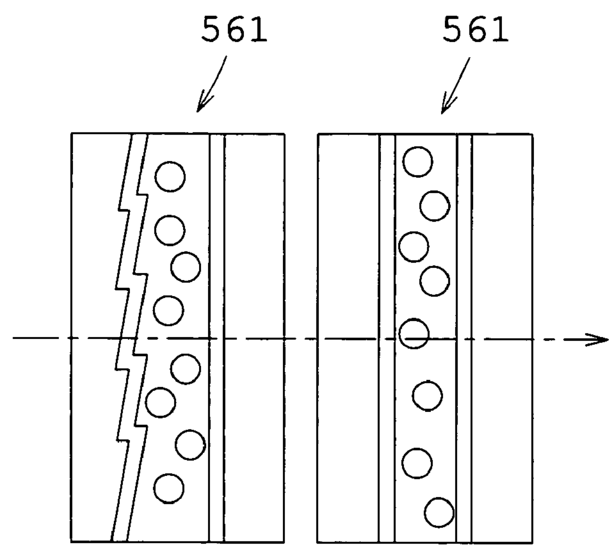

The variable deflection-angle prism 561 constructed mentioned above is used in each of the optical systems, for example, of TV cameras, digital cameras, film cameras, or binoculars, and thereby can be effectively used for shake prevention. In this case, it is desirable that the direction of refraction (deflection) of the variable deflection-angle prism 561 is vertical. In order to further improve its performance, it is desirable that two variable deflection-angle prisms 561 are arranged so that the directions of deflection of the prisms 561 are varied and as shown in FIG. 43, the refraction angles are changed in vertical and lateral directions. Also, in FIGS. 42A, 42B, and 43, the liquid crystal molecules are omitted.

Figure 44:
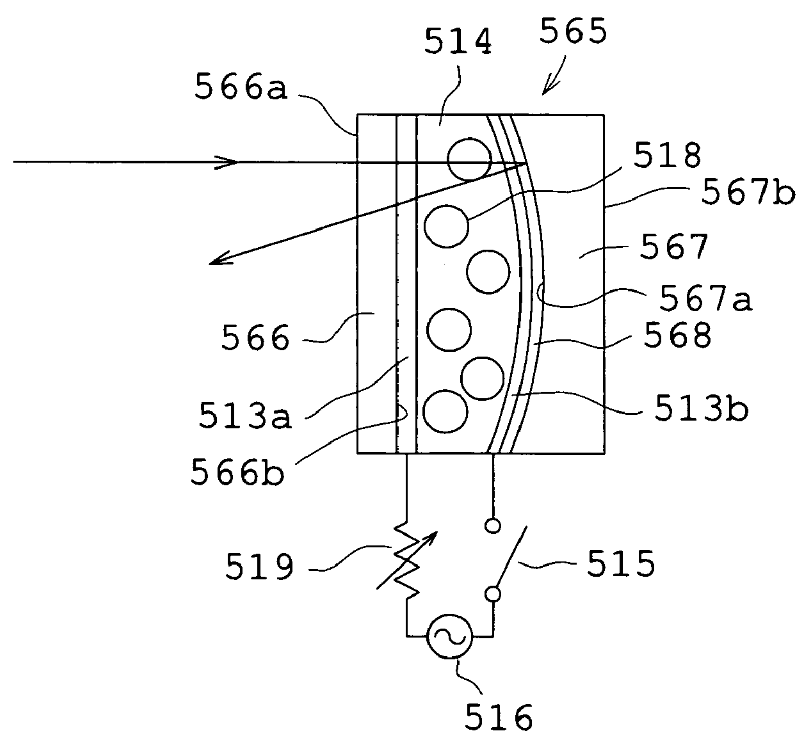
FIG. 44 is a view for explaining the applications of the variable deflection-angle prisms shown in FIGS. 42A and 42B.

FIG. 44 shows an example of a variable focal-length mirror used instead of the variable mirror, that is, configured by providing a reflecting film on one surface of the variable focal-length lens, in the optical system of the optical apparatus.

A variable focal-length mirror 565 of this example includes a first transparent substrate 566 having a first surface 566*a* and a second surface 566*b*, and a second transparent substrate 567 having a third surface 567*a* and a fourth surface 567*b*. The first transparent substrate 566 is configured into a flat plate shape or a lens shape to provide the transparent electrode 513*a* on the inner surface (the second surface) 566*b*. The second transparent substrate 567 is such that the inner surface (the third surface) 567*a* is configured as a concave surface, on which a reflecting film 568 is deposited, and the transparent electrode 513*b* is provided on the reflecting film 568. Between the transparent electrodes 513*a* and 513*b*, as in FIG. 34, the macromolecular dispersed liquid crystal layer 514 is sandwiched so that the transparent electrodes 513*a* and 513*b* are connected to the alternating-current power supply 516 through the switch 515 and the variable resistor 519, and the alternating-current voltage is applied to the macromolecular dispersed liquid crystal layer 514. Also, in FIG. 44, the liquid crystal molecules are omitted.

According to the above structure, since a ray of light incident from the side of the transparent substrate 566 is passed again through the liquid crystal layer 514 by the reflecting film (reflecting surface) 568, the function of the liquid crystal layer 514 can be exercised twice, and the focal position of reflected light can be shifted by changing the voltage applied to the liquid crystal layer 514. In this case, the ray of light incident on the variable focal-length mirror 565 is transmitted twice through the liquid crystal layer 514, and therefore when a thickness twice that of the liquid crystal layer 514 is represented by t, the conditions mentioned above can be used. Moreover, the inner surface of the transparent substrate 566 or 567 can also be configured into a diffraction grating shape, such as that shown in FIG. 39, to reduce the thickness of the liquid crystal layer 514. This offers the advantage that the amount of scattered light can be made smaller.

In the above description, in order to prevent the deterioration of the liquid crystal, the alternating-current power supply 516 is used as a voltage source to apply the alternating-current voltage to the liquid crystal. However, a direct-current power supply is used and thereby a direct-current voltage can also be applied to the liquid crystal. Techniques of shifting the orientation of the liquid crystal molecules, in addition to changing the voltage, can be achieved by changing the frequency of the electric field applied to the liquid crystal, the strength and frequency of the magnetic field applied to the liquid crystal, and the temperature of the liquid crystal. In the above description, some of macromolecular dispersed liquid crystals are close to solids, rather than liquids. In this case, therefore, one of the lenses 512*a* and 512*b*, the transparent substrates 532, the lens 538, one of the lenses 552 and 553, the transparent substrate 563 in FIG. 42A, one of the transparent substrates 562 and 563 in FIG. 42B, or one of the transparent substrates 566 and 567, may be eliminated.

The optical element of the type that the focal length of the optical element is changed by altering the refracting index of a medium, such as that described in FIGS. 34–44, has the advantages that since the shape is not changed, a mechanical design is easy and a mechanical structure becomes simple.

Figure 45:
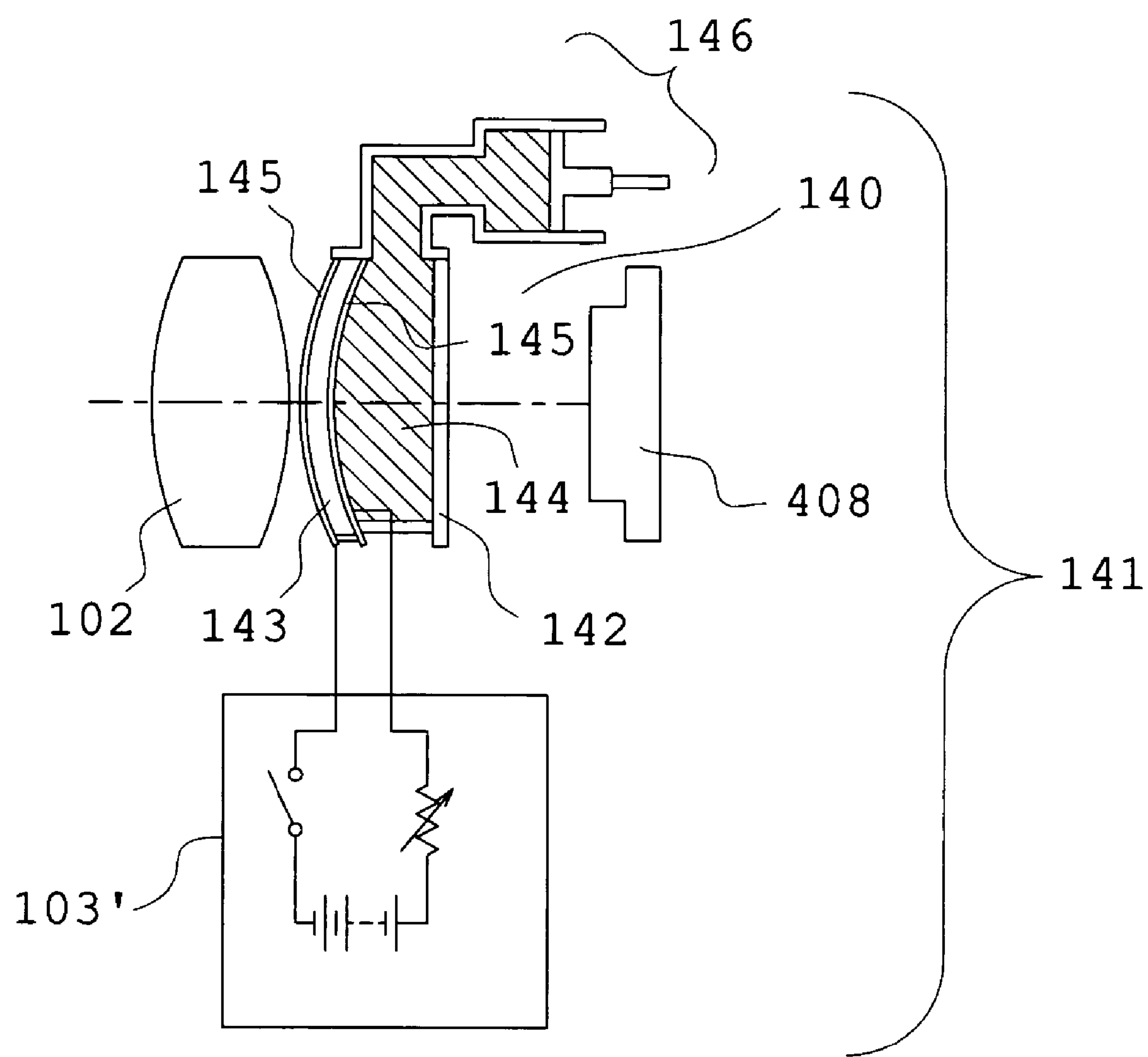
FIG. 45 is a view showing schematically the imaging optical system using another variable focal-length lens in the optical system of the optical apparatus of the present invention.

FIG. 45 shows an example of an imaging optical system using a variable focal-length lens 140 ahead of the image sensor 408 in the optical apparatus of the present invention. The imaging optical system can be used as an imaging unit 141.

In this example, a lens 102 and the variable focal-length lens 140 constitute an imaging lens system. This imaging lens system and the image sensor 408 constitute the imaging unit 141. The variable focal-length lens 140 is constructed with a transparent member 142; a soft transparent substance 143, such as piezoelectric synthetic resin, enclosed between a pair of transparent electrodes 145; and a light-transmitting fluid or a jelly-like substance 144 sandwiched between the transparent member 142 and the transparent electrode 145.

As the fluid or the jelly-like substance 144, silicon oil, elastic rubber, jelly, or water can be used. The transparent electrodes 145 are provided on both sides of the transparent substance 143, and when the voltage is applied through a circuit 103' to the transparent electrodes 145, the transparent substance 143 is deformed by the piezoelectric effect of the transparent substance 143 so that the focal length of the variable focal-length lens 140 is changed.

Thus, according to the example, even when the object distance is changed, focusing can be performed without moving the optical system with a motor, and as such the example excels in compact and lightweight design and low power consumption.

Again, in FIG. 44, reference numeral 145 denotes transparent electrodes and 146 denotes a cylinder for storing a fluid.

For the transparent substance 143, high-polymer piezoelectrics such as polyurethane, silicon rubber, acrylic elastomer, PZT, PLZT, and PVDF; vinylidene cyanide copolymer; or copolymer of vinylidene fluoride and trifluoroethylene is used.

The use of an organic substance, synthetic resin, or elastomer, having a piezoelectric property, is favorable because a considerable surface deformation of the variable focal-length lens is brought about. It is good practice to use a transparent piezoelectric substance for the variable focal-length lens.

Figure 46:
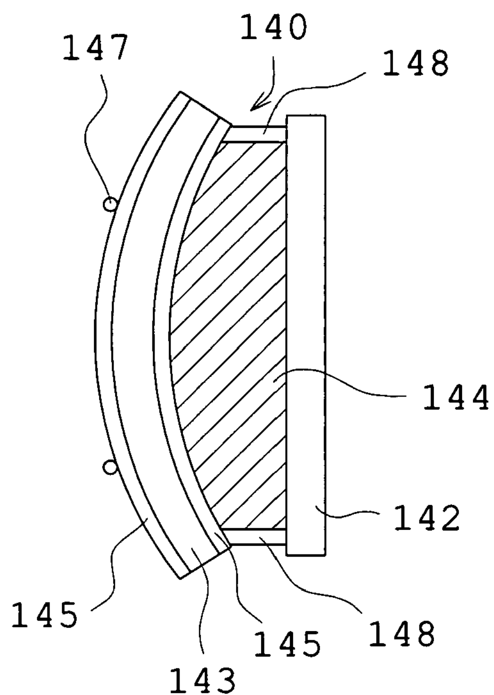
FIG. 46 is an explanatory view showing a modified example of the variable focal-length lens of FIG. 45.

In FIG. 45, instead of using the cylinder 146, the variable focal-length lens 140, as shown in FIG. 46, may be designed so that annular supporting members 147 are provided at the position parallel with the transparent member 142 and a distance between the transparent member 142 and the supporting members 147 is maintained.

Figure 47:
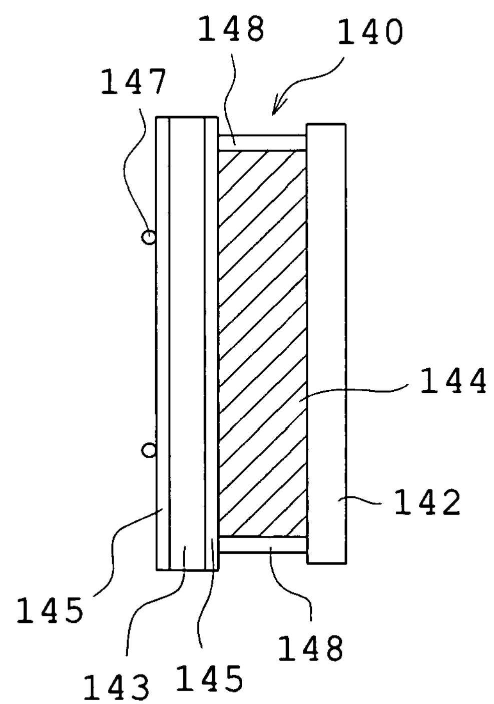
FIG. 47 is an explanatory view showing a state where the variable focal-length lens of FIG. 46 is deformed.

In FIG. 46, the transparent substance 143 enclosed between the pair of electrodes 143 and the fluid or the jelly-like substance 144 covered with a periphery-deformable member 148 are interposed between the supporting members 147 and the transparent member 142. Even when the voltage is applied to the transparent substance 143 and thereby the transparent substance 143 is deformed, as shown in FIG. 47, the deformable member 148 is deformed so that the entire volume of the variable focal-length lens 140 is not changed. As such, the cylinder 146 becomes unnecessary. In FIGS. 46 and 47, the deformable member 148 is made with an elastic body, accordion-shaped synthetic resin, or metal.

In each of the examples shown in FIGS. 45 and 46, when a reverse voltage is applied, the transparent substance 143 is deformed in a reverse direction, and thus it is also possible to construct a concave lens.

Where an electrostrictive substance, for example, acrylic elastomer or silicon rubber, is used for the transparent substance 143, it is desirable that the transparent substance 143 is constructed so that the transparent substrate and the electrostrictive substance are cemented to each other.

Figure 48:
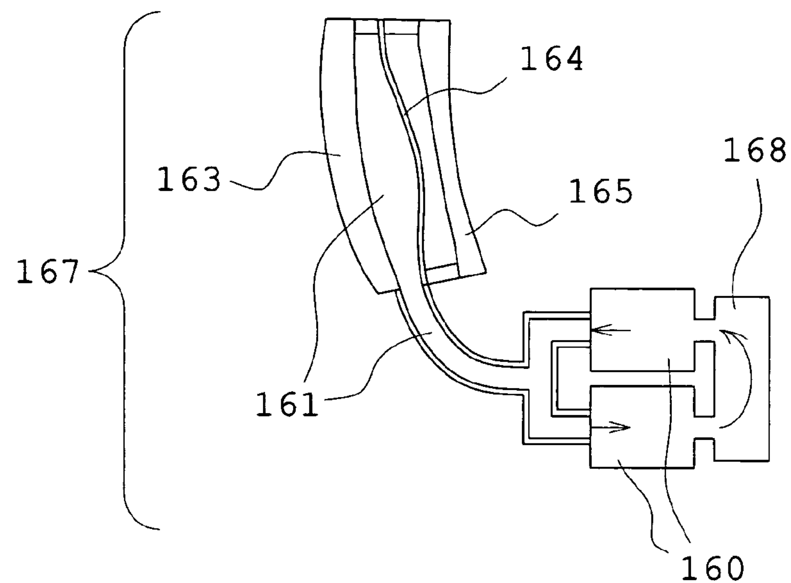
FIG. 48 is a view showing schematically another example of the variable focal-length lens applicable to the optical system of the optical apparatus of the present invention, in which a fluid is taken in and out by the micropump to deform a lens surface.

FIG. 48 shows a variable focal-length lens 167 in which the fluid 161 is taken in and out by micropumps 160 to deform the lens surface, in another example of the variable focal-length lens applicable to the imaging optical system of the optical apparatus according to the present invention.

Each of the micropumps 160 is a small-sized pump, for example, made by a micro-machining technique and is constructed so that it is operated with an electric force. The fluid 161 is sandwiched between a transparent substrate 163 and a transparent elastic body 164. In FIG. 48, reference numeral 165 represents a transparent substrate for protecting the elastic body 164, but this substrate is not necessarily required.

As examples of pumps made by the micromachining technique, there are those which use thermal deformations, piezoelectric substances, and electrostatic forces.

It is only necessary to use two micropumps, for example, like the micropumps 160 used in the variable focal-length lens of FIG. 48, each of which is the micropump 180 such as that shown in FIG. 33.

In the variable focal-length lens which uses the electrostatic force or the piezoelectric effect, a high voltage is sometimes required for drive. In this case, it is desirable that the boosting transformer or the piezoelectric transformer is used to constitute the control system. In particular, the use of a laminated piezoelectric transformer is favorable because a compact design can be achieved.

Figure 49:
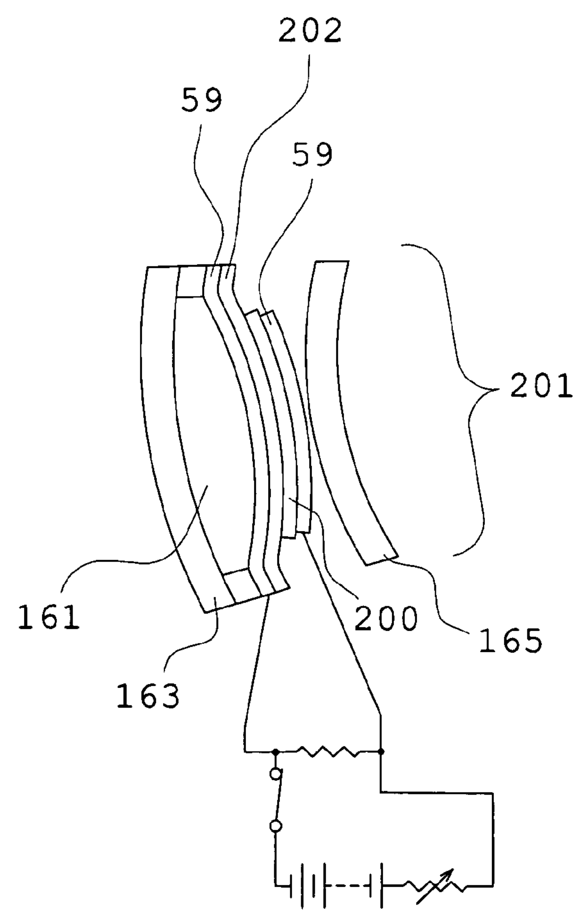
FIG. 49 is a view showing schematically another example of the variable optical-property element applicable to the optical system of the optical apparatus of the present invention, which is the variable focal-length lens using a piezoelectric substance.

FIG. 49 shows a variable focal-length lens 201 using a piezoelectric substance 200, in another example of a variable optical-property element applicable to the optical system of the optical apparatus of the present invention. The same substance as the transparent substance 143 is used for the piezoelectric substance 200, which is provided on a soft transparent substrate 202. It is desirable that synthetic resin or an organic substance is used for the substrate 202.

In the example, the voltage is applied to the piezoelectric substance 200 through two transparent electrodes 59, and thereby the piezoelectric substance 200 is deformed so that the function of a convex lens is exercised in FIG. 49.

Figure 50:
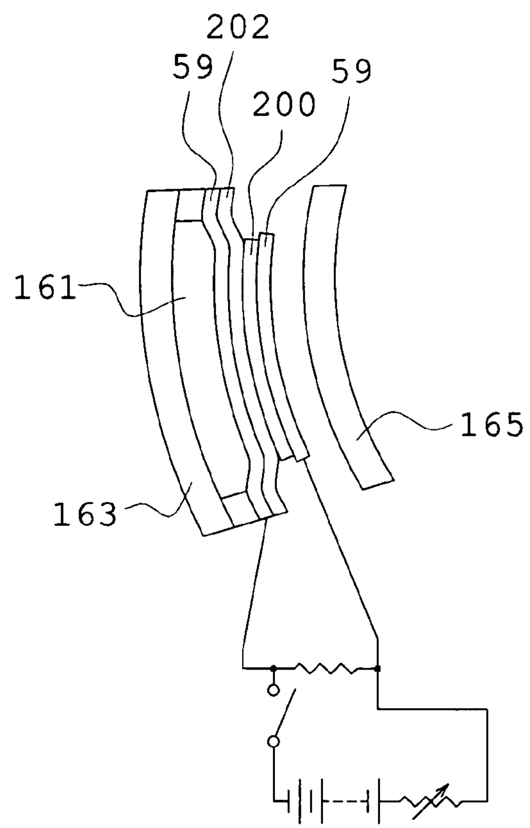
FIG. 50 is an explanatory view showing a state where the variable focal-length lens of FIG. 49 is deformed.

The substrate 202 is previously configured into a convex form, and at least one of the two transparent electrodes 59 is caused to differ in size from the substrate 202, for example, one of the electrodes 59 is made smaller than the substrate 202. In doing so, when the applied voltage is removed, only the opposite preset portions of the two transparent electrodes 59, as shown in FIG. 50, are deformed into concave shapes so as to have the function of a concave lens, acting as the variable focal-length lens.

In this case, since the substrate 202 is deformed so that the volume of the fluid 161 is not changed, there is the advantage that the liquid tank 168 becomes unnecessary.

The great advantage of this example lies in the fact that a part of the substrate 202 holding the fluid 161 is deformed by the piezoelectric substance and the liquid tank 168 is dispensed with.

The transparent substrates 163 and 165 may be constructed as lenses or plane surfaces, although the same may be said of the example of FIG. 48.

Figure 51:
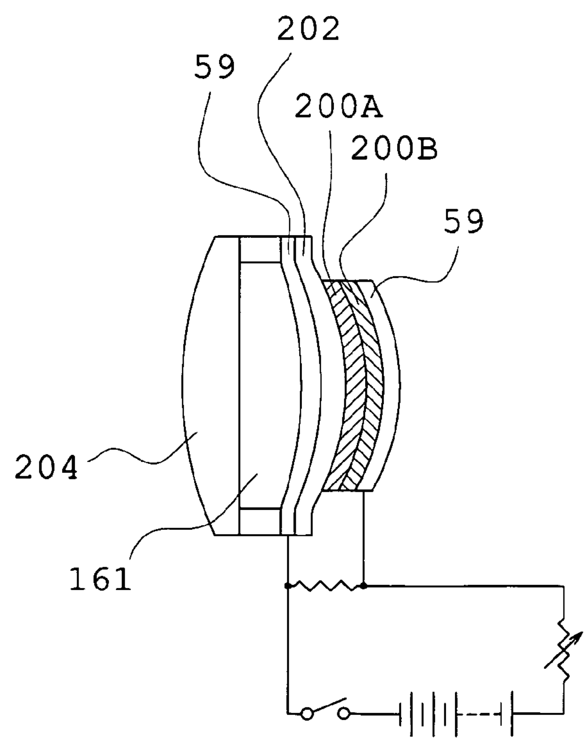
FIG. 51 is a view showing schematically still another example of the variable optical-property element applicable to the optical system of the optical apparatus of the present invention, which is the variable focal-length lens using two thin plates constructed of piezoelectric substances.

FIG. 51 shows a variable focal-length lens using two thin plates 200A and 200B constructed of piezoelectric substances, in still another example of the variable optical-property element applicable to the optical system of the optical apparatus of the present invention.

According to this example, the variable focal-length lens has the advantage that the thin plate 200A and the thin plate 200B, reversed in direction of the piezoelectric substance, are used and thereby the amount of deformation is increased so that a wide variable focal-length range can be obtained. Also, in FIG. 51, reference numeral 204 denotes a lens-shaped transparent substrate. Even in the example, the transparent electrode 59 on the right side of the figure is configured to be smaller than the substrate 202.

In the examples of FIGS. 49–51, the thicknesses of the substrate 202, the piezoelectric substance 200, and the thin plates 200A and 200B may be rendered uneven so that a state of deformation caused by the application of the voltage is controlled. This is convenient because lens aberration can also be corrected.

Figure 52:
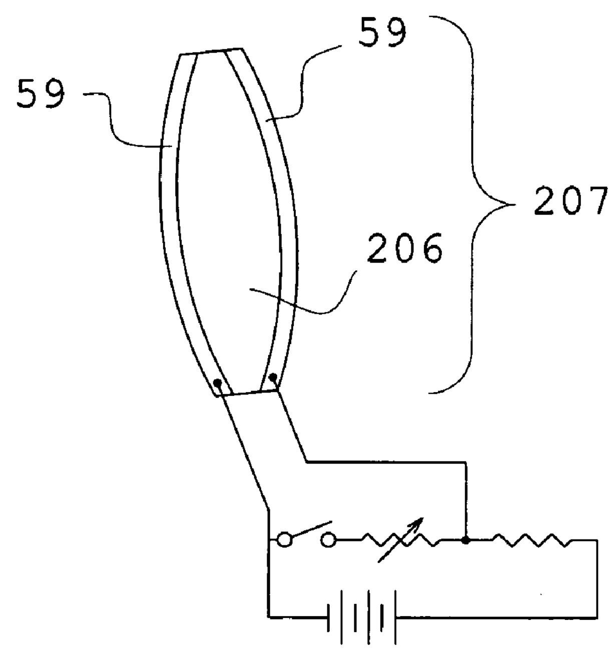
FIG. 52 is a view showing schematically still another example of the variable focal-length lens applicable to the optical system of the optical apparatus of the present invention.

FIG. 52 shows another example of the variable focal-length lens. A variable focal-length lens 207 of this example is constructed of an electrostrictive substance 206 such as silicon rubber or acrylic elastomer.

Figure 53:
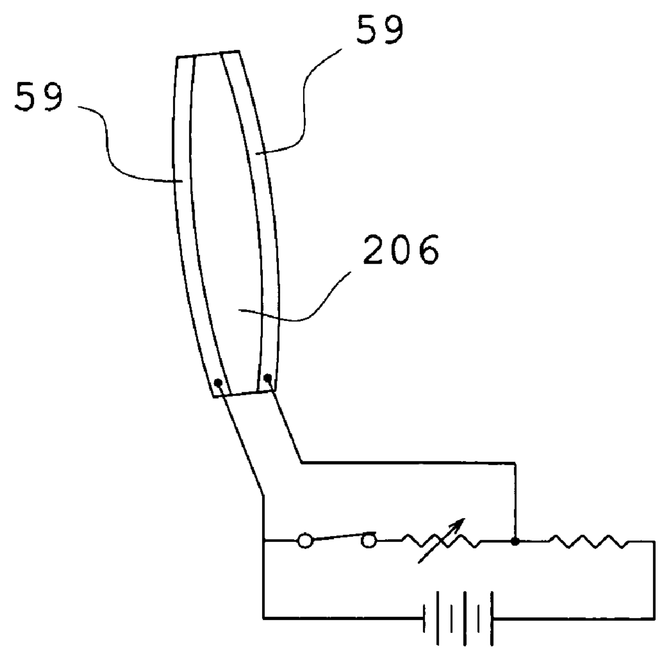
FIG. 53 is an explanatory view showing the deformation of the variable focal-length lens of FIG. 52.

When the voltage is low, the variable focal-length lens 207 constructed as mentioned above, as depicted in FIG. 52, acts as a convex lens, while when the voltage is increased, the electrostrictive substance 206, as depicted in FIG. 53, expands in a vertical direction and contracts in a lateral direction, and thus the focal length is increased. In this way, the electrostrictive substance 206 operates as the variable focal-length lens. According to the variable focal-length lens of the example, there is the advantage that since a large power supply is not required, power consumption is minimized.

The feature common to the variable focal-length lenses of FIGS. 45–53 mentioned above is that the shape of the medium acting as a lens is changed and thereby a variable focal length can be obtained. Such variable focal-length lenses, in contrast with those in which the refractive indices are changed, have the advantage that a variable focal-length range or a lens size can be arbitrarily chosen.

FIG. 54 shows a variable focal-length lens using a photomechanical effect in a further example of the variable optical-property element applicable to the optical system of the optical apparatus of the present invention. A variable focal-length lens 214 of this example is designed so that azobenzene 210 is sandwiched between transparent elastic bodies 208 and 209 and is irradiated with ultraviolet light through a transparent spacer 211. In FIG. 54, reference numerals 212 and 213 represent ultraviolet light sources, such as ultraviolet LEDs or ultraviolet semiconductor lasers, of central wavelengths $\lambda_1$ and $\lambda_2$, respectively.

In the example, when trans-type azobenzene shown in FIG. 55A is irradiated with ultraviolet light of the central wavelength $\lambda_1$, the azobenzene 210 changes to cis-type azobenzene shown in FIG. 55B to reduce its volume. Consequently, the thickness of the variable focal-length lens 214 is decreased, and the function of the convex lens is impaired.

On the other hand, when the cis-type azobenzene is irradiated with ultraviolet light of the central wavelength $\lambda_2$, the azobenzene 210 changes from the cis-type to the trans-type azobenzene to increase the volume. Consequently, the thickness of the variable focal-length lens 214 is increased, and the function of the convex lens is improved. In this way, the optical element 214 of the example acts as the variable focal-length lens.

In the variable focal-length lens 214, since the ultraviolet light is totally reflected at the interface between each of the transparent elastic bodies 208 and 209 and air, the light does not leak through the exterior and high efficiency is obtained.

Figure 56:
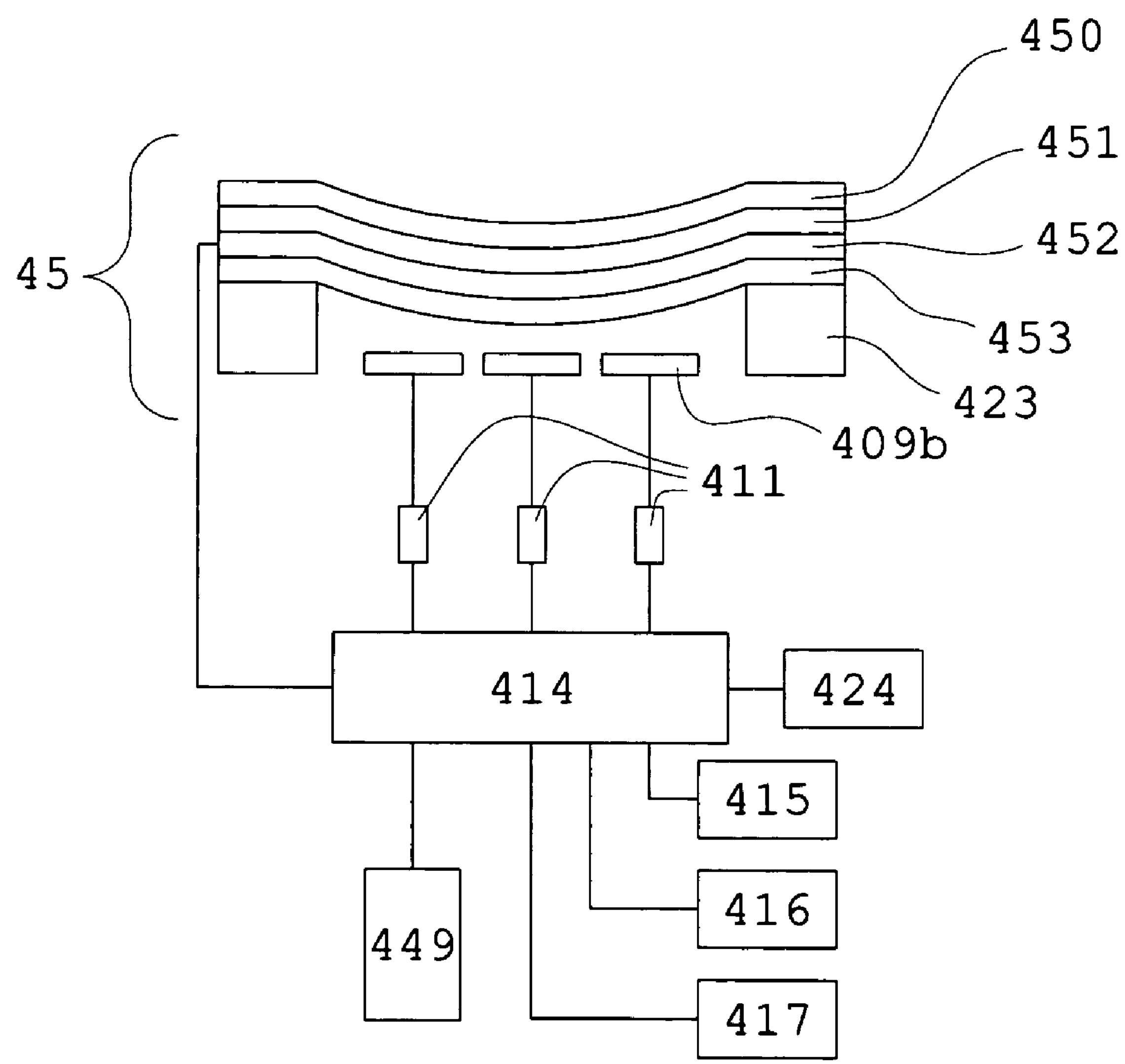
FIG. 56 is a view showing schematically another example of the variable mirror applicable to the optical system of the optical apparatus of the present invention.

FIG. 56 shows another example of the variable mirror applicable to the optical system of the optical apparatus of the present invention. This example is described on the assumption that the variable mirror is used in the imaging optical system of the digital camera. Again, in FIG. 56, reference numeral 411 designates the variable resistors housing variable resistors; 414, the arithmetical unit; 415, the temperature sensor; 416, the humidity sensor; 417, the range sensor; and 424, the shake sensor.

A variable mirror 45 of the example is constructed as a four-layer structure in which the divided electrodes 409*b* are spaced away from an electrostrictive substance 453 including an organic substance such as acrylic elastomer, whose periphery is supported by the support 423, an electrode 452 and a deformable substrate 451 are placed in turn on the electrostrictive substance 453, and a reflecting film 450 including a thin film of metal, such as aluminum, for reflecting incident light is provided on the substrate 451.

The variable mirror 45, when constructed as mentioned above, has the advantages that the surface profile of the reflecting film 450 becomes smooth and it is hard to produce aberration, in contrast to the case where the divided electrodes 409b and the electrostrictive substance 453 are integrally constructed.

Also, the deformable substrate 451 and the electrode 452 may be arranged in reverse order. In FIG. 56, reference numeral 449 stands for a button for the magnification change of the optical system. The variable mirror 45 is controlled through the arithmetical unit 414 so that when a user pushes the button 449, the reflecting film 450 can be deformed for the magnification change.

Also, instead of the electrostrictive substance including an organic substance such as acrylic elastomer, the piezoelectric substance such as barium titanate, already mentioned, may be used.

Also, although what follows is said in common with the variable mirror applicable to the optical apparatus of the present invention, it is desirable that the shape where the portion of deformation of the reflecting surface is viewed from a direction perpendicular to the reflecting surface is long along the direction of the incident plane of an axial ray, for example, elliptical, oval, or polygonal. This is because the variable mirror, as in FIG. 31, is often used in a state where a ray of light is incident at a grazing angle. In order to suppress aberration produced in this case, it is desirable that the reflecting surface has a shape similar to ellipsoid of revolution, paraboloid of revolution, or hyperboloid of revolution. This s because it is desirable that in order to deform the reflecting surface of the deformable mirror into such a shape, the shape where the portion of deformation of the reflecting surface is viewed from a direction perpendicular to the reflecting surface is long along the direction of the incident plane of the axial ray.

Figure 57A:
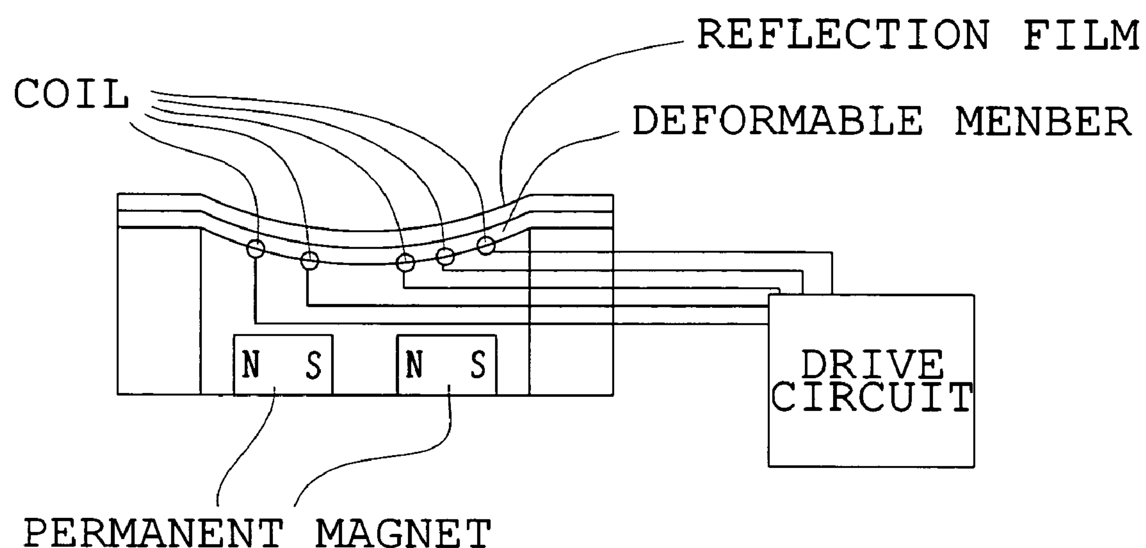
FIGS. 57A and 57B are a side view showing an electromagnetically-driven variable mirror, applicable to the optical system of the optical apparatus of the present invention, and a view looking from the opposite side of a reflecting film, respectively.
Figure 57B:
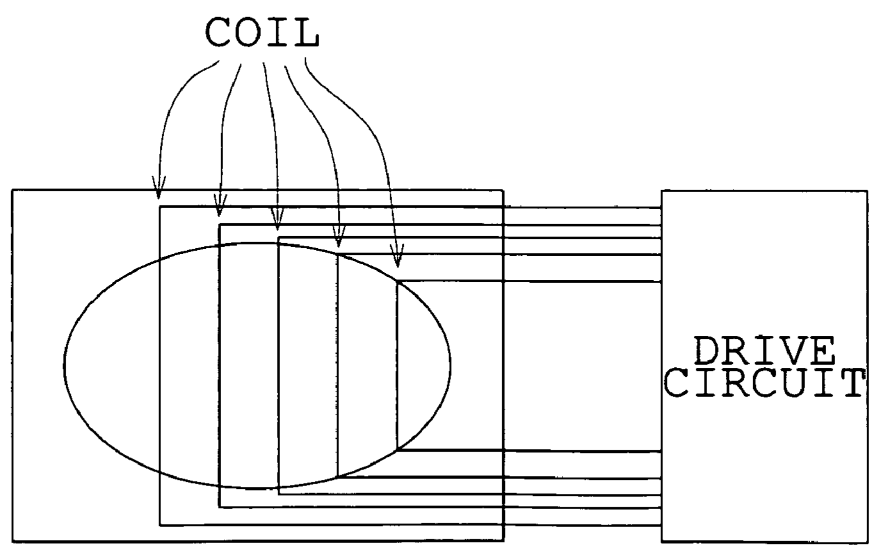

FIGS. 57A and 57B show the structure of an electromagnetic driving variable mirror applicable to the optical system of the optical apparatus of the present invention.

FIG. 57B is a diagram viewed from the opposite side of a reflecting film 409*a*. Coils (electrodes) are provided to the deformable member to supply the current from a driving circuit and thereby electromagnetic forces are produced in the magnetic fields of permanent magnets so that the shape of the mirror is changed. Since the use of thin film coils facilitates the fabrication of the coils 427 and reduces their rigidity, it is easy to deform the mirror.

Finally, the definitions of terms used in the present invention will be described.

The optical apparatus refers to an apparatus including an optical system or optical elements. The optical apparatus need not necessarily function by itself. That is, it may be thought of as a part of an apparatus.

An imaging apparatus, an observation apparatus, a display apparatus, an illumination apparatus, a signal processor, and an optical information processor come into the category of the optical apparatus.

The imaging apparatus refers to, for example, a film camera, a digital camera, a digital camera for PDAs, a robot's eye, a lens-exchangeable digital single-lens reflex camera, a TV camera, a moving-picture recorder, an electronic moving-picture recorder, a camcorder, a VTR camera, a digital camera of a mobile phone, a TV camera of a mobile phone, an electronic endoscope, a capsule endoscope, a vehicle mounted camera, a camera of an artificial satellite, a camera of a planet probe, a camera of a space probe, a monitor camera, eyes for various sensors, a digital camera of a recorder, an artificial vision, or a laser scanning microscope. Any of the digital camera, a card digital camera, the TV camera, the VTR camera, a moving-picture recording camera, the digital camera of a mobile phone, the TV camera of a mobile phone, the vehicle mounted camera, the camera of an artificial satellite, the camera of a planet probe, the camera of a space probe, and the digital camera of a recorder, is an example of an electronic imaging apparatus.

The observation apparatus refers to, for example, a microscope, a telescope, spectacles, binoculars, a magnifier, a fiber scope, a finder, a viewfinder, a contact lens, an eye lens, or an artificial vision.

The display apparatus refers to, for example, a liquid crystal display, a viewfinder, a game machine (Play Station by Sony), a video projector, a liquid crystal projector, a head mounted display (HMD), a personal digital assistant (PDA), a mobile phone, or an artificial vision.

The illumination apparatus refers to, for example, a stroboscopic lamp for cameras, a headlight for cars, a light source for endoscopes, or a light source for microscopes.

The signal processor refers to, for example, a mobile phone, a personal computer, a game machine, a read/write apparatus for optical disks, an arithmetic unit for optical computers, an optical interconnector, an optical information processor, or a PDA.

An information transmitter refers to an apparatus which is capable of inputting and transmitting any information from a mobile phone; a stationary phone; a remote control for game machines, TVs, radio-cassette tape recorders, or stereo sound systems; a personal computer; or a keyboard, mouse, or touch panel for personal computers. It also includes a TV monitor with the imaging apparatus, or a monitor or display for personal computers. The information transmitter comes into the category of the signal processor.

The image sensor refers to, for example, a CCD, a pickup tube, a solid-state image sensor, or a photographing film. The plane-parallel plate is thought of as one of prisms. A change of an observer includes a change in diopter. A change of an object includes a change in object distance. The displacement of the object includes a change of the object distance of an object to be photographed, the movement of the object, vibration, or the shake of the object.

An extended surface is defined as follows:

Any shape such as a spherical, planar, or rotational-symmetrical aspherical surface; a spherical, planar, or rotational-symmetrical aspherical surface which is decentered with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. is satisfactory. Moreover, any surface which has some effect on light, such as a reflecting or refracting surface, is satisfactory. In the present invention, it is assumed that such a surface is generally referred as to the extended surface.

The variable optical-property element includes a variable focal-length lens, a variable mirror, a deflection prism whose surface profile is changed, a variable angle prism, or a variable diffraction optical element in which the function of light deflection is changed, namely a variable HOE, or a variable DOE.

The variable focal-length lens also includes a variable lens such that the focal length is not changed, but the amount of aberration is changed. The variable mirror includes a mirror such that the focal length is not changed, but the amount of aberration is changed, a mirror provided with a reflecting surface in the variable focal-length lens, a variable focal-length mirror whose shape is not changed, or a deformable mirror whose shape is changed.

In a word, an optical element in which the function of light deflection, such as reflection, refraction, or diffraction, can be changed is called the variable optical-property element.

The present invention has the following features.

(1) The optical system comprises a plurality of rotational-symmetrical optical surfaces and at least one reflection-type variable optical-property element. The reflection-type variable optical-property element is interposed on an optical path between two rotational-symmetrical optical surfaces, and a deflection angle θ of an optical axis caused by the reflection-type variable optical-property element satisfies one of the following conditions:

$$10° < \theta < 67°$$

$$10° < \theta/npr < 67°$$

where npr is the refractive index of an optical element having an optical surface opposite to the reflection-type variable optical-property element.

(2) The optical system comprises a plurality of transmission-type rotational-symmetrical optical surfaces and a reflection-type variable optical-property element. The reflection-type variable optical-property element is interposed on an optical path between two transmission-type rotational-symmetrical optical surfaces, satisfying the following condition:

$$0.7 < |L/fw| < 50$$

where $L=L_1+L_2+ \ldots L_n \ldots +L_B$, and in the optical path between the two transmission-type rotational-symmetrical optical surfaces that are located before and behind the variable optical-property element and fail to construct the same transmissive surface, $L_1$ is a distance between a first reflecting surface from an object side and a transmission-type optical surface disposed on the object side of and being nearest to the first relfecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is a focal length of the optical system and stands for the focal length which is shortest (whose absolute value is small) when the focal length of the optical system is changed.

(3) The optical system comprises a plurality of optical surfaces including a rotational-asymmetrical optical surface; and a reflection-type varaible optical-property element. The reflection-type variable optical-property element is interposed on an optical path between two optical surfaces, and a deflection angle 0 of an optical axis caused by the reflection-type variable optical-property element satisfies the following condition:

$$10° < \theta < 67°$$

(4) The optical system comprises a rotational-asymmetrical optical surface, a plurality of transmission-type optical surfaces, and a reflection-type variable optical-property element. The reflection-type variable optical-property element is interposed on an optical path between two transmission-type optical surfaces, satisfying the following condition:

$$0.7 < |L/fw| < 50$$

where $L=L_1+L_2+ \ldots L_n \ldots +L_B$, and in the optical path between the two transmission-type optical surfaces that are located before and behind the variable optical-property element and fail to construct the same transmissive surface, $L_1$ is a distance between a first reflecting surface from an object side and a transmission-type optical surface disposed on the object side of and being nearest to the first relfecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is a focal length of the optical system and stands for the focal length which is shortest (whose absolute value is small) when the focal length of the optical system is changed.

(5) The optical system of item (1) further comprises a plurality of transmission-type rotational-symmetrical optical surfaces and a reflection-type variable optical-property element. In this case, the reflection-type variable optical-property element is interposed on an optical path between two transmission-type rotational-symmetrical optical surfaces, satisfying the following condition:

$$0.7<|L/fw|<50$$

where $L=L_1+L_2+\ldots L_n\ldots+L_B$, and in the optical path between the two transmission-type rotational-symmetrical optical surfaces that are located before and behind the variable optical-property element and fail to construct the same transmissive surface, $L_1$ is a distance between a first reflecting surface from an object side and a transmission-type optical surface disposed on the object side of and being nearest to the first relfecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is a focal length of the optical system and stands for the focal length which is shortest (whose absolute value is small) when the focal length of the optical system is changed.

(6) In the optical system of item (1) or (5), at least two reflecting surfaces are provided.

(7) In the optical system of any one of items (1), (5), and (6), at least two reflecting surfaces are arranged in succession.

(8) In the optical system of any one of items (1) and (5)–(7), the optical axis intersects.

(9) In the optical system of any one of items (1) and (5)–(7), the optical axis fails to intersect.

(10) In the optical system of item (2), at least two reflecting surfaces are provided.

(11) In the optical system of item (2) or (10), at least two reflecting surfaces are arranged in succession.

(12) In the optical system of any one of items (2), (10), and (11), the optical axis intersects.

(13) In the optical system of any one of items (2), (10), and (11), the optical axis fails to intersect.

(14) In the optical system of any one of items (1), (2), and (5)–(13), a magnification β1 of a lens unit ranging from an optical surface situated immediately behind the reflection-type variable optical-property element to the last surface satisfies the following condition:

$$0.05<|\beta 1|<1.1$$

(15) The optical system of any one of items (1), (2), and (5)–(14) has a lens unit with negative power on an object side of the reflection-type variable optical-property element and satisfies the following condition:

$$-10.0<f1/f<-0.15$$

where f1 is a focal length of the lens unit with negative power and f is a focal length of the optical system.

(16) In the optical system of any one of items (1), (2), and (5)–(15), in order to correct decentration aberration produced in the reflection-type variable optical-property element, a shift is applied to at least one lens and a tilt is applied to at least one lens or an imaging surface, satisfying one of the following conditions:

$$0.0\leq|\delta/f|<1.00$$

$$0.0°\leq|\epsilon|<20°$$

where δ is an amount of shift of the lens, ϵ is an amount of tilt of the lens, and f is a focal length of the optical system.

(17) An optical system comprises a plurality of optical surfaces including a rotational-asymmetrical optical surface and a reflection-type varaible optical-property element. The reflection-type variable optical-property element is interposed on an optical path between two optical surfaces. An optical surface is provided opposite to the reflection-type variable optical-property element, and a deflection angle θ of an optical axis caused by the reflection-type variable optical-property element satisfies one of the following conditions:

$$10°<\theta<67°$$

$$10°<\theta/npr<67°$$

where npr is a refractive index of an optical element having the optical surface opposite to the reflection-type variable optical-property element.

(18) In the optical system of item (3) or (17), the reflection-type variable optical-property element is interposed on the optical path between two transmission-type optical surfaces, satisfying the following condition:

$$0.7<|L/fw|<50$$

where $L=L_1+L_2+\ldots L_n\ldots+L_B$, and in the optical path between the two transmission-type optical surfaces that are located before and behind the variable optical-property element and fail to construct the same transmissive surface, $L_1$ is a distance between a first reflecting surface from an object side and a transmission-type optical surface disposed on the object side of and being nearest to the first relfecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is a focal length of the optical system and stands for the focal length which is shortest (whose absolute value is small) when the focal length of the optical system is changed.

(19) In the optical system of any one of items (3), (4), and (17), at least two reflecting surfaces are provided.

(20) In the optical system of any one of items (3), (4), and (17)–(19), at least two reflecting surfaces are arranged in succession.

(21) In the optical system of any one of items (3), (4), and (17)–(20), the optical axis intersects.

(22) In the optical system of any one of items (3), (4), and (17)–(20), the optical axis fails to intersect.

(23) In the optical system of any one of items (3) and (17)–(22), a magnification β1 of a lens unit ranging from an optical surface situated immediately behind the reflection-type variable optical-property element to the last surface satisfies the following condition:

$$0.05<|\beta 1|<1.1$$

(24) The optical system of any one of items (3) and (17)–(22) has a lens unit with negative power on an object side of the reflection-type variable optical-property element and satisfies the following condition:

$$-10.0<f1/f<-0.15$$

where f1 is a focal length of the lens unit with negative power and f is a focal length of the optical system.

(25) In the optical system item (3), the two optical surfaces between which the reflection-type variable optical-property element is interposed are rotational-symmetrical curved surfaces and are placed on the optical path before and behind the reflection-type variable optical-property element.

(26) The optical system has two reflecting surfaces interposed between two optical surfaces so that one of the two reflecting surfaces constitutes a reflection-type variable optical-property element. When a deflection angle of an optical axis caused by a remaining reflecting surface is denoted by ϕ, the optical system satisfies one of the following conditions:

$$45°\leqq\theta/npr+\phi\leqq 130°$$

$$90°\leqq\theta/npr+\phi\leqq 220°$$

where θ is a deflection angle of the optical axis caused by the reflection-type variable optical-property element and npr is a refractive index of an optical element having an optical surface opposite to the reflection-type variable optical-property element.

(27) The optical system of any one of items (1)-(4) has two reflecting surfaces interposed between two optical surfaces so that one of the two reflecting surfaces constitutes a reflection-type variable optical-property element. When a deflection angle of an optical axis caused by a remaining reflecting surface is denoted by ϕ, the optical system satisfies one of the following conditions:

$$45°\leqq\theta/npr+\phi\leqq 130°$$

$$90°\leqq\theta/npr+\phi\leqq 220°$$

where θ is a deflection angle of the optical axis caused by the reflection-type variable optical-property element and npr is a refractive index of an optical element having an optical surface opposite to the reflection-type variable optical-property element.

(28) The optical system has two reflecting surfaces interposed between two optical surfaces so that one of the two reflecting surfaces constitutes a reflection-type variable optical-property element. When a deflection angle of an optical axis caused by a remaining reflecting surface is denoted by ϕ, the optical system satisfies one of the following conditions:

$$25°\leqq\phi\leqq 75°$$

$$105°\leqq\phi\leqq 155°$$

(29) The optical system of any one of items (1)–(4) has two reflecting surfaces interposed between two optical surfaces so that one of the two reflecting surfaces constitutes a reflection-type variable optical-property element. When a deflection angle of an optical axis caused by a remaining reflecting surface is denoted by ϕ, the optical system satisfies one of the following conditions:

$$25°\leqq\phi\leqq 75°$$

$$105°\leqq\phi\leqq 155°$$

(30) In the optical system of any one of items (1)–(4), a periphery of an optical surface of the reflection-type variable optical-property element is fixed.

(31) The optical system of any one of items (1)–(4) constitutes a variable magnification optical system.

(32) In the optical system of any one of items (1)–(4), a lens unit located behind the reflection-type variable optical-property element is provided with at least two concave lenses.

(33) The optical system of any one of items (1)–(4), in a certain state of the optical system, satisfies one of the following conditions:

$$-10.0<f1/f<-0.15$$

$$0<|md/f1|<0.3$$

$$0<md^2/Sm<5.0\times 10^{-4}$$

$$0\leqq|Vm|<500$$

$$0\leqq|\phi DM\times f|<1.00$$

$$1.0<Cj/f<60.0$$

where f1 is a focal length of a lens unit with negative power located on an object side of the reflection-type variable optical-property element; f is a focal length of the optical system where a reflecting surface of the reflection-type variable optical-property element has a plane shape; md is a maximum amount of deformation of the reflection-type variable optical-property element; Sm is an optically effective area of the reflecting surface of the reflection-type variable optical-property element; Vm is a voltage applied to the reflection-type variable optical-property element when the focal length is changed in a case where the reflection-type variable optical-property element is drived by a voltage driving system; ϕDM is an amount proportional to a power of the reflection-type variable optical-property element; and Cj is an overall length of the optical system.

(34) In the optical system of any one of items (1)–(4), at least two optical axis bending sections are provided on the optical path.

(35) In the optical system of any one of items (1)–(4), an optical axis bending section including two reflecting surfaces is provided.

(36) In the optical system of any one of items (1)–(4), at least two optical axis bending sections, each having two reflecting surfaces, are provided on the optical path.

(37) The optical system of any one of items (1)–(4) satisfies the following conditions:

$$30° \leqq \theta \leqq 60°$$

$$30° \leqq \phi \leqq 60°$$

where θ is a bending angle of an axial principal ray caused by the reflection-type variable optical-property element and φ is a deflection angle of an optical axis caused by a remaining reflecting surface where one of two reflecting surfaces interposed on the optical path between two optical surfaces constitutes the reflection-type variable optical-property element.

(38) The optical apparatus includes the optical system of any one of items (1)–(37).

(39) The optical system comprises a plurality of optical surfaces including a rotational-symmetrical optical surface and a reflection-type varaible optical-property element. The reflection-type variable optical-property element is interposed on an optical path between two optical surfaces and a deflection angle 0 of an optical axis caused by the reflection-type variable optical-property element satisfies the following condition:

$$10° < \theta < 67°$$

(40) In the optical system of item (3), the optical surface of a rotational-symmtrical curved surface is located behind the reflection-type variable optical-property element. The reflection-type variable optical-property element is interposed on an optical path between two optical surfaces and a deflection angle 0 of an optical axis caused by the reflection-type variable optical-property element satisfies the following condition:

$$10° < \theta < 67°$$

(41) In the optical system of item (2) or (4), a transmission-type rotational-symmetrical optical surface placed behind the reflection-type variable optical-property element is a curved surface.

(42) The optical system of item (2) or (4) further comprises a rotational-symmetrical optical surface and the reflection-type variable optical-property element.

(43) The optical system of item (4) has a rotational-symmetriacl reflecting surface.

(44) The optical system of item (4) has at least two rotational-asymmetriacl optical surfaces.

(45) In the optical system of any one of items (1)–(4), relative positions of an imaging surface and the reflection-type variable optical-property element are fixed.

(46) In the optical system of any one of items (1)–(4), relative positions of an imaging surface and one of optical elements are fixed.

(47) In the optical system of any one of items (1)–(4), relative positions of an imaging surface and the most object-side optical element are fixed.

(48) In the optical system of any one of items (1)–(4), a part of optical elements is moved.

(49) in the optical system of any one of items (1)–(4), shift decentration and tilt decentration of the optical element are both zero.

(50) In the optical system of any one of items (1)–(4), an image sensor is provided, and shift decentration and tilt decentration of the optical element are not zero.

(51) In the optical system of any one of items (1)–(50), the reflection-type variable optical-property element is replaced by a variable optical-property element.

(52) In the optical system of any one of items (1)–(50), the reflection-type variable optical-property element is replaced by a reflection-type optical element.

(53) The optical apparatus includes the optical system of any one of items (1)–(52).

(54) The optical system comprises a variable optical-property element, an optical element unit with negative power, and an optical element unit with positive power. The optical element unit with negative power and the optical element unit with positive power are moved to thereby carry out a magnification change of the optical system.

(55) The optical system comprises a variable optical-property element, and further comprises, in order from the varaible optical-property element: an optical element unit with negative power and an optical element unit with positive power. The optical element unit with negative power and the optical element unit with positive power are moved to thereby carry out a magnification change of the optical system.

(56) The optical system comprises a first optical element unit with negative power; a variable optical-property element; a second optical element unit with positive power; a third optical element unit with negative power which is movable; and a fourth optical element unit with positive power which is movable. The third optical element unit and the fourth optical element unit are moved to thereby carry out a magnification change of the optical system.

(57) In the optical system of item (54), the optical element unit with positive power is located behind the optical element unit with negative power.

(58) In the optical system of item (54), the optical element unit with negative power and the optical element unit with positive power are located behind the variable optical-property element.

(59) The optical system comprises a plurality of optical surfaces and one or a plurality of variable optical-property elements. One variable optical-property element is placed on an optical path between a first optical surface and a second optical surface, and an optical element unit with negative power and an optical element unit with positive power are arranged therebehind. The optical element unit with negative power and the optical element unit with positive power are moved to thereby carry out a magnification change of the optical system.

(60) The optical system comprises a single unit with negative power, a variable optical-property element placed behind the single unit, and an optical element unit with negative power and an optical element unit with positive power, arranged behind the variable optical-property element. The optical element unit with negative power and the optical element unit with positive power are moved to thereby carry out a magnification change of the optical system.

(61) The optical system of item (56) or (60), in a certain state of the optical system, satisfies the following condition:

$$-10.0 < f1/f < -0.15$$

where f1 is a focal length of the single unit with negative power and f is a focal length of the optical system.

(62) The optical system of item (56), (60), or (61), in a certain state of the optical system, satisfies the following conditions:

$$R1 < 0$$

$$|R1/f| > 1.0$$

where R1 is a radius of curvature of an object-side surface of a concave lens in the single unit with negative power and f is a focal length of the optical system.

(63) The optical system of any one of items (54)–(62), in a certain state of the optical system, satisfies the following condition:

$$|f_3/f|1.0$$

where $f_3$ is a focal length of the optical element unit with negative power and f is a focal length of the optical system.

(64) In the optical system of any one of items (1)–(60), a lens unit is located behind the optical element unit with positive power which is movable.

(65) In the optical system of any one of items (1)–(60), a lens unit with positive power is located behind the optical element unit with positive power which is movable.

(66) The optical system of any one of items (54)–(65) has a rotational-symmetrical optical surface.

(67) In the optical system of any one of items (54)–(66), at least two concave lenses are located behind the variable optical-property element.

(68) In the optical system of any one of items (54)–(67), a cemented lens is located behind the variable optical-property element.

(69) The optical system of any one of items (1)–(68) satisfies one of the following conditions:

$$0.05<|\beta 1|<1.3$$

$$0.0 \leqq \delta/f|<1.00$$

$$0.0° \leqq |\epsilon|<20°$$

where β1 is a magnification of a lens unit ranging from an optical surface situated immediately behind the variable optical-property element to a last surface, δ is an amount of shift applied to at least one lens, ϵ is an amount of tilt applied to at least one lens or an imaging surface, and f is a focal length of the optical system.

(70) The optical system of any one of items (54)–(68) satisfies the following condition:

$$1.0<Cj/f<60.0$$

where Cj is an overall length of the optical system and f is a focal length of the optical system.

(71) The optical system of any one of items (54)–(68) has a reflecting surface.

(72) The optical system of any one of items (54)–(68) has at least two reflecting surfaces.

(73) In the optical apparatus provided with the optical system of any one of items (54)–(72), relative positions of an image sensor and a frame, a fixed section, a non-moving section, or a non-deforming section of the variable optical-property element are fixed.

(74) In the optical apparatus provided with the optical system of any one of items (54)–(72), relative positions of the most object-side optical element and a frame, a fixed section, a non-moving section, or a non-deforming section of the variable optical-property element are fixed.

(75) In the optical apparatus provided with the optical system of any one of items (54)–(72), an image sensor is provided and an imaging surface of the image sensor fails to intersect perpendicularly with an optical axis.

(76) In the optical system of any one of items (54)–(71), (73), or (75), focusing is performed by the variable optical-property element.

(77) In the optical system of any one of items (54)–(76), the variable optical-property element is a reflection-type variable optical-property element.

(78) In the optical system of any one of items (54)–(76), the variable optical-property element is a variable mirror.

(79) In the optical system of any one of items (54)–(78), the variable optical-property element is a deformable mirror.

(80) In the optical system item (79), a surface profile of the deformable mirror is rotational asymmetrical.

(81) In the optical system of item (79), a periphery of a reflecting surface of the deformable mirror is fixed.

(82) The optical system of any one of items (77)–(81), in a certain state of the optical system, satisfies one of the following conditions:

$$0<|md/f|<0.3$$

$$0<md^2/Sm<5.0\times10^{-4}$$

$$0 \leqq |Vm|<500$$

$$0 \leqq |\phi DM \times f|<1.00$$

where md is a maximum amount of deformation of the deformable mirror; Sm is an optically effective area of the reflecting surface of the deformable mirror; Vm is a voltage applied to the deformable mirror; ϕDM is an amount proportional to a power of the deformable mirror; and f is a focal length of the optical system.

(83) The optical system of any one of items (77)–(81), in a certain state of the optical system, satisfies the following condition:

$$10°<\theta<120°$$

where θ is a bending angle of an axial principal ray caused by the variable mirror.

(84) The optical system of any one of items (71) and (77)–(81), in a certain state of the optical system, satisfies one of the following conditions:

$$30° \leqq \theta \leqq 60°$$

$$30° \leqq \phi \leqq 60°$$

where θ is a bending angle of an axial principal ray caused by the variable mirror and ϕ is a deflection angle of an optical axis caused by a remaining reflecting surface where one of two reflecting surfaces interposed on the optical path between two optical surfaces constitutes the variable mirror.

(85) In the optical system of any one of items (54)–(76), the variable optical-property element is a variable focal-length lens.

(86) In the optical system of any one of items (54)–(76), a reflecting surface whose power is not changed is used instead of the variable optical-property element.

(87) The optical system of any one of items (54)–(86) has an image sensor and/or a display element.

(88) In the optical system of any one of items (54)–(87), relative positions of an object and an image are replaced.

(89) The optical apparatus uses the optical system of any one of items (71)–(88).

(90) The optical system comprises an optical element unit including a variable optical-property element and at least two optical element units. At least three optical element units are moved to thereby carry out a magnification change of the optical system.

(91) The optical system comprises an optical element unit including a variable optical-property element and at least two optical element units. The optical element unit including the variable optical-property element and the at least two optical element units are moved to thereby carry out a magnification change of the optical system.

(92) The optical system comprises an optical element unit including a variable optical-property element and at least three optical element units. At least three of optical element units excluding the variable optical-property element are moved to thereby carry out a magnification change of the optical system.

(93) The optical system of any one of items (90)–(92) further comprises at least one optical element unit.

(94) In the optical system of any one of items (90)–(92), an optical element unit is located behind three optical element units which are movable.

(95) The optical system comprises an optical element unit including a variable optical-property element and at least three optical element units located therebehind. The at least three optical element units are moved to thereby carry out a magnification change of the optical system.

(96) In the optical system of any one of items (90)–(95), one of the optical element units has positive power.

(97) In the optical system of any one of items (90)–(95), one of the optical element units has negative power.

(98) In the optical system of any one of items (90)–(95), one of the optical element units has positive power and one of remaining optical element units has negative power.

(99) The optical system comprises an optical element unit located ahead of a variable optical-property element and at least three optical element units located behind the variable optical-property element. The at least three optical element units are moved to thereby carry out a magnification change of the optical system.

(100) In the optical system of item (99), one of four optical element units has positive power.

(101) In the optical system of item (99), one of four optical element units has negative power.

(102) In the optical system of item (99), one of four optical element units has positive power and one of remaining optical element units has negative power.

(103) In the optical system of item (99), one of the optical element units located behind the variable optical-property element is a moving unit with positive power.

(104) In the optical system of item (99), one of the optical element units located behind the variable optical-property element is a moving unit with negative power.

(105) In the optical system of item (99), one of the optical element units located behind the variable optical-property element is a moving unit with positive power and one of remaining optical element units is a moving unit with negative power.

(106) The optical system of item (97), (98), (101), or (102), in a certain state of the optical system, satisfies Condition (24).

(107) In the optical system of item (99), an optical element unit is located behind the three optical element units which are movable.

(108) In the optical system of item (99), the optical element unit located ahead of a variable optical-property element has negative power.

(109) The optical system of any one of items (99)–(108) satisfies the following condition:

$$-10.0<f1/f<-0.15$$

where f1 is a focal length of the optical element unit located on an object side of the variable optical-property element and f is a focal length of the optical system.

(110) The optical system of any one of items (99)–(108), in a certain state of the optical system, satisfies the following condition:

$$|R1/f|>1.0$$

where R1 is a radius of curvature of an object-side surface of the optical element unit with negative power located on an object side of the variable optical-property element and f is a focal length of the optical system.

(111) The optical system of any one of items (90)–(110) has a rotational-symmetrical optical surface.

(112) In the optical system of any one of items (90)–(111), at least two concave lenses are located behind the variable optical-property element.

(113) In the optical system of any one of items (90)–(112), a cemented lens is located behind the variable optical-property element.

(114) The optical system of any one of items (90)–(113), in a certain state of the optical system, satisfies one of the following conditions:

$$0.05<|\beta 1|<1.3$$

$$0.0\leqq|\delta/f|<1.00$$

$$0.0°\leqq|\epsilon|<20°$$

where β1 is a magnification of an optical element unit ranging from an optical surface situated immediately behind the variable optical-property element to a last surface, δ is an amount of shift defined as a distance between a center axis of an optical element unit to which a shift is applied and a Z axis of the optical system, f is a focal length of the optical system, and ε is an inclination angle made by the center axis of a lens or an optical element unit to which a tilt is applied, with the Z axis of the optical system.

(115) An optical system of any one of items (90)–(114), in a certain state of the optical system, satisfies the following condition:

$$1.0<Cj/f<60.0$$

where Cj is an overall length of the optical system and f is a focal length of the optical system.

(116) The optical system of any one of items (90)–(115) has a reflecting surface.

(117) The optical system of any one of items (90)–(115) has at least two reflecting surfaces.

(118) In the optical apparatus provided with the optical system of any one of items (90)–(117), relative positions of an image sensor and the variable optical-property element are fixed.

(119) In the optical apparatus provided with the optical system of any one of items (90)–(117), relative positions of an image sensor and a frame, a fixed section, a non-moving section, or a non-deforming section of the variable optical-property element are fixed.

(120) In the optical apparatus provided with the optical system of any one of items (90)–(117), relative positions of the most object-side optical element and the variable optical-property element are fixed.

(121) In the optical apparatus provided with the optical system of any one of items (90)–(117), relative positions of the most object-side optical element and a frame, a fixed section, a non-moving section, or a non-deforming section of the variable optical-property element are fixed.

(122) In the optical apparatus provided with an optical system of any one of items (90)–(121), an image sensor is provided and an imaging surface of the image sensor fails to intersect perpendicularly with an optical axis.

(123) In the optical system, the optical apparatus using the optical system, or the optical apparatus, of any one of items (90)–(122), focusing is performed by the variable optical-property element.

(124) In the optical system, the optical apparatus using an optical system, or the optical apparatus, of any one of items (90)–(123), the variable optical-property element is a reflection-type variable optical-property element.

(125) In the optical system or the optical apparatus, of any one of items (90)–(123), the variable optical-property element is a variable mirror.

(126) In the optical system or the optical apparatus, of any one of items (90)–(123), the variable optical-property element is a deformable mirror.

(127) In the optical system or the optical apparatus, of item (126), the surface profile of the deformable mirror is rotational asymmetrical.

(128) In the optical system or the optical apparatus, of item (126), a periphery of a reflecting surface of the deformable mirror is fixed.

(129) The optical system or the optical apparatus, of any one of items (124)–(128), in a certain state of the optical system, satisfies one of the following conditions:

$$0<|md/f|<0.3$$

$$0<md^2/Sm<5.0\times10^{-4}$$

$$0\leqq|Vm|<500$$

$$0\leqq|\phi DM\times f|<1.00$$

where md is a maximum amount of deformation of the deformable mirror; Sm is an optically effective area of the reflecting surface of the deformable mirror; Vm is a voltage applied to the deformable mirror; φDM is an amount proportional to a power of the deformable mirror; and f is a focal length of the optical system.

(130) The optical system or the optical apparatus, of any one of items (116), (117), and (124)–(128), in a certain state of the optical system, satisfies the following condition:

$$10°<\theta<120°$$

where θ is a bending angle of an axial principal ray caused by the variable mirror.

(131) The optical system or the optical apparatus, of any one of items (116), (117), and (124)–(128), in a certain state of the optical system, satisfies one of the following conditions:

$$30°\leqq\theta\leqq60°$$

$$30°\leqq\phi\leqq60°$$

where θ is a bending angle of an axial principal ray caused by the variable mirror and φ is a deflection angle of an optical axis caused by a remaining reflecting surface where one of two reflecting surfaces interposed on the optical path between two optical surfaces constitutes the variable mirror.

(132) In the optical system of any one of items (90)–(123), the variable optical-property element is a variable focal-length lens.

(133) In the optical system of any one of items (90)–(123), a reflecting surface whose power is not changed is used instead of the variable optical-property element.

(134) The imaging apparatus comprises the optical system of any one of items (90)–(133), an image sensor, and a display element.

(135) In the optical system or the optical apparatus, of any one of items (90)–(134), relative positions of an object and an image are replaced.

What is claimed is:

1. An optical system comprising:

a plurality of optical surfaces including a rotational-symmetrical optical surface; and a reflection-type varaible optical-property element, the reflection-type variable optical-property element being interposed on an optical path between two optical surfaces, a deflection angle θ of an optical axis caused by the reflection-type variable optical-property element satisfying the following condition:

$$10°<\theta<67°.$$

2. An optical system comprising:

a plurality of transmission-type rotational-symmetrical optical surfaces; and a reflection-type variable optical-property element, the reflection-type variable optical-property element being interposed on an optical path between two transmission-type rotational-symmetrical optical surfaces, satisfying the following condition:

$$0.7<|L/fw|<50$$

where $L=L_1+L_2+\ldots L_n\ldots+L_B$, and in the optical path between the two transmission-type rotational-symmetrical optical surfaces that are located before and behind the variable optical-property element and fail to construct the same transmissive surface, $L_1$ is a distance between a first reflecting surface from an object side and a transmission-type optical surface disposed on the object side of and being nearest to the first relfecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is a focal length of the optical system and stands for the focal length which is shortest (whose absolute value is small) when the focal length of the optical system is changed.

3. An optical system comprising:

a plurality of optical surfaces including a rotational-asymmetrical optical surface; and a reflection-type varaible optical-property element, the reflection-type variable optical-property element being interposed on an optical path between two optical surfaces, a deflection angle θ of an optical axis caused by the reflection-type variable optical-property element satisfying the following condition:

$$10°<\theta<67°.$$

4. An optical system comprising:

a rotational-asymmetrical optical surface;

a plurality of transmission-type optical surfaces; and a reflection-type variable optical-property element, the reflection-type variable optical-property element being interposed on an optical path between two transmission-type optical surfaces, satisfying the following condition:

$$0.7<|L/fw|<50$$

where $L=L_1+L_2+ \ldots L_n \ldots +L_B$, and in the optical path between the two transmission-type optical surfaces that are located before and behind the variable optical-property element and fail to construct the same transmissive surface, $L_1$ is a distance between a first reflecting surface from an object side and a transmission-type optical surface disposed on the object side of and being nearest to the first relfecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is a focal length of the optical system and stands for the focal length which is shortest (whose absolute value is small) when the focal length of the optical system is changed.

5. An optical system according to claim 1, wherein a plurality of transmission-type rotational-symmetrical optical surfaces are included in the plurality of optical surfaces and wherein the reflection-type variable optical-property element is interposed on an optical path between two transmission-type rotational-symmetrical optical surfaces, satisfying the following condition:

$$0.7<|L/fw|<50$$

where $L=L_1+L_2+ \ldots L_n \ldots +L_B$, and in the optical path between the two transmission-type rotational-symmetrical optical surfaces that are located before and behind the variable optical-property element and fail to construct the same transmissive surface, $L_1$ is a distance between a first reflecting surface from an object side and a transmission-type optical surface disposed on the object side of and being nearest to the first relfecting surface; $L_2$ is a distance between the first reflecting surface and a second reflecting surface; $L_n$ is a distance between an (n−1)th reflecting surface and an nth reflecting surface; $L_B$ is a distance between a rearmost reflecting surface and a transmission-type optical surface disposed on the image side of and being nearest to the rearmost reflecting surface and stands for a distance where the optical surface is moved closest to the variable optical-property element when the most image-side transmission-type optical surface is moved; and fw is a focal length of the optical system and stands for the focal length which is shortest (whose absolute value is small) when the focal length of the optical system is changed.

6. An optical system according to claim 1 or 5, having at least two reflecting surfaces.

7. An optical system according to claim 1, wherein the optical axis intersects.

8. An optical system according to claim 2, having at least two reflecting surfaces.

9. An optical system according to claim 2, wherein the optical axis intersects.

10. An optical system accordng to claim 1 or 2, wherein a magnification β1 of a lens unit ranging from an optical surface situated immediately behind the reflection-type variable optical-property element to the last surface satisfies the following condition:

$$0.05<|\beta 1|<1.1$$

11. An optical system according to claim 1 or 2, having a lens unit with negative power on an object side of the reflection-type variable optical-property element and satisfying the following condition:

$$-10.0<f1/f<-0.15$$

where f1 is a focal length of the lens unit with negative power and f is a focal length of the optical system.

12. An optical system according to claim 1 or 2, wherein in order to correct decentration aberration produced in the reflection-type variable optical-property element, a shift is applied to at least one lens and a tilt is applied to at least one lens or an imaging surface, satisfying one of the following conditions:

$$0.0\leq|\delta/f|<1.00$$

$$0.0°\leq|\epsilon|<20°$$

where δ is an amount of shift of the lens, ε is an amount of tilt of the lens, and f is a focal length of the optical system.

13. An optical system comprising:

a plurality of optical surfaces including a rotational-asymmetrical optical surface; and a reflection-type varaible optical-property element, the reflection-type variable optical-property element being interposed on an optical path between two optical surfaces, an optical surface being provided opposite to the reflection-type variable optical-property element, a deflection angle θ of an optical axis caused by the reflection-type variable optical-property element satisfying one of the following conditions:

$$10°<\theta<67°$$

$$10°<\theta/npr<67°$$

where npr is a refractive index of an optical element having the optical surface opposite to the reflection-type variable optical-property element.

14. An optical system according to any one of claim 3, 4, or 13, having at least two reflecting surfaces.

15. An optical system according to any one of claim 3, 4, or 13, wherein the optical axis intersects.

16. An optical system having two reflecting surfaces interposed between two optical surfaces so that one of the two reflecting surfaces constitutes a reflection-type variable optical-property element and a deflection angle of an optical axis caused by a remaining reflecting surface is denoted by ϕ, satisfying one of the following conditions:

$$45°\leq\theta/npr+\phi\leq130°$$

$$90°\leq\theta/npr+\phi\leq220°$$

where θ is a deflection angle of the optical axis caused by the reflection-type variable optical-property element and npr is a refractive index of an optical element having an optical surface opposite to the reflection-type variable optical-property element.

17. An optical system having two reflecting surfaces interposed between two optical surfaces so that one of the two reflecting surfaces constitutes a reflection-type variable optical-property element and a deflection angle of an optical axis caused by a remaining reflecting surface is denoted by φ, satisfying one of the following conditions:

$$25° \leqq \phi \leqq 75°$$

$$105° \leqq \phi \leqq 155°.$$

18. An optical system according to any one of claims 1–4, wherein a periphery of an optical surface of the reflection-type variable optical-property element is fixed.

19. An optical system according to any one of claims 1–4, in a certain state of the optical system, satisfying one of the following conditions:

$$-10.0 < f1/f < -0.15$$

$$0 < |md/f| < 0.3$$

$$0 < md^2/Sm < 5.0 \times 10^{-4}$$

$$0 \leqq |Vm| < 500$$

$$0 \leqq |DM \times f| < 1.00$$

$$1.0 < Cj/f < 60.0$$

where f1 is a focal length of a lens unit with negative power located on an object side of the reflection-type variable optical-property element; f is a focal length of the optical system where a reflecting surface of the reflection-type variable optical-property element has a plane shape; md is a maximum amount of deformation of the reflection-type variable optical-property element; Sm is an optically effective area of the reflecting surface of the reflection-type variable optical-property element; Vm is a voltage applied to the reflection-type variable optical-property element when the focal length is changed in a case where the reflection-type variable optical-property element is drived by a voltage driving system; φDM is an amount proportional to a power of the reflection-type variable optical-property element; and Cj is an overall length of the optical system.

20. An optical system according to any one of claims 1–4, satisfying the following conditions:

$$30° \leqq \theta \leqq 60°$$

$$30° \leqq \phi \leqq 60°$$

where θ is a bending angle of an axial principal ray caused by the reflection-type variable optical-property element and φ is a deflection angle of an optical axis caused by a remaining reflecting surface where one of two reflecting surfaces interposed on the optical path between two optical surfaces constitutes the reflection-type variable optical-property element.

21. An optical system comprising:

a plurality of rotational-symmetrical optical surfaces; and at least one reflection-type variable optical-property element, the reflection-type variable optical-property element being interposed on an optical path between two rotational-symmetrical optical surfaces, a deflection angle θ of an optical axis caused by the reflection-type variable optical-property element satisfying one of the following conditions:

$$10° < \theta < 67°$$

$$10° < \theta/npr < 67°$$

where npr is a refractive index of an optical element having an optical surface opposite to the reflection-type variable optical-property element.

22. An optical system according to any one of claims 1–4, wherein a part of optical elements is moved.

23. An optical system according to claim 1 or 2, wherein shift decentration and tilt decentration of the optical element are both zero.

24. An optical system according to any one of claims 1–4, wherein an image sesnor is provided, and shift decentration and tilt decentration of the optical element are not zero.

* * * * *

UNITED STATES PATENT AND TRADEMARK OFFICE

CERTIFICATE OF CORRECTION

PATENT NO. : 7,131,740 B2
APPLICATION NO. : 11/079095
DATED : November 7, 2006
INVENTOR(S) : Kimihiko Nishioka It is certified that error appears in the above-identified patent and that said Letters Patent is hereby corrected as shown below:

Column 10, line 19, replace "0.05< | β 1 <1.1" with -- 0.05< | β 1 | <1.1 --.

Column 10, line 33, replace "0.1< | β 1 <0.8" with -- 0.1< | β 1 | <0.8--.

Column 16, line 17, replace "0.0° ≦ ε |<20°" with -- 0.0° ≦ | ε |<20°--.

Column 17, line 63, replace "0.05 < | β 1 <1.3" with -- 0.05 < | β 1 | <1.3 --.

Column 18, line 56, replace "$|f_3/f'>1.0$" with --$|f_3/f|>1.0$ --.

Column 21, line 14, replace "$D_{19}(10R^5 - 12R^3 + 3R)\cos(A) + D_{21}$" with --$D_{19}(10R^5 - 12R^3 + 3R)\cos(A) + D_{20}(10R^5 - 12R^3 + 3R)\sin(A) + D_{21}$--.

Column 21, line 19, replace "$D_{29}R^6\sin(6A)$" with --$D_{29}R^6\sin(6A)\cdot\cdots$ --.

Column 86, line 46, replace "when one of $(n_{LC}' - n_p)^2$ and $(n°' - n_p)^2$" with --when one of $(n_{LC}' - n_p)^2$ and $(n_o' - n_p)^2$--.

Column 103, line 7, replace "$|f_3/f/1.0$" with -- $|f_3/f/>1.0$ --.

Column 103, line 30, replace "$0.0 \leqq \delta/f| < 1.00$" with -- $0.0 \leqq |\delta/f| < 1.00$ --.

Column 111, line 21, replace "$0.0 \leqq |DMxf| < 1.00$" with -- $0.0 \leqq |\varphi DMxf| < 1.00$ --.

Signed and Sealed this

Eleventh Day of December, 2007

JON W. DUDAS
*Director of the United States Patent and Trademark Office*